(12) United States Patent
Duluk, Jr.

(10) Patent No.: US 6,285,378 B1
(45) Date of Patent: Sep. 4, 2001

(54) METHOD AND APPARATUS FOR SPAN AND SUBSPAN SORTING RENDERING SYSTEM

(75) Inventor: Jerome F. Duluk, Jr., Palo Alto, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/264,302

(22) Filed: Mar. 8, 1999

Related U.S. Application Data

(63) Continuation of application No. 08/686,535, filed on Jul. 26, 1996.
(60) Provisional application No. 60/001,529, filed on Jul. 26, 1995.

(51) Int. Cl.[7] .................................................. G06F 15/00
(52) U.S. Cl. ............................................................. 345/441
(58) Field of Search ................................... 345/418, 419, 345/441, 442, 443, 118, 433

(56) References Cited

U.S. PATENT DOCUMENTS

| | | | | |
|---|---|---|---|---|
| 4,825,391 | * | 4/1989 | Merz | 345/431 |
| 5,146,592 | * | 9/1992 | Pfeiffer et al. | 345/344 |
| 5,493,644 | * | 2/1996 | Thayer et al. | 345/502 |
| 5,977,987 | * | 11/1999 | Dulik, Jr. | 345/441 |

* cited by examiner

Primary Examiner—Phu K. Nguyen
(74) Attorney, Agent, or Firm—Flehr Hohbach Test Albritton & Herbert LLP

(57) ABSTRACT

A data shifting capability that permits sorting the data in addition to searching for obtaining real-time performance in color, with high quality imagery through a simple search of a spacial database based on a rectangularly shaped search region or range search. A sorting Magnitude Comparison Content Addressable Memory (SMCCAM) performs a range search, introducing a conservative approximation of the idea Occluding Region, and provides a MCCAM wherein the data words stored in the fields are shifted to corresponding fields in an adjacent word, based on the magnitude comparisons. The 3D graphics method stores the parameters of a polygon span in a spatial database and a query operation is performed on the database to determine which of those spans, or portions of spans, are visible, and applies a rule for comparing a new span portion to an old span portion on a subspan-by-subspan basis, thereby providing additional polygon edge information within a raster line, providing anti-aliasing.

2 Claims, 65 Drawing Sheets

Span Sorting Renderer Architecture

Figure 7A:
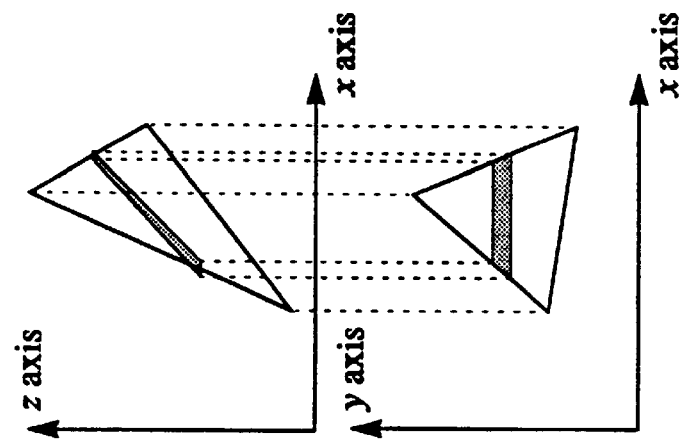

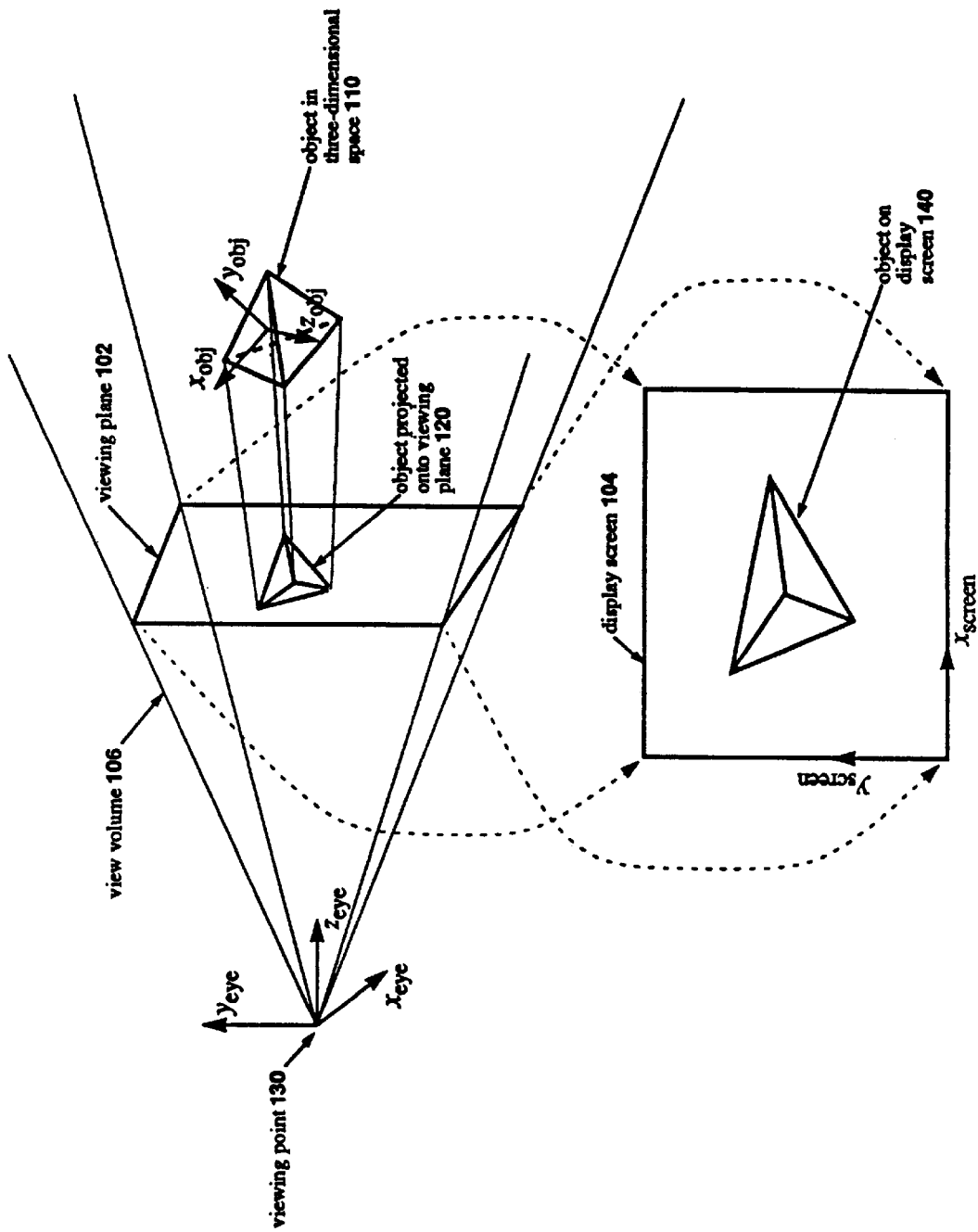
Figure 1 The Rendering Problem

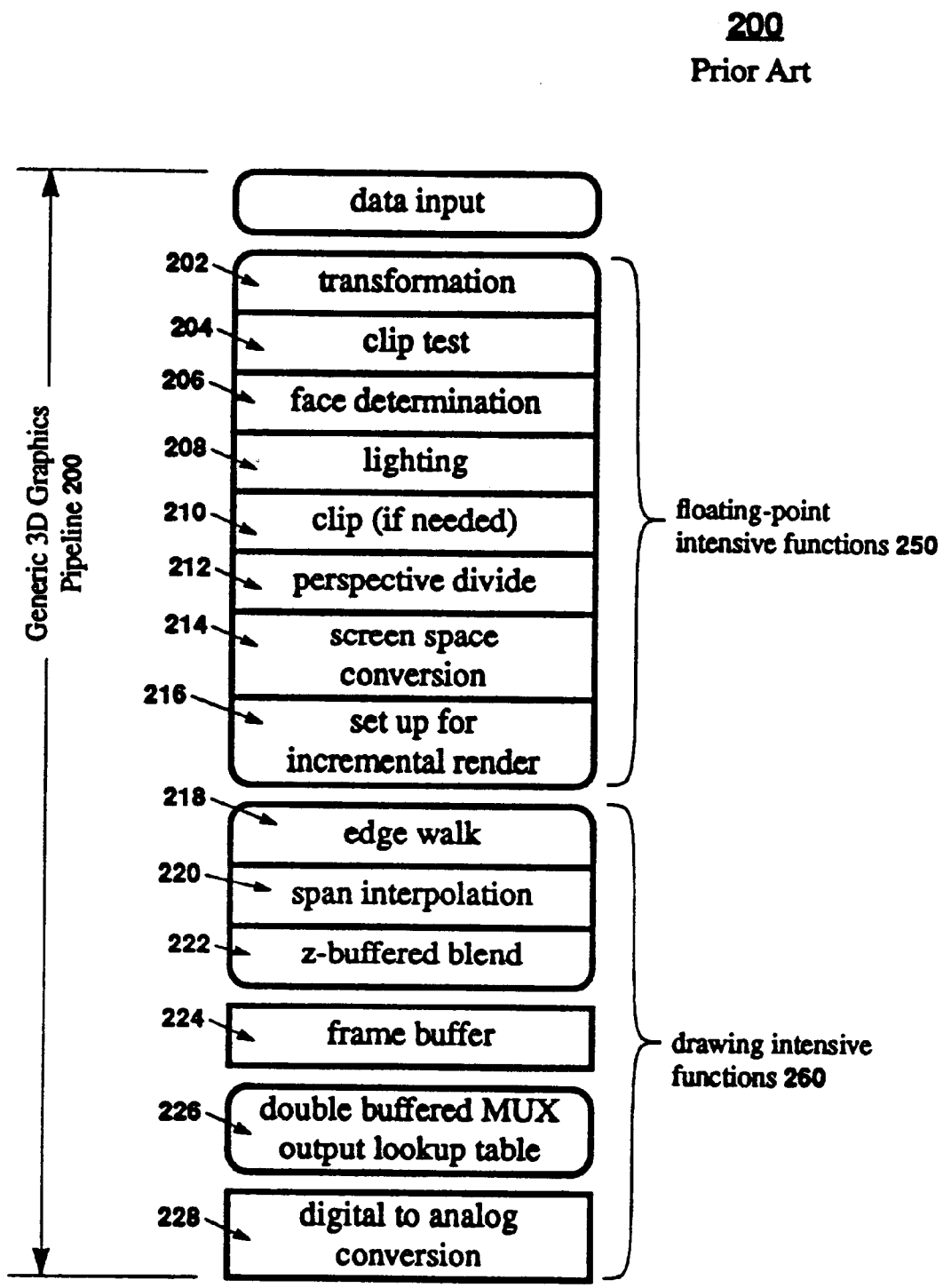
Figure 2 Generic 3D Rendering Pipeline
200
Prior Art

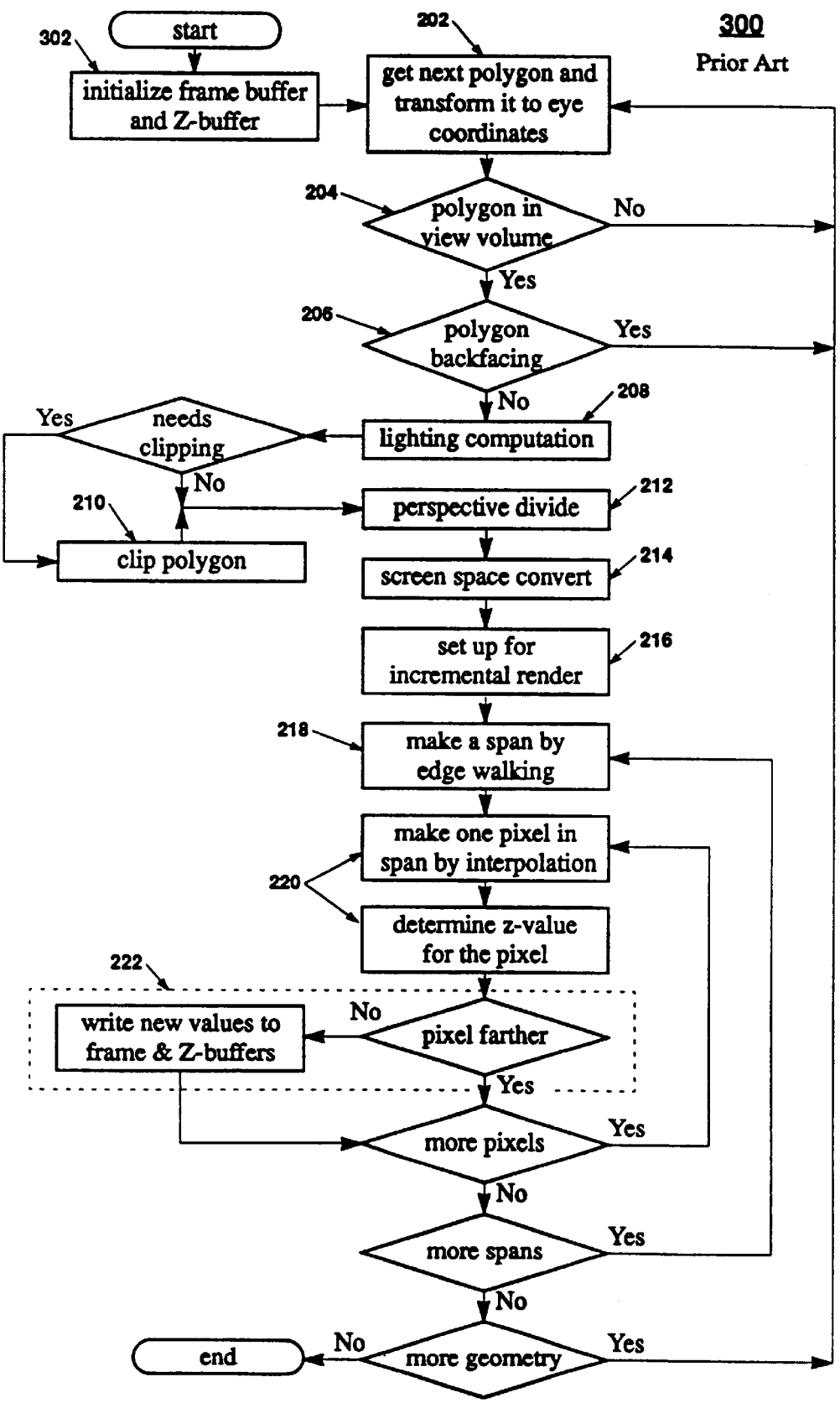
Figure 3 Generic 3D Rendering Method

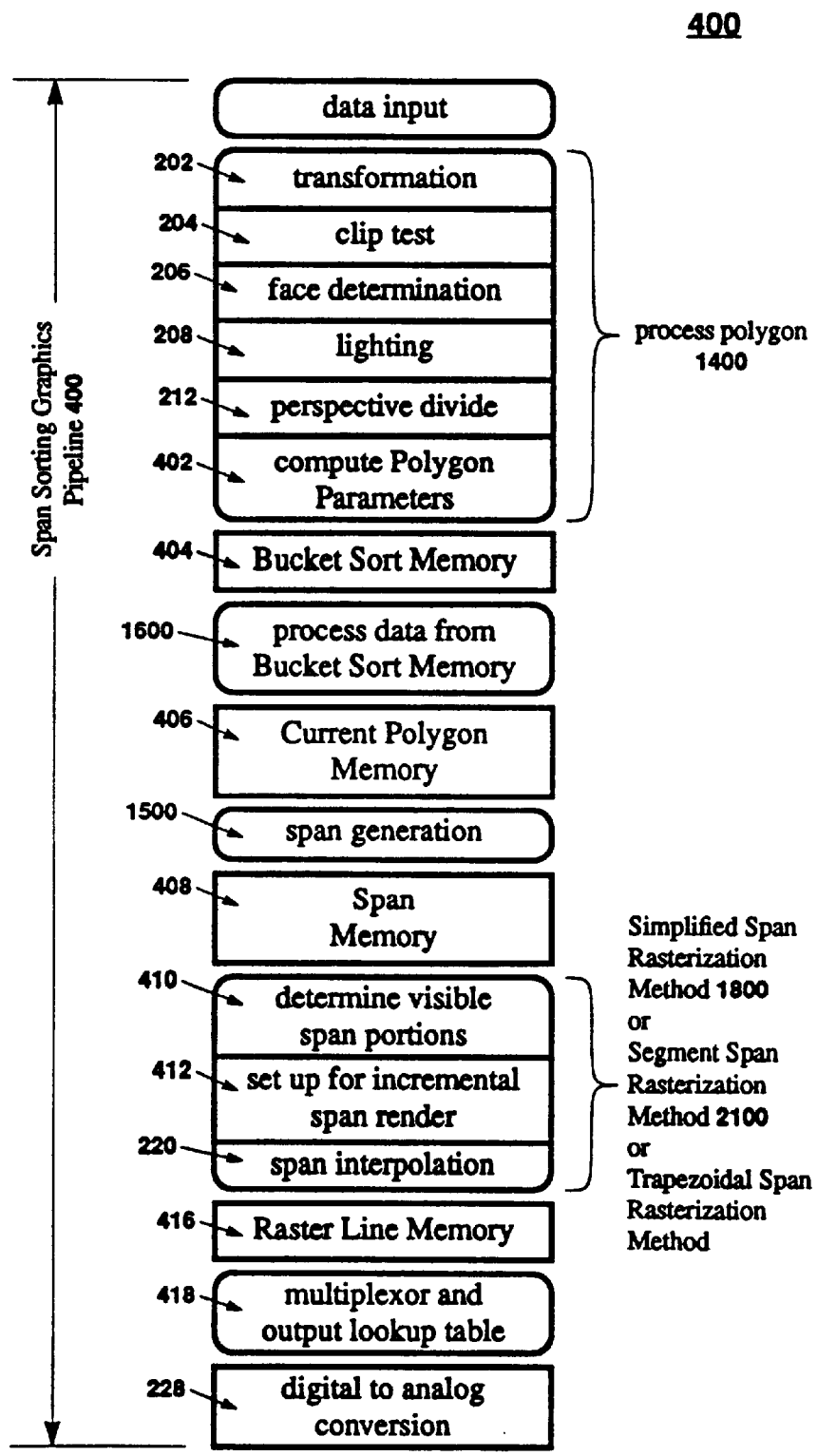
Figure 4 Span Sorting Rendering Pipeline

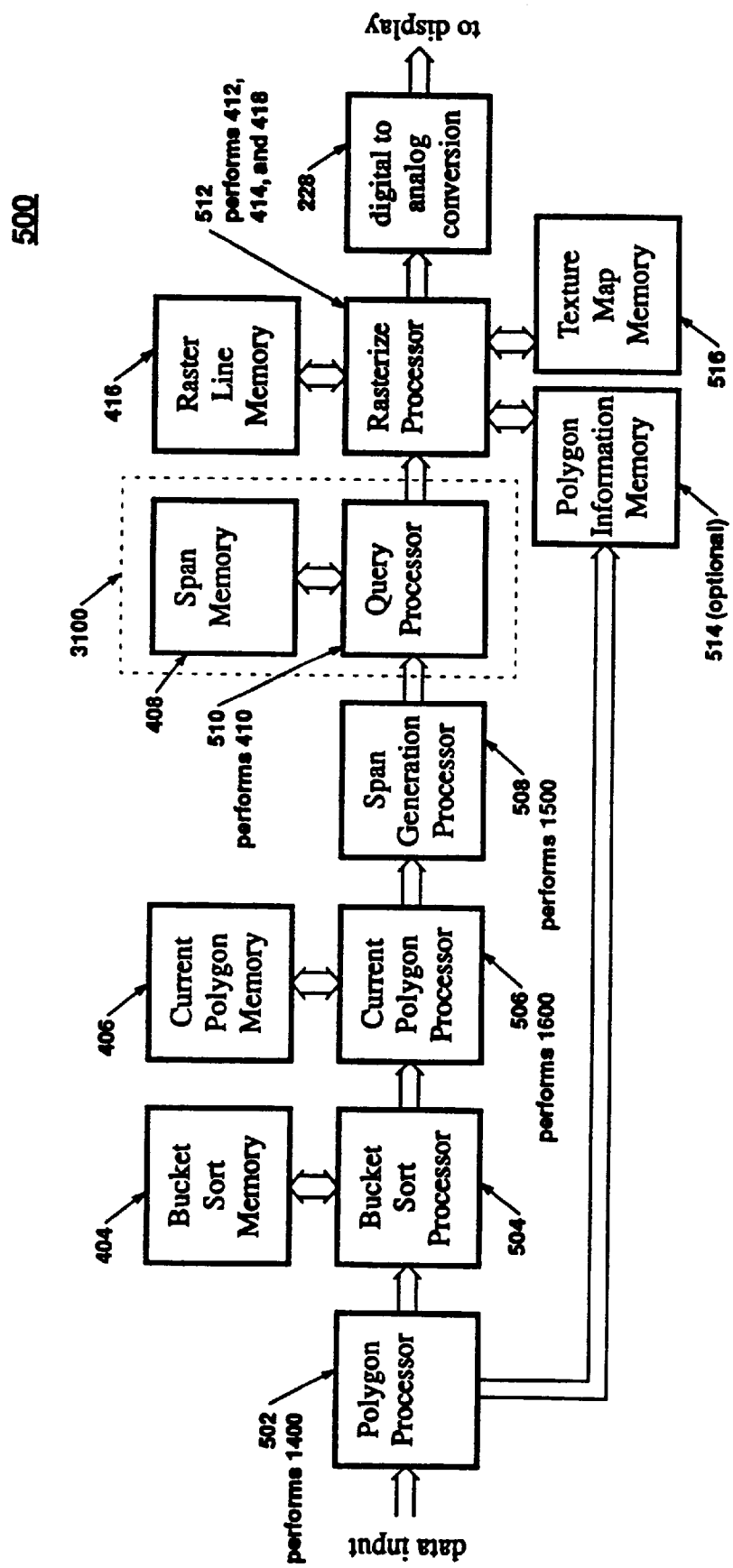
Figure 5 Span Sorting Renderer Architecture

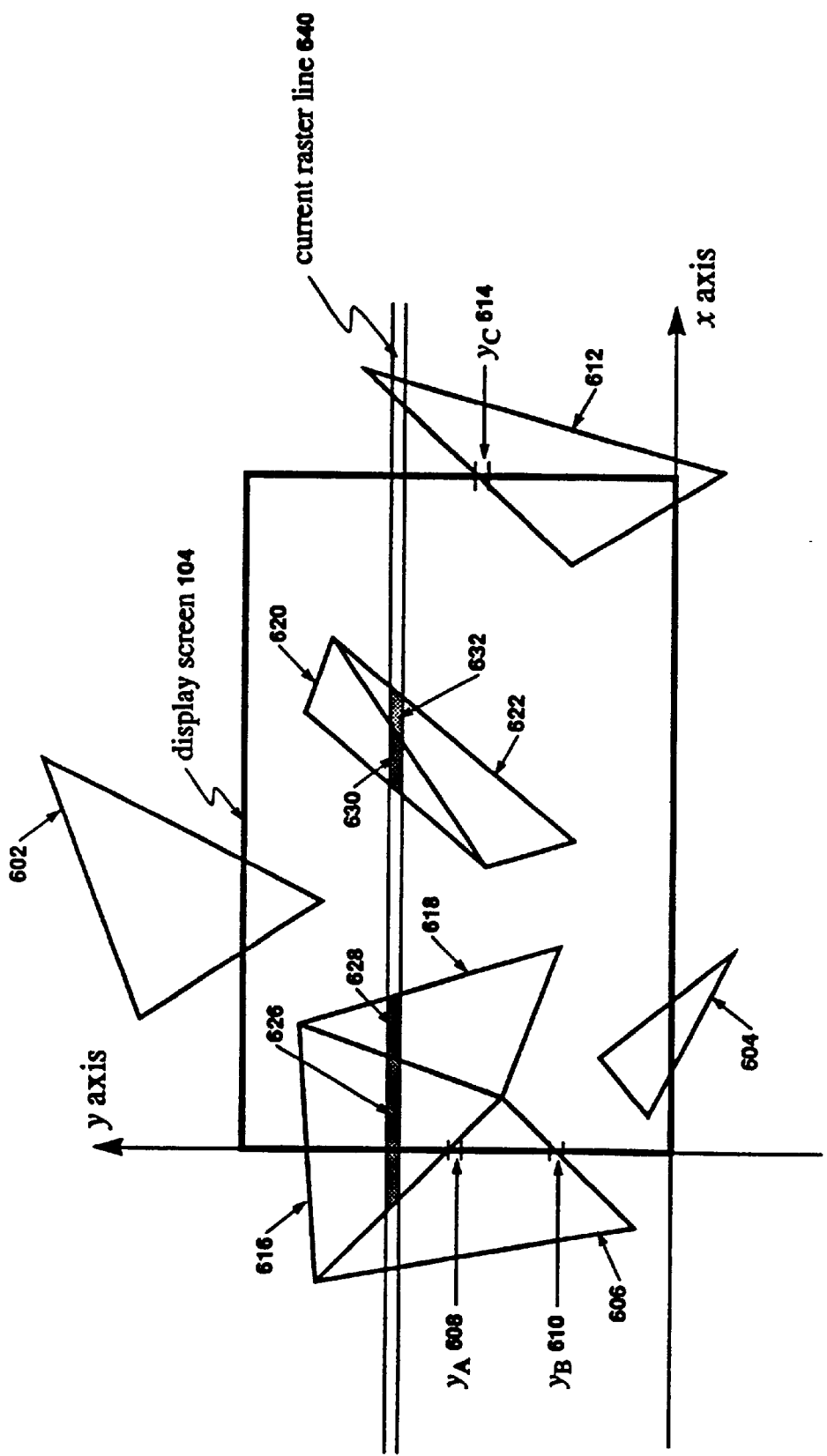
Figure 6 Generation and Sorting of Screen Coordinate Polygons and Spans

Figure 7 Three Ways to Model Spans

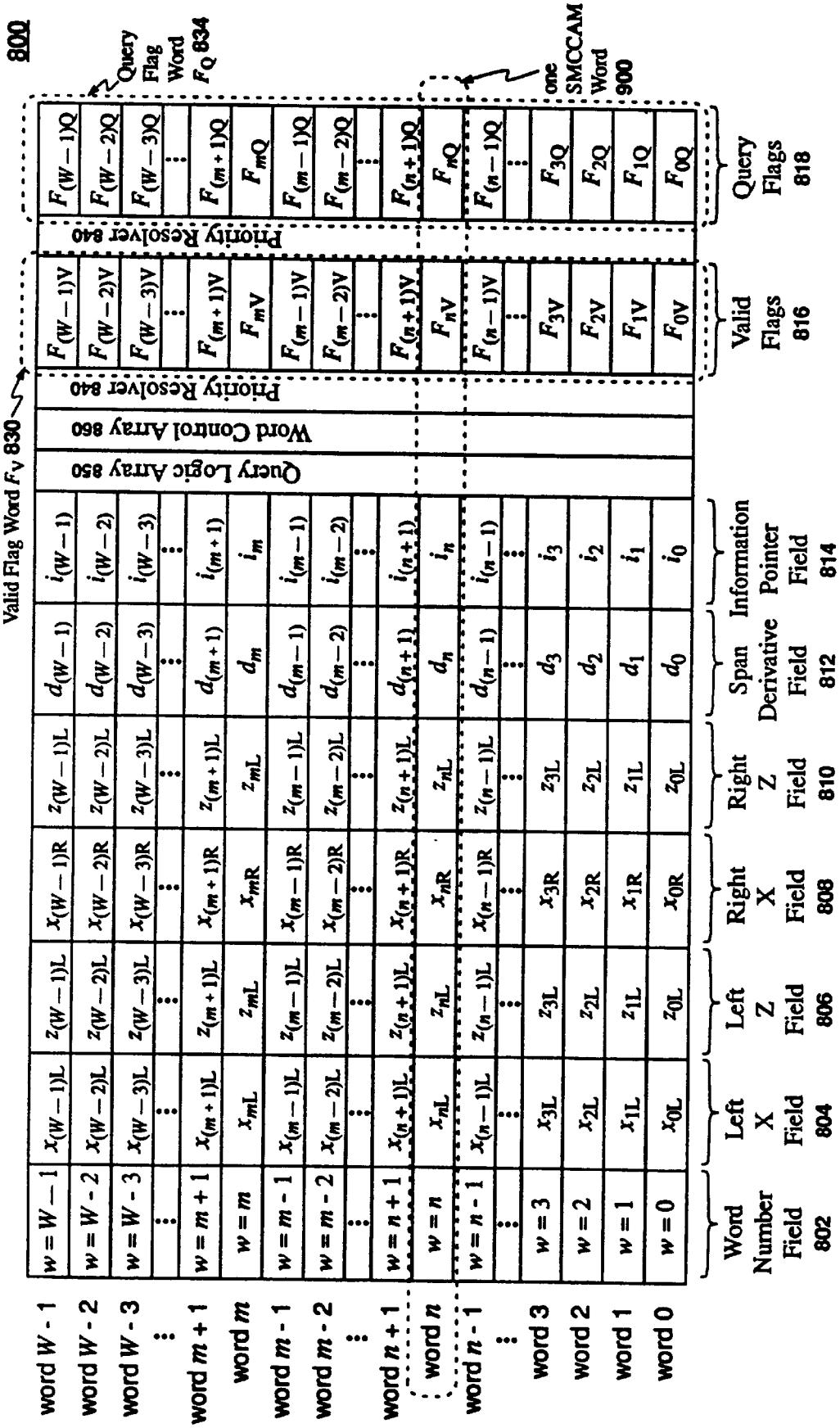
Figure 8 Data Storage within a Page of Span Memory

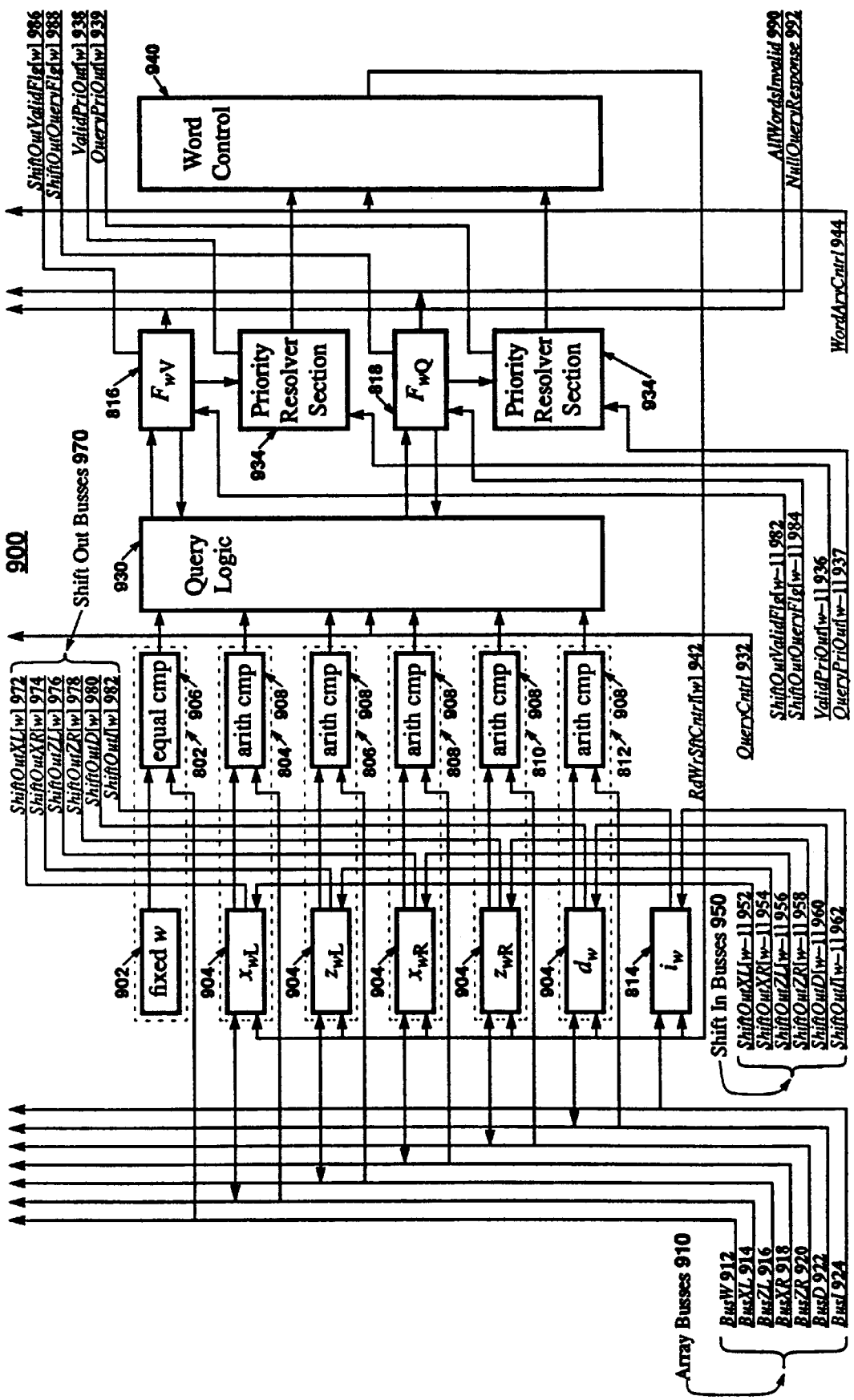
Figure 9 Block Diagram for SMCCAM Word

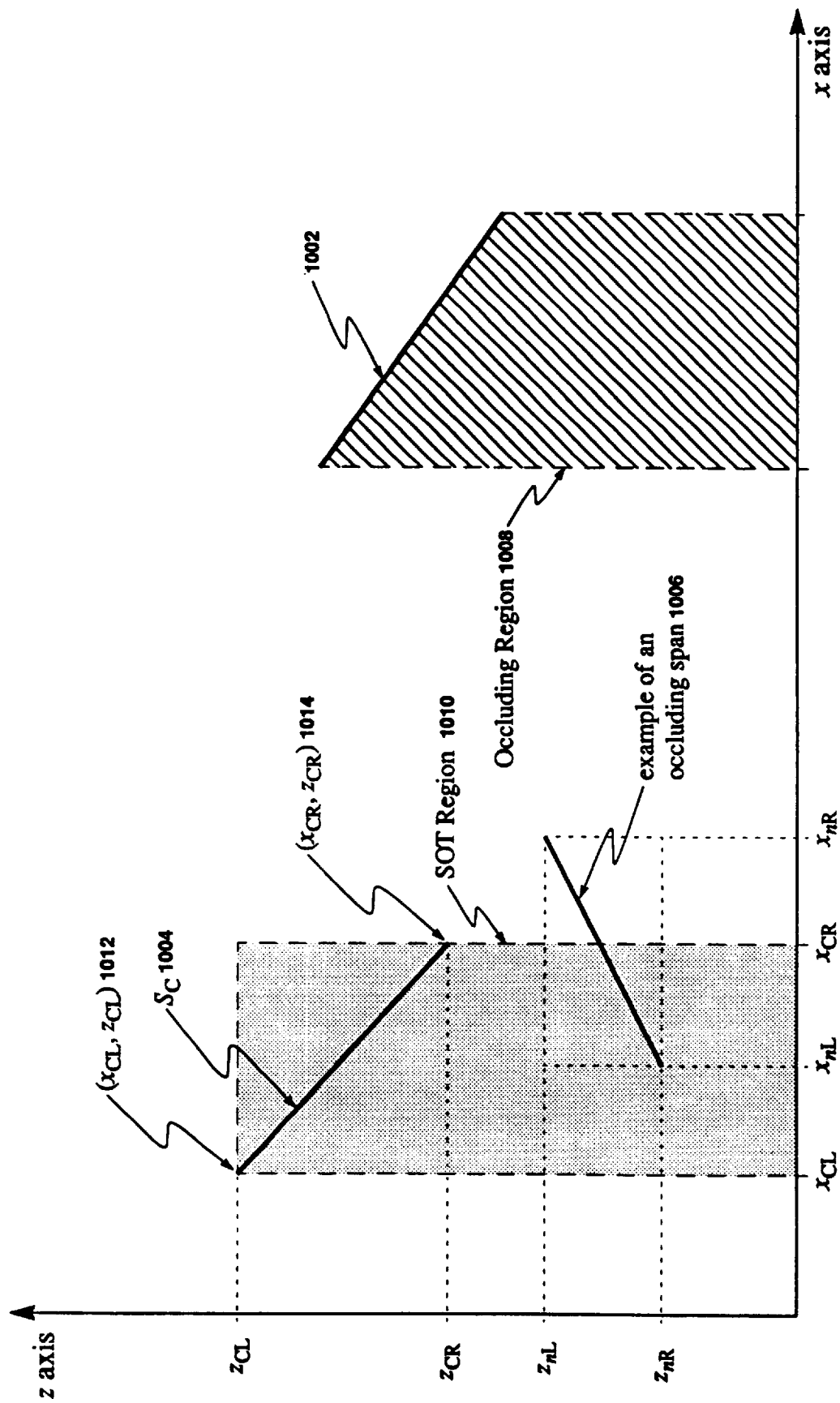

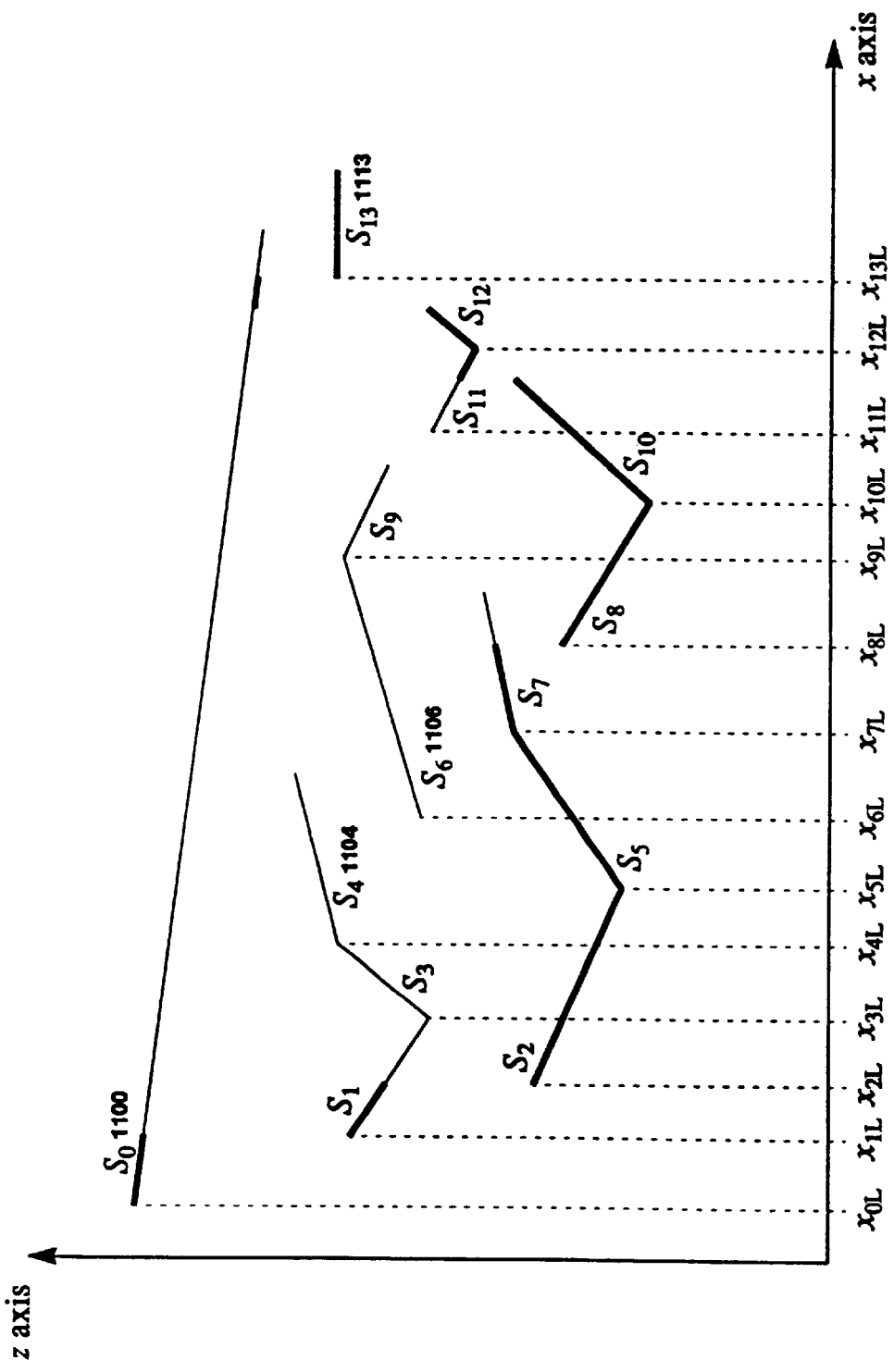
Figure 11 A Set of Spans on One Raster Line, Showing Visible Span Portions

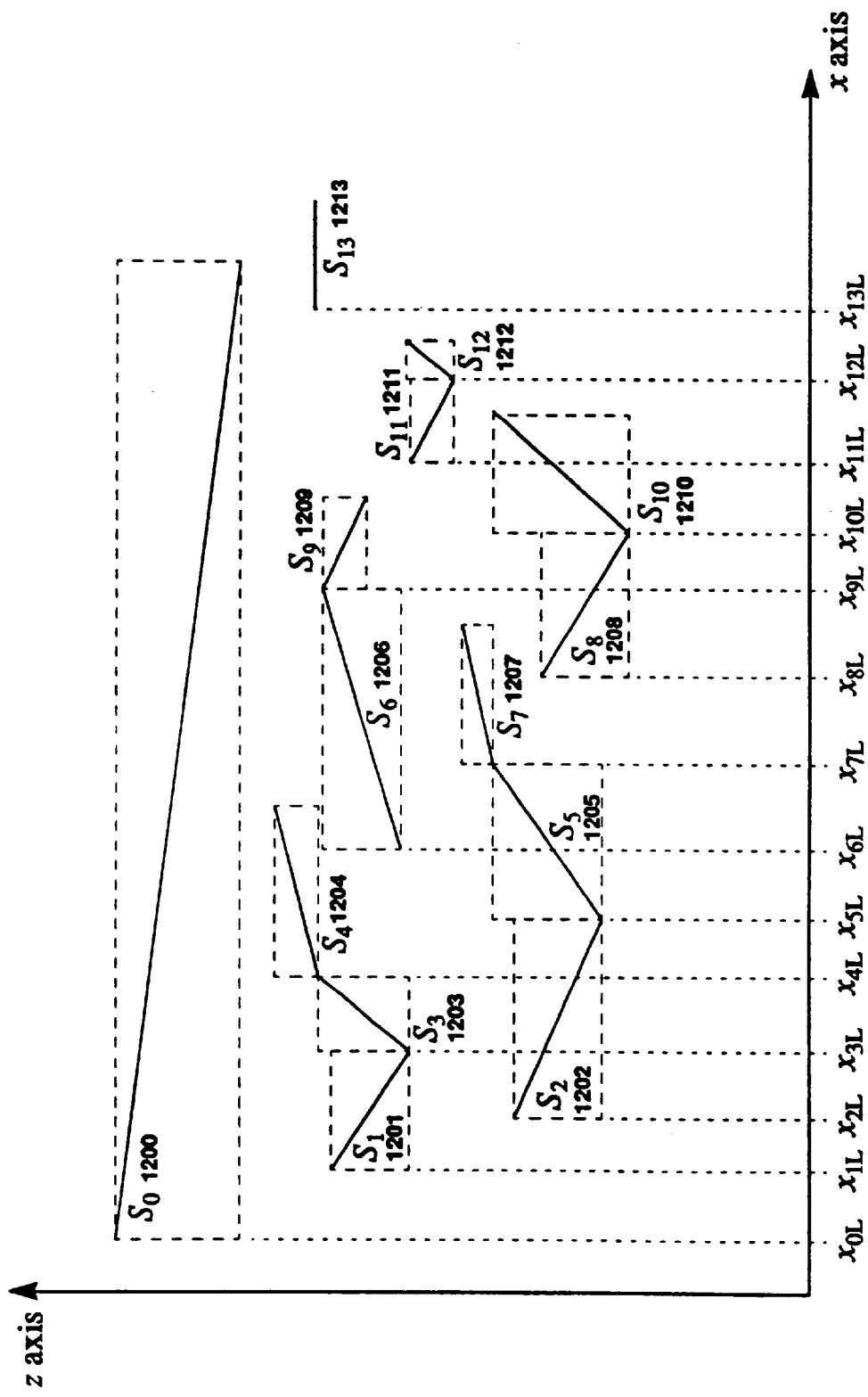
Figure 12 A Set of Spans on One Raster Line, Showing Span Bounding Boxes

Figure 13 Span Sorting Rendering Method (SSRM)
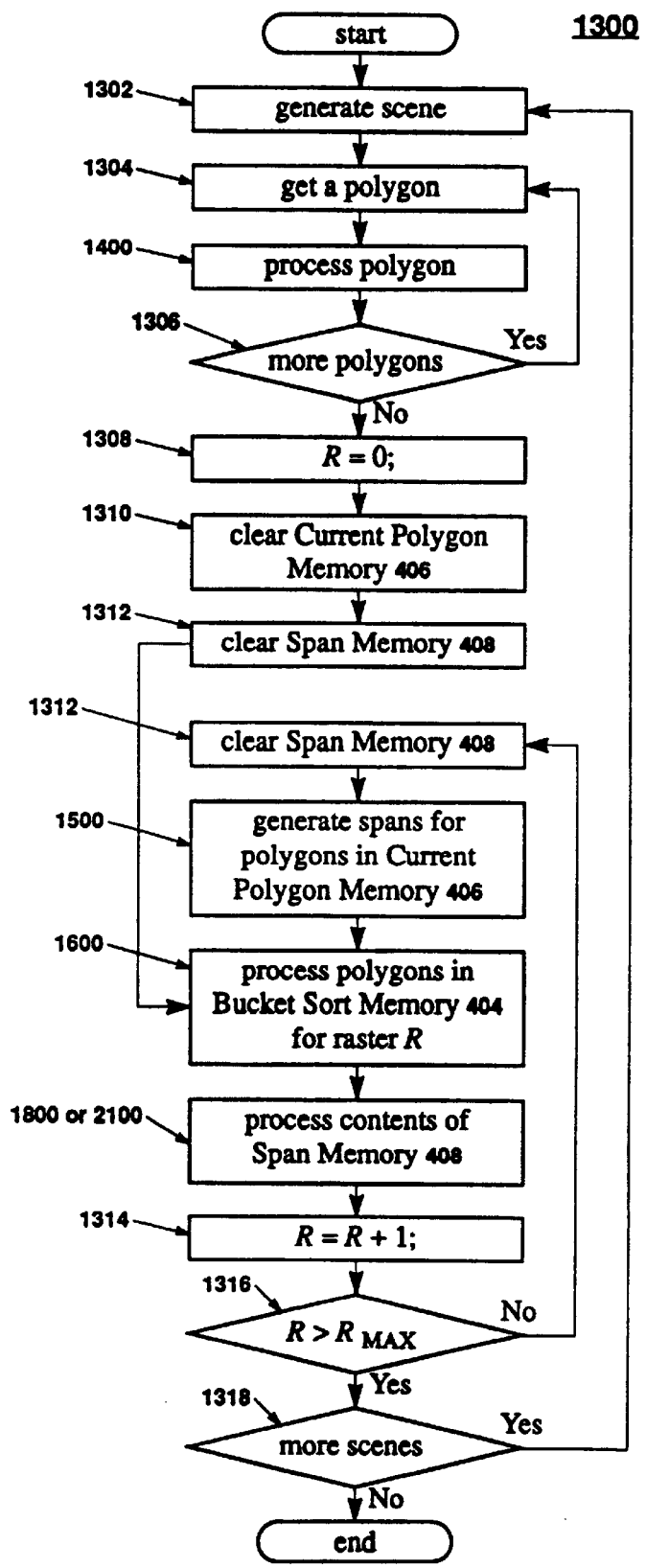

Figure 14 Process Polygon Method (in SSRM)
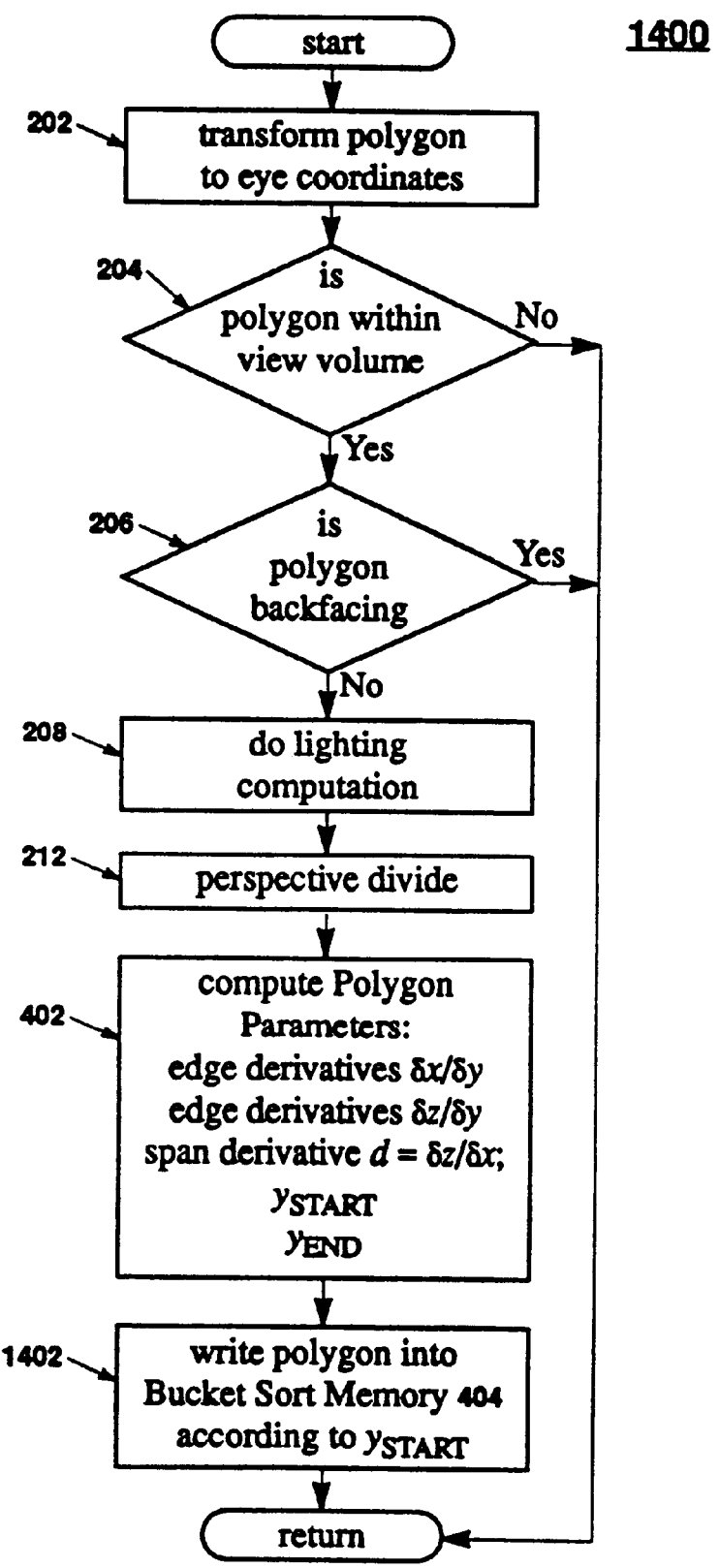

Figure 15 Process Current Polygon Memory (in SSRM)
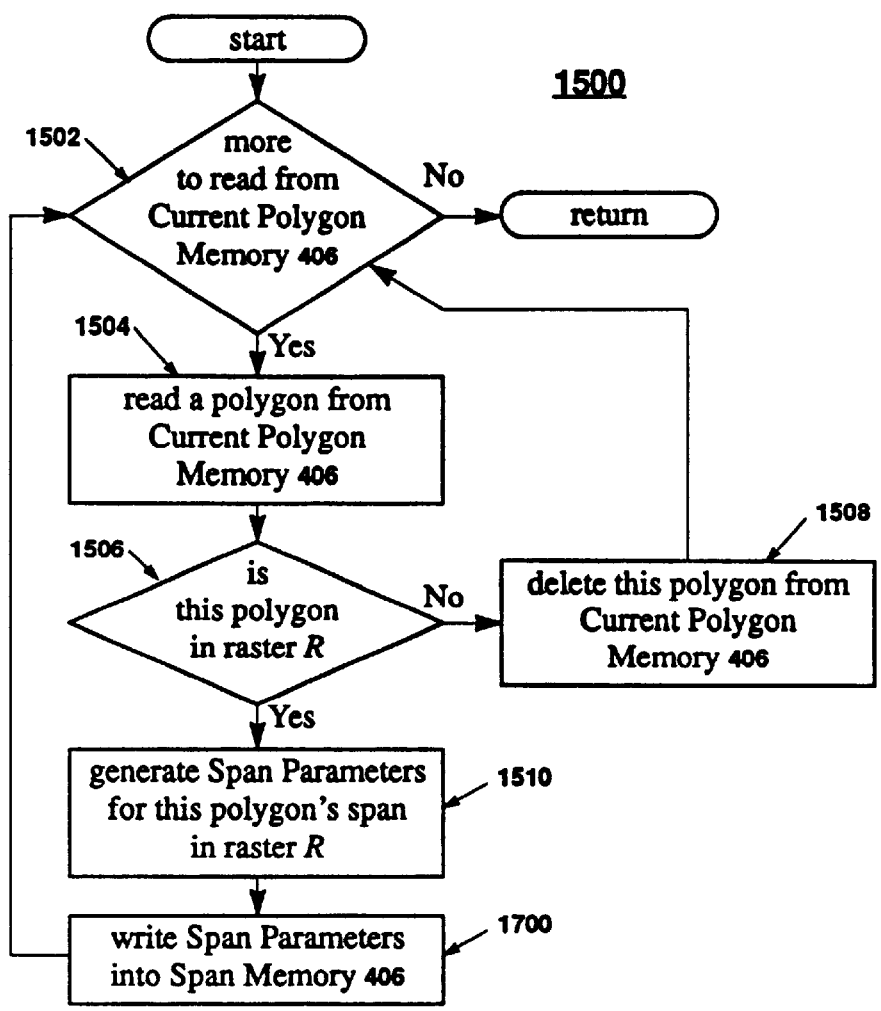

Figure 16 Process Bucket Sort Memory (in SSRM)
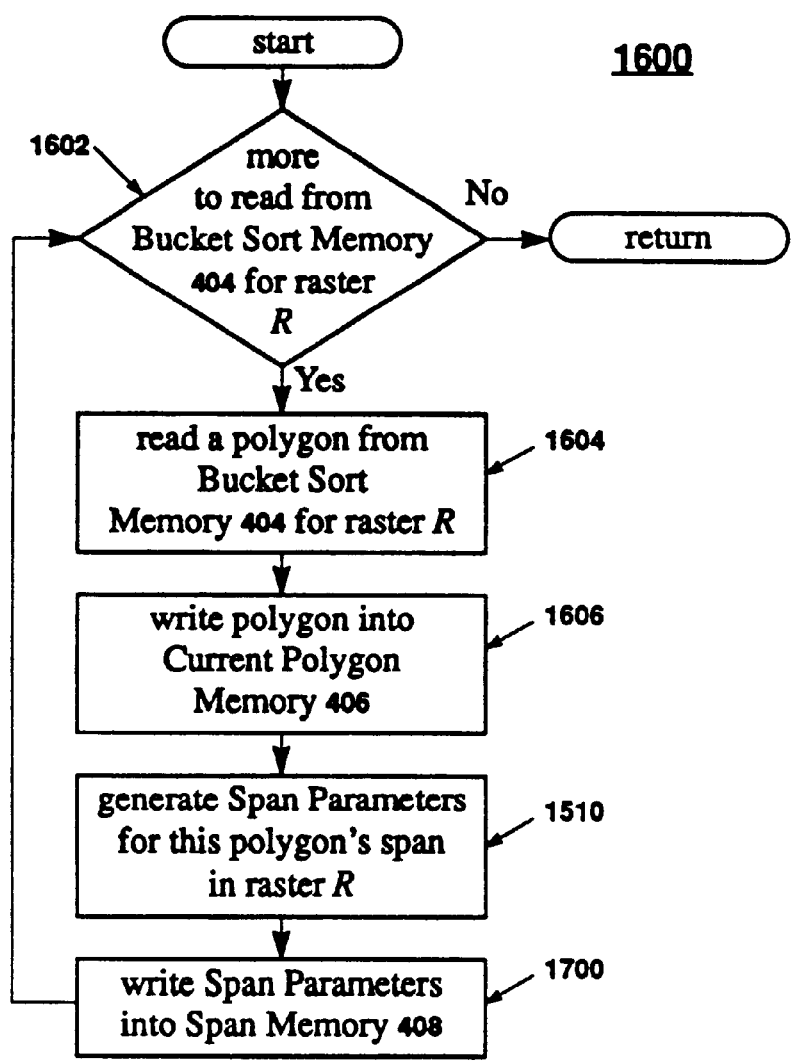

Figure 17 Write Span Parameters into SMCCAM
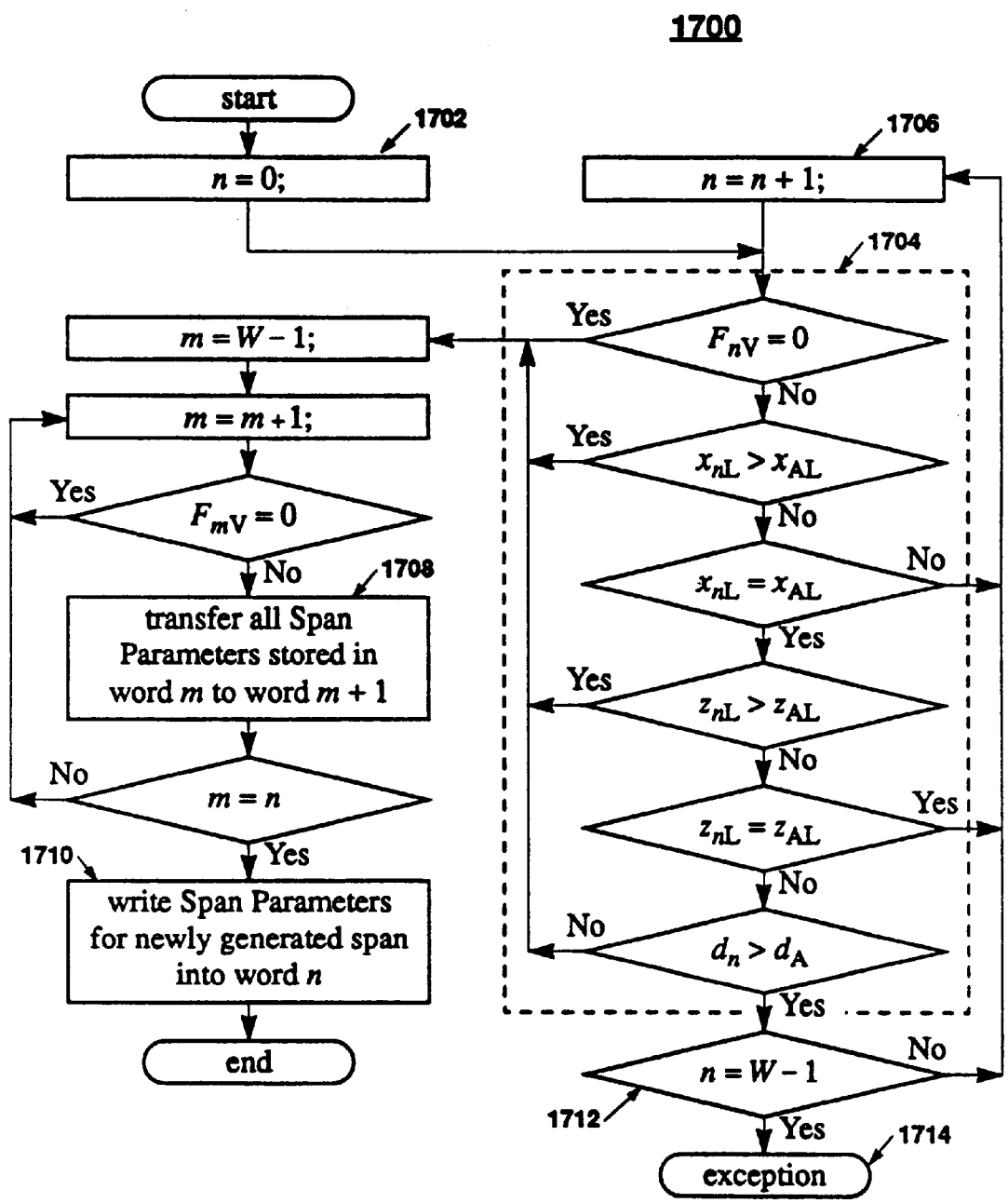

Figure 18 Simplified Span Rasterization Method
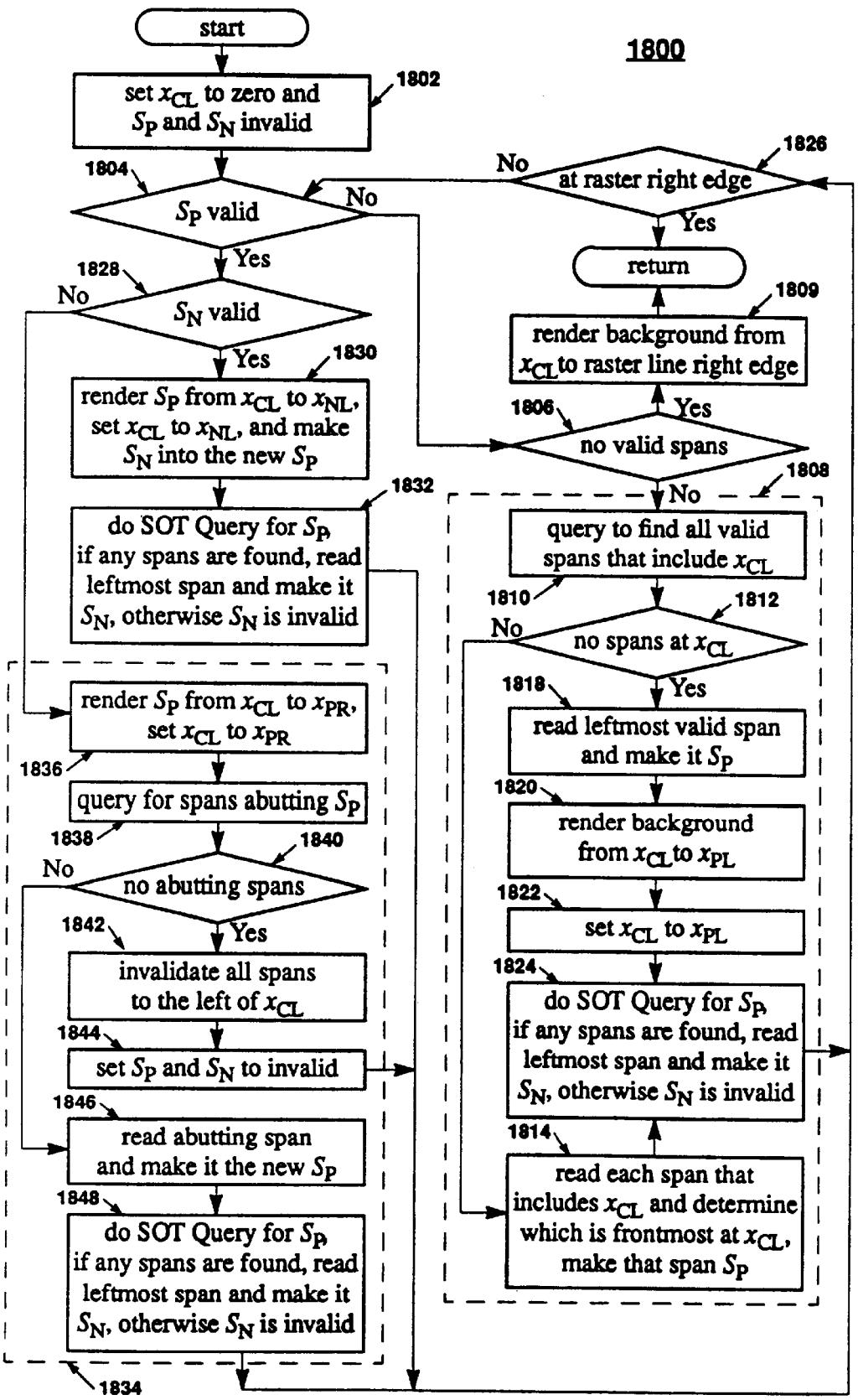

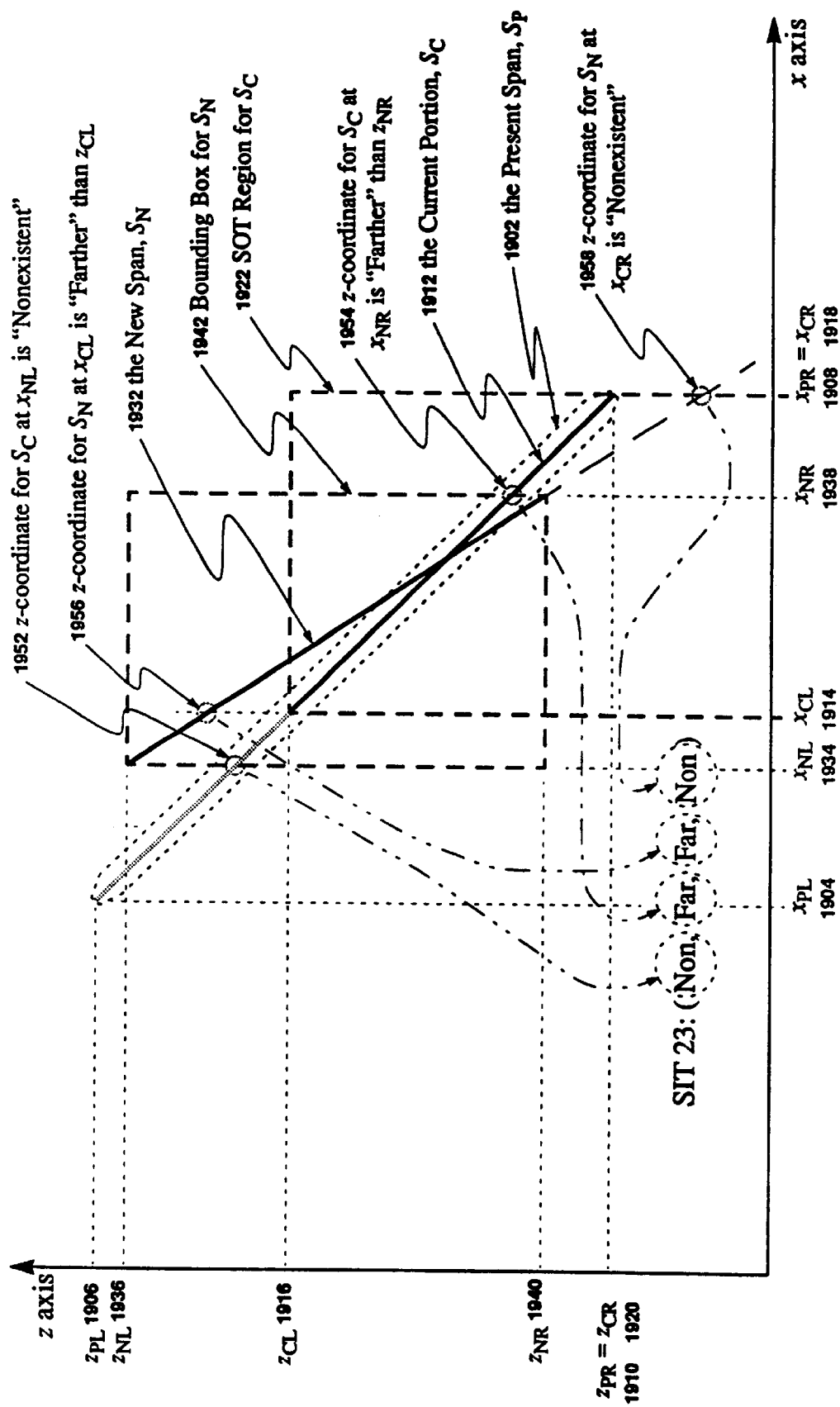
Figure 19 Span Interaction Nomenclature Definitions

Figure 20 Types of Span Interactions
Figure 20A: Interaction Type 1 = (Near, Near, Non, Non) ⇒ Rule 5
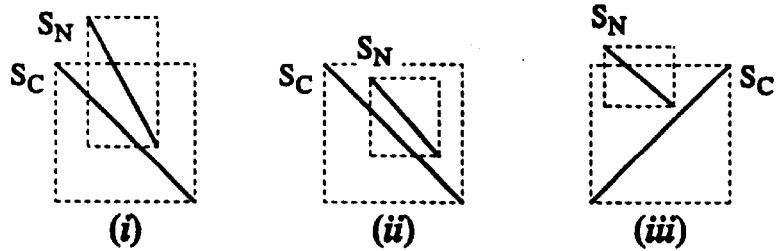
Figure 20B: Interaction Type 2 = (Near, Far, Non, Non) ⇒ Rule 4
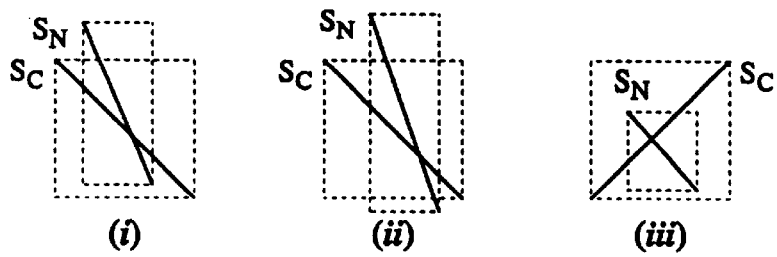
Figure 20C: Interaction Type 3 = (Near, Equal, Non, Non) ⇒ Rule 5
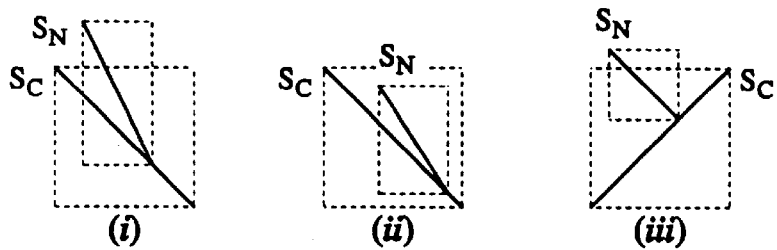
Figure 20D: Interaction Type 4 = (Far, Near, Non, Non) ⇒ Rule 3
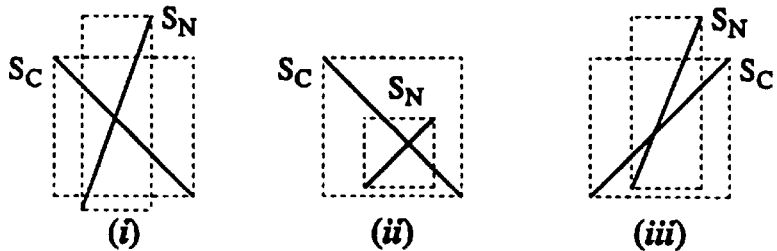
Figure 20E: Interaction Type 5 = (Far, Far, Non, Non) ⇒ Rule 3
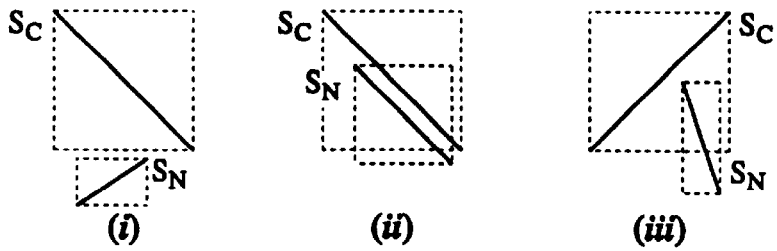

Figure 20 (continued) Types of Span Interactions
Figure 20F: Interaction Type 6: (Far, Equal, Non, Non) ⇒ Rule 3
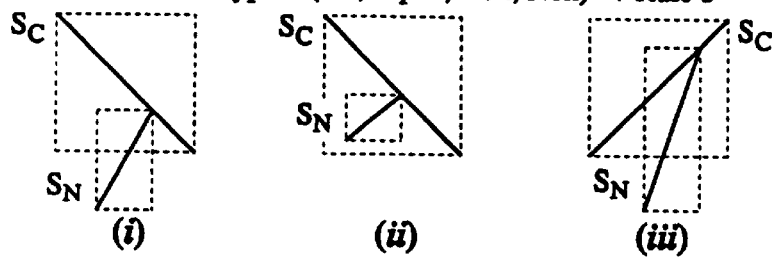
Figure 20G: Interaction Type 7 = (Equal, Near, Non, Non) ⇒ Rule 5
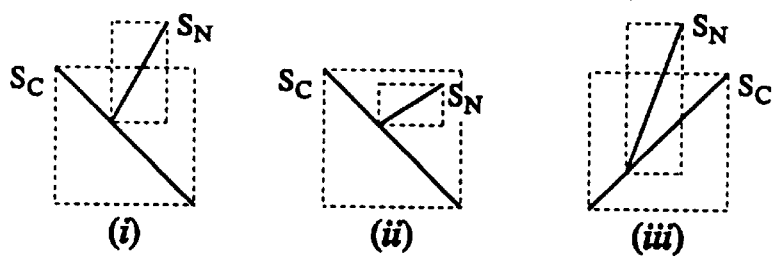
Figure 20H: Interaction Type 8 = (Equal, Far, Non, Non) ⇒ Rule 3
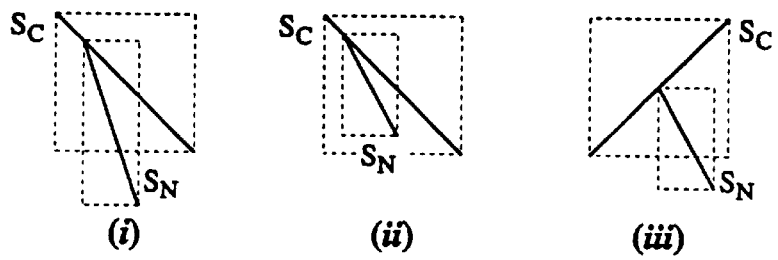
Figure 20I: Interaction Type 9 = (Equal, Equal, Non, Non) ⇒ Rule 5
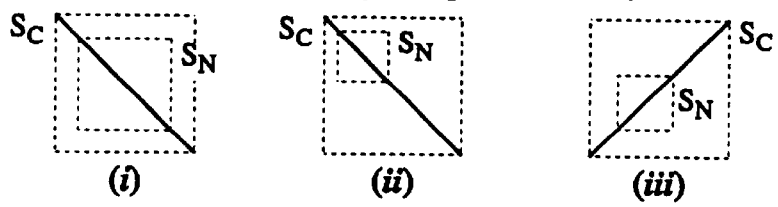
Figure 20J: Interaction Type 10 = (Near, Non, Non, Near) ⇒ Rule 4
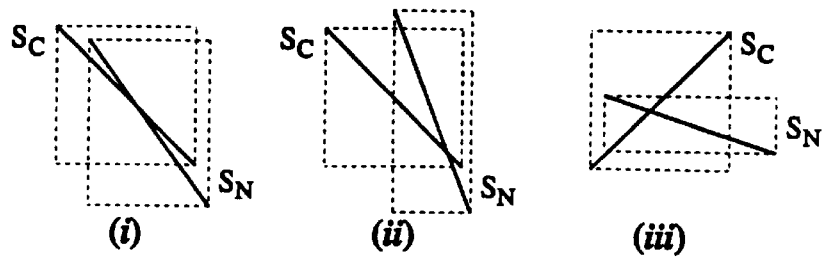

Figure 20 (continued) Types of Span Interactions
Figure 20K: Interaction Type 11 = (Near, Non, Non, Far) ⇒ Rule 5
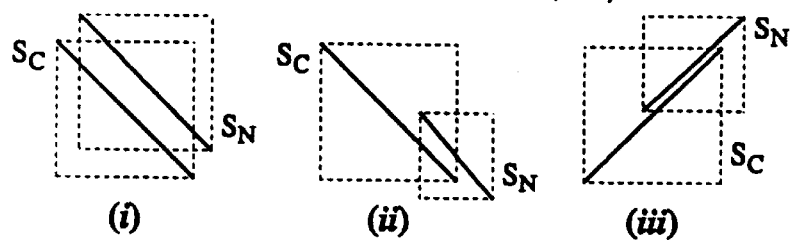
Figure 20L: Interaction Type 12 = (Near, Non, Non, Equal) ⇒ Rule 5
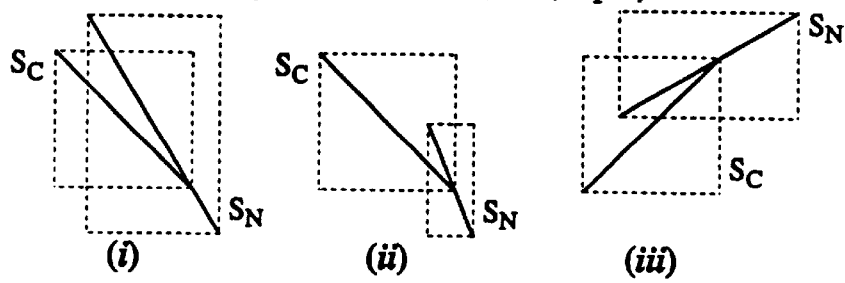
Figure 20M: Interaction Type 13 = (Far, Non, Non, Near) ⇒ Rule 3
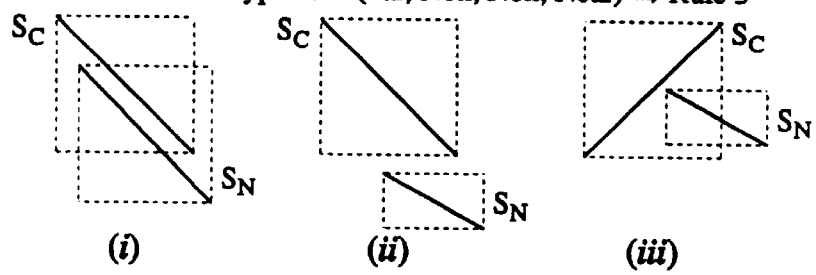
Figure 20N: Interaction Type 14 = (Far, Non, Non, Far) ⇒ Rule 3
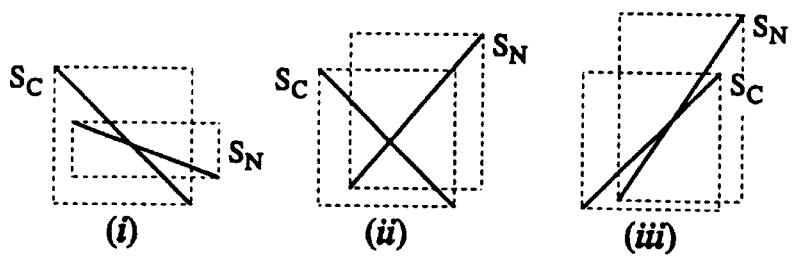
Figure 20O: Interaction Type 15 = (Far, Non, Non, Equal) ⇒ Rule 3
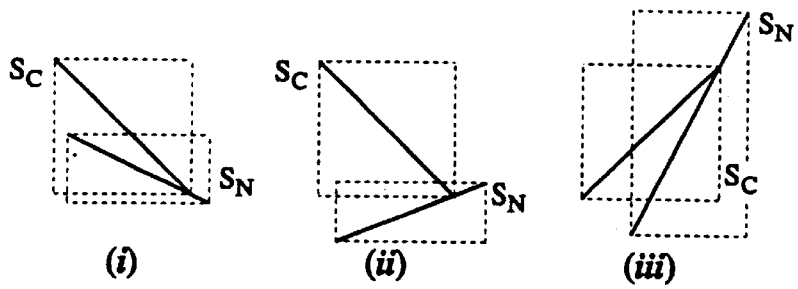

Figure 20 (continued) Types of Span Interactions
Figure 20P: Interaction Type 16 = (Equal, Non, Non, Near) ⇒ Rule 3
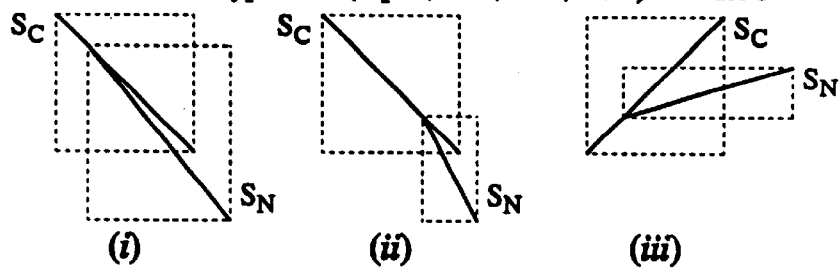
Figure 20Q: Interaction Type 17 = (Equal, Non, Non, Far) ⇒ Rule 5
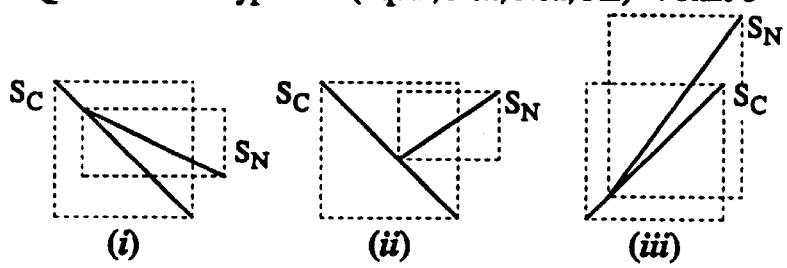
Figure 20R: Interaction Type 18 = (Equal, Non, Non, Equal) ⇒ Rule 5
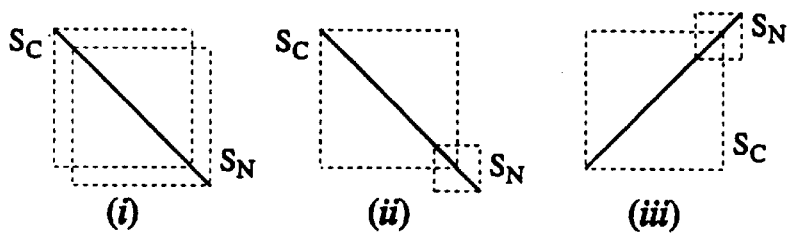
Figure 20S: Interaction Type 19 = (Non, Near, Near, Non) ⇒ impossible
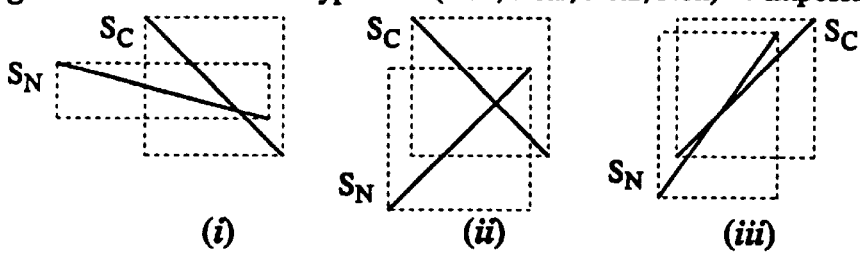
Figure 20T: Interaction Type 20 = (Non, Near, Far, Non) ⇒ Rule 5
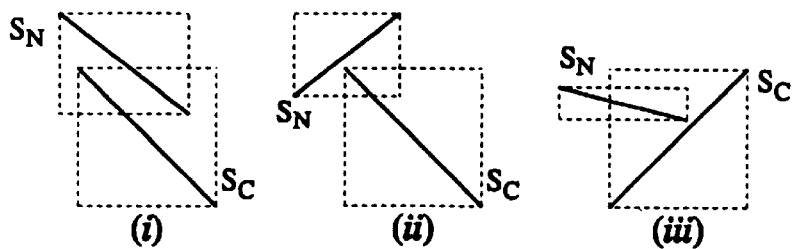

Figure 20 (continued) Types of Span Interactions
Figure 20U: Interaction Type 21 = (Non, Near, Equal, Non) ⇒ Rule 5
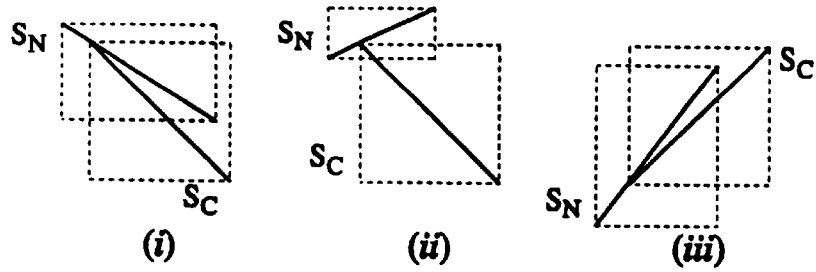
Figure 20V: Interaction Type 22 = (Non, Far, Near, Non) ⇒ impossible
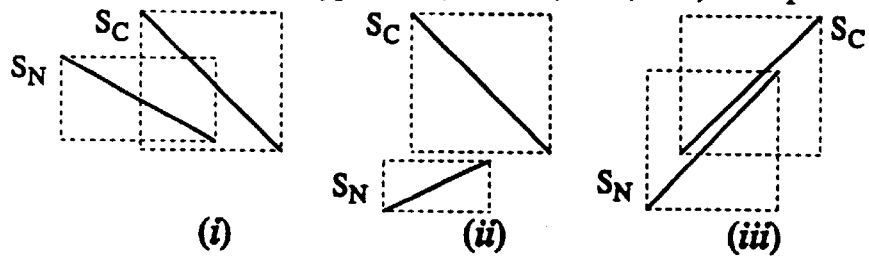
Figure 20W: Interaction Type 23 = (Non, Far, Far, Non) ⇒ Rule 4
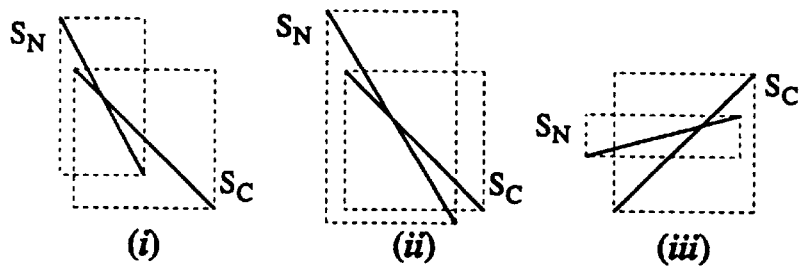
Figure 20X: Interaction Type 24 = (Non, Far, Equal, Non) ⇒ impossible
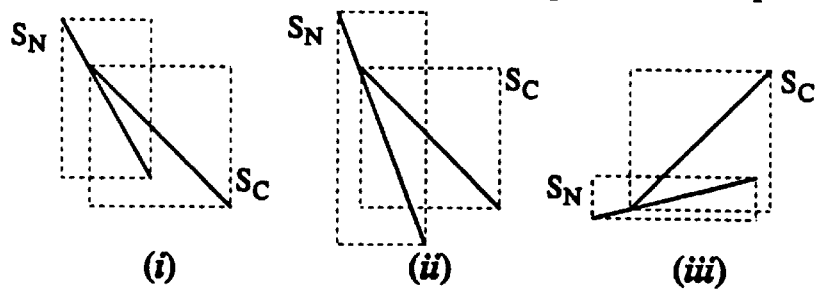
Figure 20Y: Interaction Type 25 = (Non, Equal, Near, Non) ⇒ impossible
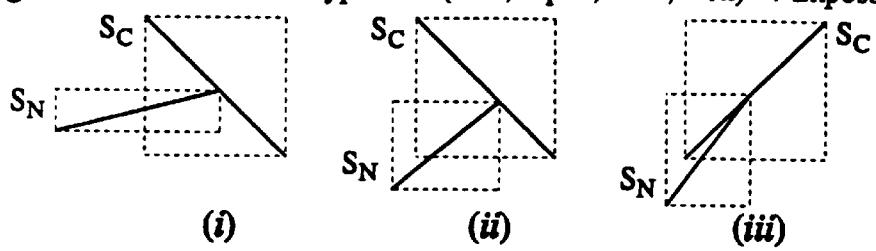

Figure 20 (continued) Types of Span Interactions
Figure 20Z: Interaction Type 26 = (Non, Equal, Far, Non) ⇒ Rule 5
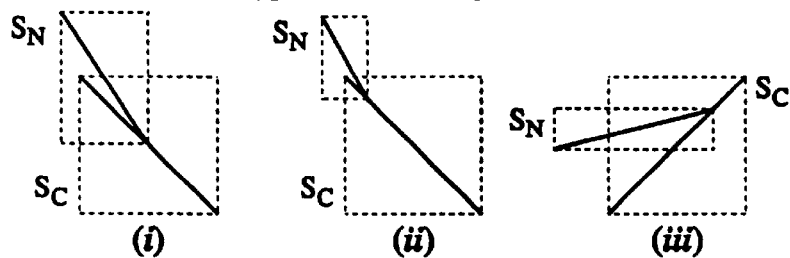
Figure 20AA: Interaction Type 27 = (Non, Equal, Equal, Non) ⇒ Rule 5
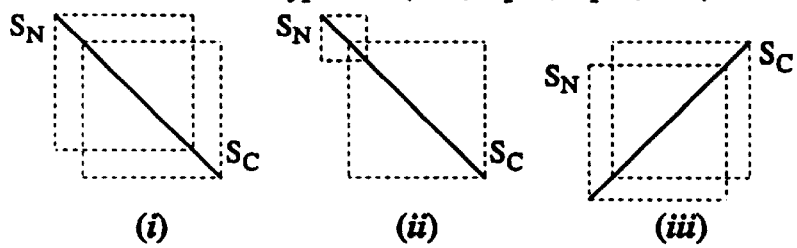
Figure 20BB: Interaction Type 28 = (Non, Non, Near, Near) ⇒ impossible
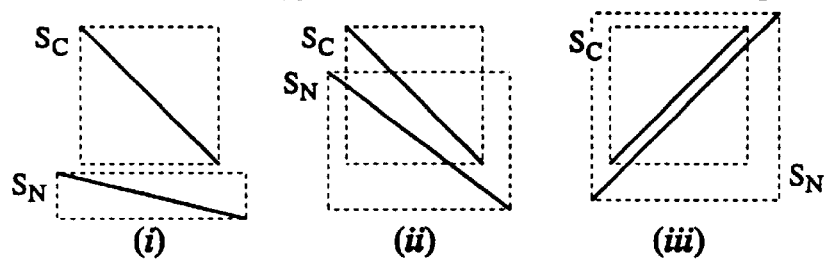
Figure 20CC: Interaction Type 29 = (Non, Non, Near, Far) ⇒ impossible
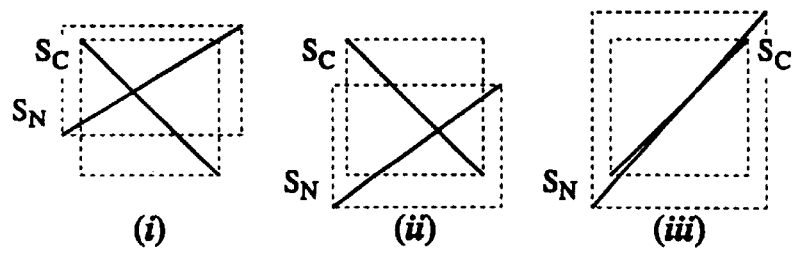
Figure 20DD: Interaction Type 30 = (Non, Non, Near, Equal) ⇒ impossible
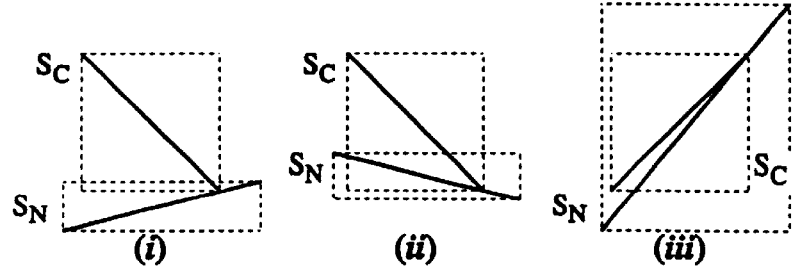

Figure 20 (continued) Types of Span Interactions
Figure 20EE: Interaction Type 31 = (Non, Non, Far, Near) ⇒ Rule 4
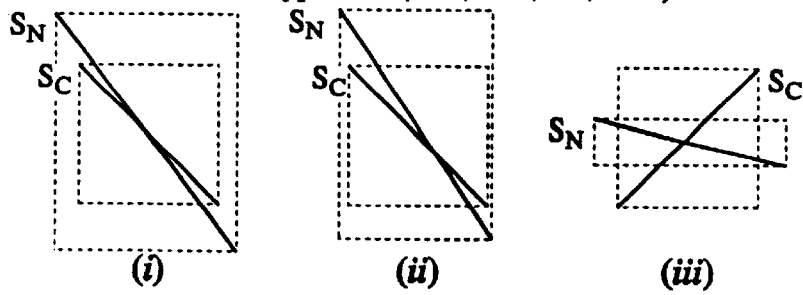
Figure 20FF: Interaction Type 32 = (Non, Non, Far, Far) ⇒ Rule 5
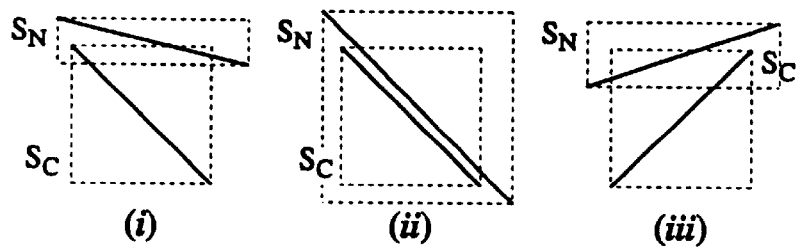
Figure 20GG: Interaction Type 33 = (Non, Non, Far, Equal) ⇒ Rule 5
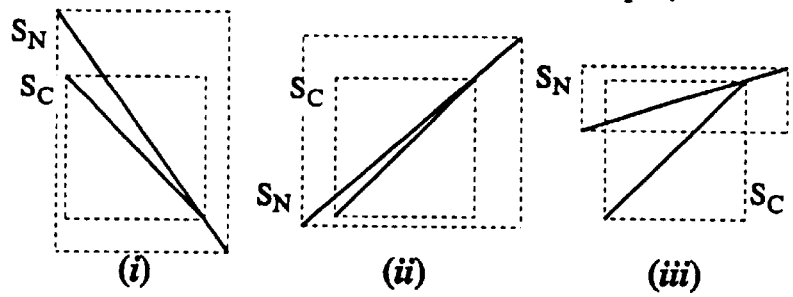
Figure 20HH: Interaction Type 34 = (Non, Non, Equal, Near) ⇒ impossible
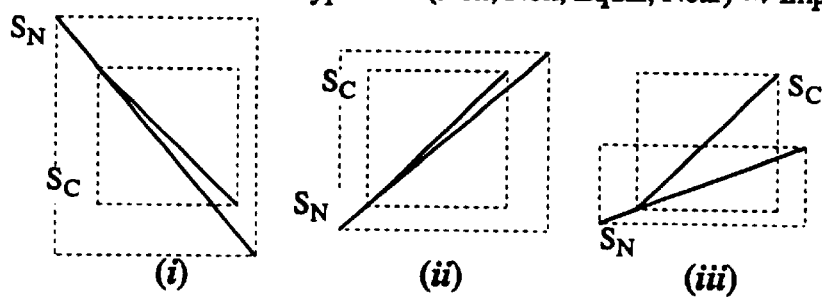
Figure 20II: Interaction Type 35 = (Non, Non, Equal, Far) ⇒ Rule 5
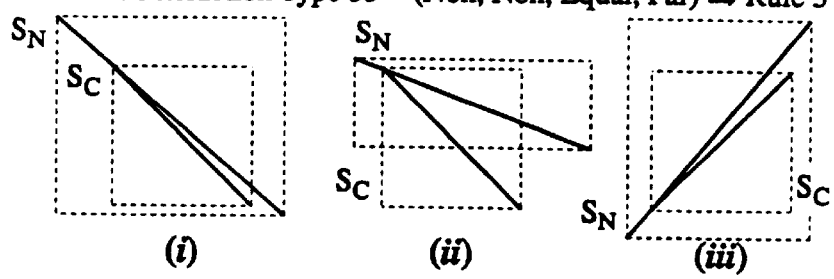

Figure 20 (continued) Types of Span Interactions
Figure 20JJ: Interaction Type 36 = (Non, Non, Equal, Equal) ⇒ Rule 5
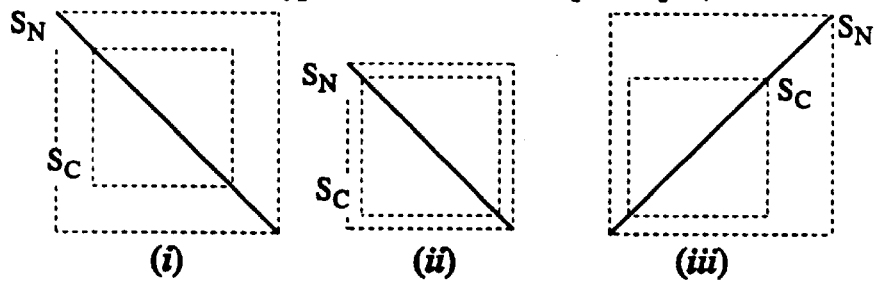
Figure 20KK: Interaction Type 37 = (Equal, Near, Equal, Non) ⇒ Rule 5
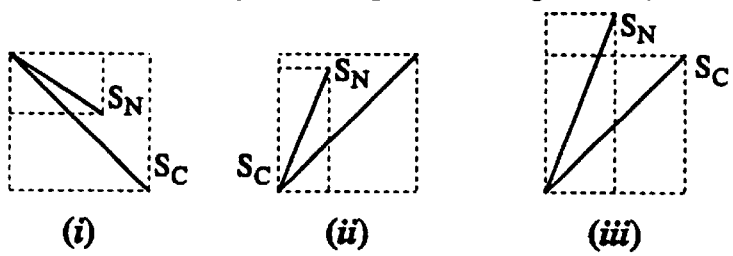
Figure 20LL: Interaction Type 38 = (Equal, Far, Equal, Non) ⇒ impossible
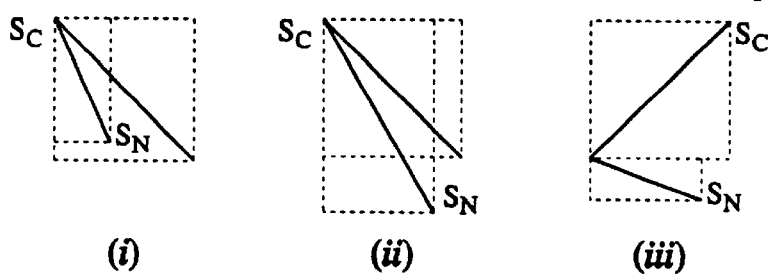
Figure 20MM: Interaction Type 39 = (Equal, Equal, Equal, Non) ⇒ Rule 5
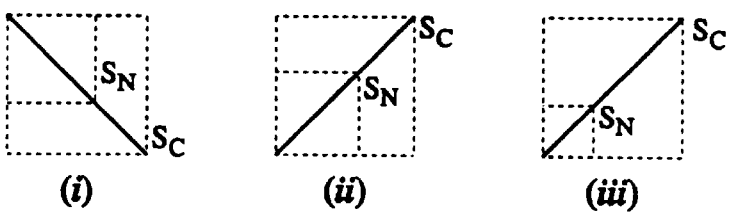
Figure 20NN: Interaction Type 40 = (Equal, Non, Equal, Near) ⇒ impossible
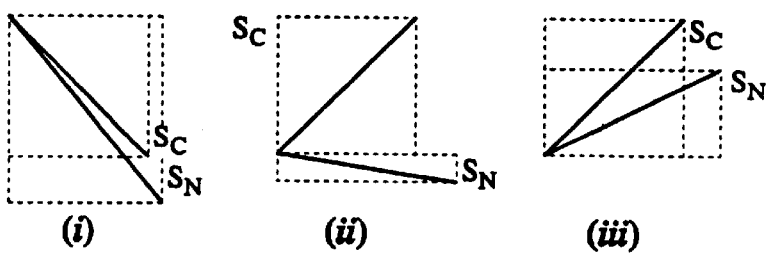

Figure 20 (continued) Types of Span Interactions
Figure 20OO: Interaction Type 41 = (Equal, Non, Equal, Far) ⇒ Rule 5
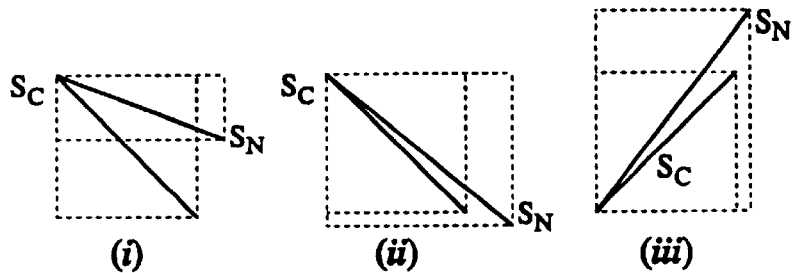
Figure 20PP: Interaction Type 42 = (Equal, Non, Equal, Equal) ⇒ Rule 5
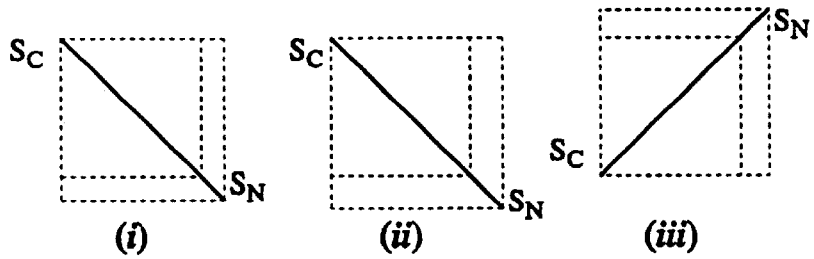
Figure 20QQ: Interaction Type 43 = (Near, Equal, Non, Equal) ⇒ Rule 5
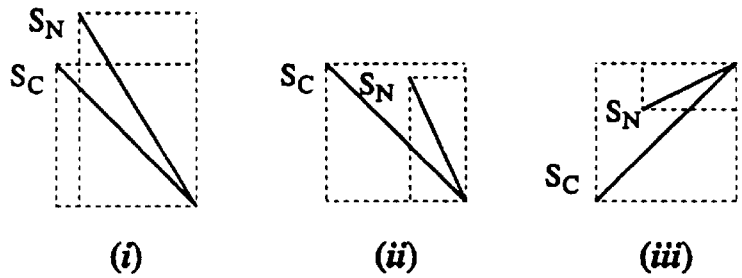
Figure 20RR: Interaction Type 44 = (Far, Equal, Non, Equal) ⇒ Rule 3
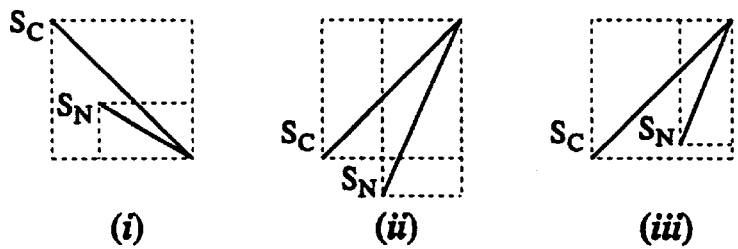
Figure 20SS: Interaction Type 45 = (Equal, Equal, Non, Equal) ⇒ Rule 5
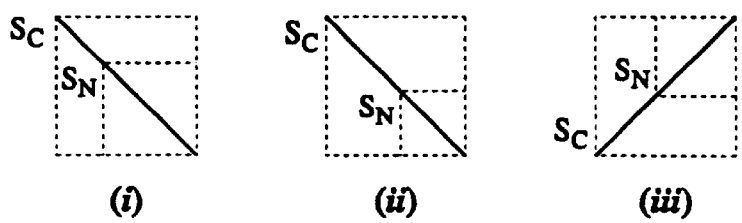

Figure 20 (continued) Types of Span Interactions
Figure 20TT: Interaction Type 46 = (Non, Equal, Near, Equal) ⇒ impossible
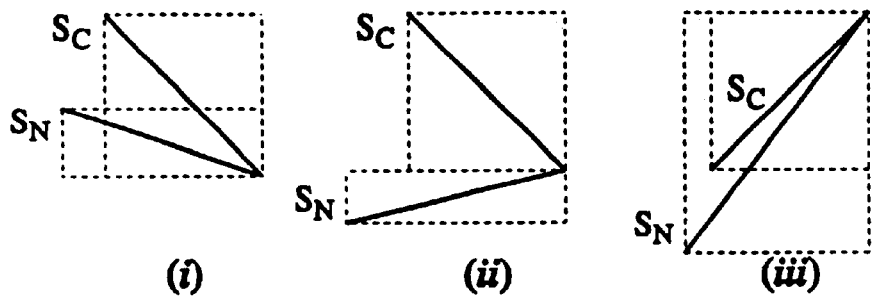
(i)  (ii)  (iii)
Figure 20UU: Interaction Type 47 = (Non, Equal, Far, Equal) ⇒ Rule 5
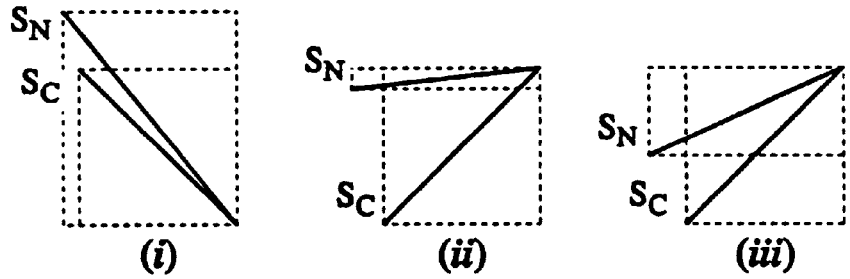
(i)  (ii)  (iii)
Figure 20VV: Interaction Type 48 = (Non, Equal, Equal, Equal) ⇒ Rule 5
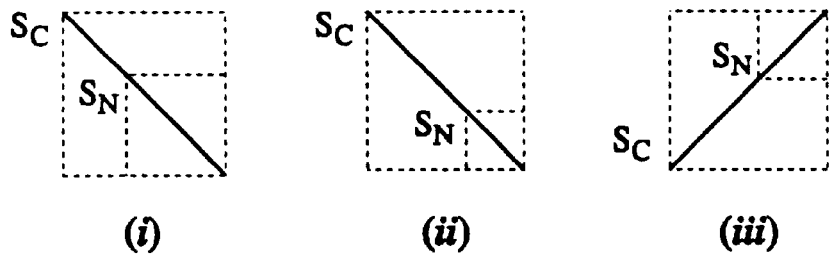
(i)  (ii)  (iii)
Figure 20WW: Interaction Type 49 = (Equal, Equal, Equal, Equal) ⇒ Rule 5
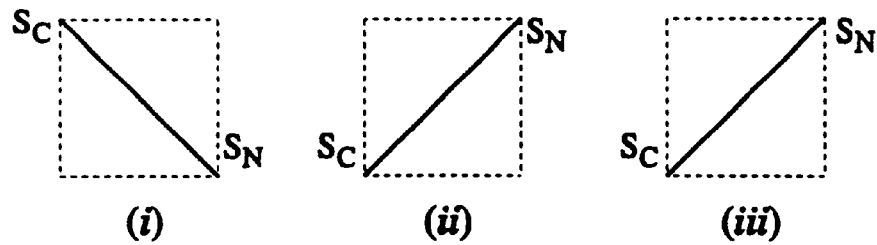
(i)  (ii)  (iii)

Figure 21 Segment Span Rasterization Method (SSRM)
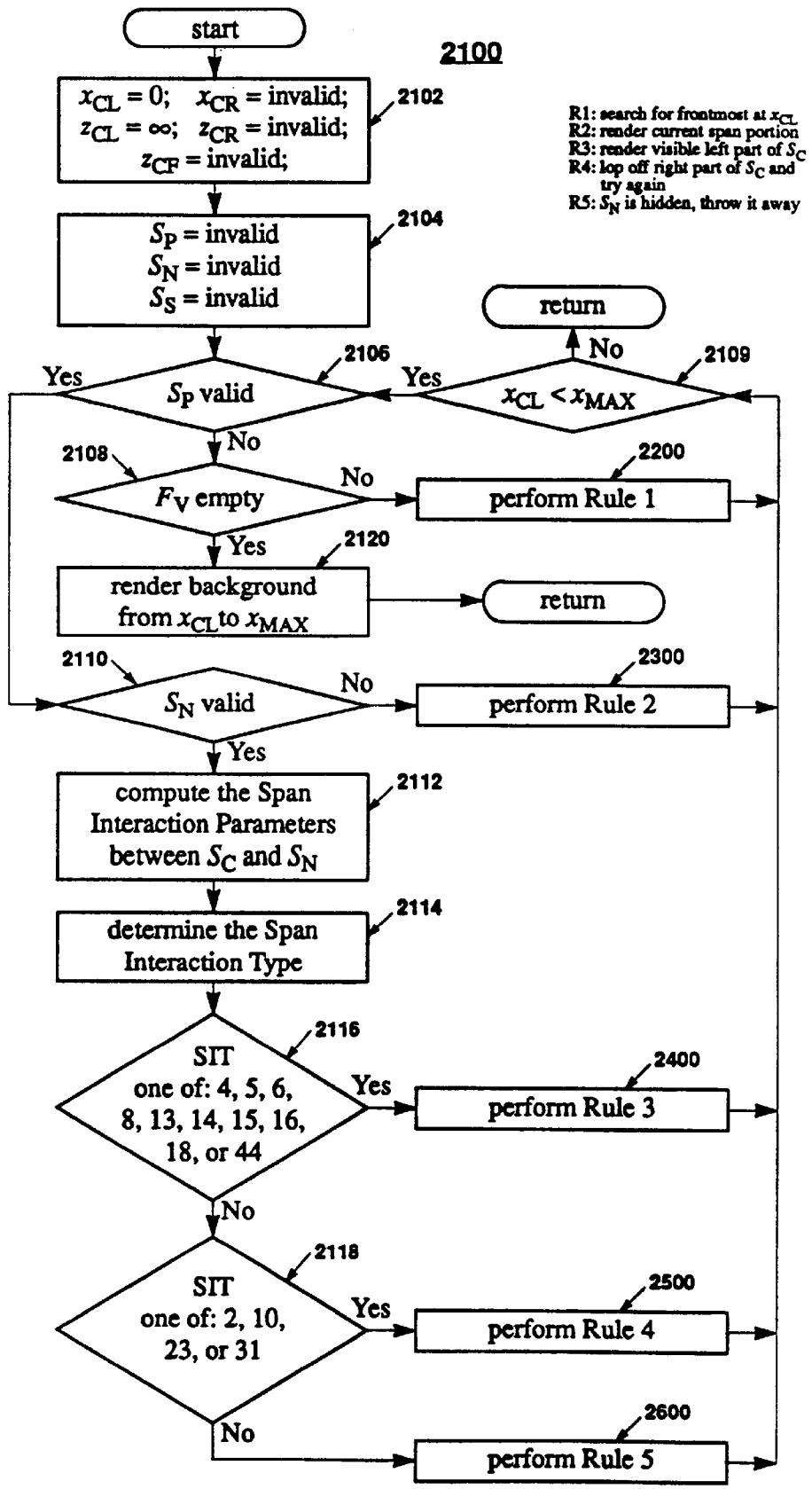

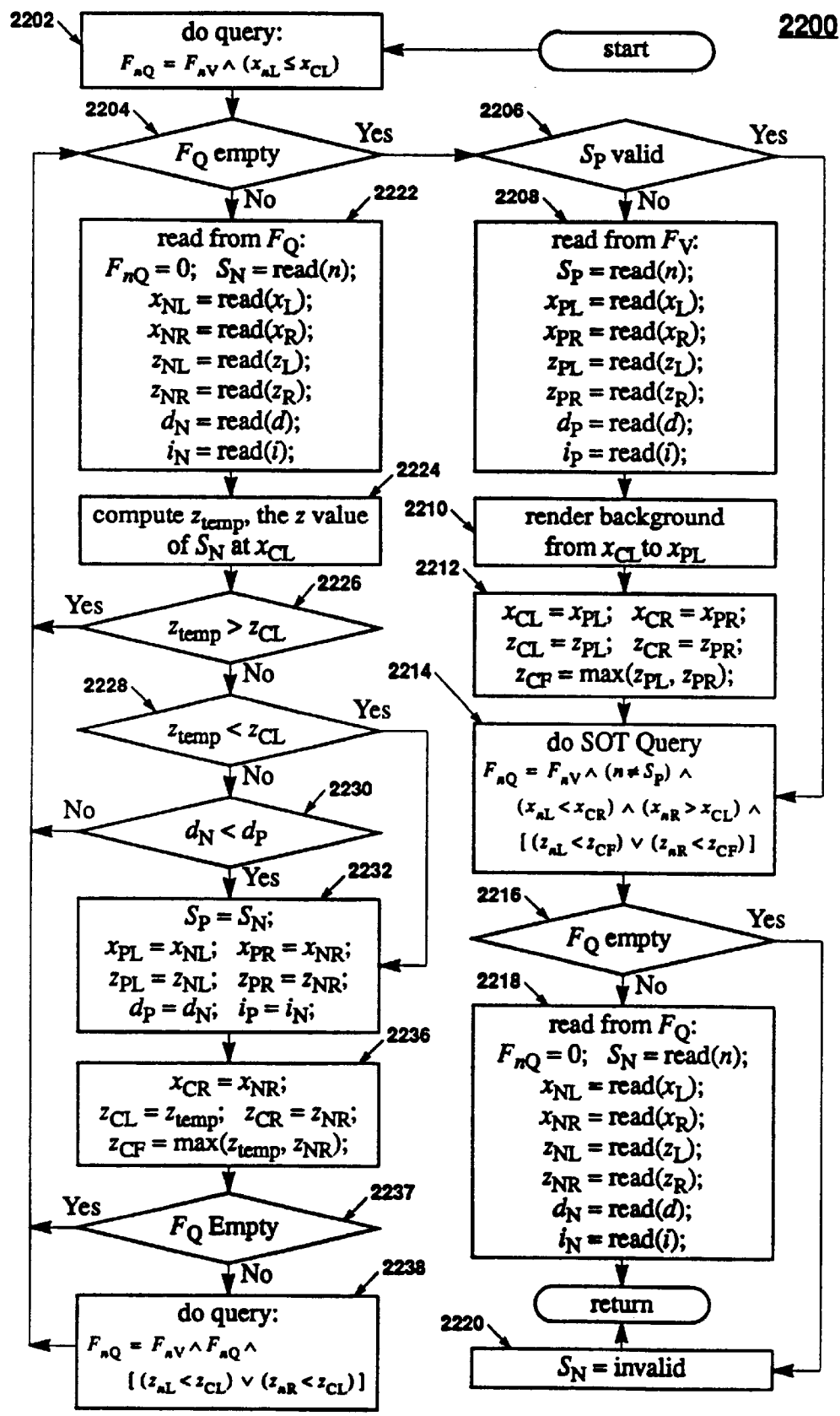
Figure 22 Rule 1 of SSRM

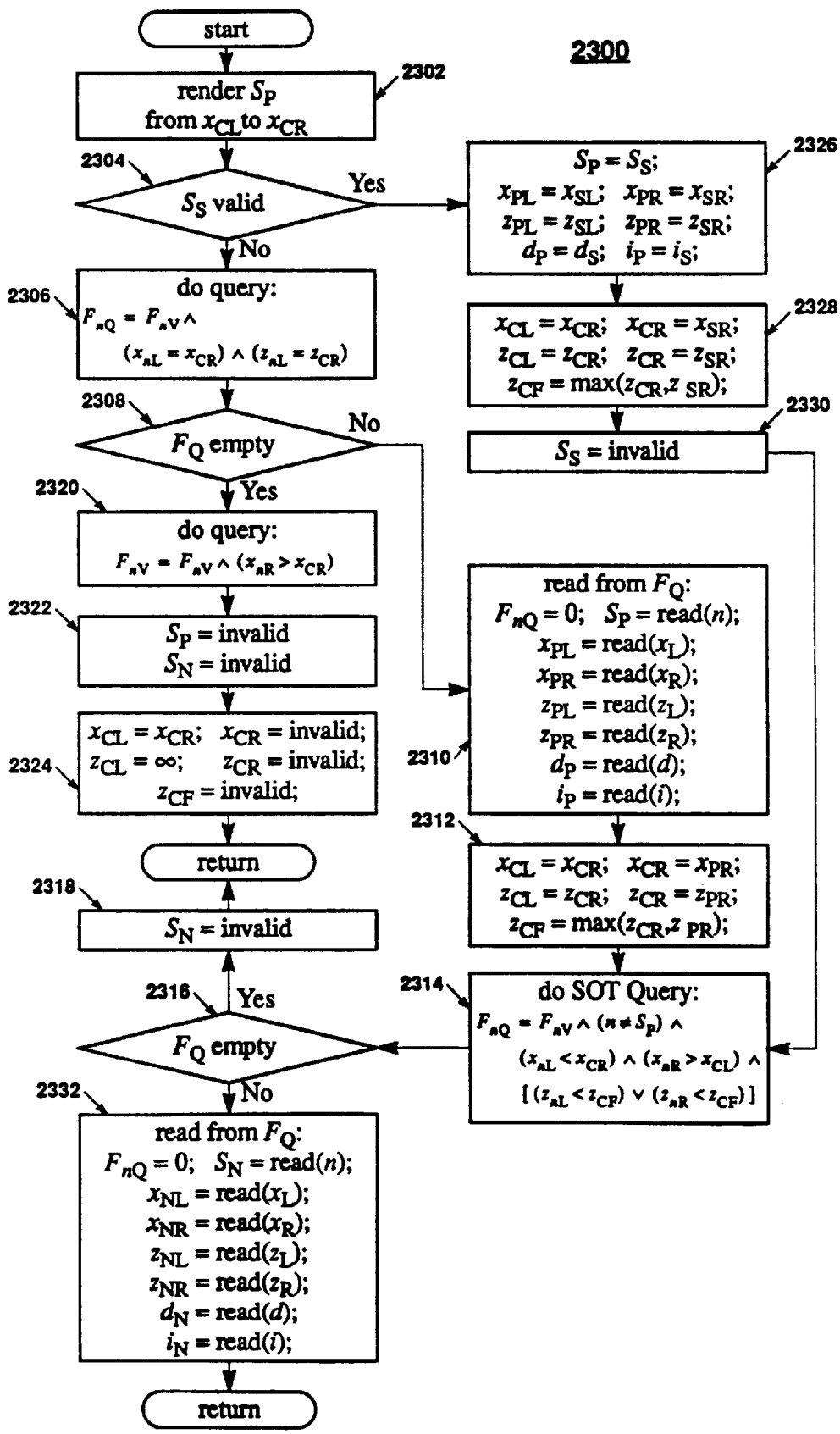
Figure 23 Rule 2 of SSRM

Figure 24 Rule 3 of SSRM
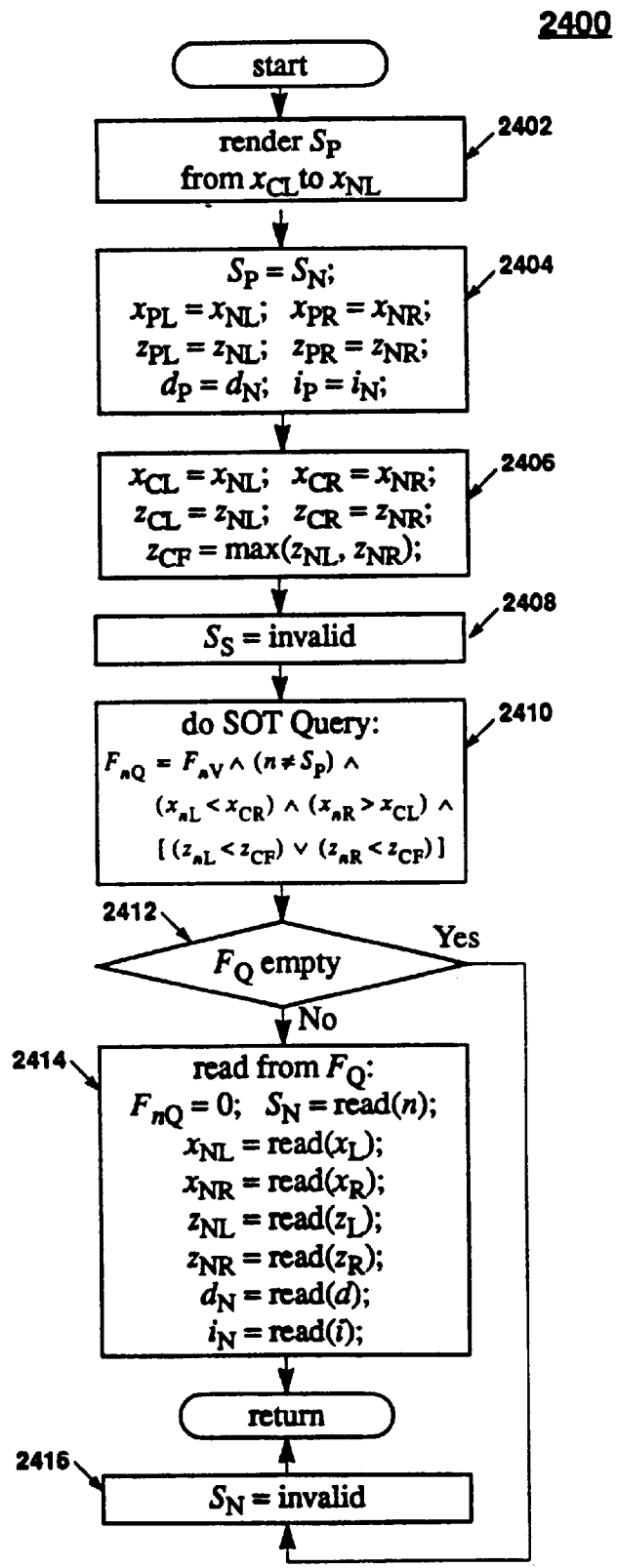

Figure 25 Rule 4 of SSRM
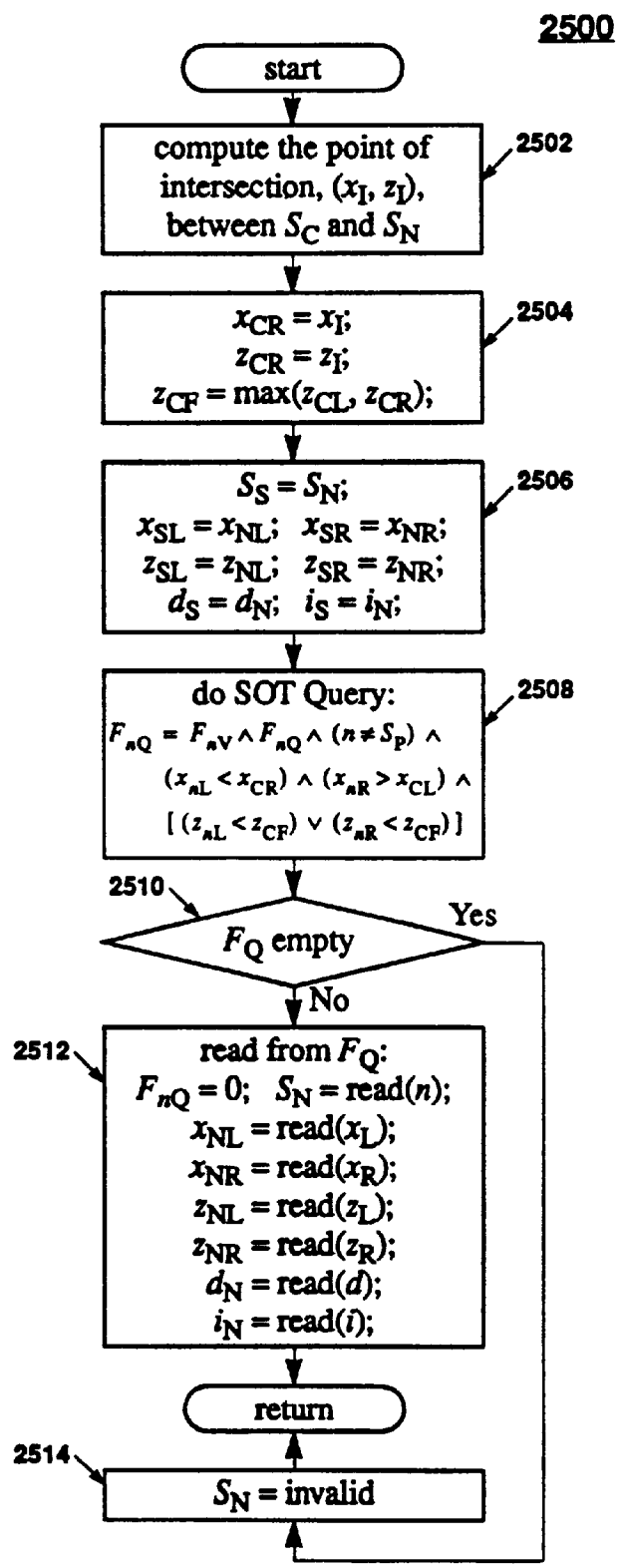

Figure 26 Rule 5 of SSRM
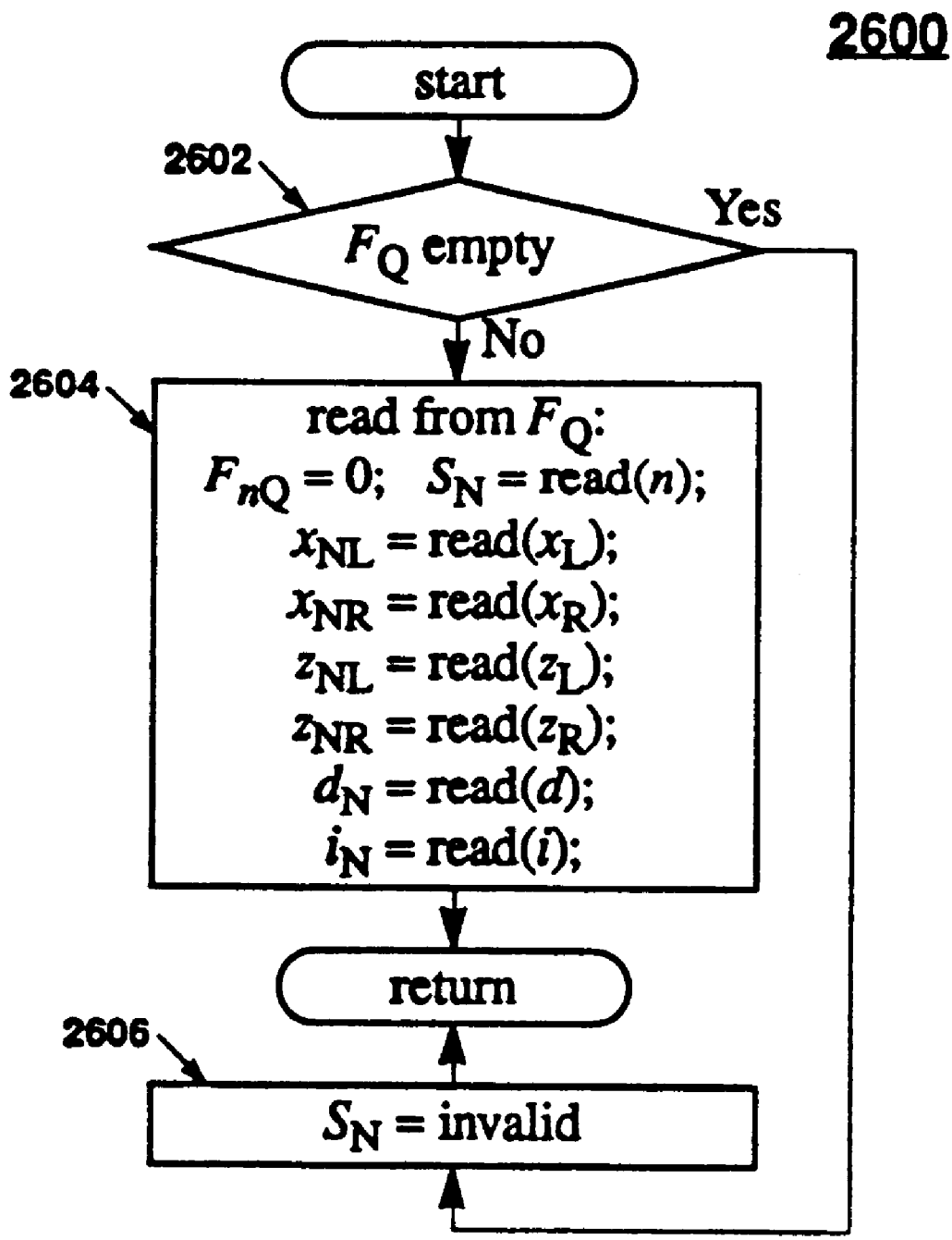

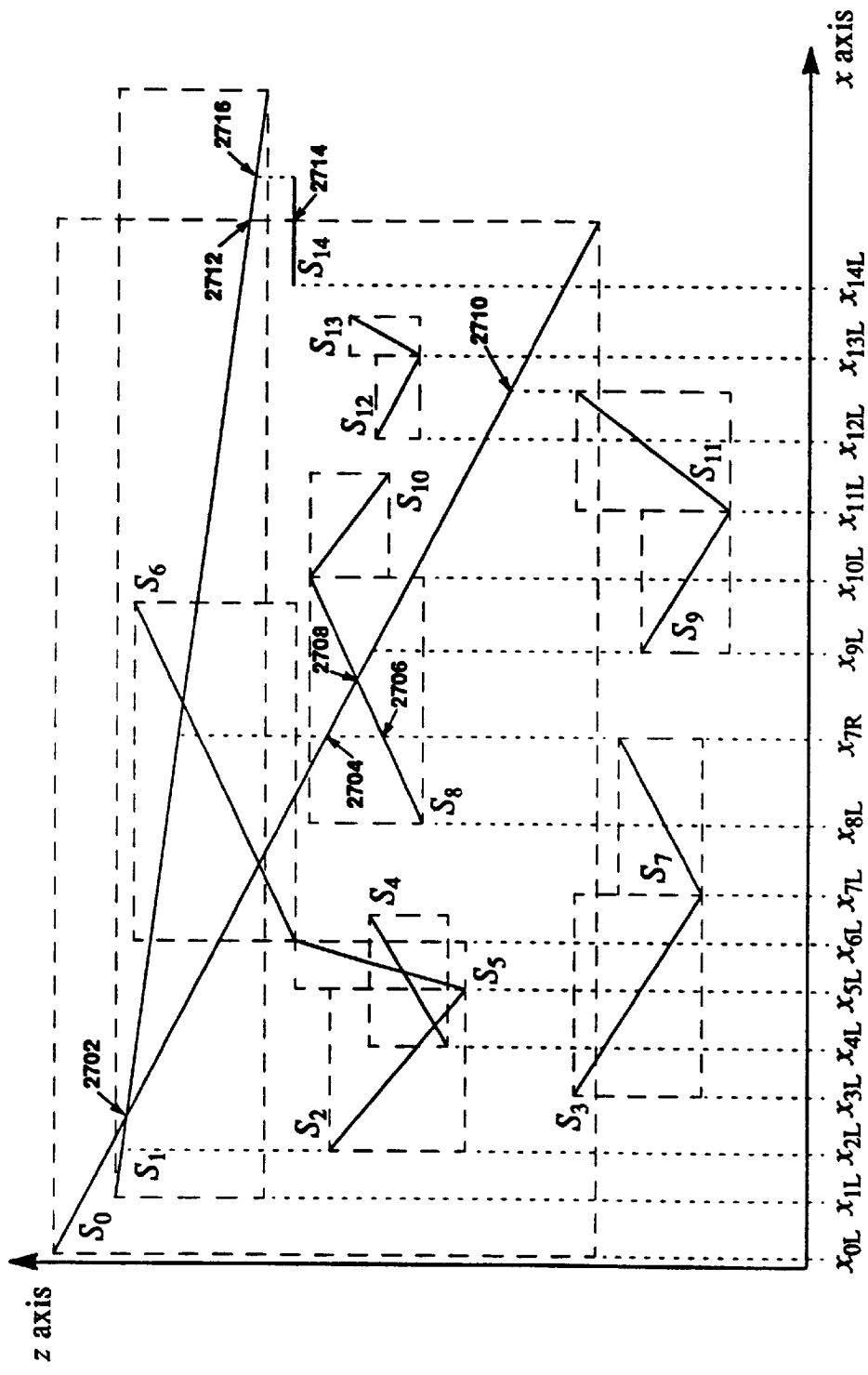
Figure 27 A Set of Spans on One Raster Line, Including Overlapping Bounding Boxes

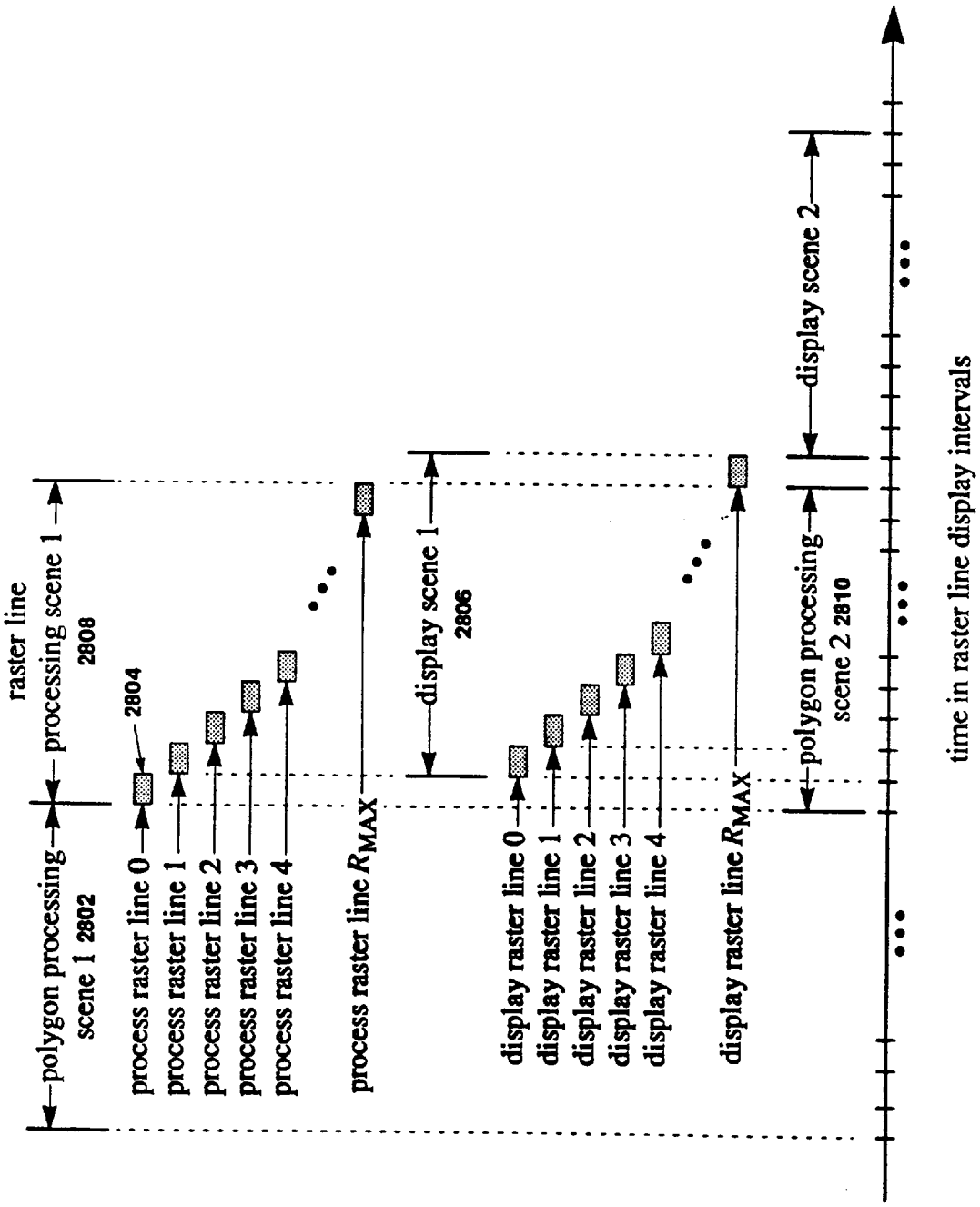
Figure 28 Timing diagram for phase-locked raster line processing and display

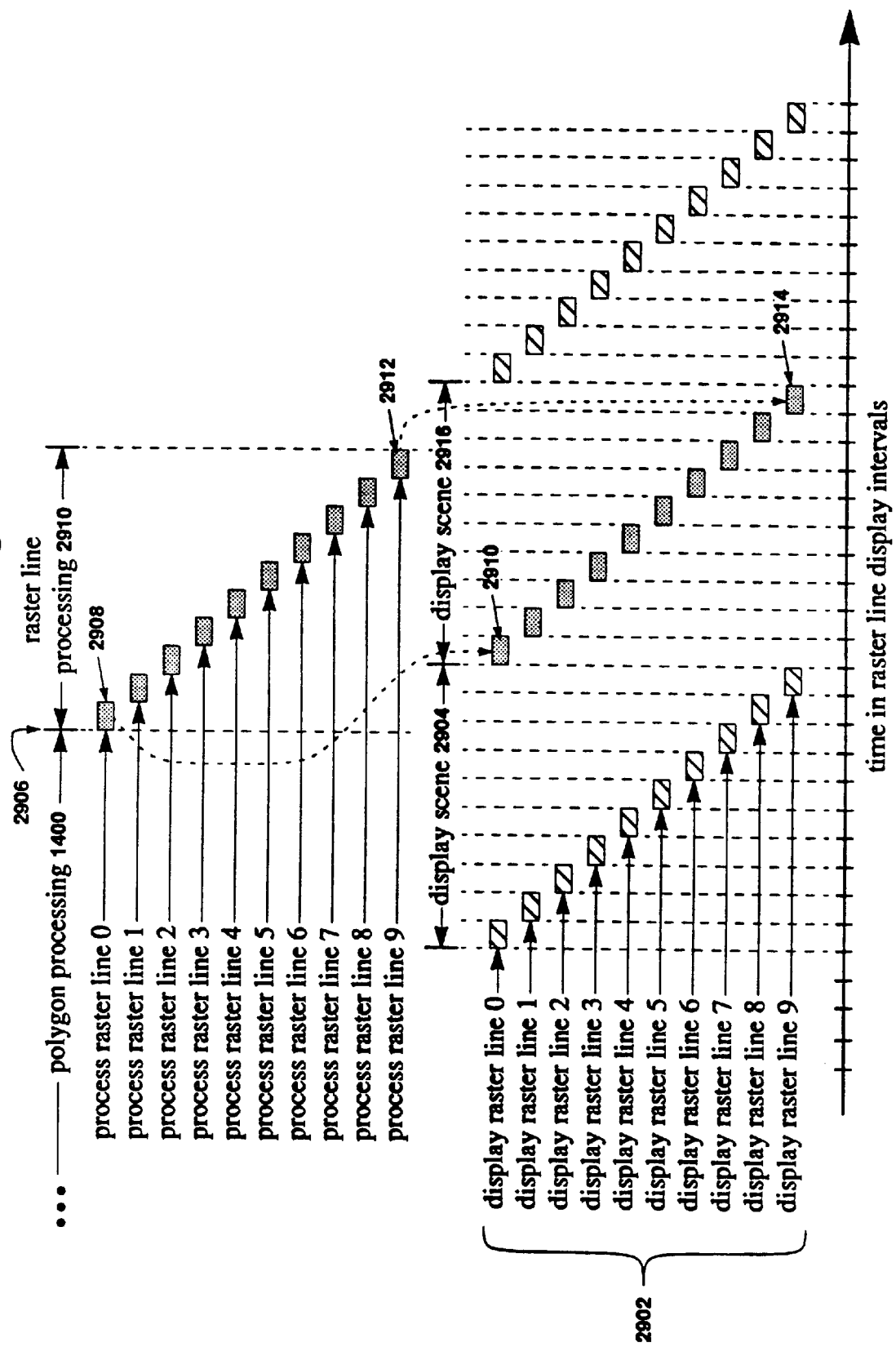
Figure 29 Timing diagram for single buffered frame buffer

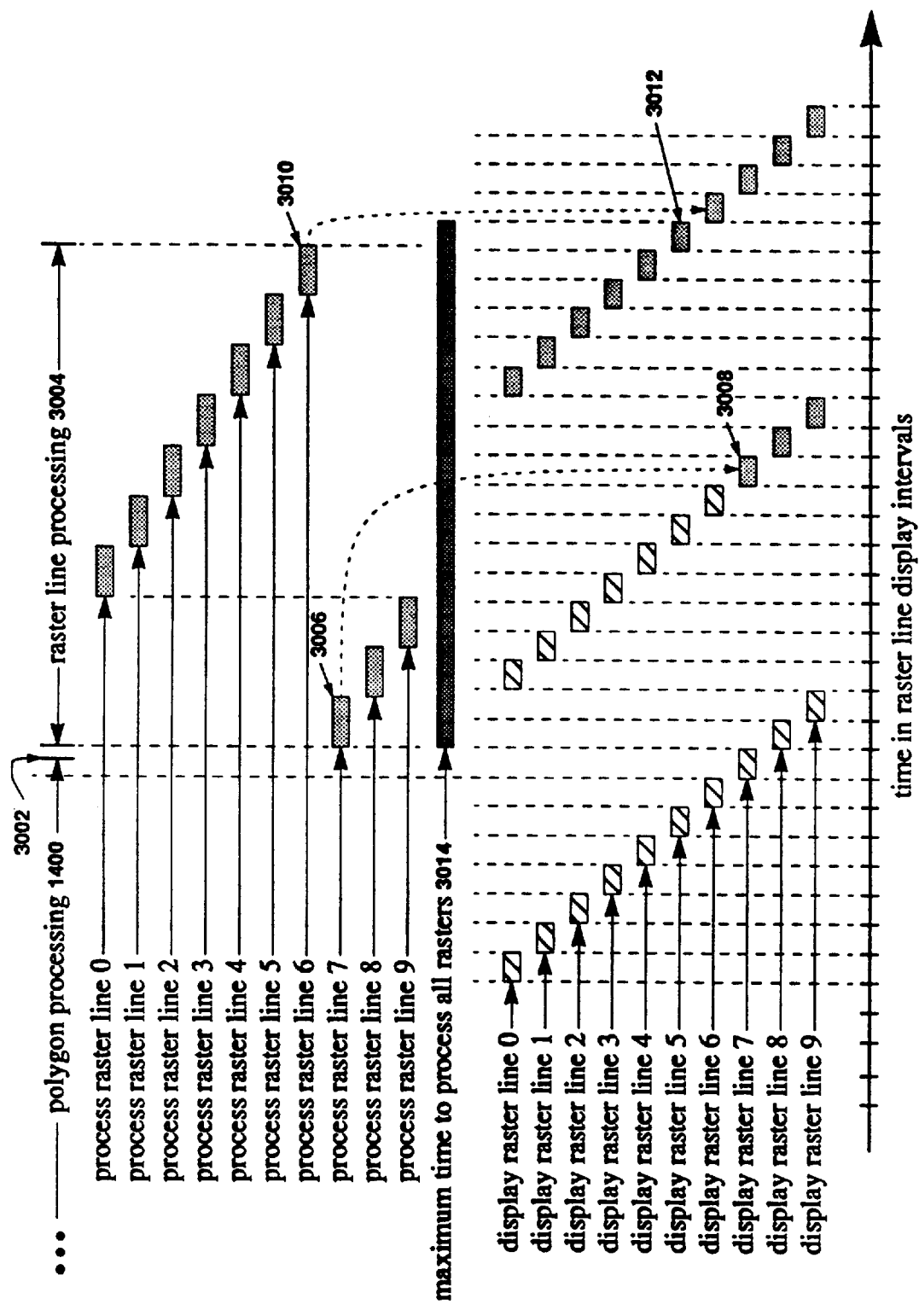
Figure 30 Timing diagram for single buffered frame buffer with slow rasterization

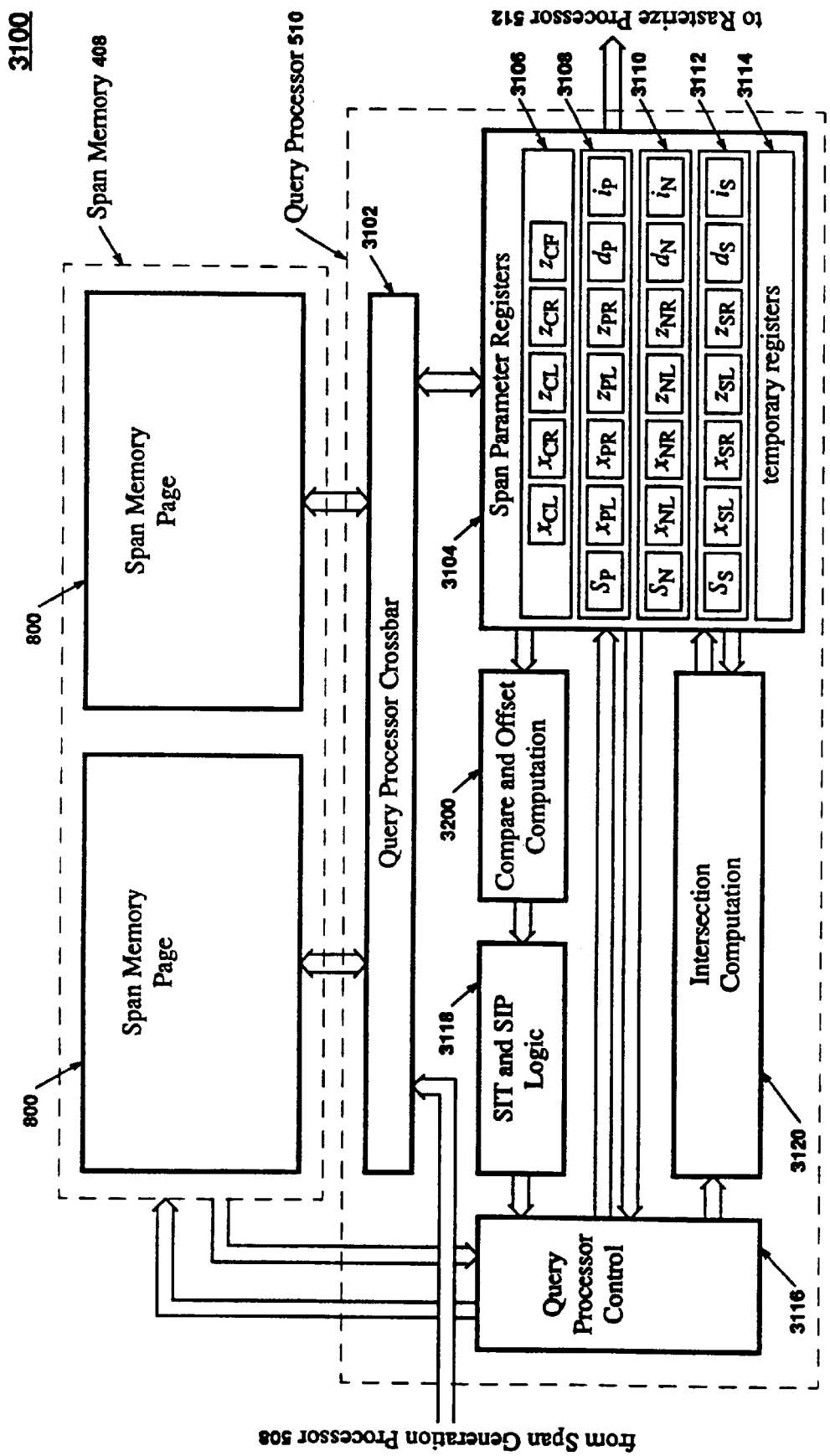
Figure 31 Query Processor Architecture, including SAM

Figure 32 Comparison and Offset Computation
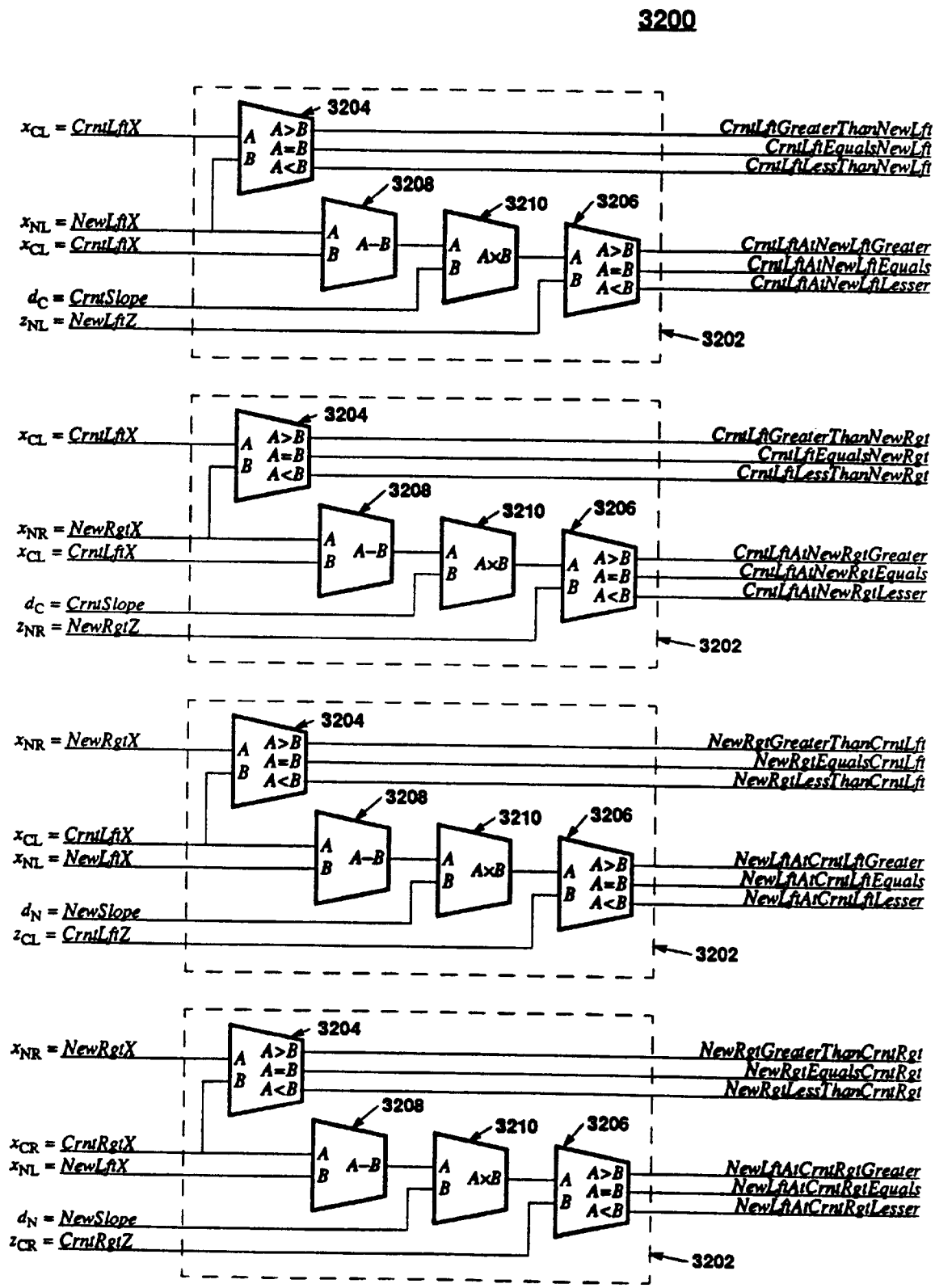

Figure 33 Prior Art MCCAM Cell
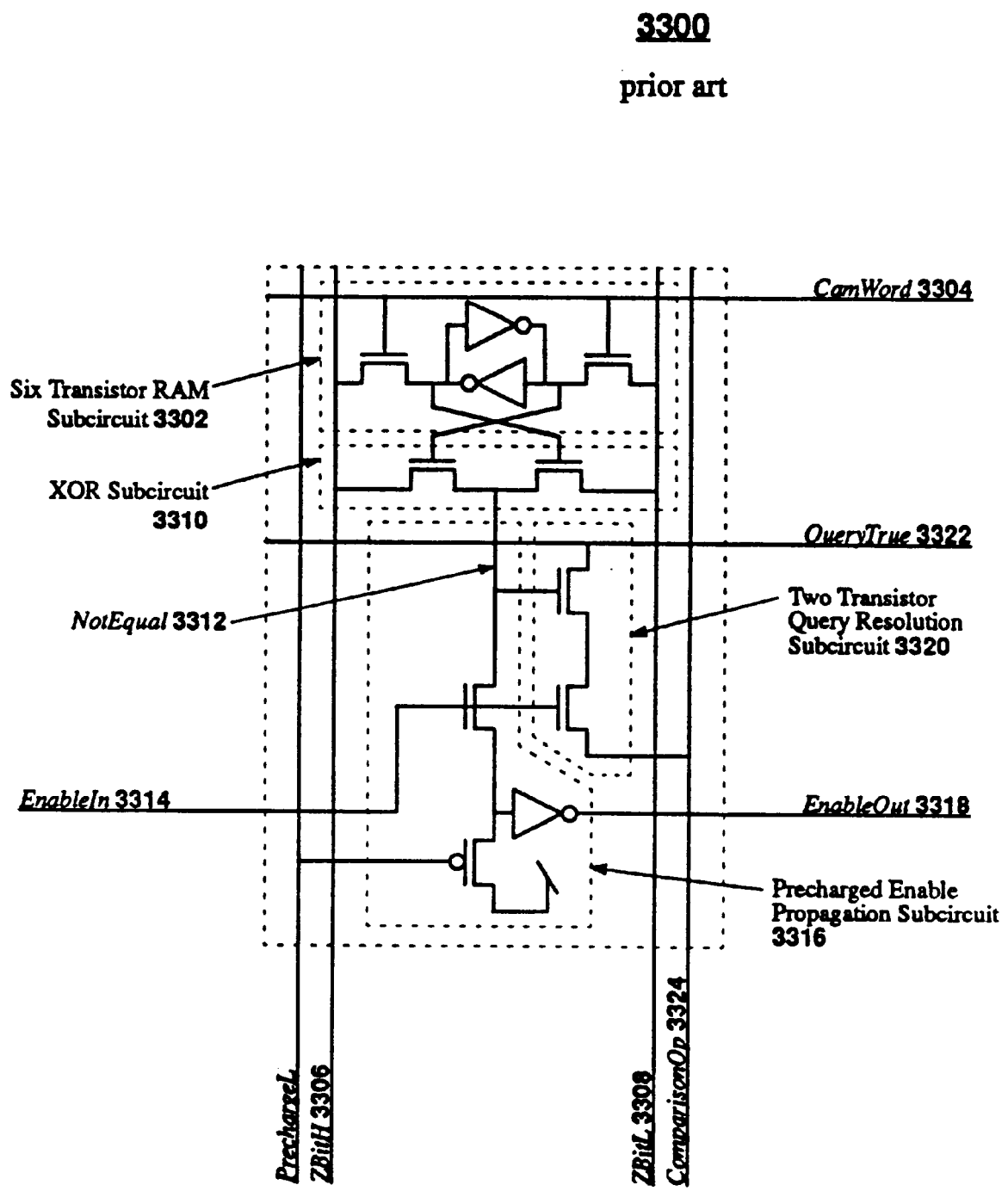

Figure 34 Generic SMCCAM Cell
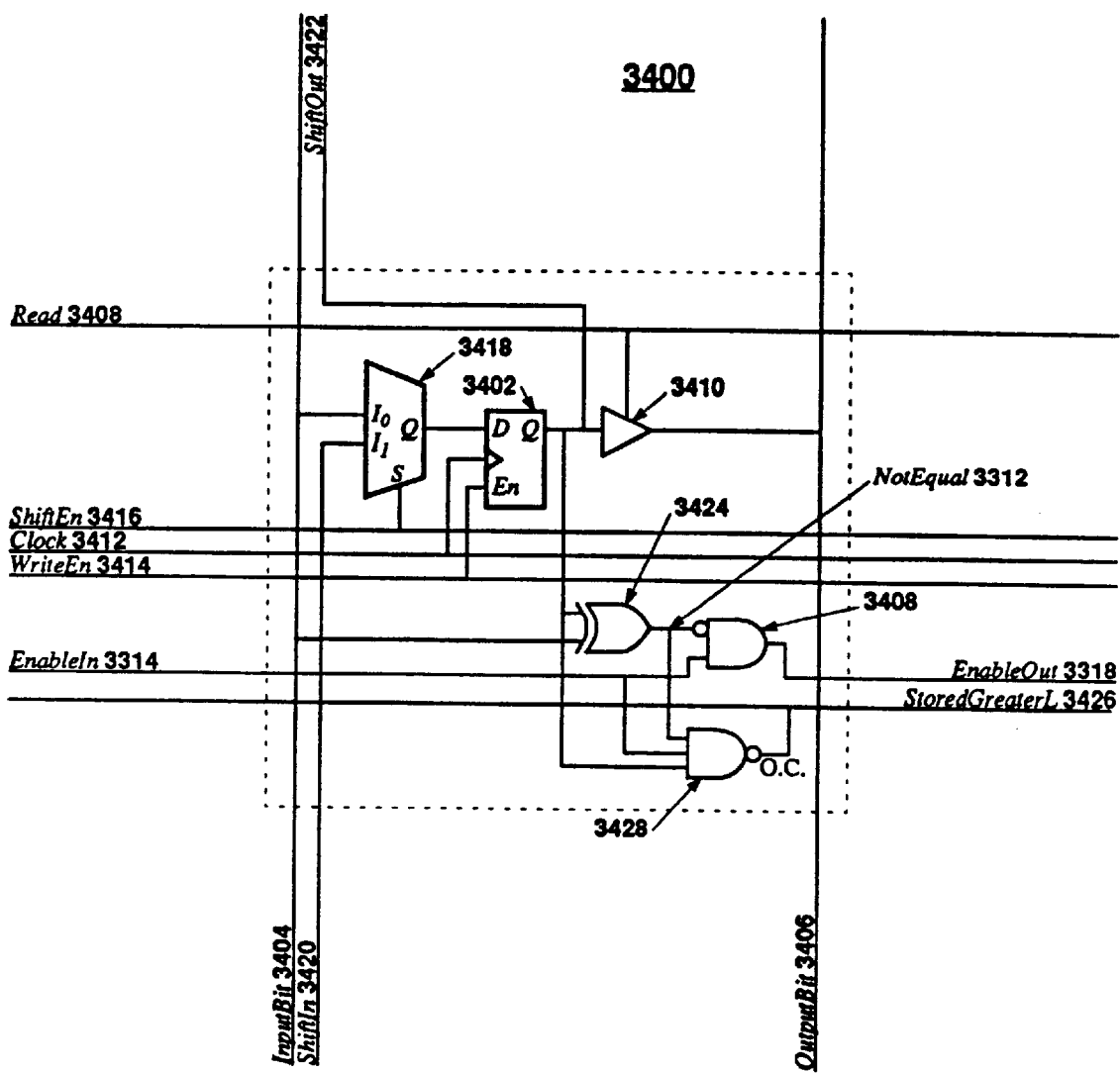

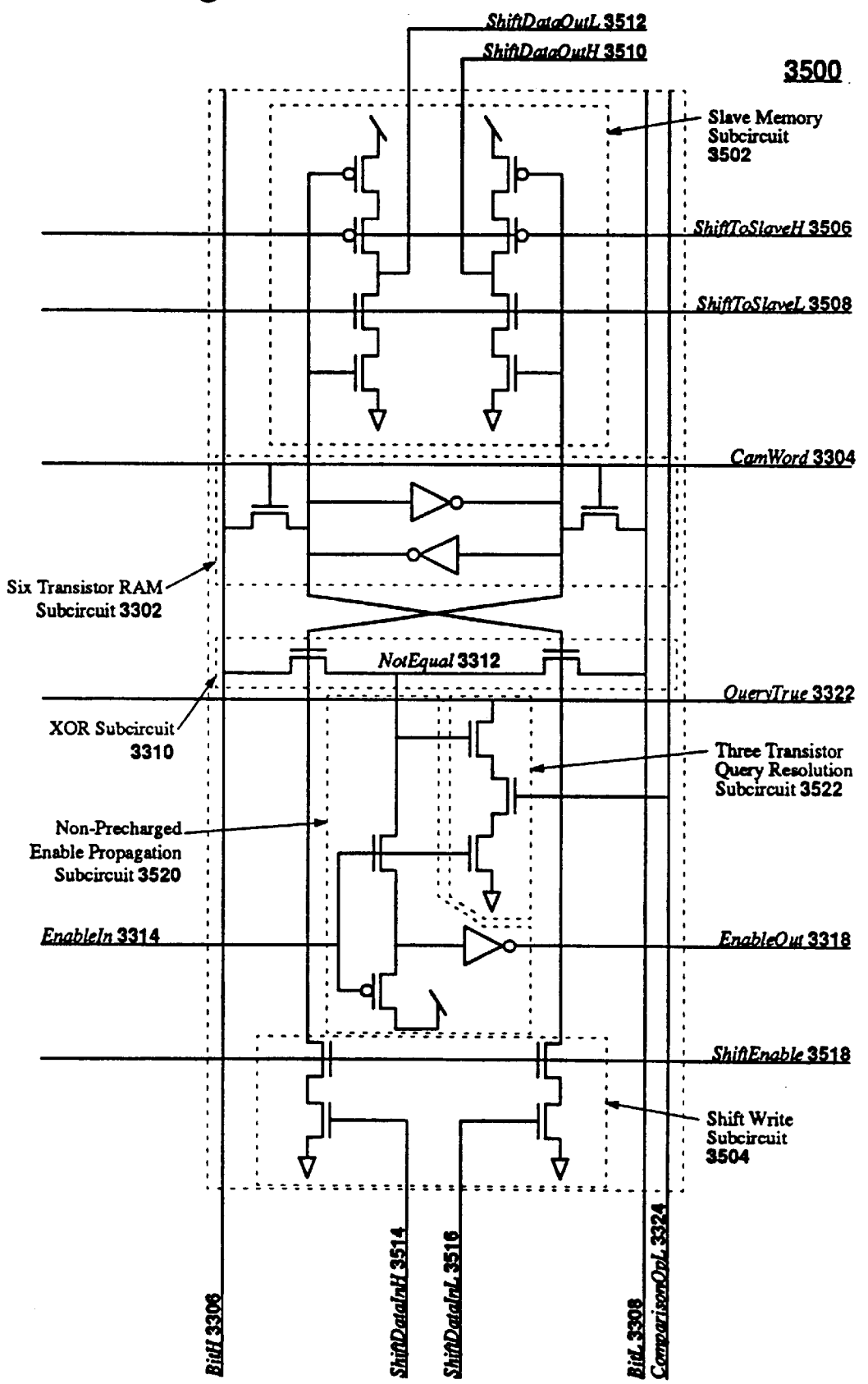
Figure 35 Static SMCCAM Cell

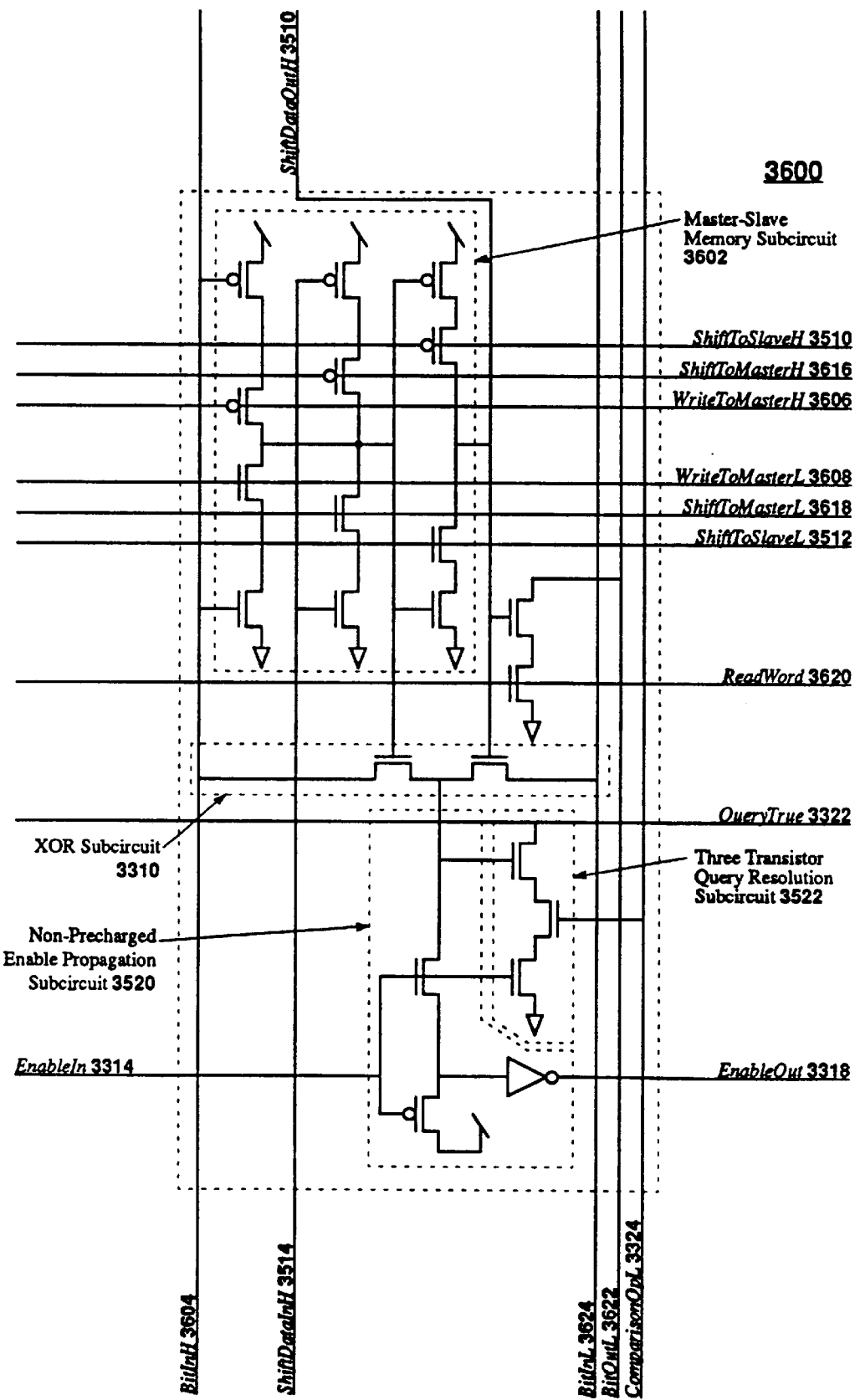
Figure 36 Dynamic SMCCAM Cell

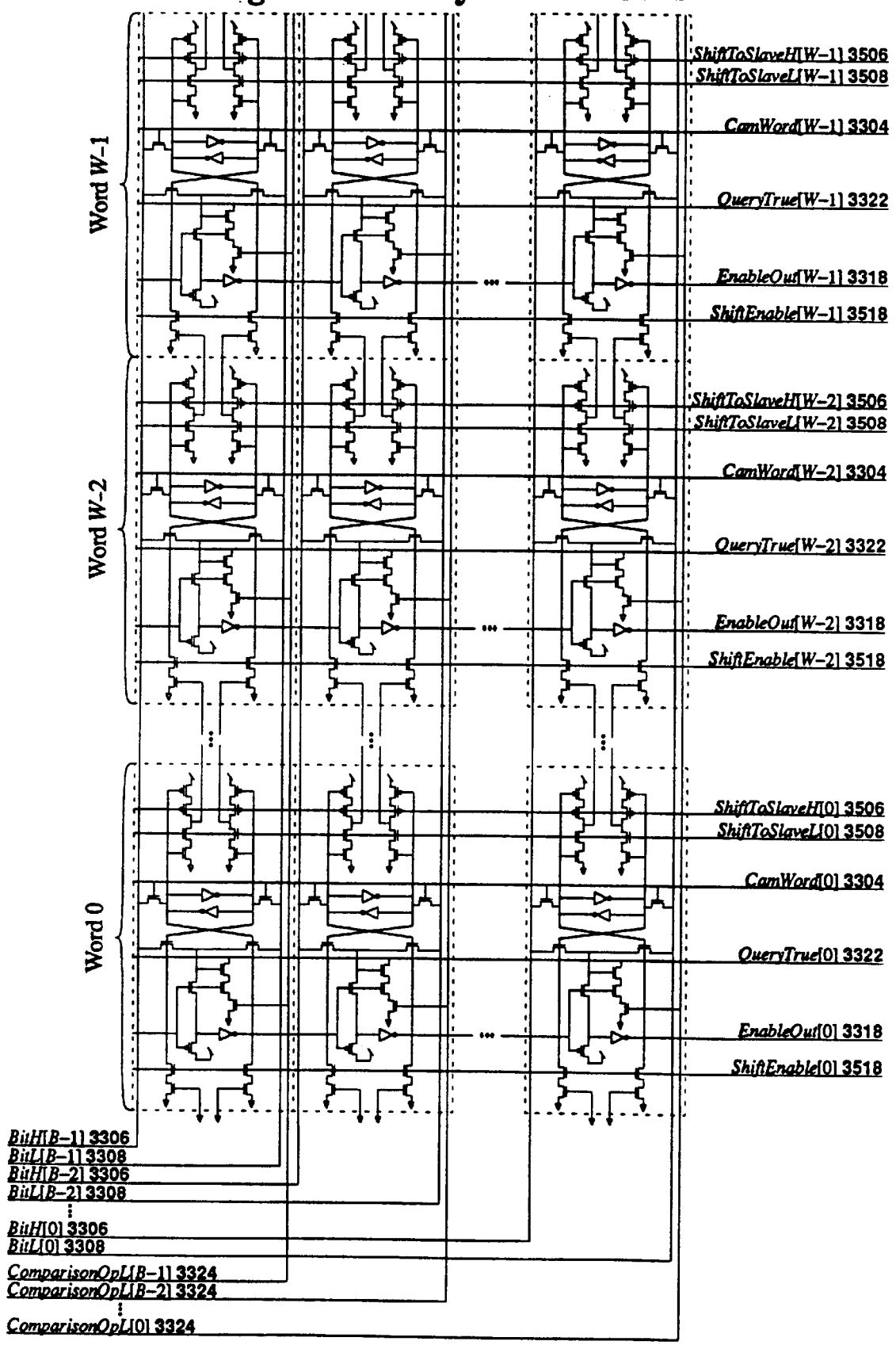
Figure 37 Array of SAM Cells

Figure 38 Multiple Spans Vertically within a Raster Line

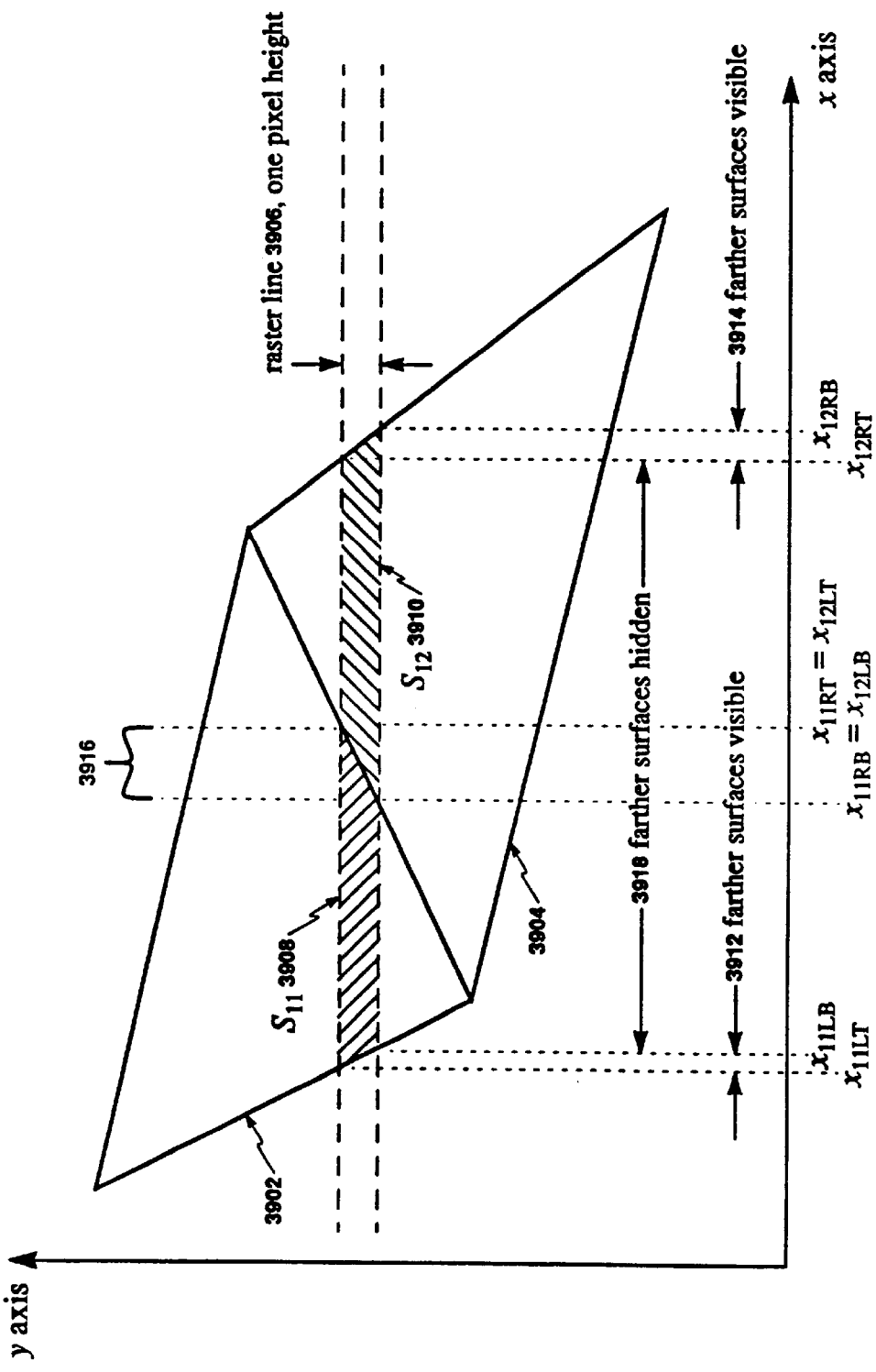
Figure 39 SMCCAM Processing Solves Both Antialiasing and Hidden Surface Removal

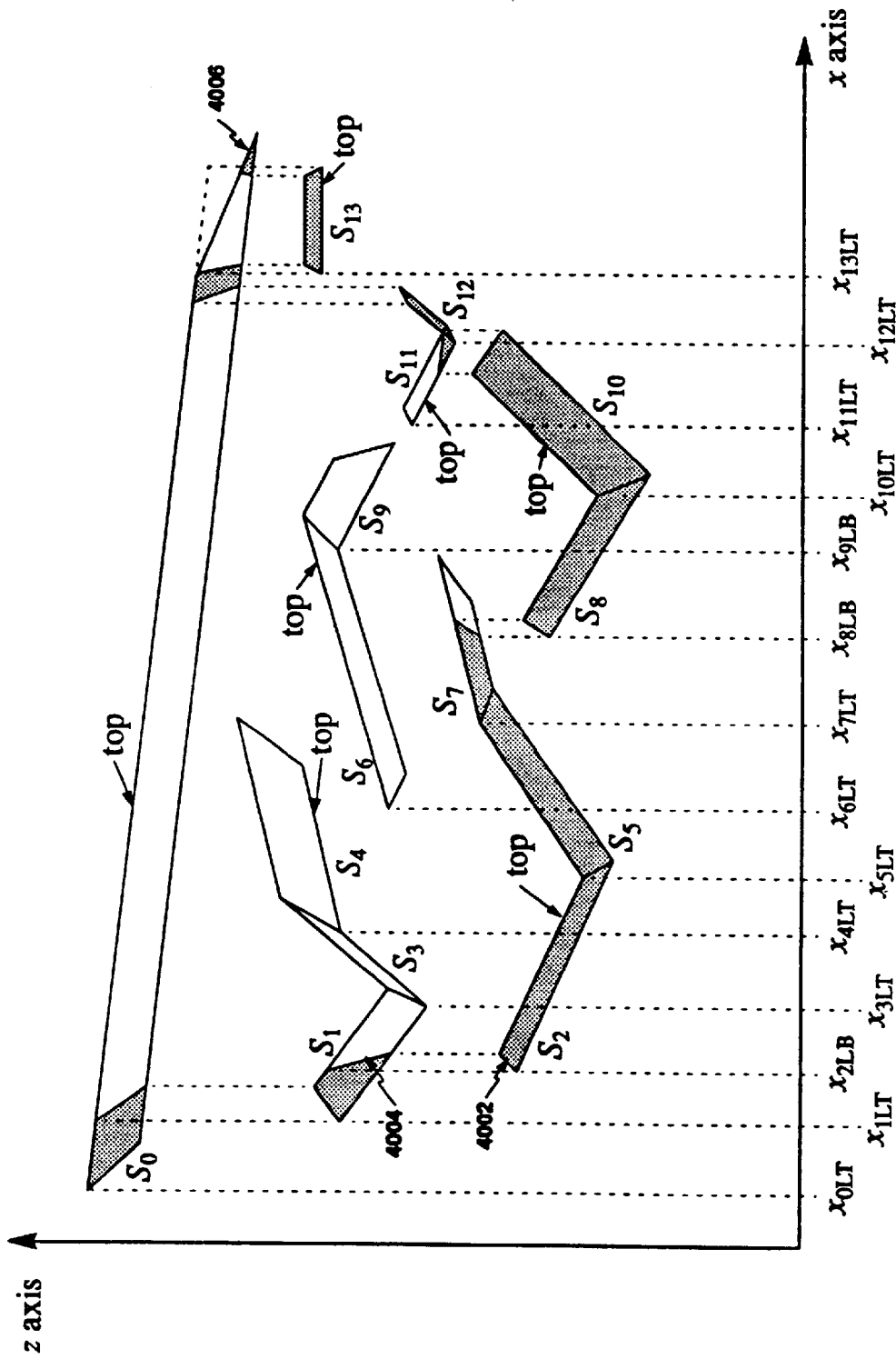
Figure 40 A Set of Trapezoidal Spans on one Raster Line

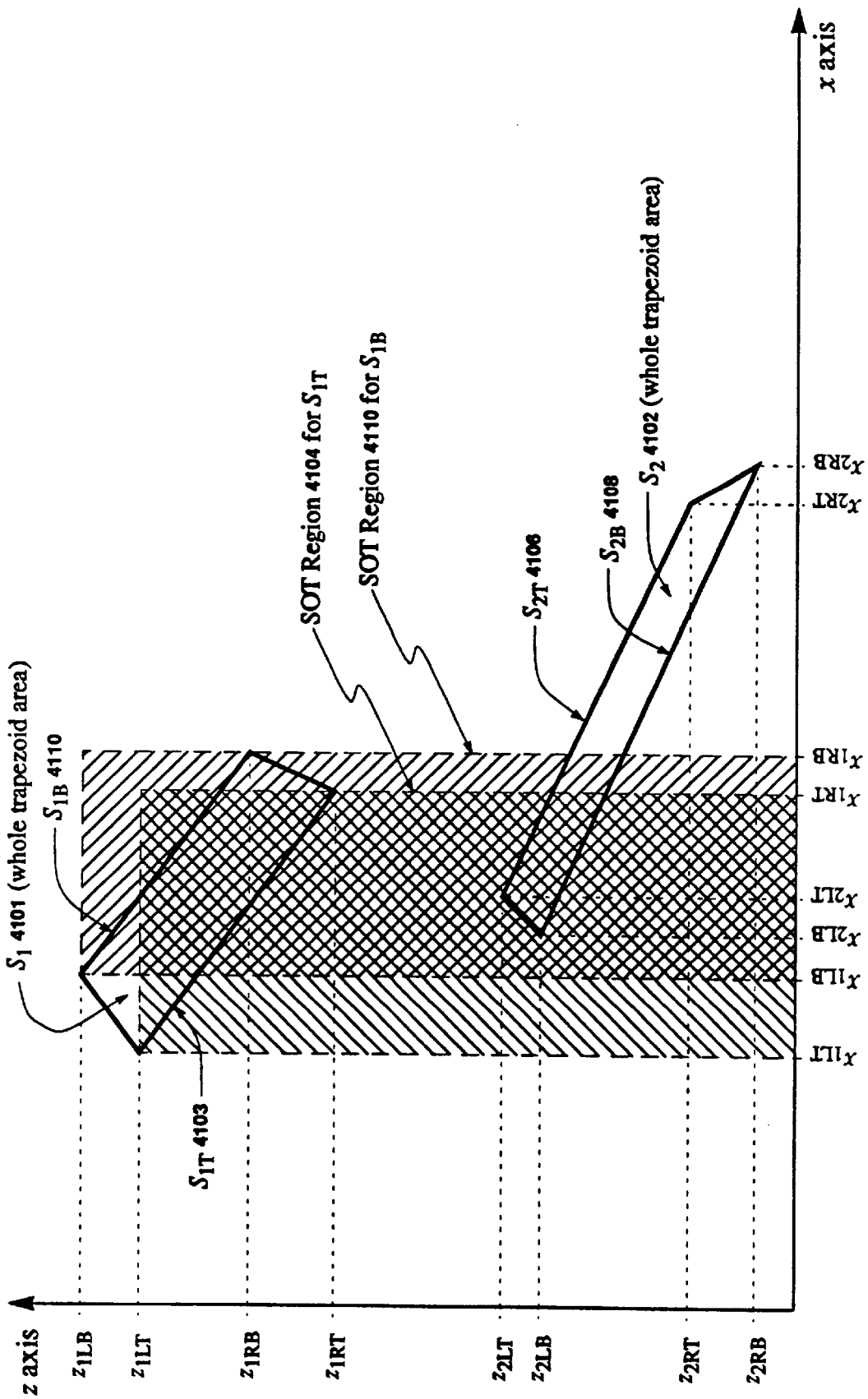
Figure 41 SOT Query for Processing Top and Bottom Separately

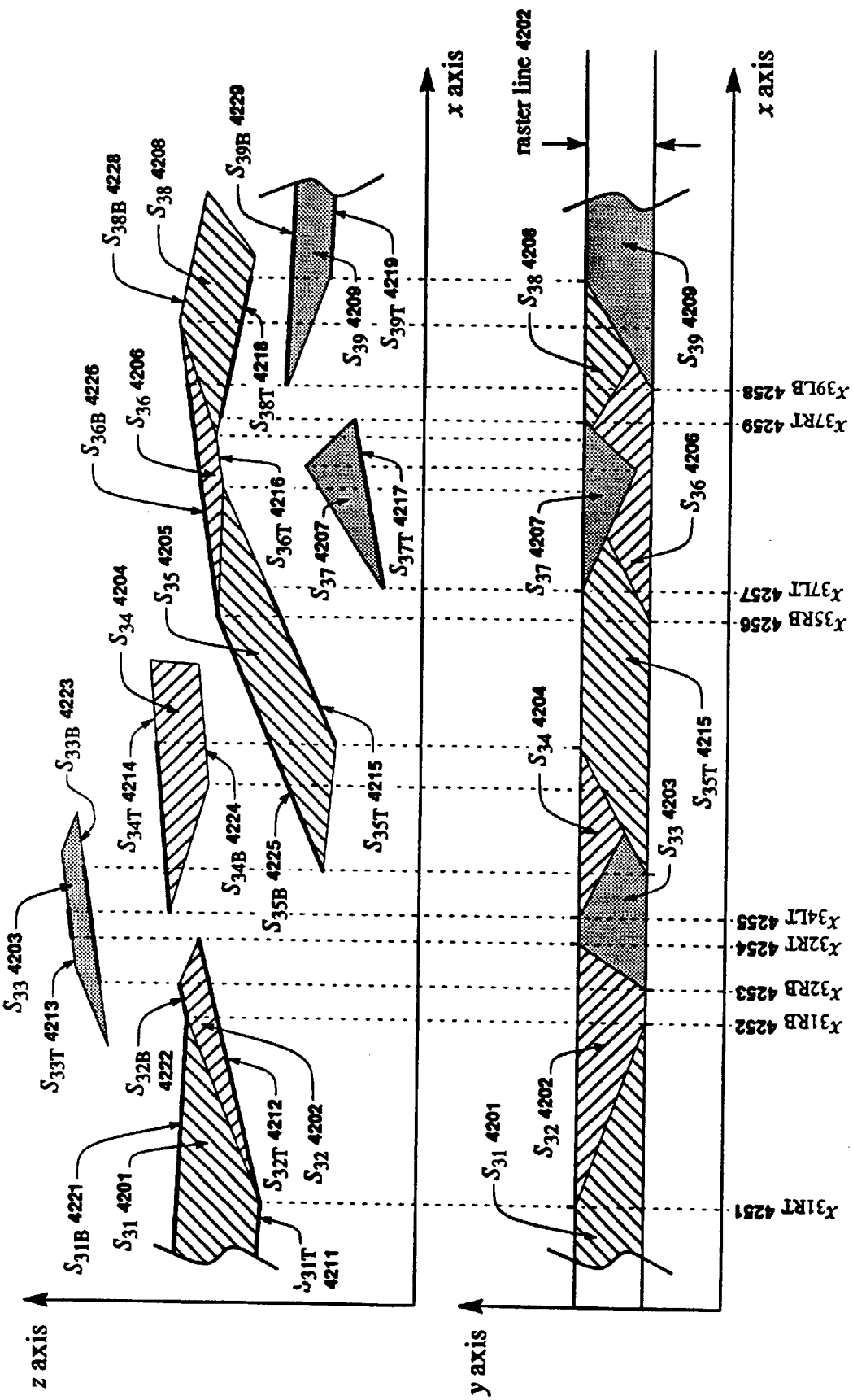
Figure 42 Rasterization Using Span Tops and Span Bottoms

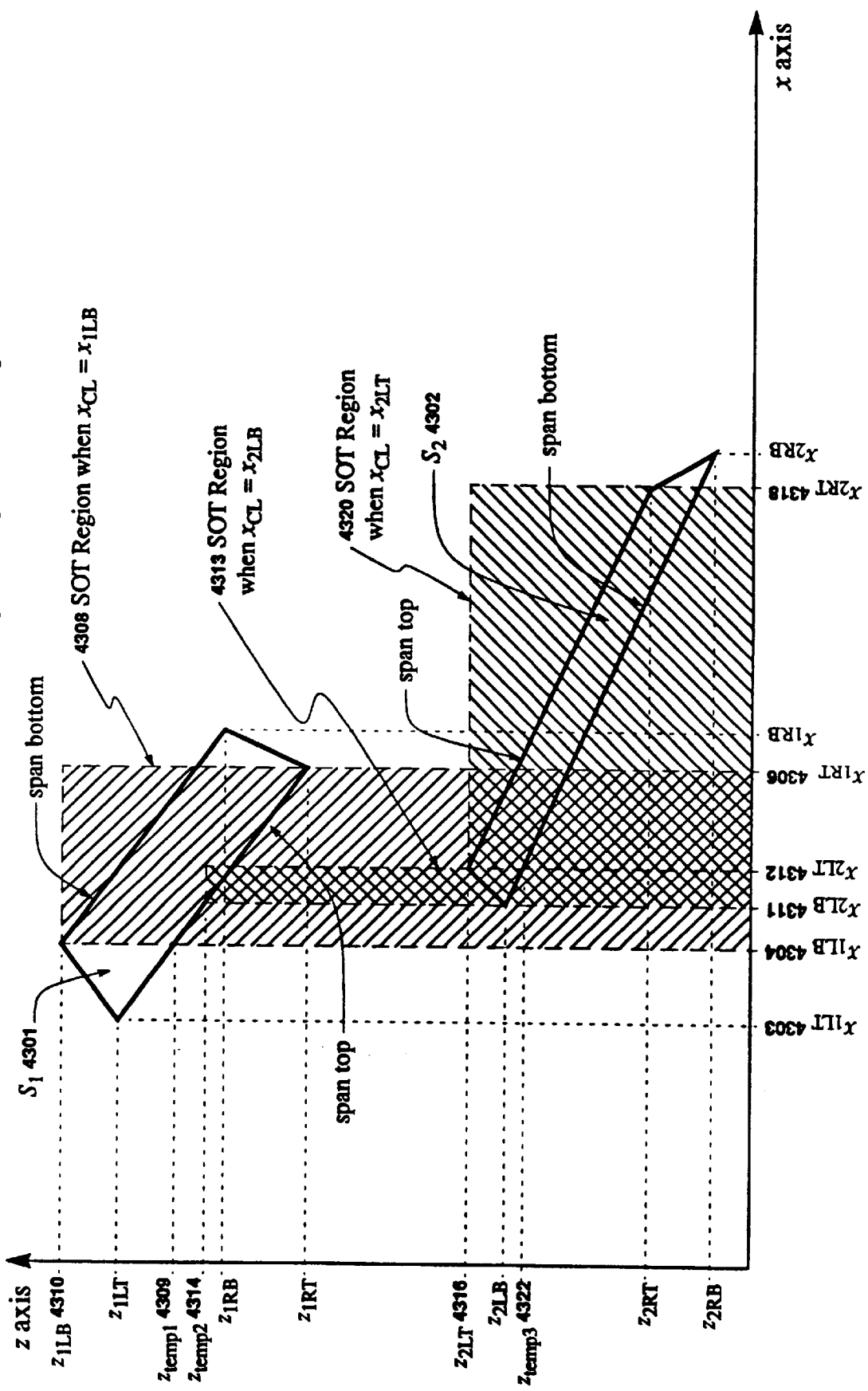
Figure 43 SOT Query for Processing Every Visibility Transition

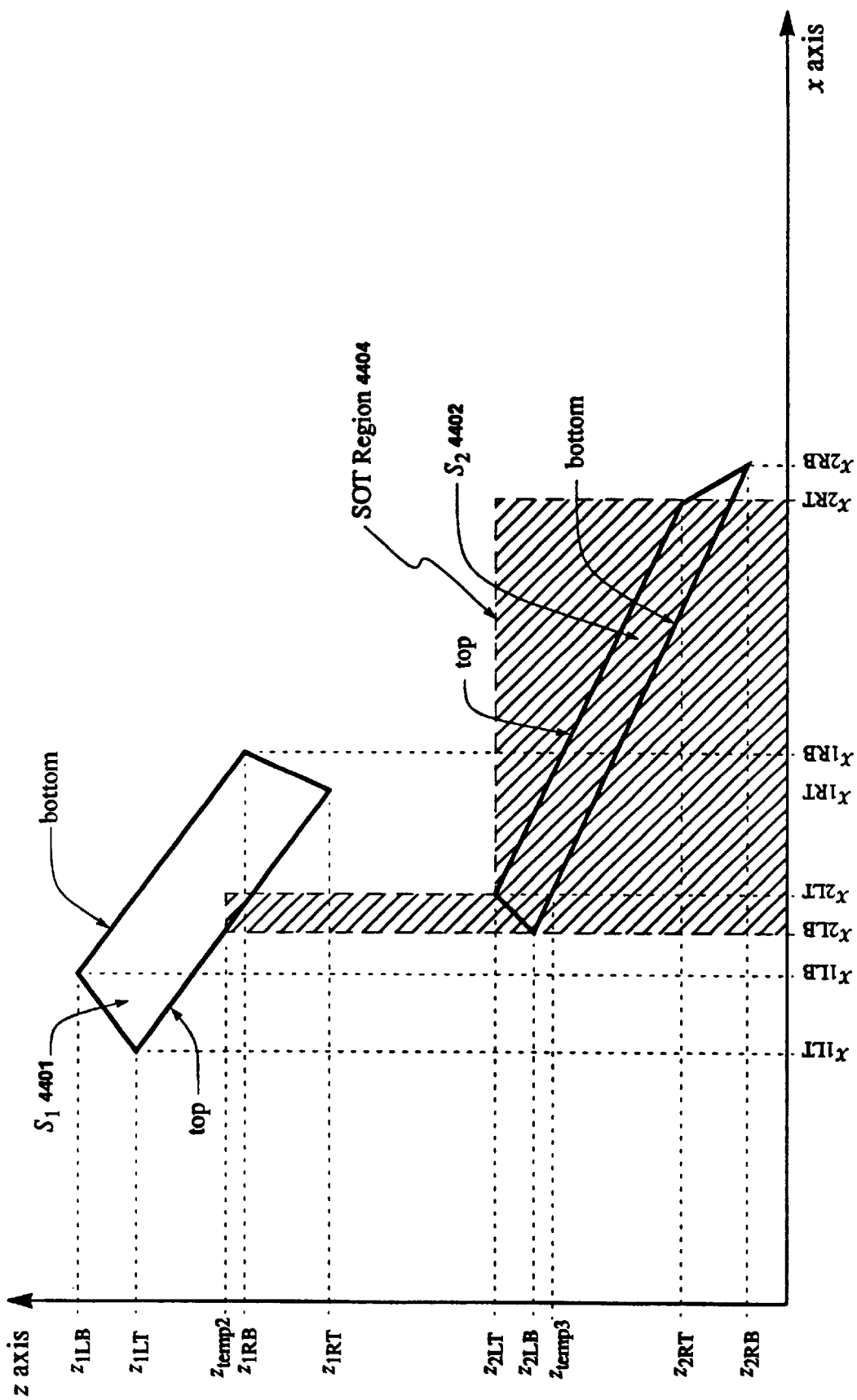
Figure 44 SOT Query with Complex Shape

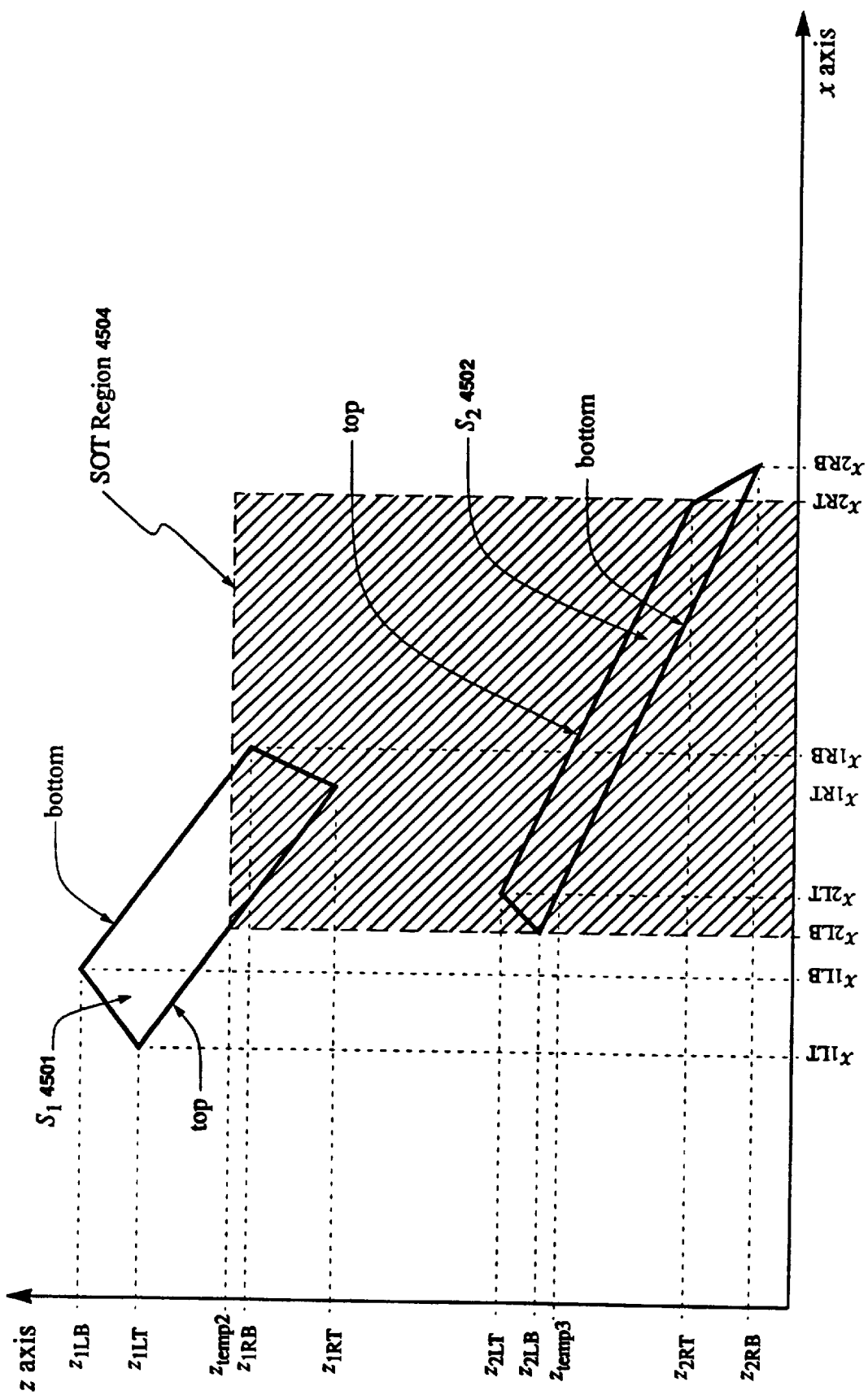
Figure 45 SOT Query with Wider Search Area

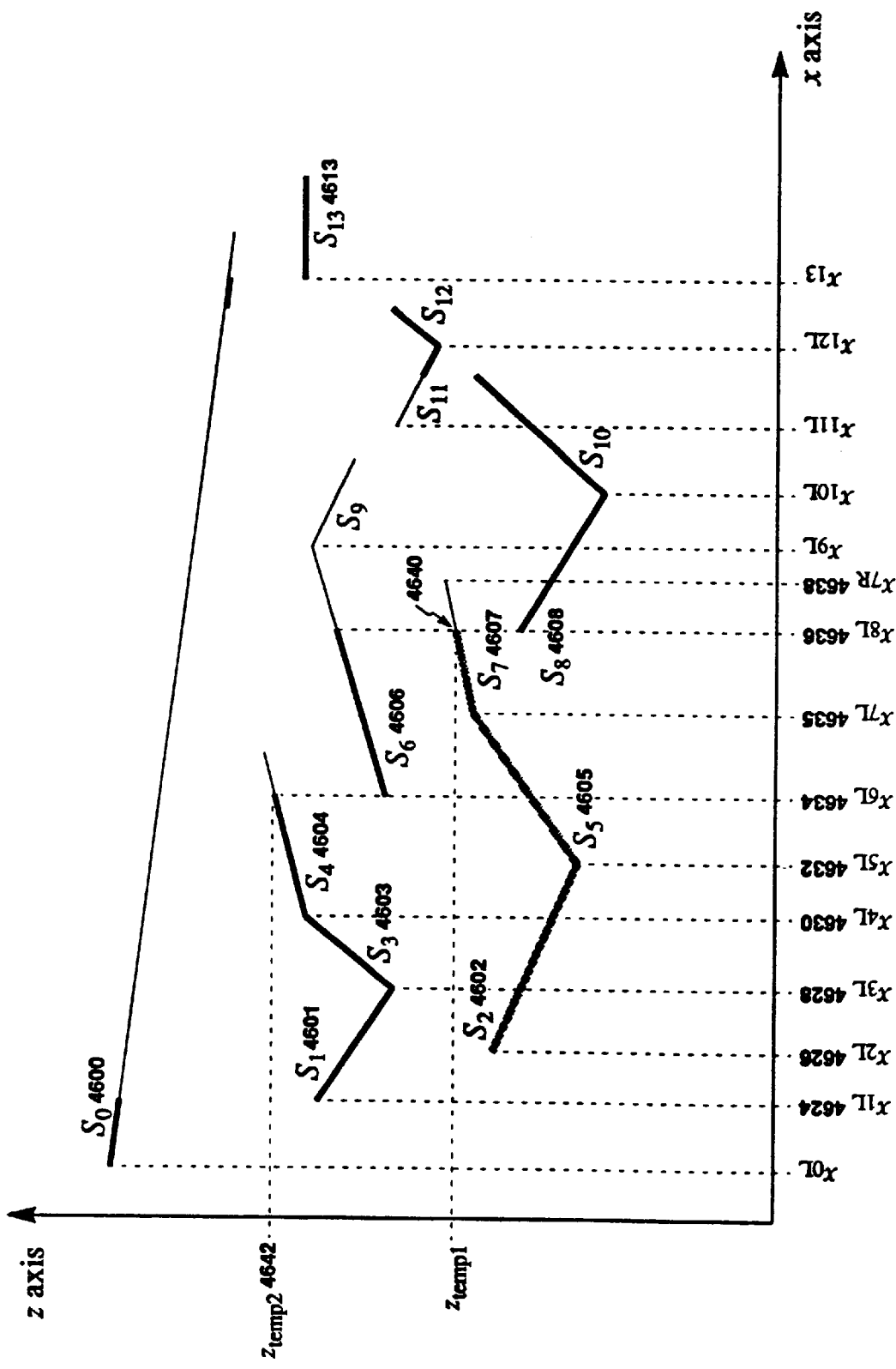
Figure 46 A Set of Spans on One Raster Line, Showing Visible Span Portions

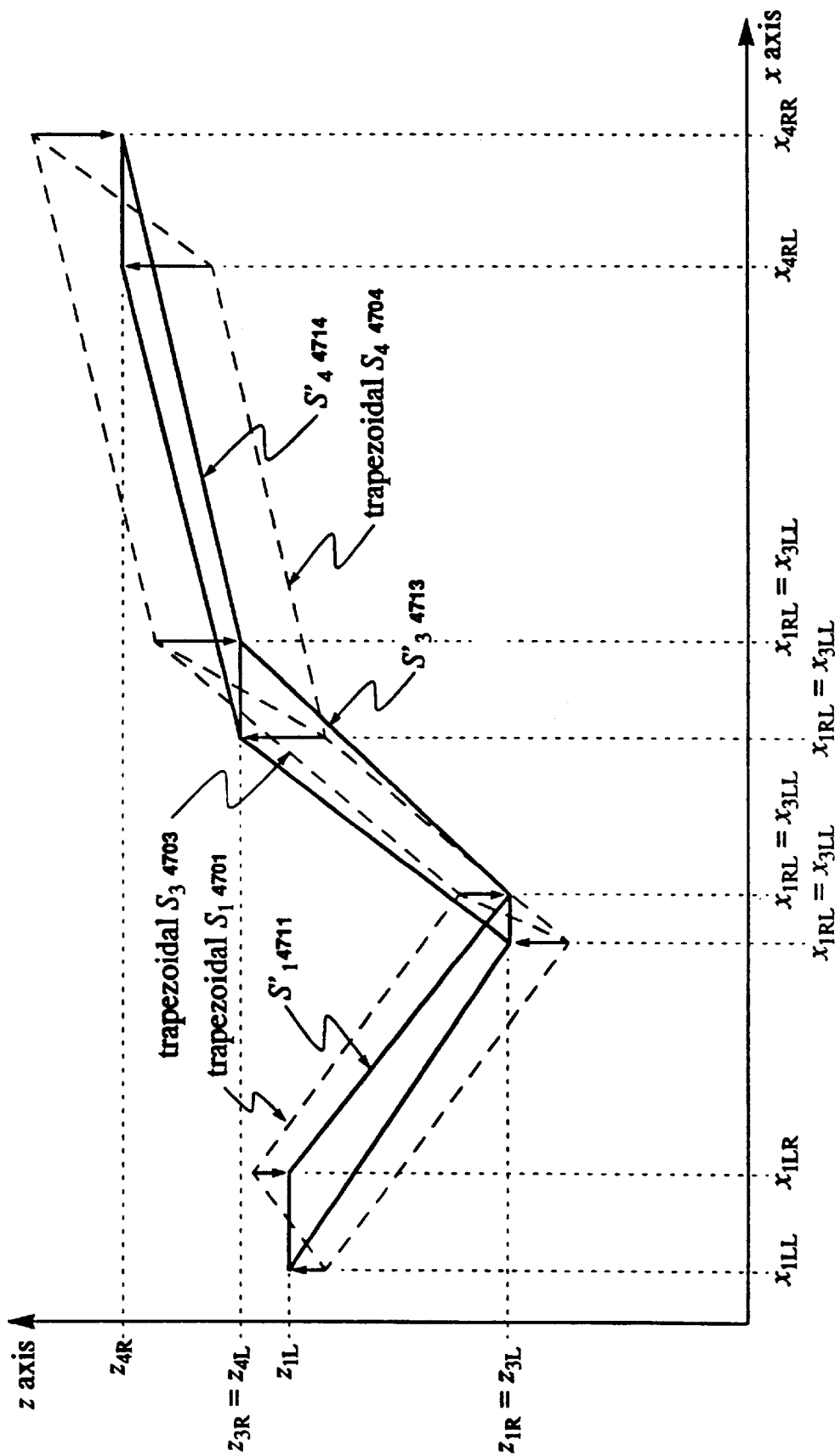
Figure 47 Using One z Value per Span Endpoint makes Quadrilateral Spans

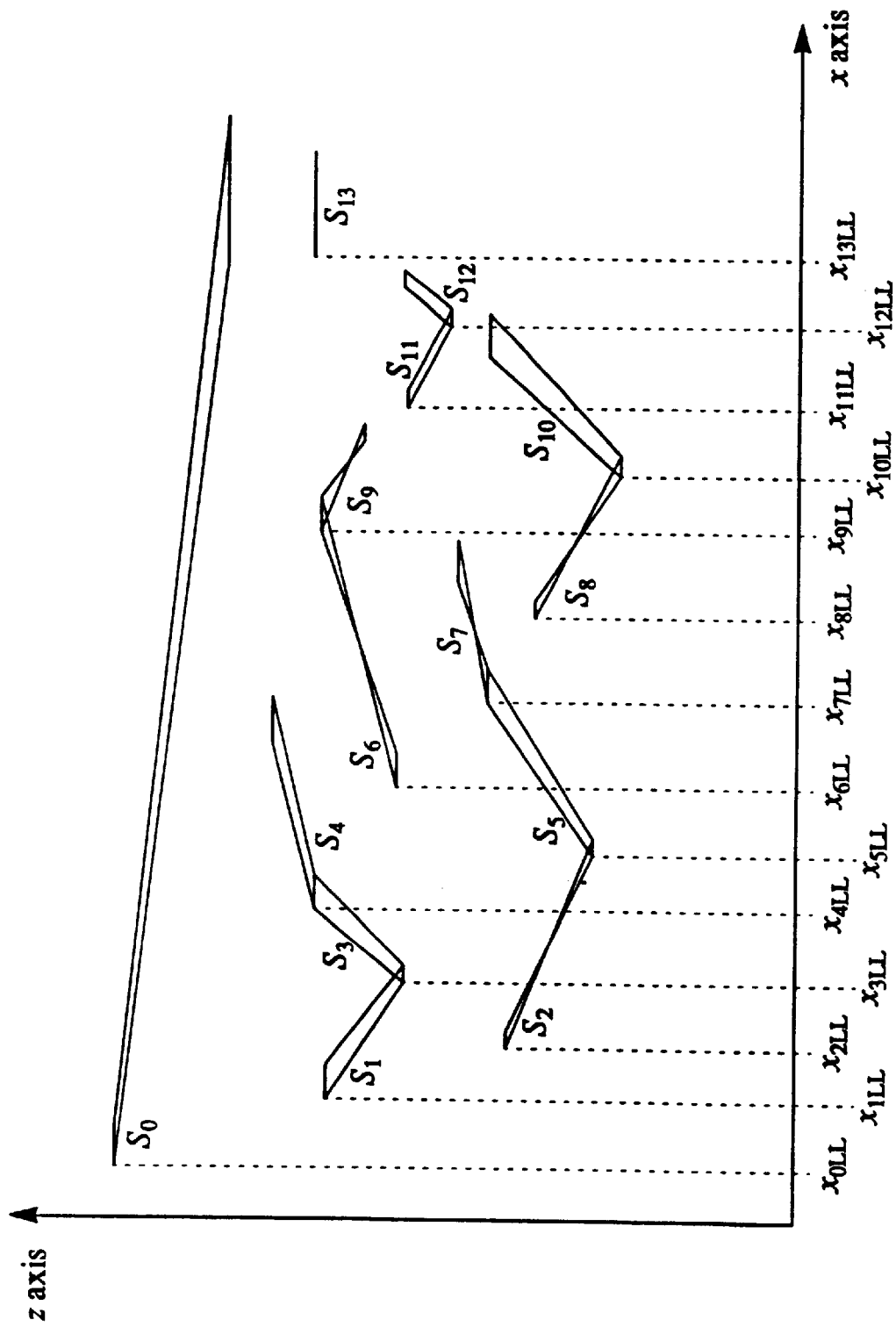
Figure 48 A Set of Quadrilateral Spans on one Raster Line

Figure 49 Span Sorting Rendering Pipeline with Direct Span Generation
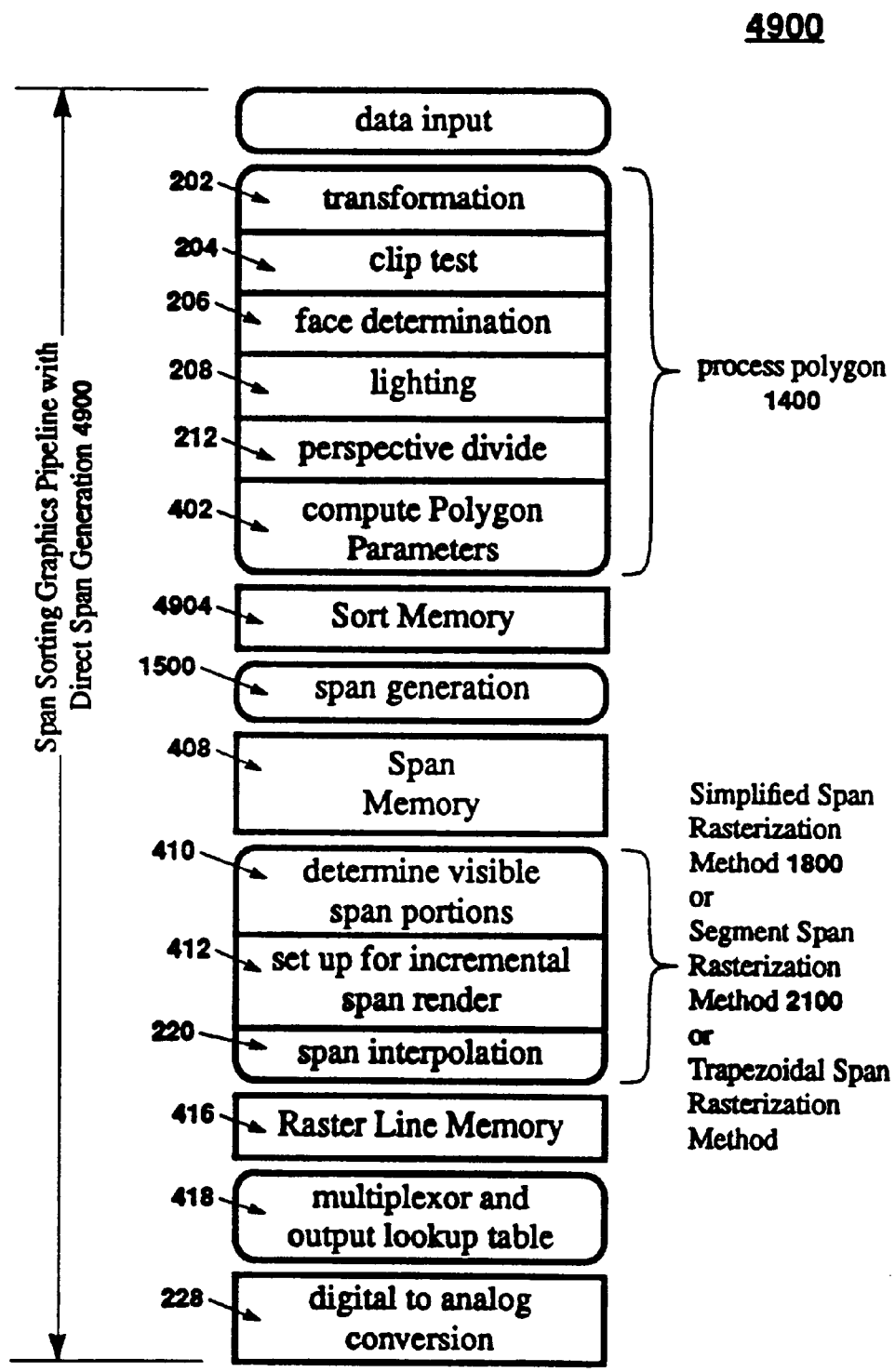

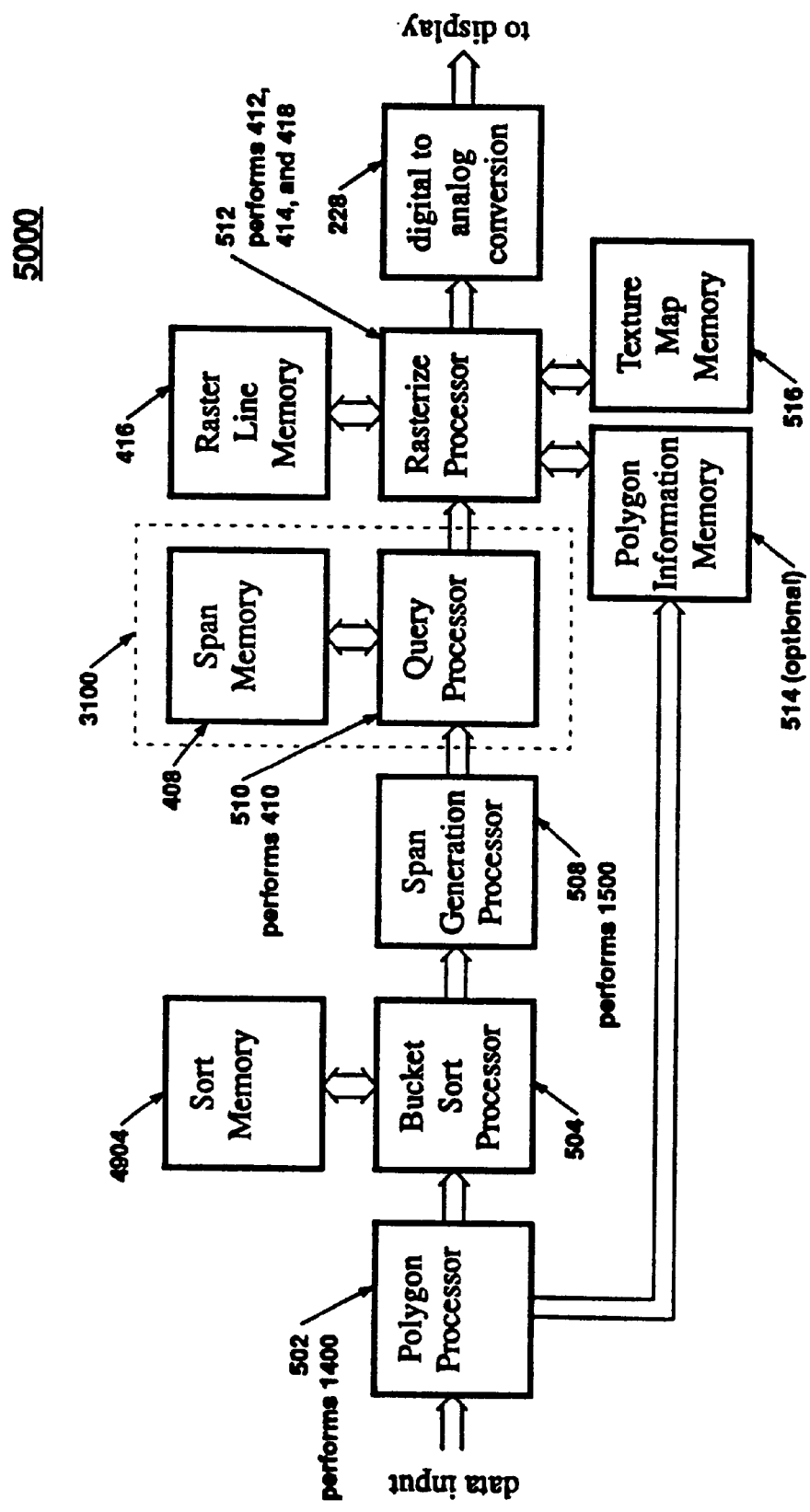
Figure 50 Span Sorting Renderer Architecture with Direct Span Generation

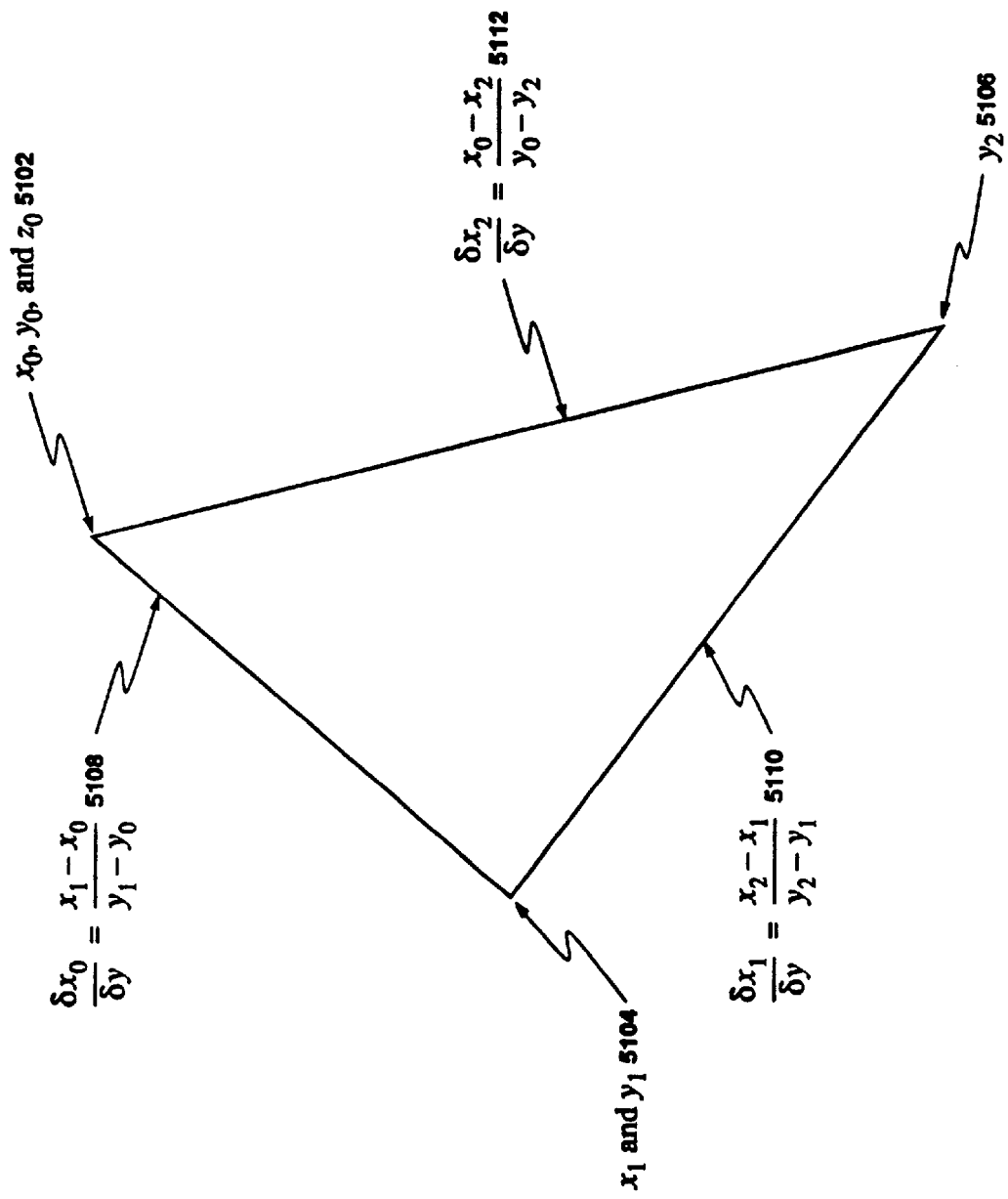
Figure 51 An alternate set of Polygon Parameters as Stored in Sort Memory

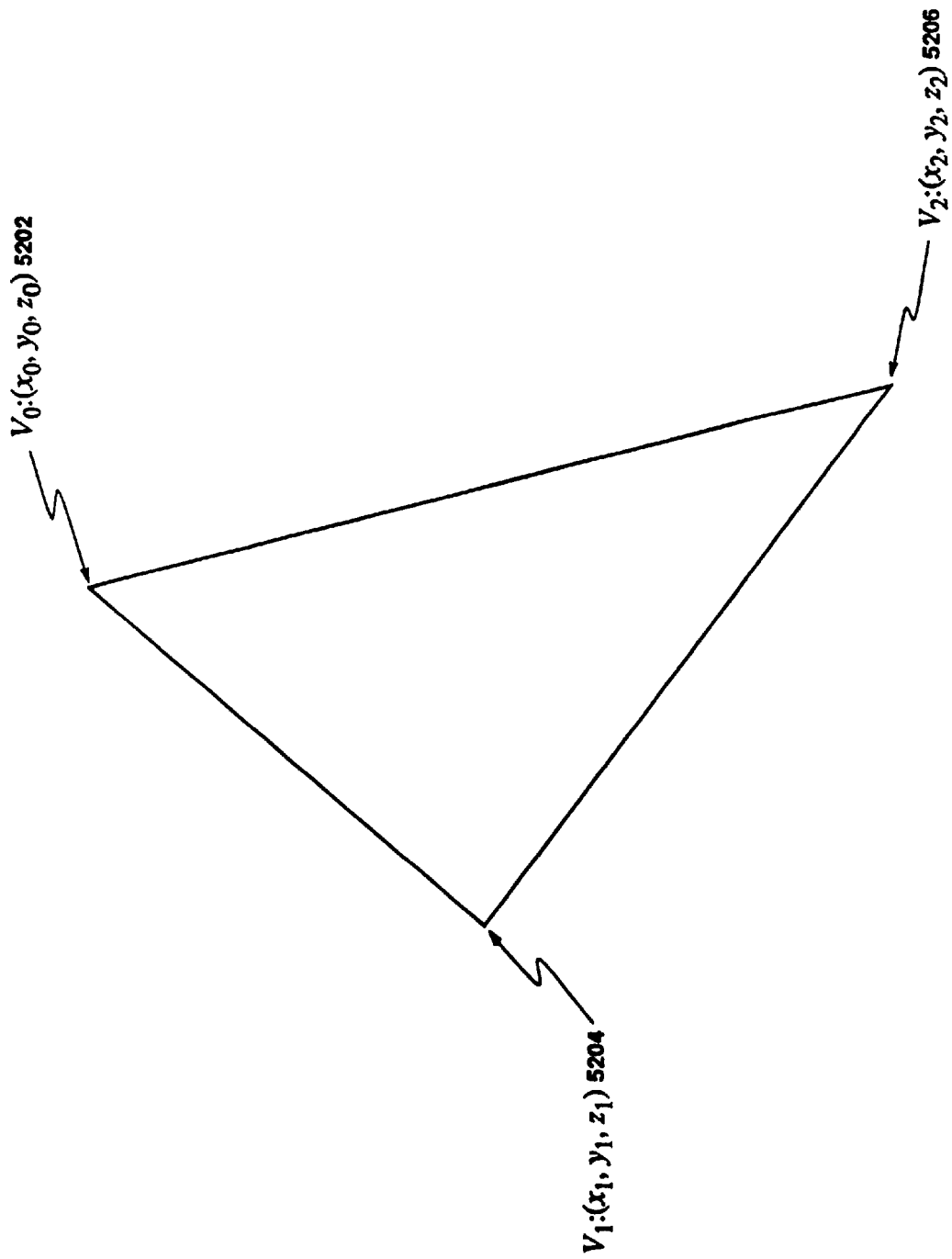
Figure 52 Generic Triangle Parameters

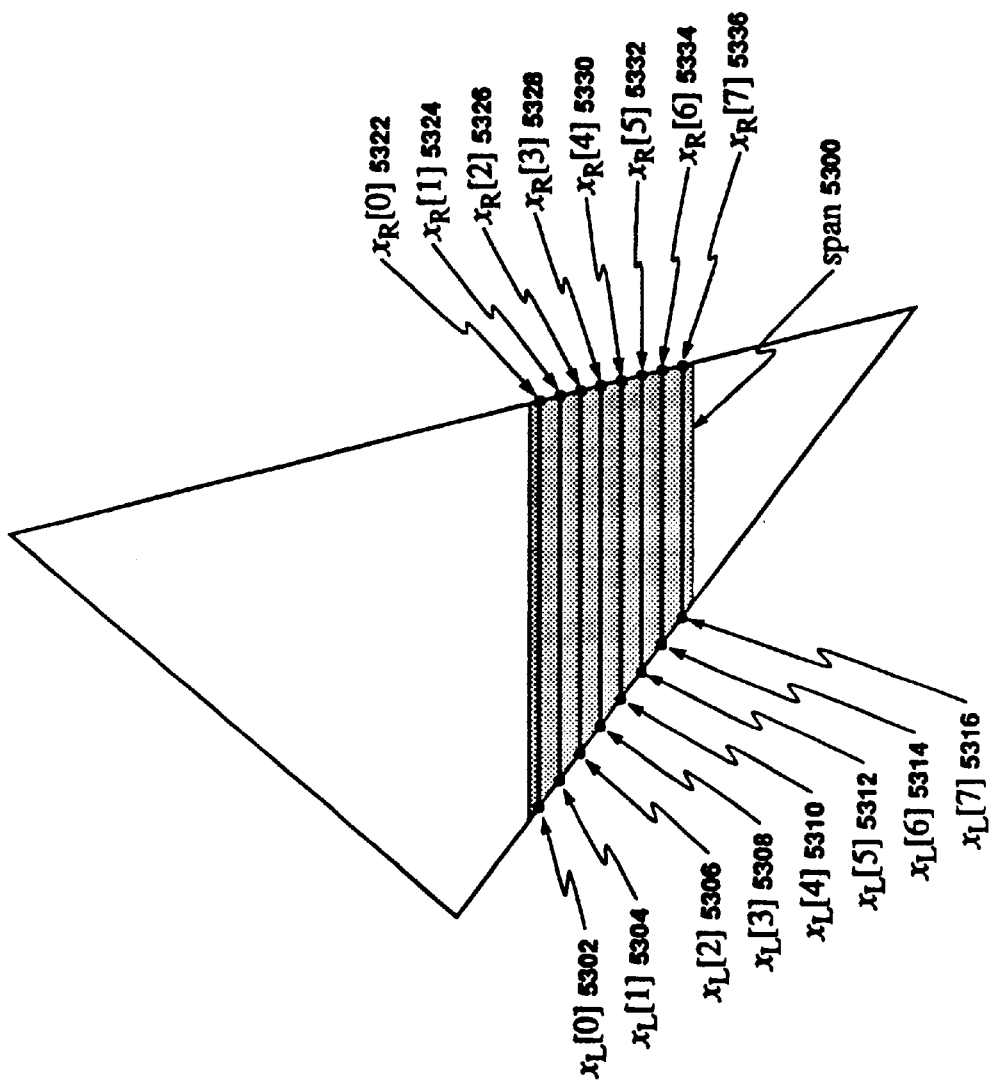
Figure 53 An Alternate Span Representation as Stored in the Span Registers

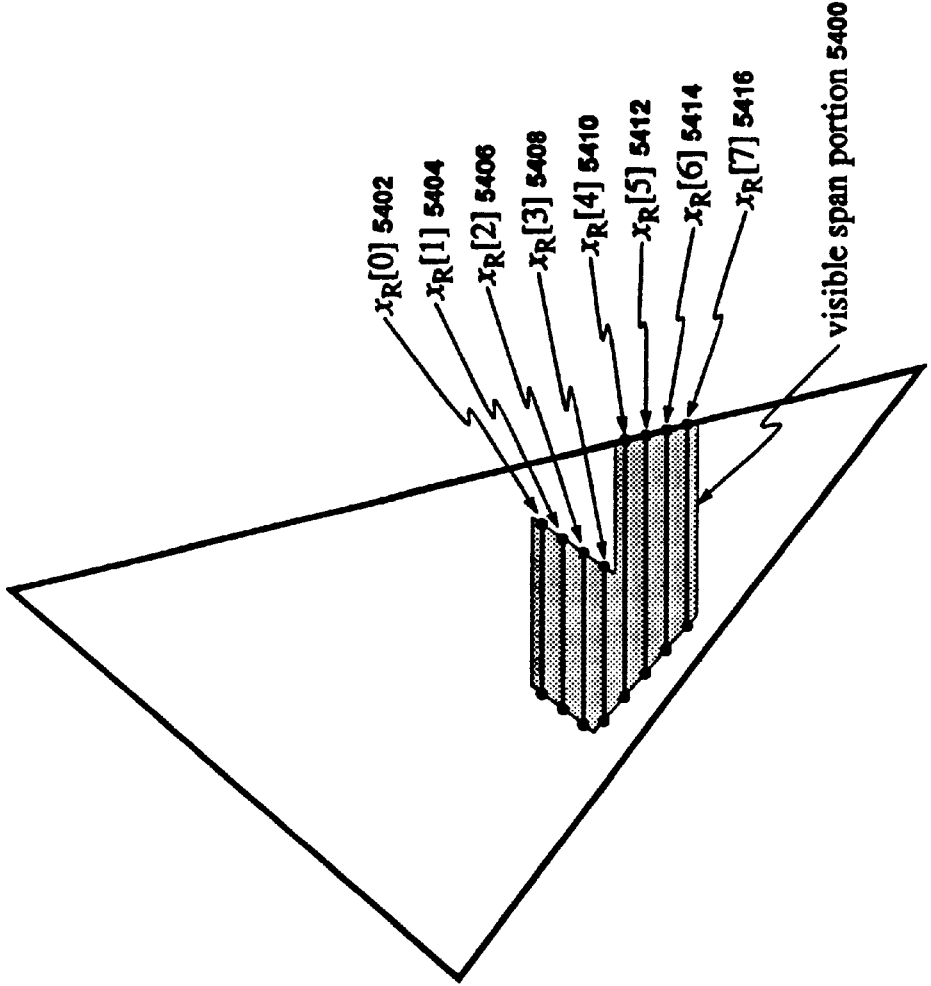
Figure 54 An Alternate Span Representation as Sent to the Rasterize Processor

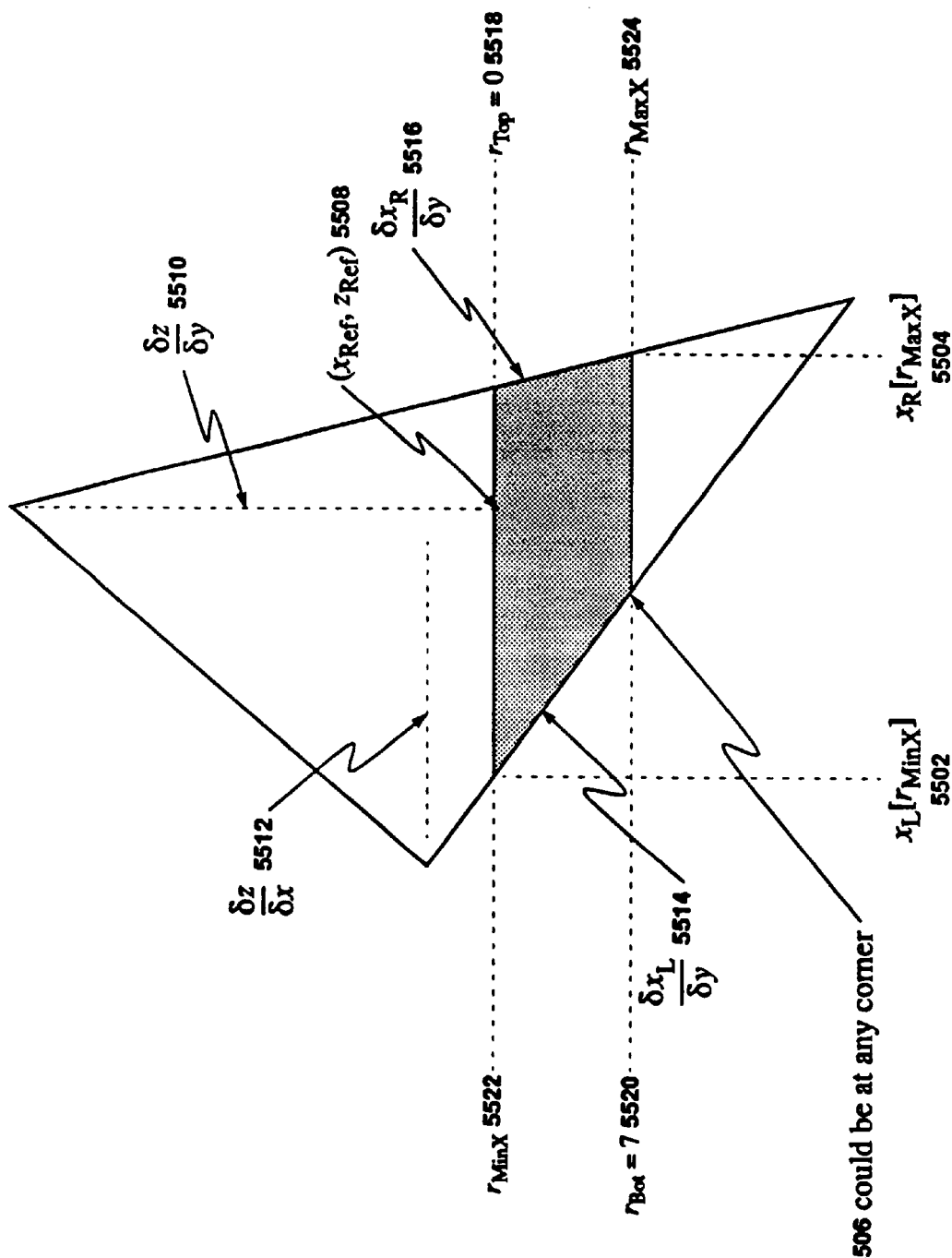
Figure 55 An alternate set of Span Parameters as Stored in Span Memory

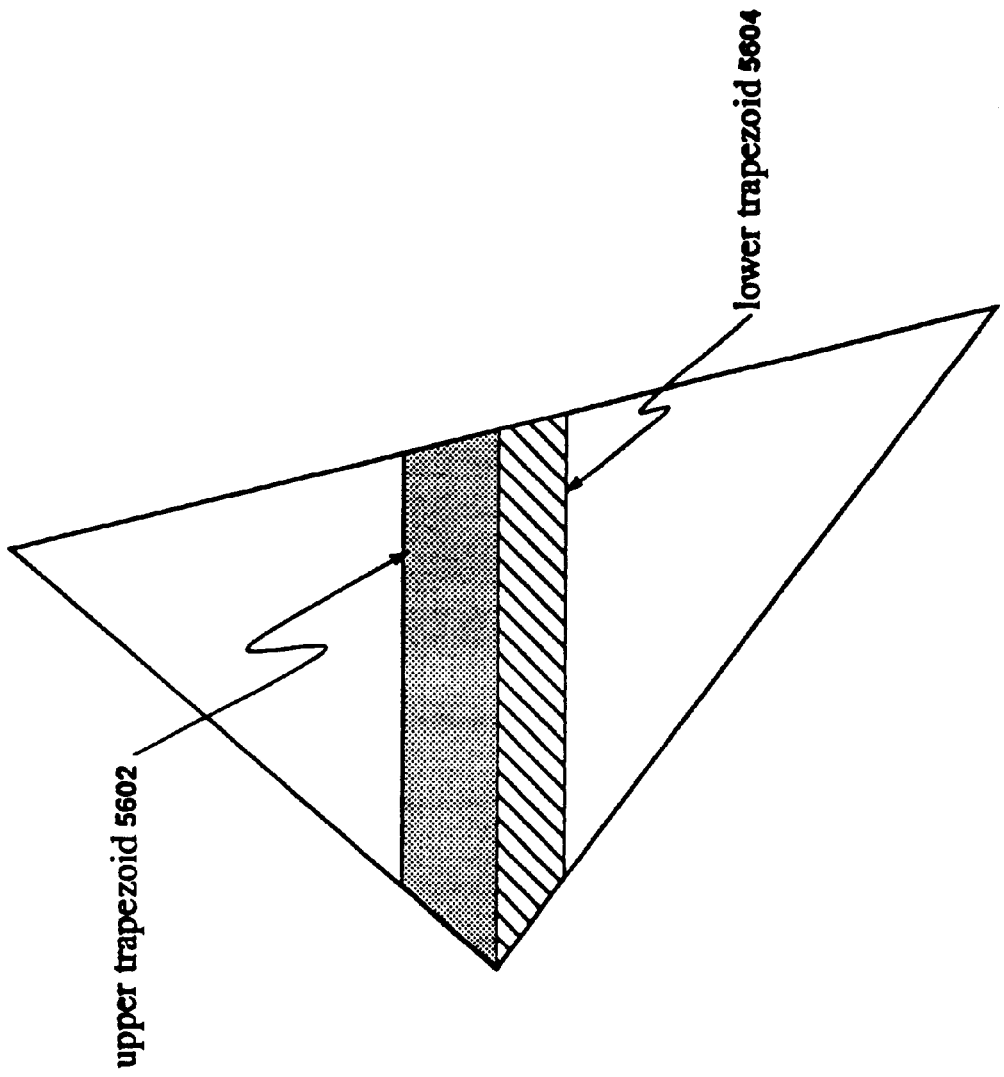
Figure 56 Trapezoidal Spans when a Corner is Included

METHOD AND APPARATUS FOR SPAN AND SUBSPAN SORTING RENDERING SYSTEM

This is a continuation of application Ser. No. 08/686,535 filed Jul. 26, 1996 which claims priority to provisional application No. 60/001,529, filed Jul. 26, 1995.

FIELD OF THE INVENTION

The field of this invention is twofold: 1) three-dimensional computer graphics; and 2) computer memories, and more specifically, Content Addressable Memories (CAM).

BACKGROUND OF THE INVENTION

Three-Dimensional Computer Graphics

Computer graphics is the art and science of generating pictures with a computer. Generation of pictures, or images is commonly called rendering. Generally, in three-dimensional (3D) computer graphics, geometry that represents surfaces (or volumes) of objects in a scene is translated into pixels stored in a frame buffer, and then displayed on a display device. Real-time display devices, such as CRTs used as computer monitors, refresh the display by continuously displaying the image over and over. This refresh usually occurs row-by-row, where each row is called a raster line or scan line. In this document, raster lines are numbered from bottom to top, but are displayed in order from top to bottom.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated 202 (or transformed) from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by precomputing appropriate translation matrices before any translation occurs. Once the geometry is in screen coordinates, it is broken into a set of pixel color values (that is "rasterized") that are stored into the frame buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

FIG. 1 shows a three-dimensional object, a tetrahedron 110, with its own coordinate axes ($x_{obj}$, $y_{obj}$, $z_{obj}$). The three-dimensional object 110 is translated, scaled, and placed in the viewing point's 130 coordinate system based on ($x_{eye}$, $y_{eye}$, $z_{eye}$). The object 120 is projected onto the viewing plane 102, thereby correcting for perspective. At this point, the object appears to have become two-dimensional; however, the object's z-coordinates are preserved so they can be used later by hidden surface removal techniques. The object is finally translated to screen coordinates, based on ($x_{screen}$, $y_{screen}$, $z_{screen}$), where $z_{screen}$ is going perpendicularly into the page. Points on the object now have their x and y coordinates described by pixel location (and fractions thereof) within the display screen 104 and their z coordinates in a scaled version of distance from the viewing point 130.

Because many different portions of geometry can affect the same pixel, the geometry representing the surfaces closest to the scene viewing point 130 must be determined. Thus, for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company. Reading, Mass., 1990, reprinted with corrections 1991, IBSN 0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity of ten or twenty. As scene models become more and more complicated, renderers will be required to process scenes of ever increasing depth complexity. Thus, for most renders, the depth complexity of a scene is a measure of the wasted processing. For example, for a scene with a depth complexity of ten, 90% of the computation is wasted on hidden pixels. This wasted computation is typical of hardware renderers that use the simple Z-buffer technique (discussed later herein), generally chosen because it is easily built in hardware. Methods more complicated that the Z-buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: 1) the x-coordinate in pixel units (generally including a fraction); 2) the y-coordinate in pixel units (generally including a fraction); and 3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking 218 and span interpolation 220. Thus, a z-coordinate value is generally included in each pixel value (along with the color value) as geometry is rendered.

Generic 3D Graphics Pipeline

Many hardware renderers have been developed, and an example is incorporated herein by reference: "Leo: A system for Cost Effective 3D Shaded Graphics", by Deering and Nelson, pages 101 to 108 of SIGGRAPH 93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBM 0-201-56997-3 (Hereinafter referred to as the Deering Reference). The Deering Reference includes a diagram of a generic 3D graphics pipeline 200 (i.e., a renderer, or a rendering system) that is describes as "truly generic, as at the top level nearly every commercial 3D graphics accelerator fits this abstraction", and this pipeline diagram is reproduced here as FIG. 2. Such pipeline diagrams convey the process of rendering, but do not describe any particular hardware. This document presents a new graphics pipeline 400 that shares some of the steps of the generic 3D graphics pipeline 200. Each of the steps in the generic 3D graphics pipeline 200 will be briefly explained here, and are also shown in the method flow diagram 300 of FIG. 3. Processing of polygons is assumed throughout this document, but other methods for describing 3D geometry could be substituted. For simplicity of explanation, triangles are used as the type of polygon in the described methods.

As seen in FIG. 2, the first step within the floating-point intensive functions 250 of the generic 3D graphics pipeline 200 is the transformation step 202, which was described above. The transformation step 202 is also shown in FIG. 3 as the first step in the outer loop of the method flow diagram 300, and also includes "get next polygon". The second step, the clip test 204, checks the polygon to see if it is at least partially contained in the view volume 106 (sometimes shaped as a frustum). If the polygon is not in the view volume 106, it is discarded; otherwise processing continues. The third step is face determination 206, where polygons facing away from the viewing point are discarded. Generally, face determination 206 is applied only to objects that are closed volumes. The fourth step, lighting computation 208, generally includes the set up for Gouraud shading and/or texture mapping with multiple light sources of various types, but could also be set up for Phong shading or one of many other choices. The fifth step, clipping 210, deletes any portion of the polygon that is outside of the view volume 106 because that portion would not project within the rectangular area of the viewing plane 102. Generally, polygon clipping 210 is done by splitting the polygon into two smaller polygons that both project within the area of the viewing plane 102. Polygon clipping is computationally expensive, but its need is avoided in the invention presented here, thus providing computational savings. The sixth step, perspective divide 212, does perspective correction for the projection of objects onto the viewing plane 102. At this point, the points representing vertices of polygons are converted to pixel-space coordinates by step seven, the screen space conversion 214 step. The eighth step, set up for incremental render 216, computes the various begin, end, and increment values needed for edge walking 218 and span interpolation 220 (e.g.; x, y, and z-coordinates; RGB color; texture map space u and v-coordinates; etc.).

Within the drawing intensive functions 260, edge walking 218 incrementally generates horizontal spans for each raster line of the display device by incrementing values from the previously generated span (in the same polygon), thereby "walking" vertically along opposite edges of the polygon. Similarly, span interpolation 220 "walks" horizontally along a span to generate pixel values, including a z-coordinate value indicating the pixel's distance from the viewing point 130. By comparing this z-coordinate value to the corresponding value stored in the Z-buffer, the z-buffered blend 222 either keeps the new pixel values (if it is closer to the viewing point than previously stored value for that pixels location) by writing it into the frame buffer 224, or discards the new pixel values (if it is farther). At this step antialiasing methods (discussed in the next section) can blend the new pixel color with the old pixel color.

The generic 3D graphics pipeline 200 includes a double buffered frame buffer 224, so a double buffered MUX 226 is also included. An output lookup table 226 is included for translating color map values. Finally, digital to analog conversion 228 makes an analog signal for input to the display device.

A major drawback to the generic 3D graphics pipeline 200 is its drawing intensive functions 260 are not deterministic at the pixel level given a fixed number of polygons. That is, given a fixed number of polygons, more pixel-level computation is required as the average polygon size increases. However, the floating-point intensive functions 250 are proportional to the number of polygons, and independent of the average polygon size. Therefore, it is difficult to balance the amount of computational power between the floating-point intensive functions 250 and the drawing intensive functions 260 because this balance depends on the average polygon size.

An ideal renderer's pixel drawing computational requirement would be proportional to the number of pixels in the display screen 104, not the total number of pixels in all the polygons in the view volume 106. This ideal is achieved by the invention described here because hidden geometry is removed before most drawing intensive functions are performed. In the invention described here, computational load balancing is not a problem because the amount of floating-point computation is essentially independent of the amount of drawing computation.

Antialiasing

In this document, pixels were defined to be the smallest individually controllable element of the display device. But, because images are quantized into discrete pixels, spatial aliasing occurs. A typical aliasing artifact is a "staircase" effect cause when a straight line or edge cuts diagonally across rows of pixels. An ideal antialiased image eliminates this "staircase" effect by calculating, for each pixel, an average color by taking into account partial coverage by the visible surfaces within the pixel's area.

Some rendering systems reduce aliasing effects by dividing pixels into subpixels, where each sub-pixel can be colored independently. When the image is to be displayed, the colors for all sub-pixels within each pixel are blended together to form an average color for the pixel. A renderer that uses 16 sub-pixels per pixel is described in "Reality-Engine Graphics", by Akeley, pages 109 to 116 of SIG-GRAPH 93 Proceedings, Aug. 1–6, 1993, Computer Graphics Processings, Annual Conference Series, published by ACM SIGGRAPH, New York, 1993, Softcover ISBN 0-201-58889-7 and CD-ROM ISBN 0-201-56997-3 (hereinafter referred to as the Akeley Reference). The drawback with using subpixels is the increase in computation due to computing color values at every subpixel. In the Akeley Reference, the increase in computation is reduced by only dividing a pixel into sub-pixels when the pixel is crossed by a line or an edge of a polygon. This reduction becomes less significant as the number of polygons increases. In other words, if the image is made up of lots of small overlapping polygons, then most pixels will need to be divided. Utilization of subpixels is an image-precision antialiasing technique.

Another prior art antialiasing method is the a-Buffer used to perform alpha blending (this technique is also included in the Akeley Reference), and is described in "The A-buffer, an Antialiased Hidden Surface Method" by L. Carpenter, SIG-GRAPH 1984 Conference Proceedings, pp. 103–108 (hereinafter referred to as the Carpenter Reference). The A-buffer is an image-precision antialiasing technique that reduces aliasing by keeping track of the percent coverage of a pixel by a rendered polygon. The main drawback to this technique is the need to sort polygons front-to-back (or back-to-front) at each pixel in order to get acceptable antialiased polygons.

An ideal antialiasing method would perform object-precision computations to precisely identify the visible portions of geometry. This would require comparing edges of polygons to each other in order to determine the fraction of each pixel covered by each polygon. The invention of this document performs object-precision antialiasing within each scan line, thus achieving this ideal.

Z-buffers

Stated simply, the Z-buffer stores, for every pixel, the z-coordinate of the closest geometry (to the viewing point) that affects the pixel. Hence, as new pixel values are generated, each new pixel's z-coordinate is compared to the corresponding location in the Z-buffer. If the new pixel's z-coordinate is smaller (i.e., closer to the viewing point), this value is stored into the Z-buffer and the new pixel's color value is written into the frame buffer. If the new pixel's z-coordinate is larger (i.e., farther from the viewing point), the frame buffer and Z-buffer values are unchanged and the new pixel is discarded. The Z-buffer is an image-precision visible surface determination technique.

A flow diagram including the prior art Z-buffer method is shown in FIG. 3. The main drawback to the Z-buffer hidden surface removal method is the requirement for geometry to be converted to pixel values before hidden surface removal can be done. This is because the keep/discard decision is made on a pixel-by-pixel basis. In contrast, the invention of this document performs hidden surface removal at a higher level by processing spans rather than pixels. For scenes with any significant depth complexity, pixel-by-pixel hidden surface removal introduces much wasted computation by requiring all geometry within the view volume to be converted to pixels, even though most are hidden and, therefore, thrown away. In hardware rendering systems, pixel color generation (shading, texture mapping, etc.) often happens in parallel with the Z-buffer comparison test, thereby compounding the wasted computation because much of the computation is associated with color generation, and most of the pixels are thrown away. Furthermore, the Z-buffer memory operation is a read-modify-write cycle, generally requiring the Z-buffer memory input/output bus to change directions twice when writing pixels into the frame buffer, thereby causing a bottleneck in the renderer. This bottleneck does not occur in the apparatus and method of the document's invention.

Prior art Z-buffers are based on conventional Random Access Memory (RAM), Video RAM (VRAM), or special purpose DRAMs. One example of a special purpose DRAM is presented in "FBRAM: A new form of Memory Optimized for 3D Graphics", by Derring, Schlapp, and Lavelle, pages 167 to 174 of SIGGRAPH 94 Proceedings, Jul. 24–29, 1994. Computer Graphics Proceedings, Annual Conference Series, published by ACM SIGGRAPH, New York, 1994, Softcover ISBN 0-201-607795-6.

Geometry Databases

The geometry needed to generate a renderable scene is store din a database. This geometry database can be a simple display list of graphics primitives or a hierarchically organized data structure. In the hierarchically organized geometry database, the root of the hierarchy is entire database, and the first layer of subnodes in the data structure is generally all the objects in the "world" which can be seen from the viewpoint. Each object, in turn, contains subobjects, which contain sub-subobjects; thus resulting in a hierarchial "tree" of objects. Hereinafter, the term "object" shall refer to any node in the hierarchial tree of objects. Thus, each subobject is an object. The term "root object" shall refer to a node in the first layer of submodes in the data structure. Hence, the hierarchical database for a scene starts with the scene root node, and the first layer of objects are root objects.

Hierarchical databases of this type are used by the Programmer's Hierarchical Interactive System (PHIGS) and PHIGS PLUS standards An explanation of these standards can be found in the book, "A Practical Introduction to PHIGS and PHIGS PLUS", by T. L. J. Howard, et. al., published by Addison-Wesley Publishing Company, 1991, ISBN 0-201-41641-7 (incorporated herein by reference and hereinafter called the Howard Reference). The Howard Reference describes the hierarchical nature of 3D models and their data structure on pages 5 through 8. Hierarchical models can provide a separate transformation matrix at each layer of the hierarchy, thereby making it possible to move models or parts of a models simply by changing a transformation matrix. This allows non-changing model geometry (in object coordinates) to be used as moving objects in an animation.

Content Addressable Memories

Most Content Addressable Memories (CAM) perform a bit-for-bit equality test between an input vector and each of the data words stored in the CAM. This type of CAM frequently provides masking of bit positions in order to eliminate the corresponding bit in all words from affecting the equality test. It is inefficient to perform magnitude comparisons in a equality-testing CAM because a large number of clock cycles is required to do the task.

CAMs are presently used in translation look-aside buffers within a virtual memory systems in some computers. CAMs are also used to match addresses in high speed computer networks. CAMs are not used in any practical prior art renders.

Magnitude Comparison CAM (MCCAM) is defined here as any CAM where the stored data are treated as numbers, and arithmetic magnitude comparisons (i.e. less-than, greater-than, less-than-or-equal-to, etc.) are performed on the data in parallel. This is in contrast to ordinary CAM which treats stored data strictly as bit vectors, not as numbers. An MCCAM patent, included herein by reference, is U.S. Pat. No. 4,996,666, by Jerome F. Duluk Jr., entitled "Content-Addressable Memory System Capable of Fully Parallel Magnitude Comparisons", granted Feb. 26, 1991 (hereinafter referred to as the Duluk Patent). Structures within the Duluk Patent specifically referenced shall include the prefix "Duluk Patent" (for example, "Duluk Patent MCCAM Bit Circuit"). MCCAMs are not used in any prior art renderer.

The basic internal structure of an MCCAM is a set of memory bits organized into words, where each word can perform one or more arithmetic magnitude comparisons between the stored data and input data. In general, for an MCCAM, when a vector of numbers is applied in parallel to an array of words, all arithmetic comparisons in all words occur in parallel. Such a parallel search comparison operation is called a "query" of the stored data.

The invention described here augments the capability of the MCCAM by adding various features, including the ability to perform sorting. This new type of MCCAM is call Sorting Magnitude Comparison CAM (SMCCAM).

SUMMARY OF THE INVENTION

Computer graphics is the art and science of generating pictures or images with a computer. This picture generation is commonly referred to as rendering. The appearance of motion, for example in a 3-Dimensional animation is achieved by displaying a sequence of images. Interactive 3-Dimensional (3D) computer graphics allows a user to change his or her viewpoint or to change the geometry in real-time, thereby requiring the rendering system to create new images on-the-fly in real-time. Therefore, real-time performance in color, with high quality imagery is becoming increasingly important.

The inventive apparatus and method provide a data shifting capability that permits sorting the data in addition to searching. It also provides a new way to perform a simple search of a spatial database based on a rectangularly shaped search region or range search. The range search may be performed in a special new Sorting Magnitude Comparison Content Addressable Memory (SMCCAM) apparatus. This SMCCAM provides a magnitude comparison content addressable memory wherein the data stored in the fields in each word of the memory may be shifted to corresponding fields in an adjacent word, where this shifting is conditionally performed based on the results of the magnitude comparisons.

The 3D graphics method stores the parameters of a polygon span in a spatial database, and a query operation is performed on the database to determine which of those spans, or portions of spans, are visible. The spatial database of spans can be stored in an SMCCAM. The SMCCAM apparatus is significant because its operation is fast enough to support real time operation, such as for standard and emerging video technologies (NTSC, PAL, HDTV, and the like), visual flight simulators, virtual reality image generators, and the like, among other applications.

Since the range search is used, it introduces a conservative approximation of the ideal Occluding Region. An Occluding Test is provided which defines an Occluding Test Region as an approximation to the ideal Occluding Region. A rule based method is used when comparing the Current Span Portion with the New Span, where the New Span is found by the Occluding Test and read out of the data structure stored in memory. That memory may advantageously be the SMCCAM, or it may be a conventional memory that implements the spatial data structure with conventional spatial database methods. Based on the results of the comparison, one rule out of several possible simple rules are selected and applied to determine which piece of the current Span is visible, if any. Several alternative rules are described.

Multiple alternative span representations are provided, including a Segment Span, Trapezoidal Span, and Quadrilateral Span. Each of these Spans is defined by its own set of span parameters, of which they are multiple selections of each. The span parameters are stored in a data structure in memory, which may be implemented by the SMCCAM, and are used during the query search operation. Each of these Span types have their own advantages. For example, a Trapezoidal Span or a Quadrilateral Span provides superior antialiasing performance than provided by a Segment Span. This performance advantage is achieved by preserving the left and right edge information of the polygon within a particular raster line. Several ways to handle the query operation for Trapezoidal and Quadrilateral Spans are described.

Spatial searching and sorting apparatus and methods are provided such that spatial searching and sorting can be used to properly render transparent polygon spans in front-to-back or back-to-front order.

As a possible improvement to the method and apparatus, rather than using two distinct memories (Bucket Sort Memory and Current Polygon Memory) to store polygon geometry information once they have translated to screen coordinates, a single memory (Sort Memory) can be used to store the polygon geometry information. This can be done by replacing the Current Polygon Memory with a list of pointers into the Sort Memory, thereby eliminating copying Polygon Parameters form Bucket Sort Memory to Current Polygon Memory.

As another possible improvement for trapezoidal spans and quadrilateral spans, the spatial data structure can store the parameters of the entire span, and when the span is read form the data structure, a set of subspans is generated on the fly, where these subspans are vertically distributed over the height of the full span, and each subspan is a segment span. The rule for comparing the Current Span Portion to the New Span are applied on a subspan-by-subspan basis, thereby providing additional polygon edge information within a raster line, which, in turn, provides antialiasing. Once again, for real-time performance, the spatial data structure can be stored in a SMCCAM.

The inventive apparatus, system, and method also provide several options and enhancements to the basic system. These include, by way of example: preservation of rendering order, utilization of a single-buffered frame buffer for increased compatibility with conventional video cards, the ability to selectively turn on or off antialiasing on specific polygon edges, the ability to store edge-pairs rather than polygons thereby simplifying downstream processing, the ability to eliminate the Current Polygon Memory by replacing it with a list of pointers, the ability to add clipping planes (front, rear, and/or arbitrary), provision of the Geometry Cache for storing geometry as it is input for rendering, flexible options for the number of pages of Span Memory and Page Memory I/O bus architecture, support for geometry primitives other than polygons (such as CSG primitives), and alternatives that support the inventive method in conventional hardware with some performance compromises.

A BRIEF DESCRIPTION OF THE DRAWINGS

FIG. 1: An object in three-dimensional space, its projection onto the viewing plane, and its image one a display screen.

FIG. 2: Generic rendering pipeline from the Deering Reference (prior art).

FIG. 3: Method flow diagram for the standard Z-buffer method (prior art).

FIG. 4: The Span Sorting Rendering Pipeline. The Span Memory can be implemented with a SMCCAM 800.

FIG. 5: A block diagram of the Span Sorting Rendering Architecture.

FIG. 6: An example of nine polygons showing how they intersect the display screen and how they are included in a particular raster line.

Figure 7B:
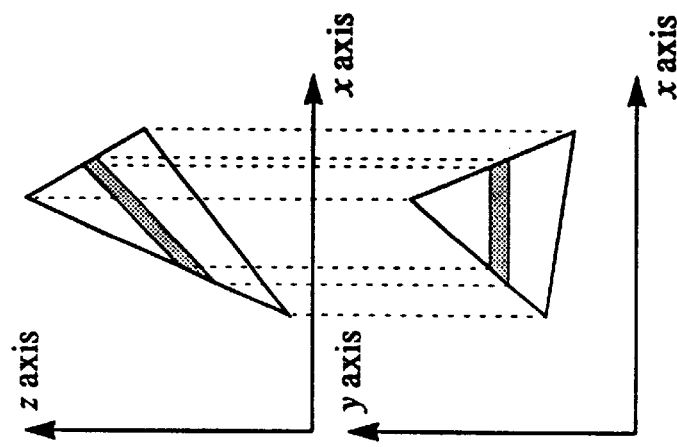
Figure 7C:
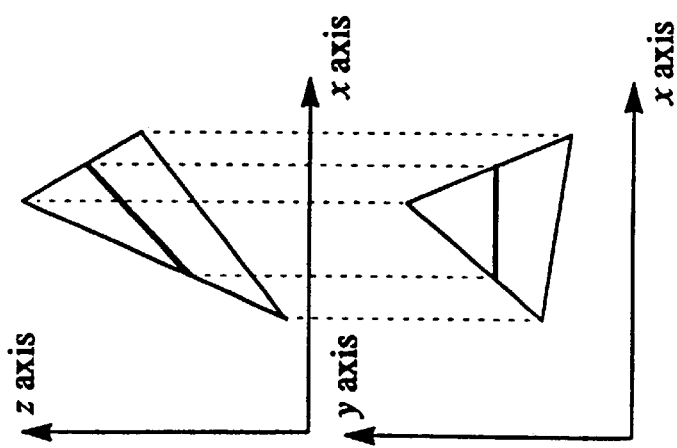

FIG. 7 including FIG. 7A–7C: Three ways to model a polygon span: 1) a line segment; 2) a trapezoid; and 3) a quadrilateral.

FIG. 8: Data organization within the Sorting Magnitude Comparison Content Addressable Memory 800 (SMCCAM 800).

FIG. 9: SMCCAM Word 900 block diagram.

FIG. 10: The area covered by a Span Occluding Test query, including two Potentially Occluding Spans.

FIG. 11: An example set of spans on one raster line, shown in x-z space.

FIG. 12: The same example set of spans as shown in FIG. 11, except with bounding boxes around each span.

FIG. 13: The Span Sorting Rendering Method 1300 flow diagram.

FIG. 14: The Process Polygon Method 1400 flow diagram, part of the Span Sorting Rendering Method 1300.

FIG. 15: The Process Current Polygon Memory Method 1500 flow diagram, part of the Span Sorting Rendering Method 1300.

FIG. 16: The Process Bucket Sort Memory Method 1600 flow diagram, part of the Span Sorting Rendering Method 1300.

FIG. 17: The Write Span Parameters Method 1700 flow diagram.

FIG. 18: The Simplified Span Rasterization Method 1800 flow diagram, part of the Span Sorting Rendering Method 1300.

FIG. 19: Span interaction nomenclature definitions.

FIG. 20 including 20A–20WW: The 36 varieties of Span Interaction Types.

FIG. 21: Segment Span Rasterization Method 2100 flow diagram, part of the Span Sorting Rendering Method 1300.

FIG. 22: Rule 1 2200 method flow diagram, part of Segment Span Rasterization Method 2100.

FIG. 23: Rule 2 2300 method flow diagram, part of Segment Span Rasterization Method 2100.

FIG. 24: Rule 3 2400 method flow diagram, part of Segment Span Rasterization Method 2100.

FIG. 25: Rule 4 2500 method flow diagram, part of Segment Span Rasterization Method 2100.

FIG. 26: Rule 5 2600 method flow diagram, part of Segment Span Rasterization Method 2100.

FIG. 27: An example raster line with fifteen spans. The bounding box of each span is shown as well as each span's $x_L$ location along the x axis.

FIG. 28: Timing diagram for phase-locked raster line processing and display.

FIG. 29: Timing diagram for single buffered frame buffer.

FIG. 30: Timing diagram for single buffered from buffer where span rasterization covers more than one screen display time.

FIG. 31: Block diagram of the Span Processor hardware architecture.

FIG. 32: Block diagram of the Comparison and Offset Computation block within the Span Processor.

FIG. 33: Prior art MCCAM CMOS bit cell.

FIG. 34: A "TTL type" circuit for an SMCCAM bit cell.

FIG. 35: A CMOS circuit for the SMCCAM bit cell that uses static storage for the master half of the master-slave flip-flop.

FIG. 36: A CMOS circuit for the SMCCAM bit cell that uses dynamic storage for both halves of the master-slave flip-flop.

FIG. 37: An array of SMCCAM bit cells.

FIG. 38: Multiple spans vertically within a raster line.

FIG. 39: Two trapezoidal spans working together to occlude farther spans that would be visible if the shown trapezoidal spans did not work together.

FIG. 40: An example set of trapezoidal spans, shown in x-z space.

FIG. 41: SOT Query for Processing Top and Bottom Separately

FIG. 42: An example set of trapezoidal spans used to illustrate the Trapezoidal Span Rasterization Method version that does occlusion processing on span tops and span bottoms separately.

FIG. 43: SOT Query for processing every visibility transition

FIG. 44: SOT Query with Complex Shape

FIG. 45: SOT Query with Wider Search Area

FIG. 46: A set of segment spans in a raster line where the visible opaque surfaces are shown as thick black lines and the visible translucent spans are shown as thick shaded lines.

FIG. 47: Approximating trapezoidal spans using only one z-value per endpoint changes the spans into quadrilateral spans.

FIG. 48: An example set of quadrilateral spans, shown in x-z space.

FIG. 49: Span Sorting Rendering Pipeline with Direct Span Generation.

FIG. 50: Span Sorting Renderer Architecture with Direct Span Generation.

FIG. 51: An alternate set of Polygon Parameters as stored in Sort Memory 4904.

FIG. 52: Generic triangle parameters.

FIG. 53: An alternate span representation as stored in the Span Parameter Registers 3104.

FIG. 54: An alternate span representation as sent to the Rasterize Processor 512.

FIG. 55: An alternate set of Span Parameters as stored in Span Memory 408.

FIG. 56: Multiple trapezoidal spans can be generated when a corner is included.

DETAILED DESCRIPTIONS OF THE INVENTION

Span Sorting Rendering Pipeline

FIG. 4 shows the Span Sorting 3D Graphics Pipeline 400, where the first six steps are defined as the process polygon 1400 steps. The first five steps (transformation 202, clip test 204, face determination 206, lighting 208, and perspective divide 212) are the same as the five of the first six steps in the Generic 3D Graphics Pipeline 200. The clip 210 step is omitted because the Span Sorting 3D Graphics Pipeline 400 operates in object-precision, and coordinates are not limited to the area of the display screen 104. Elimination of the clip 210 step allows all polygons in the view volume 106 to be treated the same. However, the clip 210 step can be inserted if desired. The Span Sorting 3D Graphics Pipeline 400 can be built with dedicated hardware, done completely in software, or a combination of the two. Hereinafter, a dedicated hardware implementation is assumed, and a new apparatus is described.

The top-level block diagram of the new apparatus is shown in FIG. 5. The process polygon 1400 steps are performed in the Polygon Processor 502. The last step performed by the Polygon Processor 502 is the computation of the Polygon Parameters 402. The Polygon Parameters, output by the Polygon Processor 502, describe a polygons as needed by the rest of the Span Sorting 3D Graphics Pipeline 400.

For each polygon, Polygon Parameters are written into the Bucket Sort Memory 400, and include: 1) the location in object-precision screen coordinates of the polygon vertics, $v_1$, $v_2$, $v_3$, etc., defined respectively as: $(x_1, y_1, z_1)$, $(x_2, y_2, z_2)$, $(x_3, y_3, z_3)$, etc.; 2) color information, including such things as vertex colors for Gouraud (or Phong) shading and/or texture mapping parameters; 3) the edge derivatives of x and z with respect to y (i.e., $\delta x/\delta y$ and $\delta z/\delta y$) for each edge; 4) starting raster line (or topmost), $y_{START}$; 5) ending raster line (or bottommost), $y_{END}$; and 6) the span derivative of z with respect to x (i.e., $\delta x/\delta y$), assigned to the variable d. The last four in this list need to be computed 402, and this is done in the Polygon Processor 502.

Assuming the polygons are triangles, the edge derivatives are computed as:

$$\frac{\delta x_{12}}{\delta y_{12}} = \frac{x_1 - x_2}{y_1 - y_2} \quad \frac{\delta x_{23}}{\delta y_{23}} = \frac{x_2 - x_3}{y_2 - y_3} \quad \frac{\delta x_{31}}{\delta y_{31}} = \frac{x_3 - x_1}{y_3 - y_1} \quad \text{(EQ 1)}$$
$$\frac{\delta z_{12}}{\delta y_{12}} = \frac{z_1 - z_2}{y_1 - y_2} \quad \frac{\delta z_{23}}{\delta y_{23}} = \frac{z_2 - z_3}{y_2 - y_3} \quad \frac{\delta z_{31}}{\delta y_{31}} = \frac{z_3 - z_1}{y_3 - y_1}$$

When the starting raster line, $y_{START}$, and the ending raster line, $y_{END}$, are computed, the edges of the display screen 104 must generally be taken into account. FIG. 6 shows a display screen 104 with eight polygons (in this case, triangles), some of which intersect the edges of the display screen 104. If a polygon does not intersect the right or left edges of the display screen 104, then $y_{START}$ and $y_{END}$ are computed by:

$$y_{START} = \text{MinOf}(y_{MAX}, \text{IntPartOf}(\text{MaxOf}(y_1, y_2, y_3, \ldots)))$$

$$y_{END} = \text{MaxOf}(0, \text{IntPartOf}(\text{MinOf}(y_1, y_2, y_3, \ldots))) \quad \text{(EQ 2)}$$

The computation of $y_{START}$ first finds the maximum of the y-coordinates of the vertices of the polygon, thereby finding the "uppermost" y-coordinate in the polygon. Then, the function IntPartOf() takes the "integer part of" the uppermost y-coordinate, thereby computing the raster line of the "uppermost" y-coordinate in the polygon. Since the start of the polygon can not be above the topmost raster line in the display screen 104, the MinOf() function substitutes $y_{MAX}$ if the polygon would start in a non-existent raster line. Computation of $y_{END}$ is done similarly. FIG. 6 shows a polygon 602 that starts at $y_{MAX}$, and another 604 that ends at raster line zero.

If a polygon intersects the right or left edges of the display screen 104, they $y_{START}$ and $y_{END}$ should be the first and last raster lines that is affected by the polygon within the display screen 104. In FIG. 6, an example polygon 606 begins at $y_A$ 608 and ends at $y_B$ 610. Another example polygon 612 begins at $y_C$ 614 and ends at raster line zero. The effects of the right and left edges of the display screen 104 can be ignored, but then span generation 1500 will create spans that are not within the display screen 104, and therefore must test for this, and throw away such spans.

Computation of the span derivative, d (i.e., $\delta z/\delta x$), can be computed in one of many conventional ways.

$$d = \frac{\delta z}{\delta x} \quad \text{(EQ 3)}$$

The span derivative is constant for each planar polygon and can have either a positive or a negative value.

Writing into the Bucket Sort Memory 404 is done according to $y_{START}$ for each polygon. There is one "bucket" per raster line, and a polygon is placed into the one bucket that corresponds to its starting raster line. Within each bucket, polygons do not need to be sorted. Management of the data in the Bucket Sort Memory 404 is done by the Bucket Sort Processor 504, which can do the sort with one linked list per bucket. In addition, the Bucket Sort Memory 404 can be double buffered so the write operations associated with a scene can be performed concurrently with read operations from the previous scene.

If all the color information described above is stored into the Bucket Sort Memory 404, it must be carried along, through the span Sorting Renderer 500 (see FIG. 5) all the way to the Rasterize Processor 512. Alternatively, the color information in the Bucket Sort Memory 404 can be replaced by an information pointer, and then stored into a separate Polygon Information Memory 514. The information pointer is an address into the Polygon Information Memory 514 where all the color information for the polygon is stored, and can be used by the Rasterize Processor 512 to read the color information. The information pointer is carried along to the Rasterize Processor 512. This saves expensive hardware memory throughout the Span Sorting Renderer 500 because the information pointer has very few bits when compared to all the color information for a polygon. This savings can be done because: 1) the color information is constant over the entire polygon, and so can be shared by all the spans of the polygon; and 2) the color information is not needed until visible span portions are colored by the Rasterize Processor 512. The use of the information pointer and the Polygon Information Memory 514 will be assumed in the rest of this document.

Within the span Sorting Renderers 500, a list is kept in the Current Polygon Memory 406 of all the polygons that affect the raster line that is currently being rendered. Hence, when the rendering of a scene begins, the Current Polygon Memory 406 is empty. During rendering, when a particular raster line is reached, all the polygons that have their $y_{START}$ at that raster line (i.e., that particular bucket) are read from the Bucket Sort Memory 404 and added to the Current Polygon Memory 406. As rendering proceeds, polygons are deleted from the Current Polygon Memory 406 as their $y_{END}$ values are reached. The data in the Current Polygon Memory 406 is managed by the Current Polygon Processor 506, which performs the operation "process data from Bucket Sort Memory 404" 1600, as shown in the pipeline diagram 400. Also, the Current Polygon Processor 506 feeds the polygons that affect the raster line to the span Generation Processor 508.

Starting at the beginning of the rendering of a raster line, each polygon that has a span in that raster line is input to the Span Generation Processor 508, which performs span generation 1600. The Span Generation Processor 508 uses the geometric properties of each polygon, including its edge derivatives of Equation 1, to compute the location in object-precision screen coordinates of the left and right endpoints of its span within the current raster line. The span can be modeled as a simple line segment, a trapezoid, or a quadrilateral, as shown in FIG. 7. The geometric properties of the span are sent to the Query Processor 510, and those properties include: 1) coordinates of the left endpoint of the span; 2) coordinates of the right endpoint of the span; 3) the span derivative, d; and 4) the information pointer. The coordinates of a span endpoint can be: 1) an (x,z) point within the current raster line used when spans are modeled as line segments as in FIG. 7A; 2) two (x,z) points, one for the top edge of the current raster line and one for the lower edge, used when spans are modeled as trapezoids as in FIG. 7B; or 3) an $(x_U, x_L, z)$ triplet including one z-coordinate and an x-coordinate for the upper and lower edges of the current raster line, used when spans are modeled as quadrilaterals as in FIG. 7C. Of the eight example polygons shown in FIG. 6, four of them 616, 618, 620, 622 have spans 626, 628, 630, 632 on the example current raster line 640. Note that one of the example spans 626 starts at a negative x-value.

For a given raster line, as geometric properties of spans are output from the span Generation Processor 508, they are received by the Query Processor 510 that then writes them all into one bank of the double buffered span Memory 406. As the spans are written into the span Memory 406, they are sorted, in order of precedence, by: 1) the left x-coordinate; 2) the left z-coordinate; and 3) the span derivative. Simultaneous to writing span data into one bank, the span data in the order bank of Span Memory 406 is processed to discover visible span portions.

When the Query Processor 510 has completed processing the spans stored in one bank of the Span Memory 406, and all the spans in the next raster lien have been received from the span Generation Processor 508 and written into the other bank, the two banks of the Span Memory 406 are swapped. After the bank swap, the Query Processor 510 and the Span Memory 406 jointly perform arithmetic comparisons on the span data (hereinafter called query operations) and various arithmetic operations to process 1800 or 2100 the spans and determine which spans or portions of spans are visible in the scene. These visible spans (or portions of spans) are sent to the Rasterize Processor 512. A more detailed block diagram of the Query Processor 510 and the Span Memory 406 is shown as FIG. 31.

The Rasterize Processor 512 receives only spans (or portions of spans) that are fully visible. To process each span, the Rasterize Processor 512 performs the set up for incremental span render 412 and then performs span interpolation 220. Pixel color values are generated by utilizing the data stored in the Polygon Information Memory 514 and possibly also the Texture Map Memory 516. As pixel color values are generated, they are written into the Raster Line Memory 416.

The Raster Line Memory 416 can store all the color pixel values for several complete raster lines. That is, it 416 stores the color values for the raster line currently being fed to the digital to analog converter 228 (via the Rasterize Processor 512) as well as several subsequent raster lines. Once all the values for a particular raster line have been sent to the digital to analog converter 228, the corresponding part of the Raster Line Memory 416 can be overwritten with another raster line. In this way, the total amount of memory required is only a few raster lines worth (the minimum is two), rather than the typical doubled buffer full display screen 104 frame buffer 224 required by prior art 3D graphics renders. This saves many megabytes of memory. The Raster Line Memory 416 can store data for several raster lines in order for the rasterization process to "work ahead" of the digital to analog converter 228, thereby providing some time cushion for raster lines that require more than the average amount of time process.

Having only enough memory for a few raster lines requires the Span Sorting Renders 500 architecture to keep up with the average raster line display rate. Therefore, if very large geometry databases (larger than the maximum where the Span Sorting Renderer 500 can keep up) need to be rendered, the Raster Line Memory 416 can be replaced with a doubled buffered full display screen 104 frame buffer 224.

Sorting Magnitude Comparison Content Addressable Memory 800

A Diagram of data storage 800 within a page of Span Memory 406 is shown in FIG. 8. This data array can reside in typical random access memory (RAM) as a sorted data structure, or reside in Sorting Magnitude Comparison Content Addressable Memory (SMCCAM). The SMCCAM implementation will be assumed in the rest of this document.

An SMCCAM is a new type of MCCAM, and is comprised of a set of memory registers (or words), each work composed of a multiplicity of fields, where each field can: 1) store a number, either as an integer or as a floating-point number; 2) perform arithmetic comparisons between the stored number and another number broadcast to all words; and 3) shift is contents to the corresponding field in the next word. When used as the span Memory 406 within the Span Sorting Renderer 500, the SMCCAM stores a set of spans and performs parallel searching and sorting operations to find the visible span portions.

As shown in FIG. 8, the data storage within the SMCCAM 800 is divided into SMCCAM Words 900, where each word 900 stores and processes (by performing query operations) data corresponding to one span in the current raster line. The figure shows a total of W SMCCAM Words 900, numbered 0 to W−1. Each SMCCAM Word 900 includes seven numeric fields (and the variable name shown here is for the nth word): 1) the Word Number Field 802, w, that is a fixed (i.e., read-only) unique identifying number for each word 900, skin to an address; 2) the Left X Field 804, $x_{aL}$, that stores the x-coordinate of the left endpoint of a span; 3) the Left Z Field 806, $z_{nL}$, that stores the z-coordinate of the left endpoint of a span; 4) the Right X Field 808, $x_{nR}$, that stores the x-coordinate of the right endpoint of a span; 5) the Right Z Field 810, $z_{nR}$, that stores the z-coordinate of he right endpoint of a span; 6) the span Derivative Field 812, $d_n$, that stores the $\delta z/\delta x$ slope of the span; and 7) the Information Pointer Field 814, $i_n$, that stores a pointer into the Polygon Information Memory 514 for color information for the span's polygon.

Each SMCCAM Word 900 also stores: 1) a Valid Flag 816, $F_{nV}$, a single bit value indicating whether the SMCCAM Word 900 is storing valid data; and 2) a Query Flag 818, $F_{nQ}$, a single bit value indicating whether the SMCCAM Word 900 responded positively to a query operation. Both flag bits 816, 818 each have a corresponding "wired-nor" bus that indicates whether all words 900 have the flag bit turned off. Specifically, for the Valid Flag 816, $F_{nV}$, if $F_{nV}$ is false for all n (i.e., all words), then the signal AllwordsInvalid 990 is asserted. Similarly, if $F_{nQ}$ is false for all n, then the signal NullQueryResponse 992 is asserted. The two wired-nor signals, AllWordsInvalid 990 and NullQueryResponse 992, provide the mechanism for query results to be fed back to the external controller (located in the Query Processor 510), so it can make decisions (i.e. "branches") about how to proceed within the method.

The nomenclature for fields and flags 804 and 818 include the Word Number Field 802 value as the first part of the field subscript (e.g., $z_{3L}$ is in word 3). Later in this document, the number of fields in each word in increased to add various features to the Span Sorting Renderer 500. FIG. 8 shows two variable word indices, n and w, that are used throughout this document as references to SMCCAM Words 900.

A block diagram of an SMCCAM Word 900 is shown as FIG. 9, where each of the seven fields 802 and 814 is shown. The seven fields, $x_{wL}$ 804, $z_{wL}$ 806, $x_{wR}$ 808, $z_{wR}$ 810, $d_w$ 812, and $i_w$ 814, each have a corresponding data bus within the set of Array Busses 910: BusW 912, BusXL 914, BusZL 916, BusXR 918, BusZR 920, BusD 922, and BusI 924. Six of the fields 802 to 812 are broken into a memory 902 or 904 and a comparator 906 or 908. The Word Number Field 802 includes: 1) a fixed memory 902; and 2) an equality comparison circuit 906, used for query operations, that compares the fixed memory value 902 to the data on the input bus, BusW 912. Five of the fields 804 to 812 include: 1) a read/write memory 904; and 2) an arithmetic comparison circuit 906 (tests for less-than, etc.), used for query operations, that compares the stored memory value 904 to the data on the corresponding input bus. The seventh field, the Information Pointer Field 814, $i_w$, is simply a read/write memory that does not generally participate in query operations.

Query operations are used for searching, sorting, reading, and writing into the array 800 of SMCCAM Words 900. A query operation is performed by all SMCCAM Words 900 in parallel by supplying query data to all words 900 via the Array Busses 910. The SMCCAM 800 includes the Query Logic Array 850, which is a set of Query Logic 930 circuits, one in each SMCCAM Word 900.

In parallel, within each SMCCAM Word 900, query operation results are computed by the Query Logic 930. The Query Logic 930 receives the results from the comparators 906 and 908 as well at the Valid Flag 816 and Query Flag 818 values, performs a selectable Boolean operation on these values (selected by QueryCntrl 932) to generate a query result bit, and then writes the query result bit back into either the Valid Flag 816 or the Query Flag 818.

When a query operation is performed, every word 900 generates a query result, which is stored into either its 900 Valid Flag 816 or the Query Flag 818. The set of all Valid Flags 816 is called the Valid Flag Word 830, and the set of all Query Flags 818 is called the Valid Flag Word 834. When a search is done, the query results designate which words fulfilled the query operation parameters. An example query operation is:

$$F_{nQ}=F_{nV} \wedge (x_{nL} \leq x_{CL}) \qquad (EQ\ 4)$$

where the following occurs: 1) $x_{CL}$ is broadcast to all words 900 via BusZL 916; 2) the Left X Field 804 in each word 900 performs ($x_{nL} \leq x_{CL}$), by comparing its 804 contents, $x_{nL}$, to the value on BusZL 916; 3) the Query Logic 930 in each word 900 performs the right side of Equation 4, which is the query result for that word 900; 4) in each word 900, the query result is stored into the query Flag 818 shown as the left side of Equation 4; and 5) the signal, NullQueryResponse 992, is asserted if the Query Flag 818 is false in all words 900.

Additional example Boolean operations are shown in Equation 5, where $x_{CL}$, $S_F$, $x_{CR}$, $z_{CR}$ $z_{CL}$, and $Z_{CR}$ are data broadcast to all SMCCAM Words 900 via the Array Busses 910, and where n is the particular word 900 where the operation is taking place (this happens for all n, which means for all SMCCAM Words 900).

$$F_{aQ}=F_{aV} \wedge (n \neq S_p) \wedge (x_{nL} < x_{CR}) \wedge (x_{nR} > x_{CL}) \wedge [(z_{ml} < z_{CP}) \vee (z_{aR} < z_{CP})]$$

$$F_{nQ}F_{aV} \wedge F_{nQ} \wedge [(z_{aL} < z_{CL}) \vee (z_{aR} z_{CL})]$$

$$F_{aQ}=F_{aV} \wedge (x_{nL}=x_{CR}) \wedge (z_{nL}=z_{CR})$$

$$F_{aV}=F_{aV} \wedge (x_{aR} > x_{CR})$$

$$F_{aQ}=\overline{F_{aV}} \vee (x_{aL} > x_{AL}) \vee [(x_{mL}=x_{AL}) \wedge (z_{nL} > z_{AL})] \vee [(x_{nL}=x_{AL}) \wedge (z_{aL}=z_{AL}) \wedge (d_n > d_A)] \qquad (EQ\ 5)$$

The query operation mechanism inherently performs a search operation on the data stored in the SMCCAM 800, and the search results are stored into the Query Flags 818. When data needs to be written into the SMCCAM 800, the following sequence occurs: 1) the Valid Flag Word 830 (or, for certain applications, the Query Flag Word 834 could be used) is chosen to determine the word 900 to be written; 2) the Valid Flag Word 830 contents are input to its 830 corresponding Priority Resolver 840; 3) the Priority Resolver 840 finds the first occurrence of a logic "zero" within the flag word 830, this is the first invalid word; 4) the SMCCAM Word 900 with the first occurrence of logic "zero" is the selected word 900, and the data on the Array Busses 910 is stored into that word 900; and 5) the selected word 900 has its Valid Flag 816 asserted, indicating that word now contains valid data.

A read operation words similarly, with the following sequence: 1) the Valid Query Flag Word 834 is chosen to determine the word 900 to be read; 2) the Query Flag Word 834 contents are input to its 834 corresponding Priority Resolver 840; 3) the Priority Resolver 840 finds the first occurrence of a logic "one" within the flag word 834; 4) the SMCCAM Word 900 with the first occurrence of logic "one" is the selected word 900, and its 900 contents are output onto the Array Busses 910; 5) the selected word 900 has its Query Flag 818 de-asserted, indicating that word has had its contents read, and subsequent reads (without intervening queries) will read other words; and 6) the signal, NullQueryResponse 992, is asserted if the Query Flag 818 is false in all words 900, indicating that no other words would respond to a read operation. The query, write, and read operations work somewhat similarly to that described in the Duluk Patent.

The portion of the Priority Resolver 840 within an SMCCAM Word 900 is called a Priority Resolver Section 934, and they 934 communicate across SMCCAM Words 900 via the busses: ValidPriOut[w−1]936, QueryPriOut[w−1]937, ValidPriOut[w]938, and QueryPriOut[w]939. Alternatively, the Priority Resolver 840 could be built with a treelike structure, thereby making the worst case circuit propagation delay proportional to log W rather than W.

The SMCCAM 800 also performs a sorting operation, which is not provided in the apparatus described in the Duluk Patent. As described above, the Span Sorting Renderer 500 sorts spans as they are written into the span Memory 406 according to: 1) the left x-coordinate; 2) the left z-coordinate; and 3) the span derivative. In the SMCCAM 800, sorting is done by locating the place in the span list where a span needs to be inserted, then, from this place, shifting the SMCCAM 800 contents down one word 900, and then writing the new span into the vacated word 900.

The SMCCAM 800 can shift data from word-to-word to make room in the sorted span list. The sorting operation is done in the following sequence: 1) the geometric properties (as described above) of the span to be written are input to the SMCCAM 800 for a query operation; 2) the query operation of Equation 6 is performed in every SMCCAM Word 900 with the query results written into the Query Flags 818, thereby identifying all words that contain either invalid data or contain a span that should be sorted later in the span list that the span being written; 3) the Query Flag Word 834 contents are input to the corresponding Priority Resolver 840; 4) the Priority Resolver 840 finds the first occurrence of a logic "one" within the Query Flag Word 834, thereby determining the selected word 900; 5) for the selected word 900 and all SMCCAM Words 900 after the selected word 900, stored data is shifted to the next word 900; and 6) at the selected word 900, the data on the Array Busses 910 is stored into the word 900.

$$F_{nQ}=F_{n}v(x_{nL}>x_{AL})v[(x_{nL}=x_{AL})\hat{\ }(z_{nL}>z_{AL})]v[(x_{nL}=x_{AL})\hat{\ }(z_{nL}=z_{AL})\hat{\ }(d_{n}>d_{A})] \quad (EQ\ 6)$$

Shifting data in the fields 802 to 814 from one SMCCAM Word 900 to the next is done via the Shift In Busses 950 that are connected to the Shift Out Busses 970 of the previous word 900. The list of Shift In Busses 950 includes: ShiftOutXL[w-1]952; ShiftOutXR[w-1]954; ShiftOutZL[w-1]956; ShiftOutZR[w-1]958; ShiftOutD[w-1]960; and ShiftOutI[w-1]962. The list of Shift Out Busses 970 includes: ShiftOutXL[w]972; ShiftOutXR[w]974; ShiftOutZL[w]976; ShiftOutZR[w]978; ShiftOutD[w-1] 980; and ShiftOutI[w]982. The circuit signal nomenclature used in this document includes the use of a bracketed index, such as "[w]", indicating it is part of an array of busses (similar to the array nomenclature of the "C" computer language). Here, "[w]" indicates the wth word 900, and "[w-1]" indicates the word 900 immediately prior in the set of words 800.

Span Occluding Test

FIG. 10 shows three spans 1002, 1004, 1006 represented by line segments (i.e., "segment spans") in the x–z plane, corresponding to one raster line of the display screen 104. One of the spans 1002 is shown with a corresponding Occluding Region 1008. If there are no spans that Occluding Region 1008, then the corresponding span 1002 is not hidden. The shape of the Occluding Region 1008 is trapezoidal, and therefore it is computationally expensive to determine if another span lies within it 1008, and is particularly expensive if many spans need to tested against the region 1008. A simplifying approximation for an Occluding Region 1008 is a rectangular Span Occluding Test Region 1010 (hereinafter called an SOT Region 1010). The SOT Region 1010 is generated from the span (or span portion) being tested for occlusion, hereinafter called the Current Portion, $S_C$ 1004. Determining if a span 1006 with endpoints $(x_{nL}, z_{nL})$ and $(x_{nL}, z_{nL})$ lies within an SOT Region 1010 for a Current Portion, 1004, $S_C$, with endpoints $(x_{CL}, z_{CL})$ 1012 and $(x_{CR}, z_{CR})$ 1014 is done by:

$$\text{In SOT Region}=(x_{nL}<x_{CR})\hat{\ }(x_{nR}>x_{CL})\hat{\ }[(z_{nL}<\text{MaxOf}(z_{CR},z_{CL}))v(z_{nR}<\text{MaxOf}(z_{CR},z_{CL}))] \quad (EQ\ 7)$$

The arithmetic computation required for Equation 7 is four comparisons and one "choose-the-maximum-of" function (the two needed in the equation are identical). For the SMCCAM 800 to perform the operations of Equation 7, the "choose-the-maximum-of" would be performed outside the SMCCAM 800 to determine:

$$z_{CF}=\text{MaxOf}(z_{CR}, z_{CL}) \quad (EQ\ 8)$$

and then the values $x_{CL}$, $x_{CR}$, and $z_{CF}$ would be input on the Array Busses 910 and the comparisons would be performed in the appropriate fields 804 to 810. In this way, all the spans stored in the SMCCAM 800 would be tested in parallel, performing the search for occluding spans in a matter of nanoseconds. In this document, any span that is found by an SOT Query is called an occluding span.

The complete equation for the Span Occluding Test Query (hereinafter called the SOT Query) is shown as Equation 9.

$$F_{nQ}=F_{n}v\hat{\ }(n\neq S_{P})\hat{\ }(x_{nL}<x_{CR})\hat{\ }(x_{nR}>x_{CL})\hat{\ }[(z_{nL}<z_{CF})v(z_{nR}<z_{CF})] \quad (EQ\ 9)$$

The complete SOT Query equation adds two more terms to the conjunction: 1) the Valid Flag 816, needed to keep words with invalid data from mistakenly identifying themselves as storing an occluding span; and 2) a test, $n\neq S_P$, where $S_P$ is the Word Number Field 802 corresponding to the Current Portion, done to keep the span from being identified as occluding itself. The complete SOT Query equation stores the query result into the Query Flag 818 of each SMCCAM Word 900. The result of the SOT Query is available at the signal, Null Query Response 992, where an asserted value indicates that no occluding spans were found.

By using the SOT Region as an approximation of the Occluding Region 1008, a conservative error is introduced. That is, the SOT Query may find occluding spans that are within the SOT Region 1010, but are actually behind the Current Portion. However, the SOT Query will never fail to find spans that actually occlude the Current Portion.

Span Sorting Rendering Method 1300

In order for the SOT Query to inadvertently find an occluding span that does not actually occlude the Current Portion, the bounding box (described in the next section) of the Current Portion must overlap the bounding box of the occluding span. Therefore, the simplest form of the Span Sorting Rendering Method 1300 assumes that bounding boxes of spans do not overlap, thereby eliminating the need to handle occluding spans that do not actually occlude the Current Portion. While this assumption is not practical for most rendering applications, it does simplify part of the description of the method 1300. Therefore, this simplified (though not generally practical) version will be described first. In a later section, the method 1300 will be expanded to process spans with overlapping bounding boxes.

FIG. 11 shows a set of fourteen spans in the same raster line (numbered $S_0$ 1100 to $S_{13}$ 1113), where each span is represented by a line segment in the x–z plane of the raster line (the y-coordinate is fixed). The visible parts of the spans are shown as thick lines, and the hidden parts are shown as thin lines. For example, $S_4$ 1104 and $S_6$ 1106 are hidden, and $S_0$ 1100 has two visible portions. The spans have been sorted according to the x-coordinate location of their left endpoint. Hence, the spans are numbered from left to right according to their Word Number Field 802 assigned when they are all stored in the SMCCAM 800. For example, span $S_4$ 1104 is stored in SMCCAM Word 900 number four, and has its left endpoint located at the point $(x_{4L}, z_{4L})$ and its right endpoint located at $(x_{4R}, z_{4R})$.

FIG. 12 shows the same fourteen spans, except that each span is enclosed by a bounding box. The set of spans in FIG. 11 and FIG. 12 were chosen so that the span bounding boxes do not overlap. The spans of FIG. 12 will be used to describe the simplest form of the Span Sorting Rendering Method 1300, the version that includes the Simplified Span Rasterization Method 1800 which assumes span bounding boxes do not overlap.

The Span Sorting Rendering Method 1300 is described in the context of the apparatus described herein, but can also be performed by software on a general purpose computer. FIG. 13 is the top-level method diagram of the Span Sorting Rendering Method 1300. This method 1300 is performed by the Span Sorting Rendering Pipeline 400 of FIG. 4, in the same way the method flow diagram 300 of FIG. 3 is performed by the generic 3D graphics pipeline 200.

In the Span Sorting Rendering Method 1300, scenes are generated 1302 (object locations in world coordinates, etc.), and within each scene, polygons are obtained 1304 for input to the Span Sorting Rendering Pipeline 400 and processed 1400.

FIG. 14 shows the process polygon step 1400. Included are the previously described transformation 202, clip test 204, face determination 206, lighting 208, perspective divide 212 and compute polygon parameter 402 steps. After these steps, polygons are written into the Bucket Sort Memory 404, each according to its $y_{START}$ parameter.

Getting back to FIG. 13, once all 1306 the polygons for a scene have been processed 1400 and therefore written into the Bucket Sort Memory 404, each raster line is processed. The variable, R, is used to keep track of the current raster line number, and is initialized 1308 to zero. Before the first raster line can be processed, the Current Polygon Memory 406 must be cleared 1310, thereby indicating that no polygons are on the current raster line. Also, the Span Memory 408 must be cleared 1312, thereby indicating that no spans are on the current raster line. These operations 1310, 1312 can be done by marking the entire contents of the memories 406, 408 as invalid. Since, at the first raster line, there are no polygons in the Current Polygon Memory 406, the next step 1600 is to transfer polygons that start in the current raster line form the Bucket Sort Memory 404 to the Current Polygon Memory 406 and to make spans for these polygons. Beginning on the second raster line (i.e., R=1), there is probably some polygons in the Current Polygon Memory 406, and spans need to be made 1500 for those polygons.

FIG. 15 is the Process Current Polygon Memory 406 step 1500 within the Span Sorting Rendering Method 1300. Each 1502 polygon in the Current Polygon Memory 406, is read 1504, and if 1506 that polygon is not included in the current raster line, it is deleted 1508 from the Current Polygon Memory 406 so subsequent raster lines do not need to consider it. If 1506 the polygon is included in the present raster line, then a span within the current raster line and its Span Parameters (as described above) are generated 1510 for that polygon. Then, the Span Parameters are written 1700 into the Span Memory 408.

FIG. 16 is the Process Bucket Sort Memory 404 step 1600 within the Span Sorting Rendering Method 1300. If 1602 there are more polygons to be read from the Bucket Sort Memory 404 for the current raster line, then for each such polygon: 1) the polygon is read 1604 from the Bucket Sort Memory 404; 2) the polygon is written 1606 into the Current Polygon Memory 406; 3) the polygon has a span in the current raster line, and Span Parameters (as described above) are generated 1510 for the span; and 4) the Span Parameters are written 1700 into the Span Memory 408.

When writing 1700 Span Parameters into the Span Memory 408, a sort operation is done. The sort operation is performed by the SMCCAM 800 as a query operation (Equation 6) and a special write operation, as described above. The apparatus of the SMCCAM 800 performs this step 1700 in parallel, but it is described in the flow diagram 1700 of FIG. 17 as if it is a sequential search process. A counter, n, used as an index into the set of SMCCAM Words 900, is initialized 1702 to zero. The flow diagram shows the query operation of Equation 6 broken down into six conditionals 1704 that test to see if the new span should be inserted at the nth word 900. Words 900 are stepped through 1706 by incrementing n until such an insertion point is found. When the insertion point is found, the counter n stops incrementing, and the contents of all the words from W-1 to n (using the counter, m) are transferred 1708 to the next word and the Span Parameters are written 1710 into word n. A test 1712 for reaching the last word 900 (i.e., word W-1) is included to detect an exception 1714 condition if there are more than a total of W spans in the raster line, thus exceeding the total number of words 900. Strategies to work within a fixed number of words 900 are presented later in this document.

Once again returning to FIG. 13, once all the spans within the display screen at raster line R have been written into the Span Memory 408, visible span portions are identified 1800 or 2100. One version of this portion of the method is the Simplified Span Rasterization Method 1800, which assumes span bounding boxes do not overlap. Other versions that do not make this assumption are the Segment Span Rasterization Method 2100 and the Trapezoidal Span Rasterization Method, described in later sections.

Simplified Span Rasterization Method 1800

The Simplified Span Rasterization Method 1800, shown in FIG. 18, maintain three sets of variables: 1) the current left x-coordinate position, $X_{CL}$, used to indicate how much of the current raster line has been rendered so far; 2) the Present Span, $S_P$, used to keep track of the frontmost span at $x_{CL}$, including its Span Parameters $x_{PL}$, $z_{PL}$, $x_{PR}$, $z_{PR}$, $d_P$, $i_P$, and word number; and 3) the New Span, $S_N$, used to keep track of the span most recently read form the Span Memory 408 (generally found by a query), including its Span Parameters $x_{NL}$, $z_{NL}$, $x_{NR}$, $z_{NR}$, $d_N$, $i_N$, and word number. In the Simplified Span Rasterization Method 1800, the Current Portion, $S_C$, is always equal to the Present Span, $S_P$.

The rasterization method 1800 will be explained by using the set of spans in FIG. 12 as an example. In the rest of this section, the method 1800 will be followed step-by-step as the example spans are processed.

The method 1800 starts by setting 1802 $x_{CL}$ to zero (thereby starting at the left edge of the display screen) and declaring the variables $S_P$ and $S_N$ to be invalid. Because $S_P$ is invalid 1804 and there are valid 1806 spans still stored in the Span Memory 408, a search 1808 must be done to find either the frontmost span at $x_{CL}$ (i.e., zero) of, if there is no span at $x_{CL}$, then find the leftmost valid span in the Span Memory 408.

The first step in this search 1808 is to do a query 1810 to find all valid spans in the Span Memory 408 that include $x_{CL}$ (i.e., zero). Looking at FIG. 12, it is seen that there are no 1812 spans at x-coordinate zero (the query 1810 finds nothing). Because there are no spans 1812 at x-coordinate zero, the leftmost span in the Span Memory 408 (i.e., the first valid span because the spans are sorted) is read 1818 thereby making $S_P$ to be equal to $S_0$ 1200. There were no valid spans at $x_{CL}$ (i.e., zero), and the leftmost span does not start until $X_{0L}$ (left endpoint of span $S_0$ 1200), so the range from zero to $x_{0L}$ does not have any spans at all, and therefore the background is rendered 1820 from $x_{CL}$ (i.e., zero) to $x_{0L}$. Some rendering has been done, so the value for $x_{CL}$ is updated 1822 to become $x_{PL}$ (i.e., $x_{0L}$), indicating rendering has been done up to this point. An SOT Query is done 1824 for the Present Span (i.e., $S_0$ 1200) to find any occluding spans, and this finds all the other spans 1201 to 1213 since they are all in the SOT Region of $S_0$ 1200. The first of these found spans are read 1824, making the value of the New Span, $S_N$, equal to $S_1$ 1201.

The method 1800 has not reached 1826 the right edge of the display screen (i.e., $x_{CL} < x_{MAX}$), both $S_P$ and $S_N$ are valid 1804 and 1828, and the next step 1830 is to render the $S_P$ (i.e., $S_0$ 1200) from $x_{CL}$ (i.e., $x_{0L}$) to $x_{NL}$ (i.e., $x_{1L}$). This rendering can be done because the SOT Query 1824 found the leftmost occluding span in front of $S_0$ 1200, meaning any part of $S_0$ 1200 to the left of this occluding span must be visible. This step 1830 also updates the value for $x_{CL}$ to be $x_{NL}$ (i.e., $x_{1L}$), and also makes $S_N$ (i.e., $S_1$ 1201) into the new value of $S_P$. An SOT Query is done 1832 for the Present Span (i.e., $S_1$ 1201) to find any occluding spans, and this finds only one span, $S_2$ 1202, since it 1202 is the only span in the SOT Region of $S_1$ 1201. This span is read 1832, making the value of the New Span, $S_N$, equal to $S_2$ 1202.

The span $S_1$ 1201 is processed in a way similar to $S_0$ 1200. The method 1800 has not reached 1826 the right edge of the display screen (i.e., $x_{CL} < x_{MAX}$), both $S_P$ and $S_N$ are valid 1804 and 1828, and $S_P$ (i.e., $S_1$ 1201) is rendered 1830 from $x_{CL}$ (i.e., $x_{1L}$) to $x_{NL}$ (i.e., $x_{2L}$). The value for $x_{CL}$ is updated 1830 to be $x_{NL}$ (i.e., $x_{2L}$), and $S_N$ (i.e., $S_2$ 1202) is made into the new value of $S_P$. An SOT Query is done 1832 for the Present Span (i.e., $S_2$ 1202), but the query does not find any spans because nothing occludes $S_2$ 1202, and the value of the New Span, $S_N$, is set to invalid.

The right edge of the display screen has not been reached 1826, $S_P$ is valid 1804, $S_N$ is invalid 1828, and the next portion 1834 of the method 1800 includes a search for an abutting span for $S_P$. An abutting span is a span whose left endpoint is located at the same point as the right endpoint of the Current Portion (or, for the Simplified Span Rasterization Method 1800, the Present Span). In FIG. 12, three example pairs of abutting spans are: 1) $S_2$ 1202 and $S_5$ 1205; 2) $S_5$ 1205 and $S_7$ 1207; and 3) $S_6$ 1206 and $S_9$ 1209. Abutting spans occur frequently because 3D objects are generally described by a set of polygons that share edges. Therefore, for highly tessellated objects, most spans will be part of at least one abutting span pair.

The portion 1834 of the method 1800 starts with rendering 1836 $S_P$ (i.e., $S_2$ 1202) from $x_{CL}$ (i.e., $x_{2L}$) to $x_{PR}$ (i.e., $x_{2R}$). This can be done because the SOT Query did not find any occluding spans, thus proving $S_P$ (i.e., $S_2$ 1202) is not hidden at all, and should be rendered. Also, $x_{CL}$ is set 1836 to $x_{PR}$ (i.e., $x_{2R}$). Next, a query is done 1838 to find an abutting span for $S_P$ (i.e., $S_2$ 1202), which finds span $S_5$ 1205. Because 1840 an abutting span was found, the abutting span, $S_5$ 1205, is read 1846 and assigned to $S_P$. An SOT Query is done 1848 for the Present Span (i.e., $S_5$ 1205), but the query does not find any spans because nothing occludes $S_5$ 1205, and the value of the New Span, $S_N$, is set to invalid.

The Present Span, $S_5$ 1205, is processed similarly to $S_2$ 1202. The right edge of the display screen has not been reached 1826, $S_P$ is valid 1804, $S_N$ is invalid 1828, $S_P$ (i.e., $S_5$ 1205) is rendered 1836 from $x_{CL}$ (i.e., $x_{2R}$) to $x_{PR}$ (i.e., $x_{5R}$), and $x_{CL}$ is set 1836 to $x_{PR}$ (i.e., $x_{5R}$). A query is done 1838 for an abutting span, which finds span $S_7$ 1207. The abutting span, $S_7$ 1207, is read 1846 and assigned to $S_P$. An SOT Query is done 1848 for the Present Span (i.e., $S_7$ 1207), finding only $S_8$ 1208 which is read 1832, making the value of the $S_N$ equal to $S_8$ 1208.

The Present Span, $S_7$ 1207 is processed similarly to $S_1$ 1201. The right edge of the display screen has not been reached 1826, both $S_P$ and $S_N$ are valid 1804 and 1828, and $S_P$ (i.e., $S_7$ 1207) is rendered 1830 from $x_{CL}$ (i.e., $x_{5R}$) to $x_{NL}$ (i.e., $x_{8L}$). The value for $x_{CL}$ is updated 1830 to be $x_{NL}$ (i.e., $x_{8L}$), and $S_P$ is set to $S_N$ (i.e., $S_2$ 1202). An SOT Query is done 1832 for the Present Span (i.e., $S_8$ 1208), but the query does not find any spans and the value of the New Span, $S_N$, is set to invalid.

The Present Span, $S_8$ 1208 is processed similarly to $S_2$ 1202 and $S_5$ 1205. The right edge of the display screen has not been reached 1826, $S_P$ is valid 1804, $S_N$ is invalid 1828, $S_P$ (i.e., $S_8$ 1208) is rendered 1836 from $x_{CL}$ (i.e., $x_{8L}$) to $x_{PR}$ (i.e., $x_{8R}$), and $x_{CL}$ is set 1836 to $x_{PR}$ (i.e., $x_{8R}$). A query is done 1838 for an abutting span, which finds span $S_{10}$ 1210. The abutting span, $S_{10}$ 1210, is read 1846 and assigned to $S_P$. An SOT query is done 1848 for the Present Span (i.e., $S_{10}$ 1210), but the query does not find any spans, and the value of the New Span, $S_N$, is set to invalid.

As the Present Span, $S_{10}$ 1210 is processed, the search for an abutting span does not find such a span. The right edge of the display screen has not been reached 1826, $S_P$ is valid 1804, $S_N$ is invalid 1828, $S_P$ (i.e., $S_{10}$ 1210) is rendered 1836 from $x_{CL}$ (i.e., $x_{8R}$) to $x_{PR}$ (i.e., $x_{10R}$), and $x_{CL}$ is set 1836 to $x_{PR}$ (i.e., $x_{10R}$). A query is done 1838 for an abutting span, but no abutting span is found. Since 1840 no abutting span was found, a search must be done to find the frontmost span at $x_{CL}$ (i.e., $x_{10R}$). However, before the search is done, a query is done to invalidate 1842 all spans that are completely to the left of $x_{CL}$ (i.e., $x_{10R}$). This invalidation 1842 can be done because the current raster line has been rendered up to $x_{CL}$ (i.e., $x_{10R}$), and spans to the left of $x_{CL}$ (i.e., $x_{10R}$) were either rendered or hidden (or some of each). The invalidation 1842 turns off the Valid Flags 816 for $S_1$ 1201 through $S_{10}$ 1210, thereby leaving only $S_0$ 1200 and $S_{11}$ 1211 through $S_{13}$ 1213 as validly stored spans. The value of the Present Span, $S_N$, and the value of the New Span, $S_N$, are both set 1844 to invalid.

The right edge of the display screen has not been reached 1826, $S_P$ is invalid 1804, there are still 1806 valid spans, and the next part 1808 of the method includes a search for the frontmost span at $x_{CL}$ (i.e., $x_{10R}$). First, a query 1810 is done to find all spans that include $x_{CL}$ (i.e., $x_{10R}$), which finds two spans: $S_0$ 1200 and $S_{11}$ 1211. Since 1812 spans were found, these two spans 1200 and 1211 are read 1814, the z-coordinates of the spans are computed 1814 at $x_{CL}$ (i.e., $x_{10R}$), and are compared to determine 1814 that $S_{11}$ 1211 is the frontmost span. The z-coordinate computation is simplified by having the span derivative (from the Span Derivative Field 812) available for use in extrapolating from the left endpoint of the span. The frontmost span, $S_{11}$ 1211, is made 1814 the Present Span, $S_P$. An SOT Query is done 1824 for the Present Span (i.e., $S_{11}$ 1211), but the query does not find any spans, and the value of the New Span, $S_N$, is set to invalid.

The Present Span, $S_{11}$ 1211, is processed similarly to $S_2$ 1202, $S_5$ 1205, and $S_8$ 1208. The right edge of the display screen has not been reached 1826, $S_P$ is valid 1804, $S_N$ is invalid 1828, $S_P$ (i.e., $S_{11}$ 1211) is rendered 1836 from $x_{CL}$ (i.e., $x_{10R}$) to $x_{PR}$ (i.e., $x_{11R}$), and $x_{CL}$ is set 1836 to $x_{PR}$ (i.e., $x_{11R}$). A query is done 1838 for an abutting span, which finds span $S_{12}$ 1212. The abutting span, $S_{12}$ 1212, is read 1846 and assigned to $S_P$. An SOT Query is done 1848 for the Present Span (i.e., $S_{12}$ 1212), but the query does not find any spans, and the value of the New Span, $S_N$, is set to invalid.

The Present Span, $S_{12}$ 1212 is processed similarly to $S_{10}$ 1210. The right edge of the display screen has not been reached 1826, $S_P$ is valid 1804, $S_N$ is invalid 1828, $S_P$ (i.e., $S_{12}$ 1212) is rendered 1836 from $x_{CL}$ (i.e., $x_{11R}$) to $x_{PR}$ (i.e., $x_{12R}$), and $x_{CL}$ is set 1836 to $x_{PR}$ (i.e., $x_{12R}$). A query is done 1838 for an abutting span, but no abutting span is found. Since 1840 no abutting span was found, a query is done to invalidate 1842 all spans that are completely to the left of $x_{CL}$ (i.e., $x_{12R}$), thereby turning off the Valid Flags 816 for $S_{11}$ 1211 and $S_{12}$ 1212, thereby leaving only $S_0$ 1200 and $S_{13}$ 1213 as validly stored spans. The value of the Present Span, $S_N$, and the value of the New Span, $S_N$, are both set 1844 to invalid.

The right edge of the display screen has not been reached 1826, $S_P$ is invalid 1804, there are still 1806 valid spans, and the next part 1808 of the method includes a search for the frontmost span at $x_{CL}$ (i.e., $x_{12R}$). First, a query 1810 is done to find all spans that include $x_{CL}$ (i.e., $x_{12R}$), which finds only one span, $S_0$ 1200. Since 1812 a span was found, it is made 1814 the Present Span, $S_P$. An SOT Query is done 1848 for the Present Span (i.e., $S_0$ 1200), finding only $S_{13}$ 1213 which is read 1832, making the value of the $S_N$ equal to $S_{13}$ 1213.

The right edge of the display screen has not been reached 1826, both $S_P$ and $S_N$ are valid 1804 and 1828, and $S_P$ (i.e., $S_0$ 1200) is rendered 1830 from $x_{CL}$ (i.e., $x_{12R}$) to $x_{NL}$ (i.e., $x_{13L}$). The value for $x_{CL}$ is updated 1830 to be $x_{NL}$ (i.e., $x_{13L}$), and $S_P$ is set to $S_N$ (i.e., $S_{13}$ 1213). An SOT Query is done 1832 for the Present Span (i.e., $S_{13}$ 1213), but the query does not find any spans, and the value of the New Span, $S_N$, is set to invalid.

The right edge of the display screen has not been reached 1826, $S_P$ is valid 1804, $S_N$ is invalid 1828, $S_P$ (i.e., $S_{13}$ 1213) is rendered 1836 from $x_{CL}$ (i.e., $x_{13L}$) to $x_{PR}$ (i.e., $x_{13R}$), and $x_{CL}$ is set 1836 to $x_{PR}$ (i.e., $x_{13R}$). A query is done 1838 for an abutting span, but no abutting span is found. Since 1840 no abutting span was found, a query is done to invalidate 1842 all spans that are completely to the left of $x_{CL}$ (i.e., $x_{13R}$), thereby turning off the Valid Flags 816 for $S_0$ 1200 and $S_{13}$ 1213, thereby eliminating the last valid spans. The value of the Present Span, $S_N$, and the value of the New Span, $S_N$, are both set 1844 to invalid.

The right edge of the display screen has not been reached 1826, $S_P$ is invalid 1804, and there are 1806 no valid spans. Therefore, the background is rendered from $x_{CL}$ (i.e., $x_{13R}$) to $x_{MAX}$ (i.e., the right edge of the raster line). The entire current raster line has now been rendered, and the next raster line can be processed, as shown in the method flow diagram of FIG. 13.

It is important to note that the method 1800 rendered the visible portions of the spans, and completely ignored the spans that are totally hidden (i.e., $S_3$ 1203, $S_4$ 1204, $S_6$ 1206, and $S_9$ 1209). For scenes with greater depth complexity, a larger fraction of the spans will be ignored in a similar way, thereby providing a greater computational savings. A unique feature of this method 1800 is the ability of abutting spans to work together to occlude spans behind them.

Another important feature of the method 1800 is the pixel coloration processing within a raster line is roughly proportional to the number of pixels in the raster line, rather than proportional to the number of pixels in all the spans in the raster line. This is because hidden portions within spans are never sent to the pixel coloration process. Pixel coloration processing is "roughly" proportional to the number of pixels within the raster line because a pixel can be affected by two spans because, for example, the span to the right may end within the pixel's boundary. In this case, color from two spans are blended together to form the final color for the pixel.

Span Interaction Types and Span Interaction Parameters

As described above, the SOT Query is a set of comparison operations simple enough to be performed in hardware by an SMCCAM 800. However, in the general case where span bounding boxes overlap, the SOT Query will sometimes find spans that do not occlude the Current Portion. Furthermore, the SOT Query will also sometimes find spans that intersect the Current Portion, thus making both spans partially visible. The Segment Span Rasterization Method 2100 solves this shortcoming by categorizing the interaction between the Current Portion and a span in the SOT Region into one of many Span Interaction Types (hereinafter abbreviated SIT), and then applying rendering rules based on the SIT. The SIT is determined from the Span Interaction Parameters (hereinafter SIP) of the two spans.

As the Segment Span Rasterization Method 2100 proceeds, it 2100 maintains four spans and their associated parameters: 1) the Present Span, $S_P$, the frontmost span at $x_{CL}$, as described above; 2) the New Span, $S_N$, a span in the SOT Region of $S_P$, as described above; 3) the Current Portion, $S_C$, a subsection of the Present Span; and 4) the Saved Span, $S_S$, used as a single depth stack for temporarily saving $S_N$ so that more spans in the SOT Region of $S_P$ can be read.

The nomenclature for spans, span endpoints, SIPs, and SITs is illustrated by the examples shown in FIG. 19. The Present Span, $S_P$ 1902, has the endpoints ($x_{PL}$, $z_{PL}$) 1904, 1906 and ($x_{PR}$, $z_{PR}$) 1908, 1910, is enclosed by a dashed oval, and is shown as the union of a solid black line and a finely dotted line. The solid black line subsection of $S_P$ 1902 is the Current Portion, $S_C$ 1912, and has the endpoints ($x_{CL}$, $z_{CL}$) 1914, 1916 and ($x_{CR}$, $z_{CR}$) 1918, 1920. The SOT Region 1922 corresponding to $S_C$ 1912 is enclosed by a dashed line. The New Span, $S_N$ 1932, has the endpoints ($x_{NL}$, $z_{NL}$) 1934, 1936 and ($x_{NR}$, $z_{NR}$) 1938, 1940, and is enclosed by its bounding box 1942.

The Span Interaction Parameters (i.e., SIPs) are arithmetic comparison results between the z-coordinates of $S_C$ 1912 and $S_N$ 1932 at four particular x-coordinate values, specifically, the endpoints of the two spans: $x_{NL}$ 1934, $x_{NR}$ 1938, $x_{CL}$ 1914, and $X_{CR}$ 1918. In detailed terms, the four Span Interaction Parameters (i.e., SIPs) are: 1) the comparison of the z-coordinate of $S_C$ 1912 at $x_{NL}$ 1934 to $z_{NL}$ 1936, shown in the example as "Nonexistent" because $S_C$ 1912 does not have a point at $x_{NL}$ 1934; 2) the comparison of the z-coordinate of $S_C$ 1912 at $x_{NR}$ 1938 to $z_{NR}$ 1940, shown in the example as "Farther" because the point on $S_C$ 1912 is father (i.e., has a greater z-coordinate) than $z_{NR}$ 1940; 3) the comparison of the z-coordinate of $S_N$ 1932 at $x_{CL}$ 1914 to $z_{CL}$ 1916, shown in the example as "Farther" because the point of $S_N$ 1932 is father (i.e., has a greater z-coordinate) than $z_{CL}$ 1916; and 4) the comparison of the z-coordinate of $S_N$ 1932 at $x_{CR}$ 1918 to $z_{CR}$ 1920, shown in the example as "Nonexistent" because $S_N$ 1932 does not have a point at $x_{CR}$ 1918. Each of the four SIPs can take on one of the values: 1) "Nonexistent" (abbreviated "Non"); 2) "Farther" (abbreviated "Far"); 3) "Nearer" (abbreviated "Near"); or 4) "Equal". In the example of FIG. 19, the four SIPs are Non, Far, Far, Non, as shown in the figure. This particular set of four is SIT 23, causing invocation of Rule 4, as will be described later in this document.

The SIPs were chosen so as to be easy to compute, avoiding expensive computations such as division. The computation of z-coordinates used in the comparison is done by:

z-coordinate of $S_C$ at $x_{NL} = z_{CL} + (x_{NL} - x_{CL}) d_C$ z-coordinate of $S_C$ at $x_{NR} = z_{CL} + (x_{NR} - x_{CL}) d_C$ \hfill (EQ 10)

z-coordinate of $S_N$ at $x_{CL} = z_{NL} + (x_{CL} - x_{NL}) d_N$ z-coordinate of $S_N$ at $x_{CR} = z_{NL} + (x_{CR} - x_{NL}) d_N$ FIG. 20 is a listing of all 49 possible SITs. For example, FIG. 20C illustrates SIT 3, showing three examples of a $S_C$ paired with an $S_N$, where the SIPs are Near, Equal, Non, Non. Each possible combination of SIPs correspond to one SIT. When a particular SIT is encountered during the Segment Span Rasterization Method 2100, one of several rules is invoked, and each SIT in FIG. 20 identifies the rule it invokes. Some SITs, such as SIT 19 and SIT 22, cannot ever be encountered by the method 2100, therefore, no rule is invoked, and the tag "impossible" is shown in FIG. 20.

Segment Span Rasterization Method 2100

The Segment Span Rasterization Method 2100, shown in FIG. 21, processes spans that are represented by line segments (as in FIG. 7A). This method can be utilized within Span Sorting Rendering Method 1300, shown in FIG. 13. In this section of the document, the method flow diagrams of FIG. 21 through FIG. 26 will be described in very general terms. In the next section, an complex set of example spans is used to describe the step-by-step functioning of the method 2100.

The Segment Span Rasterization Method 2100 starts by initializing 2102 and 2104 variables. The method 2100 calls sub-methods, called Rule 1 2200 through Rule 5 2600. Every rule considers: 1) what part of $S_C$ should be rendered, if any; 2) the updating of $S_P$ and/or $S_C$; 3) updating of $S_S$; 4) invalidation of spans stored in the Span Memory 408; 5) doing an SOT Query; and/or 6) updating of $S_N$.

Rule 1 2200 (shown in FIG. 22) is invoked if $S_P$ is invalid. It 2200 searches for the frontmost span at $x_{CL}$, makes the frontmost span $S_P$, performs an SOT Query, and updates $S_N$.

Rule 2 2300 (shown in FIG. 23) is invoked if $S_C$ has no Potentially Occluding Spans remaining. Therefore, it 2300 renders the Present Span, $S_P$, from $x_{CL}$ to $x_{CR}$. Then, $S_C$ is set to, in order of precedence: 1) the Saved Span, $S_S$; 2) an Abutting Span; or 3) the first valid span after invalidation of all spans completely to the left of $x_{CR}$. In any case, $x_{CL}$ is set to $x_{CR}$, and $S_S$ is invalidated.

Rule 3 2400 (shown in FIG. 24) is invoked if the SIT is such that the Current Portion, $S_C$, is occluded at $x_{NL}$, but is visible from $x_{CL}$ to $x_{NL}$. Therefore, render the Present Span, $S_P$, from $x_{CL}$ to $x_{NL}$. Then, make the New Span, $S_N$, the Present Span and begin processing it. Since $S_C$ is not being rendered to $x_{CR}$, invalidate the Saved Span, $S_S$.

Rule 4 2500 (shown in FIG. 25) is invoked if the SIT is such that $S_C$ intersects $S_N$ and the point of intersection is visible. The intersection point, at $(x_I, z_I)$, between the Current Portion, $S_C$, and the New Span, $S_N$ is computed. Since $S_C$ is occluded to the right of $x_I$, $S_C$ is modified by changing $x_{CR}$ to $x_I$. The New Span, $S_N$, is stored as the Saved Span, $S_S$, in case it is needed later under Rule 1 2200. Then, the next Potentially Occluding Span is read and made $S_N$.

Rule 5 2600 (shown in FIG. 26) is invoked if the Current Portion, $S_C$, occludes the New Span, $S_N$, such that none of $S_N$ is visible from $x_{CL}$ to $x_{CR}$. Therefore, $S_N$ is discarded, and the next Potentially Occluding Span is read and made $S_N$. Since $S_C$ is not being rendered when this rule is applied, leave the status of the Saved Span, $S_S$, unchanged.

Detailed example of the Segment Span Rasterization Method 2100

In order to fully describe the Segment Span Rasterization Method 2100 in a step-by-step fashion, an example set of fifteen spans, shown in FIG. 27, is used to illustrate how the method 2100 works. The spans in this example were chosen so as to exercise all parts of the Segment Span Rasterization Method 2100. The example, when compared to typical raster lines in typical scenes, is abnormally complex due to the large fraction of overlapping bounding boxes and intersecting spans. As each step in the Segment Span Rasterization Method 2100 is described, the corresponding reference designators in the method flow diagrams are listed at the beginning of the step description. Within a step description, equations for query operations are first shown as they appear in the method flow diagrams, then, on a second line, the same equation is shown with all its variables substituted by values from the example of FIG. 27. Also, within a step description, assignment statements will be cascaded (with multiple "=" signs) showing how to arrive at the fully substituted variables.

For the example of FIG. 27, when the Segment Span Rasterization Method 2100 begins, there are fifteen valid spans in the SMCCAM 800, designated $S_0$ through $S_{14}$. These spans are stored in SMCCAM Words 900 0 through 14, and therefore each have ($F_{nV}$=1), indicating those SMC-CAM Words 900 have valid contents. The rest of the SMCCAM Words 900, namely words 15 through W-1, each have ($F_{nV}$=0), indicating those SMCCAM Words 900 have invalid contents. Hence, at the start of the Segment Span Rasterization Method 2100, the Valid Flag Word 840, $F_V$, designates the set of valid spans, and this set is not empty.

For the example set of fifteen spans shown in FIG. 27, the step-by-step processing using the Segment Span Rasterization Method 2100 is:

1) 2102 The left x value of the Current Portion, $x_{CL}$, indicates how far the rendering has proceeded along the present raster line. Hence, the start of a raster line causes setting ($x_{CL}$=0). The left z value of the Current Portion, $z_{CL}$, is set to infinity to allow any span to be in front of the background. The depth location of the background is considered to be at infinity. The background is not composed of polygons, and for may applications, is set to the color black. The right x and y values of the Current Portion $x_{CR}$ and $x_{CR}$, are set to "invalid" because there is no valid Present Span, $S_P$. With assignment statements, this is described as:

$x_{CL}$=0;

$x_{CR}$=invalid;

$z_{CL}$=infinity;

$z_{CR}$=invalid;

$z_{CF}$=infinity; (EQ 11)

2) 2104 The data within registers for storing span information external to the SMCCAM 800 (i.e., $S_P$, $S_N$, and $S_S$) are also designated as invalid.

$S_P$=invalid;

$S_N$=invalid;

$S_S$=invalid; (EQ 12)

3) 2106, 2108, and 2200 Because the Present Span, $S_P$, is not valid and $F_V$ is not empty (indicating that at least some spans are valid), Rule 1 is invoked. Here, Rule 1 is used to search for the first span to make the Present Span, $S_P$.

3A) 2202 Do a query to find all valid spans that could affect the current raster line at $x_{CL}$ (i.e., at x coordinate zero). The query performs, in each SMCCAM Word 900:

$F_{nQ}=F_{nV} \hat{} (x_{nL} \leq x_{CL})$ $F_{nQ}=F_{nV} \hat{} (x_{nL} \leq 0)$ (EQ 13)

This query does not find any spans, and therefore, the set $F_Q$ is empty.

3B) 2204, 2206, and 2206 Because $F_Q$ is empty and $S_P$ is not valid, there must not be a valid span that could affect the current raster line at $x_{CL}$. Therefore, the first span in $F_V$ is read and made the Present Span, $S_P$. This read operation sets the following values:

$S_P$=read(n)=0;

$x_{PL}$=read($x_L$)=$x_{0L}$;

$x_{PR}$=read($x_R$)=$x_{0R}$;

$z_{PL}$=read($z_L$)=$z_{0L}$;

$z_{PR}$=read($z_R$)=$z_{0R}$;

$d_P$=read(d)=$d_0$;

$i_P$=read(i)=$i_0$;  (EQ 14)

Reading the first span from $F_V$ yields the leftmost valid span, $S_0$, because the spans are stored in the SMC-CAM 800 in a left to right ordering.

3C) 2210 Because there is not a valid span that could affect the current raster line at $x_{CL}$ (i.e., at x coordinate zero), and the leftmost valid span does not start until $x_{PL}$ (i.e., $x_{0L}$), the background must be rendered from $x_{CL}$ to $x_{PL}$ (i.e., from 0 to $x_{0L}$).

As possible alternate methods, rendering of the background can be avoided if: 1) it is know that polygons will always cover 100% of the viewing plane; or 2) the raster buffer is initialized with the background colors prior to processing the first span in each raster line.

3D) 2212 There is now a Present Span, $S_P$ (i.e., $S_0$), and the Current Portion, $S_C$, is set equal to $S_P$ by setting:

$x_{CL}$=$x_{PL}$=$x_{0L}$;

$x_{CR}$=$x_{PR}$=$x_{0R}$;

$z_{CL}$=$z_{PL}$=$z_{0L}$;

$z_{CR}$=$z_{PR}$=$z_{0R}$;

CF=max($z_{PL}$, $z_{PR}$)=max ($z_{0L}$, $z_{0R}$)=$z_{0L}$;  (EQ 15)

The Current Portion, $S_C$, is equal to $S_0$. The Far Z Value for the Current Portion, $z_{CF}$, is set to $z_{0L}$ by the "find the maximum" function.

3E) 2214 There is now a defined Present Span, $S_P$ (i.e., $S_0$), and a defined Current Portion, $S_C$ (i.e., $S_0$), so a search is done for spans that could possibly occlude the Current Portion, $S_C$, (i.e., $S_0$). The Span Occluding Test query performs, in each SMCCAM Word 900:

$F_{nQ}$=$F_{nV}$^(n≠$S_P$)^($x_{nL}$<$x_{CR}$)^($x_{nR}$>$x_{CL}$)^[($z_{nL}$<$z_{CF}$)v($z_{nR}$<$z_{CF}$)]

$F_{nQ}$=$F_{nV}$^(n≠0)^($x_{nL}$<$x_{0R}$)^($x_{nR}$>$x_{0L}$)^[($z_{nL}$<$z_{0L}$)v($z_{nR}$<$z_{0L}$)]  (EQ 16)

This query creates the set of all Potentially Occluding Spans for the Current Portion, $S_C$ (i.e., $S_0$). The query finds $S_1$ through $S_{14}$. In general, queries used for search operations include $F_{nV}$ in the conjunction in order to prevent invalid data stored in a SMCCAM Word 900 from causing a bit in $F_Q$ from being mistakenly asserted.

3F) 2216 and 2218 Because $F_Q$ is not empty, there must spans that possibly occlude the Current Portion, $S_C$ (i.e., $S_0$). Therefore, the first span in $F_Q$ is read and made the New Span, $S_N$. This read operation sets the following values:

$S_N$=read(n)=1;

$x_{NL}$=read($x_L$)=$x_{1L}$;

$x_{NR}$=read($x_R$)=$x_{1R}$;

$z_{NL}$=read($z_L$)=$z_{1L}$;

$z_{NR}$=read($z_R$)=$z_{1R}$;

$d_N$=read(d)=$d_1$;

$i_N$=read(i)=$i_1$;  (EQ 17)

Reading the first span in $F_Q$ yields $S_1$, the first span in the set. The read process also deletes $S_1$ from $F_Q$ by setting ($F_{1Q}$=0).

4) 2109, 2106, 2110, and 2112 The right edge of the display screen has not been reached (i.e., $x_{CL}$<$x_{max}$) and both the Present Span, $S_P$ (i.e., $S_0$), and the New Span, $S_N$ (i.e., $S_1$), are valid. Therefore, the Span Interaction Parameters for these two spans are computed, and are found to be: (Far, Non, Non, Far).

5) 2114 The Span Interaction Type is determined from the Span Interaction Parameters, and turns out to be Type 14.

6) 2116 and 2400 Because the Span Interaction Type is Type 14, Rule 3 invoked to process $S_0$:

6A) 2402 The Current Portion, $S_C$ (i.e., $S_0$), is hidden starting at $x_{NL}$ (i.e., $x_{1L}$), but is visible to the left of $x_{NL}$ (i.e., $x_{1L}$). Therefore, render the Present Span, $S_P$ (i.e., $S_0$), from $x_{CL}$ to $x_{NL}$ (i.e., from $x_{0L}$ to $x_{1L}$).

6B) 2404 The processing of Present Span is completed (at this point), so make $S_N$ (i.e., $S_1$) into the Present Span, $S_P$, by setting:

$S_P$=$S_N$=1;

$x_{PL}$=$x_{NL}$=$x_{1L}$;

$x_{PR}$=$x_{NR}$=$x_{1R}$;

$z_{PL}$=$z_{NL}$=$z_{1L}$;

$z_{PR}$=$z_{NR}$=$z_{1R}$;

$d_P$=$d_N$=$d_1$;

$i_P$=$i_N$=$i_1$;  (EQ 18)

6C) 2406 The Current Portion, $S_C$, is set equal to $S_N$ by setting:

$x_{CL}$=$x_{NL}$=$x_{1L}$;

$x_{CR}$=$x_{NR}$=$x_{1R}$;

$z_{CL}$=$z_{NL}$=$z_{1L}$;

$z_{CR}$=$z_{NR}$=$z_{1R}$;

CF=max($z_{NL}$, $z_{NR}$)=max($z_{1L}$,$z_{1R}$)=$z_{1L}$;  (EQ 19)

Alternatively, the Current Portion, $S_C$, could be set to the Present Span, $S_P$, (rather than $S_N$) because it has the same values. However, this alternate way is not desirable for hardware implementation because this step and the previous step could not be done in parallel.

6D) 2408 The Saved Span, $S_S$, is invalidated, but at this point in this example, it was already invalid.

6E) 2410 There is a new Current Portion, $S_C$ (i.e., $S_1$), so a search is done for spans that could possibly occlude it. The Span Occluding Test query performs, in each SMCCAM Word 900:

$F_{nQ}=F_{nV}\hat{}(n\neq S_P)\hat{}(x_{nL}<x_{CR})\hat{}(x_{nR}>x_{CL})\hat{}[(z_{nL}<z_{CF})v(z_{nR}<z_{CF})]$ $F_{nQ}=F_{nV}\hat{}(n\neq 1)\hat{}(x_{nL}<x_{1R})\hat{}(x_{nR}>x_{1L})\hat{}[(z_{nL}<z_{1L})v(z_{nR}<z_{1L})]$   EQ 20

This query creates the set of all Potentially Occluding Spans for the Current Portion, $S_C$ (i.e., $S_1$). The query finds $S_0$ and $S_2$ through $S_{14}$.

6F) 2412 and 2414 Because $F_Q$ is not empty, there must spans that possibly occlude the Current Portion, $S_C$ (i.e., $S_1$). Therefore, the first span in $F_Q$ is read and made the New Span, $S_N$. This read operation sets the following values:

$S_N$=read(n)=0;

$x_{NL}$=read($x_L$)=$x_{0L}$;

$x_{NR}$=read($x_R$)=$x_{0R}$;

$z_{NL}$=read($z_L$)=$z_{0L}$;

$z_{NR}$=read($z_R$)=$z_{0R}$;

$d_N$=read(d)=$d_0$;

$i_N$=read(i)=$i_0$;   (EQ 21)

Reading the first span in $F_Q$ yields $S_0$, the first span in the set. The read process also deletes $S_0$ from $F_Q$ by setting ($F_{0Q}$=0).

7) 2109, 2106, 2110, and 2112 The right edge of the display screen has not been reached (i.e., $x_{CL}<x_{max}$) and both the Present Span, $S_P$ (i.e., $S_1$), and the New Span, $S_N$ (i.e., $S_0$), are valid. Therefore, the Span Interaction Parameters for these two spans are computed, and are found to be: (Far, Non, Far, Non).

8) 2114 The Span Interaction Type is determined from the Span Interaction Parameters, and turns out to be Type 23.

9) 2116, 2118, and 2500 Because the Span Interaction Type is Type 23, Rule 4 is invoked to process $S_1$:

9A) 2502 The Current Portion, $S_C$ (i.e., $S_1$), and the New Span, $S_N$ (i.e., $S_0$), interact to cause $S_C$ to transition from being visible to being hidden somewhere along its length; at point of intersection between $S_C$ (i.e., $S_1$) and $S_N$ (i.e., $S_0$). The intersection is computed, and found to be at $(x_I, z_I)$ 2702, as shown in FIG. 27.

9B) 2504 The Current Portion, $S_C$ (i.e., $S_1$), is shortened by changing its right end point to the intersection point. The right endpoint of $S_C$ is modified by setting $x_{CR}=x_I$;

$z_{CR}=z_I$;

$c_F$=max($z_{CL}$, $z_1$)=$z_{CL}$=$z_{1L}$;   (EQ 22)

The Present Span, $S_P$, is still equal to all of $S_1$.

9C) 2506 The New Span, $S_N$ (i.e., $S_0$), is saved as the Saved Span, $S_S$. This is done because $S_S$ will be needed later is $S_P$ (i.e., $S_1$) is rendered to $x_I$.

$S_S=S_N$=0;

$x_{SL}=x_{NL}=x_{0L}$;

$x_{SR}=x_{NR}=x_{0R}$;

$x_{SL}=z_{NL}=z_{0L}$;

$z_{SR}=z_{NR}=z_{0R}$;

$d_S=d_N=d_0$;

$i_S=i_N=i_0$;   (EQ 23)

The portion of the Saved Span, $S_S$, to the right $x_I$ abuts $S_C$ at the x coordinate $x_I$. If, later in the method, $S_C$ is rendered to $x_I$, then $S_S$ will become the Present Span, $S_P$.

9D) 2508 The Current Portion, $S_C$ (i.e., $S_1$ from $x_{1L}$ to $x_I$) has been changed, so a search is done for spans that could possible occlude it. The Span Occluding Test query performs, in each SMCCAM Word 900;

$F_{nQ}=F_{nV}\hat{}F_{nQ}\hat{}(n\neq S_P)\hat{}(x_{nL}<x_{CR})\hat{}(x_{nR}>x_{CL})\hat{}[(z_{nL}<z_{CF})v(z_{nR}<z_{CF})]$ $F_{nQ}=F_{nV}\hat{}F_{nQ}\hat{}(n\neq 1)\hat{}(x_{nL}<x_I)\hat{}(x_{nR}>x_{1L})\hat{}[(z_{nL}<z_{1L})v(z_{nR}<z_{1L})]$   (EQ 24)

This query creates the set of all Potentially Occluding Spans for the Current Portion, $S_C$ (i.e., $S_1$ between $x_{1L}$ and $x_I$). The query finds only $S_2$. The conjunction performed by the query includes $F_Q$ to prevent any previously read (and discarded) Potentially Occluding Span of $S_1$ from being re-included into $F_Q$ and needlessly reprocessed.

A variation of this method could skip this step and continue reading from the existing $F_Q$ rather than doing a query to eliminate spans from $F_Q$. This variation saves execution time by eliminating the query, but possibly increases execution time by failing to reduce the number of spans in $F_Q$.

9E) 2510 and 2512 Because $F_Q$ is not empty, there must be spans that possibly occlude the Current Portion, $S_C$ (i.e., $S_1$ from $x_{1L}$ to $x_I$). Therefore, the first span in $F_Q$ is read and made the New Span, $S_N$. This read operation sets the following values:

$S_N$=read(n)=2;

$x_{NL}$=read($x_L$)=$x_{2L}$;

$x_{NR}$=read($x_R$)=$x_{2R}$;

$z_{NL}$=read($z_L$)=$z_{2L}$;

$z_{NR}$=read($z_R$)=$z_{2R}$;

$d_N$=read(d)=$d_2$;

$i_N$=read(i)=$i_2$;   (EQ 25)

Reading the first span in $F_Q$ yields $S_2$, the first (and only) span in the set. The read process also deletes $S_2$ from $F_Q$ by setting ($F_{2Q}$=0), making $F_Q$ empty.

10) 2109, 2106, 2110, and 2112 The right edge of the display screen has not been reached (i.e., $x_{CL}<x_{max}$) and both the Present Span, $S_P$ (i.e., $S_1$), and the New Span, $S_N$ (i.e., $S_2$), are valid. Therefore, the Span Interaction Parameters for these two spans are computed, and are found to be: (Far, Non, Non, Near).

11) 2114 The Span Interaction Type is determined from the Span Interaction Parameters, and turns out to be Type 13.

12) 2116 and 2400 Because the Span Interaction Type is Type 13, Rule 3 is invoked to continue processing $S_1$:

12A) 2402 The Current Portion, $S_C$ (i.e., $S_1$ between $x_{1L}$ and $x_I$), is hidden starting at $x_{NL}$ (i.e., $x_{2L}$), but is visible to the left of $x_{NL}$ (i.e., $x_{2L}$). Therefore, render the Present Span, $S_P$ (i.e., $S_1$), from $x_{CL}$ to $x_{NL}$ (i.e., from $x_{1L}$ to $x_{2L}$).

12B) 2404 The processing of Present Span is completed (at this point), so make $S_N$ (i.e., $S_2$) into the Present Span, $S_P$, by setting:

$S_P = S_N = 2;$ $x_{PL} = x_{NL} = x_{2L};$ $x_{PR} = x_{NR} = x_{2R};$ $z_{PL} = z_{NL} = z_{2L};$ $z_{PR} = z_{NR} = z_{2R};$ $d_P = d_N = d_2;$ $i_P = i_N = i_2;$ (EQ 26)

12C) 2406 The Current Portion, $S_C$, is set equal to $S_N$ by setting:

$x_{CL} = x_{NL} = x_{2L};$ $x_{CR} = x_{NR} = x_{2R};$ $z_{CL} = z_{NL} = z_{2L};$ $z_{CR} = z_{NR} = z_{2R};$ $c_F = \max(z_{NL}, z_{NR}) = \max(z_{2L}, z_{2R}) = z_{2L};$ (EQ 27)

12D) 2408 The Saved Span, $S_S$, is invalidated. In Step 9C, the values for $S_S$ were set to those of $S_1$, but these are now labelled invalid.

$S_S = \text{invalid};$ (EQ 28)

12E) 2410 There is a new Current Portion, $S_C$ (i.e., $S_2$), so a search is done for spans that could possibly occlude it. The Span Occluding Test query performs, in each SMCCAM Word 900:

$F_{nQ} = F_{nV} \hat{}(n \neq S_P) \hat{}(x_{nL} < x_{CR}) \hat{}(x_{nR} > x_{CL}) \hat{}[(z_{nL} < z_{CF}) v (z_{nR} < z_{CF})]$ $F_{nQ} = F_{nV} \hat{}(n \neq 2) \hat{}(x_{nL} < x_{2R}) \hat{}(x_{nR} > x_{2L}) \hat{}[(z_{nL} < z_{2L}) v (z_{nR} < z_{2L})]$ (EQ 29)

This query creates the set of all Potentially Occluding Spans for the Current Portion, $S_C$ (i.e., $S_2$). The query finds $S_0$, $S_3$, and $S_4$.

12F) 2412 and 2414 Because $F_Q$ is not empty, there must be spans that possibly occlude the Current Portion, $S_C$ (i.e., $S_2$). Therefore, the first span in $F_Q$ is read and made the New Span, $S_N$. This read operation sets the following values:

$S_N = \text{read}(n) = 0;$ $x_{NL} = \text{read}(x_L) = x_{0L};$ $x_{NR} = \text{read}(x_R) = x_{0R};$ $z_{NL} = \text{read}(z_L) = z_{0L};$ $z_{NR} = \text{read}(z_R) = z_{0R};$ $d_N = \text{read}(d) = d_0;$ $i_N = \text{read}(i) = i_0;$ (EQ 30)

Reading the first span in $F_Q$ yields $S_0$, the first span in the set. The read process also deletes $S_0$ from $F_Q$ by setting $(F_{0Q}=0)$.

13) 2109, 2106, 2110, and 2112 The right edge of the display screen has not been reached (i.e., $x_{CL} < x_{max}$) and both the Present Span, $S_P$ (i.e., $S_2$), and the New Span, $S_N$ (i.e., $S_0$), are valid. Therefore, the Span Interaction Parameters for these two spans are computed, and are found to be: (Non, Non, Far, Far).

14) 2114 The Span Interaction Type is determined from the Span Interaction Parameters, and turns out to be Type 32.

15) 2116, 2118, and 2600 Because the Span Interaction Type is Type 32, Rule 5 is invoked to process $S_2$.

15A) 2602 and 2604 The New Span, $S_N$ (i.e., $S_0$), is hidden within the x axis projection of $S_C$ (i.e., $S_2$). Therefore, $S_N$ (i.e., $S_0$) is discarded. Because $F_Q$ is not empty, there must be other spans that possibly occlude the Current Portion, $S_C$ (i.e., $S_2$). Therefore, the first span in $F_Q$ is read and made the New Span, $S_N$. This read operation sets the following values:

$S_N = \text{read}(n) = 3;$ $x_{NL} = \text{read}(x_L) = x_{3L};$ $x_{NR} = \text{read}(x_R) = x_{3R};$ $z_{NL} = \text{read}(z_L) = z_{3L};$ $z_{NR} = \text{read}(z_R) = z_{3R};$ $d_N = \text{read}(d) = d_3;$ $i_N = \text{read}(i) = i_3;$ (EQ 31)

Reading the first span in $F_Q$ yields $S_3$, the first span in the set. The read process also deletes $S_3$ from $F_Q$ by setting $(F_{3Q}=0)$. $S_2$ is still the Present Span, $S_P$. The status of the Saved Span, $S_S$, is left unchanged, thereby remaining invalid.

16) 2109, 2106, 2110, and 2112 The right edge of the display screen has not been reached (i.e., $x_{CL} < x_{max}$) and both the Present Span, $S_P$ (i.e., $S_2$), and the New Span, $S_N$ (i.e., $S_3$), are valid. Therefore, the Span Interaction Parameters for these two spans are computed, and are found to be: (Far, Non, Non, Near).

17) 2114 The Span Interaction Type is determined from the Span Interaction Parameters, and turns out to be Type 13.

18) 2116 and 2400 Because the Span Interaction Type is Type 13, Rule 3 is invoked to continue processing $S_2$.

18A) 2402 The Current Portion, $S_C$ (i.e., $S_2$), is hidden starting at $x_{NL}$ (i.e., $x_{3L}$), but is visible to the left of $x_{NL}$ (i.e., $x_{3L}$). Therefore, render the Present Span, $S_P$ (i.e., $S_2$), from $x_{CL}$ to $x_{NL}$ (i.e., from $x_{2L}$ to $x_{3L}$).

18B) 2404 The processing of Present Span is completed, so make the New Span, $S_N$ (i.e., $S_3$), into the Present Span, $S_P$, by setting:

$S_P = S_N = 3;$ $x_{PL} = x_{NL} = x_{3L};$ $x_{PR} = x_{NR} = x_{3R};$ $z_{PL} = z_{NL} = z_{3L};$ $z_{PR} = z_{NR} = z_{3R};$ $d_P = d_N = d_3;$ $i_P = i_N = i_3;$ (EQ 32)

18C) 2406 The Current Portion, $S_C$, is set equal to $S_N$ (i.e., $S_3$) by setting:

$$x_{CL}=x_{NL}=x_{3L};$$

$$x_{CR}=x_{NR}=x_{3R};$$

$$z_{CL}=z_{NL}=z_{3L};$$

$$z_{CR}=z_{NR}=z_{3R};$$

$$c_F=\max(z_{NL},z_{NR})=\max(z_{3L}, z_{3R})=z_{3L}; \quad (EQ\ 33)$$

18D) 2408 The Saved Span, $S_S$, is invalidated, but it was already labelled invalid in a previous step.

$$S_S=\text{invalid}; \quad (EQ\ 34)$$

18E) 2410 There is a new Current Portion, $S_C$ (i.e., $S_3$), so a search is done for spans that could possibly occlude it. The Span Occluding Test query performs, in each SMCCAM Word 900:

$$F_{nQ}=F_{nV}\hat{\ }(n\neq S_P)\hat{\ }(x_{nL}<x_{CR})\hat{\ }(x_{nR}>x_{CL})\hat{\ }[(z_{nL}<z_{CF})v(z_{nR}<z_{CF})]$$

$$F_{nQ}=F_{nV}\hat{\ }(n\neq 3)\hat{\ }(x_{nL}<x_{3R})\hat{\ }(x_{nR}>x_{3L})\hat{\ }[(z_{nL}<z_{3L})v(z_{nR}<z_{3L})] \quad (EQ\ 35)$$

This query creates the set of all Potentially Occluding Spans for the Current Portion, $S_C$ (i.e., $S_3$). The query finds only $S_0$.

18F) 2412 and 2414 Because $F_Q$ is not empty, there must be spans that possibly occlude the Current Portion $S_C$ (i.e., $S_3$). Therefore, the first span in $F_Q$ is read and made the New Span, $S_N$. This read operation sets the following values:

$$S_N=\text{read}(n)=0;$$

$$x_{NL}=\text{read}(x_L)=x_{0L};$$

$$x_{NR}=\text{read}(x_R)=x_{0R};$$

$$z_{NL}=\text{read}(z_L)=z_{0L};$$

$$z_{NR}=\text{read}(z_R)=z_{0R};$$

$$d_N=\text{read}(d)=d_0;$$

$$i_N=\text{read}(i)=i_0; \quad (EQ\ 36)$$

Reading the first span in $F_Q$ yields $S_0$, the first (and only) span in the set. The read process also deletes $S_0$ from $F_Q$ by setting ($F_{0Q}=0$). The read process leaves set $F_Q$ empty.

19) 2109, 2106, 2110, and 2112 The right edge of the display screen has not been reached (i.e., $x_{CL}<x_{max}$) and both the Present Span, $S_P$ (i.e., $S_3$), and the New Span, $S_N$ (i.e., $S_0$), are valid. Therefore, the Span Interaction Parameters for these two spans are computed, and are found to be: (Non, Non, Far, Far).

20) 2114 The Span Interaction Type is determined from the Span Interaction Parameters, and turns out to be Type 32.

21) 2116, 2118, and 2600 Because the Span Interaction Type is Type 32, Rule 5 is invoked to process $S_3$.

21A) 2602 and 2606 The New Span, $S_N$ (i.e., $S_0$), is hidden within the x axis projection of $S_C$ (i.e., $S_3$). Therefore, $S_N$ (i.e., $S_0$) is discarded. Because $F_Q$ is empty, there must be no other spans that possibly occlude the Current Portion, $S_C$ (i.e., $S_3$). Therefore, the New Span, $S_N$, is labelled as invalid.

$$S_N=\text{invalid}; \quad (EQ\ 37)$$

A read operation is not done. $S_3$ is still the Present Span, $S_P$. The status of the Saved Span, $S_S$, is left unchanged, thereby remaining invalid.

22) 2109, 2106, 2110, and 2300 Because the right edge of the display screen has not been reached (i.e., $x_{CL}<x_{max}$) and also because $S_P$ is valid and $S_N$ is not valid, Rule 2 is invoked to continue processing $S_3$.

22A) 2302 The Current Portion, $S_C$ (i.e., $S_3$), must be completely visible. Therefore, render the Present Span, $S_P$ (i.e., $S_3$), from $x_{CL}$ to $x_{CR}$ (i.e., from $x_{3L}$ to $x_{3R}$).

22B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$$F_{nQ}=F_{nV}\hat{\ }(x_{nL}=x_{CR})\hat{\ }(z_{nL}=x_{CR})$$

$$F_{nQ}=F_{nV}\hat{\ }(x_{nL}=x_{3R})\hat{\ }(z_{nL}=z_{3R}) \quad (EQ\ 38)$$

This query creates the set of all Abutting Spans for the Current Portion, $S_C$ (i.e., $S_3$) and stores them in $F_Q$. The query finds only $S_7$.

22C) 2308 and 2310 Because $F_Q$ is not empty, there must be an Abutting Span. Therefore, the first span in $F_Q$ is read and made the Present Span, $S_P$. This read operation sets the following values:

$$S_P=\text{read}(n)=7;$$

$$x_{PL}=\text{read}(x_L)=x_{7L};$$

$$x_{PR}=\text{read}(x_R)=x_{7R};$$

$$z_{PL}=\text{read}(z_L)=z_{7L};$$

$$z_{PR}=\text{read}(z_R)=z_{7R};$$

$$d_P=\text{read}(d)=d_7;$$

$$i_P=\text{read}(i)=i_7; \quad (EQ\ 39)$$

Reading the first span in $F_Q$ yields $S_7$, the first (and only) span in the set. The read process also deletes $S_7$ from $F_Q$ by setting ($F_{7Q}=0$). The read process leaves set $F_Q$ empty.

22D) 2312 The Current Portion, $S_C$, is set equal to $S_P$ (i.e., $S_7$) by setting:

$$x_{CL}=x_{PL}=x_{7L};$$

$$x_{CR}=x_{PR}=x_{7R};$$

$$z_{CL}=z_{PL}=z_{7L};$$

$$z_{CR}=z_{PR}=z_{7R};$$

$$c_F=\max(z_{PL}, z_{PR})=\max(z_{7L}, z_{7R})=z_{7R}; \quad (EQ\ 40)$$

This step can be done concurrently with Step 22C.

22E) 2314 There is a new Current Portion, $S_C$ (i.e., $S_3$), so a search is done for spans that could possibly occlude it. The Span Occluding Test query performs, in each SMCCAM Word 900:

$$F_{nQ}=F_{nV}\hat{\ }(n\neq S_P)\hat{\ }(x_{nL}<x_{CR})\hat{\ }(x_{nR}>x_{CL})\hat{\ }[(z_{nL}<z_{CF})v(z_{nR}<z_{CF})]$$

$$F_{nQ}=F_{nV}\hat{\ }(n\neq 7)\hat{\ }(x_{nL}<x_{7R})\hat{\ }(x_{nR}>x_{7L})\hat{\ }[(z_{nL}<z_{7R})v(z_{nR}<z_{7R})] \quad (EQ\ 41)$$

This query creates the set of all Potentially Occluding Spans for the Current Portion, $S_C$ (i.e., $S_7$). The query does not find any spans, so $F_Q$ is empty.

22F) 2316 and 2318 Because $F_Q$ is empty, there must be no spans that possibly occlude the Current Portion, $S_C$ (i.e., $S_7$). Therefore, the New Span, $S_N$, is labelled as invalid.

$S_N$=invalid; (EQ 42)

A read operation is not done. $S_7$ is still the Present Span, $S_P$.

23) 2109, 2106, 2110, and 2300 Because the right edge of the display screen has not been reached (i.e., $x_{CL} < x_{max}$) and also because $S_P$ is valid and $S_N$ is not valid, Rule 2 is invoked to process $S_7$.

23A) 2302 The Current Portion, $S_C$ (i.e., $S_7$), must be completely visible. Therefore, render the Present Span, $S_P$ (i.e., $S_7$), from $x_{CL}$ to $x_{CR}$ (i.e., from $x_{7L}$ to $x_{7R}$).

23B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$F_{nQ} = F_{nV} \hat{} (x_{nL} = x_{CR}) \hat{} (z_{nL} = z_{CR})$ $F_{nQ} = F_{nV} \hat{} (x_{nL} = x_{7R}) \hat{} (z_{nL} = z_{7R})$ (EQ 43)

This query creates the set of all Abutting Spans for the Current Portion, $S_C$ (i.e., $S_7$) and stores them in $F_Q$. The query does not find any spans, so $F_Q$ is empty.

23C) 2308 and 2320 Because $F_Q$ is empty, there is not an Abutting Span. All spans completely to the left of $x_{CR}$ (i.e., $x_{7R}$) must be hidden, so they are declared invalid. This is done by a query that performs, in each SMCCAM Word 900:

$F_{nV} = F_{nV} \hat{} (x_{nR} > x_{CR})$ $F_{nV} = F_{nV} \hat{} (x_{nR} > x_{7R})$ (EQ 44)

This query reduces the number of valid spans by reducing the spans in set $F_V$ from 15 to 10. At this point, $F_V$ consists of $S_0$, $S_1$, $S_6$, and $S_8$ through $S_{14}$.

23D) 2322 There is neither a valid Present Span, $S_P$, nor a valid New Span, $S_N$. Hence, both are labelled as invalid.

$S_P$=invalid;

$S_N$=invalid; (EQ 45)

23E) 2324 The Current Portion, $S_C$, is set equal to:

$x_{CL} = x_{CR} = x_{7R}$;

$x_{CR}$=invalid;

$z_{CL}$=infinity;

$z_{CR}$=invalid;

$z_{CF}$=infinity; (EQ 46)

24) 2109, 2106, 2108, and 2200 Because the right edge of the display screen has not been reached (i.e., $x_{CL} < x_{max}$) and also because the Present Span, $S_P$, is not valid and $F_V$ is not empty (indicating that at least some spans are valid), Rule 1 is invoked. Here, Rule 1 is used to search for the frontmost span at $x_{7R}$. When found, this frontmost span is processed as the Present Span, $S_P$.

24A) 2202 Do a query to find all valid spans that could affect the current raster line at $x_{CL}$ (i.e., $x_{7R}$). The query performs, in each SMCCAM Word 900:

$F_{nQ} = F_{nV} \hat{} (x_{nL} \leq x_{CL})$ $F_{nQ} = F_{nV} \hat{} (x_{nL} \leq x_{7R})$ (EQ 47)

This query finds $S_0$, $S_1$, $S_6$, and $S_8$. The query operation could include z coordinate comparisons that check for values less than $z_{CF}$, which has been set to infinity.

24B) 2204 and 2222 Because $F_Q$ is not empty, there must be at least one span that could affect the current raster line at $x_{CL}$ (i.e., $x_{7R}$). Therefore, the first span in $F_Q$ is read and made the New Span, $S_N$. This read operation sets the following values:

$S_N$=read(n)=0;

$x_{NL}$=read($x_L$)=$x_{0L}$;

$x_{NR}$=read($x_R$)=$x_{0R}$;

$z_{NL}$=read($z_L$)=$z_{0L}$;

$z_{NR}$=read($z_R$)=$z_{0R}$;

$d_N$=read(d)=$d_0$;

$i_N$=read(i)=$i_0$; (EQ 48)

Reading the first span yields the leftmost span in $F_Q$, which is $S_0$. The read process also deletes $S_0$ from $F_Q$ by setting ($F_{0Q}$=0).

24C) 2224 The z value for the New Span, $S_N$ (i.e., $S_0$), at the x coordinate $x_{CL}$ (i.e., $x_{7R}$) is computed as $z_{temp}$.

$z_{temp} = z_{NL} + (x_{CL} - x_{NL})d_N = z_{0L} + (x_{7R} - x_{0L})d_0$ (EQ 49)

The position ($x_{7R}$, $z_{temp}$) 2704 is shown in FIG. 27.

24D) 2226, 2228, and 2232 The computed value, $z_{temp}$, is less than $z_{CL}$ (i.e., infinity), so make the New Span, $S_N$ (i.e., $S_0$), into the Present Span, $S_P$, by setting:

$S_P = S_N = 0$;

$x_{PL} = x_{NL} = x_{0L}$;

$x_{PR} = x_{NR} = x_{0R}$;

$z_{PL} = z_{NL} = z_{0L}$;

$z_{PR} = z_{NR} = z_{0R}$;

$d_P = d_N = d_0$;

$i_P = i_N = i_0$; (EQ 50)

24E) 2236 The Current Portion, $S_C$, is set to the portion of the Present Span, $S_P$ (i.e., $S_0$) to the right of $x_{CL}$ (i.e., $x_{7R}$) by setting:

$x_{CR} = x_{NR} = x_{0R}$;

$z_{CL} = z_{temp}$;

$z_{CR} = z_{NR} = z_{0R}$;

$z_{CF} = \max(z_{temp}, z_{NR}) = \max(z_{temp}, z_{0R}) = z_{temp}$; (EQ 51)

24F) 2237 and 2238 As stated above, the objective of this part of the method is to find the frontmost span at $x_{CL}$ (i.e., $x_{TR}$) Al $x_{CL}$(i.e., $x_{TR}$), the z coordinate of the Present Span, $S_P$ (i.e., $S_0$), is equal to $z_{temp}$. Therefore, any span in front of $S_P$ (i.e., $S_0$) at $x_{CL}$ (i.e., $x_{7R}$) must be at least partially located closer to the observer than $z_{temp}$. The set $F_Q$ is not empty and includes all the candidates for frontmost span at $x_{CL}$ (i.e., $x_{7R}$), and some of these candidates maybe eliminated with the query:

$$F_{nQ}=F_{nV}\hat{F}_{nQ}[(z_{nL}<z_{CL})v(z_{nR}<z_{CL})]$$

$$F_{nQ}=F_{nV}\hat{F}_{nQ}[(z_{nL}<z_{temp})\hat{}(z_{nR}<z_{temp})] \quad (EQ\ 52)$$

This query operation keeps candidate spans that have either endpoint z coordinate less than $z_{temp}$. After the query, $F_Q$ contains only $S_8$.

A variation of this method could skip this query to save time, but does not delete spans hidden by $S_P$ (i.e., $S_0$) at $x_{CL}$ (i.e., $x_{7R}$), and so must read all the spans that could affect the current raster line at $x_{CL}$ (i.e., $x_{7R}$). If the depth complexity is small, then this variation would yield a net savings. However, for large depth complexity, the time saved by eliminating candidate spans would outweigh the time spent doing the query operations. Hence, the method choice depends on the expected depth complexity of the scene.

To avoid making an a priori assumption about scene complexity, the SMCCAM800 could include a mechanism for determining the depth complexity at $x_{CL}$ by counting the number of spans in the set $F_Q$. If the number of spans in $F_Q$ is small, the query operation of this step is skipped, and each span in $F_Q$ is read. If the number of spans in $F_Q$ is sufficiently large, the query operation is not skipped, and some spans in $F_Q$ are deleted, and a net saving is achieved.

24G) 2204 and 2222 Because $F_Q$ is not empty, there must be at least one more candidate span that could be frontmost at $x_{CL}$ (i.e., $x_{7R}$). Therefore, the first span in $F_Q$ is read and made the New Span, $S_N$. This read operation sets the following values:

$$S_N=read(n)=8;$$

$$x_{NL}=read(x_L)=x_{8L};$$

$$x_{NR}=read(x_R)=x_{8R};$$

$$z_{NL}=read(z_L)=z_{8L};$$

$$z_{NR}=read(z_R)=z_{8R};$$

$$d_N=read(d)=d_8;$$

$$i_N=read(i)=i_8; \quad (EQ\ 53)$$

Reading the first span yields the only span in $F_Q$, $S_8$. The read process also deletes $S_8$ from $F_Q$ by setting ($F_{8Q}=0$). The read process leaves set $F_Q$ empty.

24H) 2224 The z value for the New Span, $S_N$ (i.e., $S_8$), at the x coordinate $x_{CL}$ (i.e., $x_{7R}$) is computed as $z_{temp}$.

$$z_{temp}=z_{NL}+(x_{CL}-x_{NL})d_N=z_{8L}+(x_{7R}-x_{8L})d_8 \quad (EQ\ 54)$$

The position ($x_{7R}$, $z_{temp}$) 2704 is shown in FIG. 27.

24I) 2226, 2228, and 2232 The computed value, $z_{temp}$, is less than $z_{CL}$ (i.e., z coordinate of $S_0$ at $x_{7R}$, computed as $z_{temp}$ is Step 24C), so make the New Span, $S_N$ (i.e., $S_8$), into the Present Span, $S_P$, by setting:

$$S_P=S_N=8;$$

$$x_{PL}=x_{NL}=x_{8L};$$

$$x_{PR}=x_{NR}=x_{8R};$$

$$z_{PL}=z_{NL}=z_{8L};$$

$$z_{PR}=z_{NR}=z_{8R};$$

$$d_P=d_N=d_8;$$

$$i_P=i_N=i_8; \quad (EQ\ 55)$$

24J) 2236 The Current Portion, $S_C$, is set to the portion of the Present Span, $S_P$ (i.e., $S_8$) to the right of $x_{CL}$ (i.e., $x_{7R}$) by setting.

$$x_{CR}=x_{NR}=x_{8R};$$

$$z_{CL}=z_{temp};$$

$$z_{CR}=z_{NR}=z_{8R};$$

$$z_{CF}=\max(z_{temp},$$

$$z_{NR})=\max(z_{temp}, z_{8R})=z_{8R}; \quad (EQ\ 56)$$

24K) 2237, 2204, 2206, and 2214 Because $F_Q$ is empty and $S_P$ (i.e., $S_8$) is valid, a search is done for spans that could possibly occlude the Current Portion, $S_C$, (i.e., $S_8$ to the right of $x_{7R}$). The Span Occluding Test query performs, in each SMCCAM Word 900:

$$F_{nQ}=F_{nV}\hat{}(n\neq S_P)\hat{}(x_{nL}<x_{CR})\hat{}(x_{nR}<x_{CL})\hat{}[(z_{nL}<z_{CF})v(z_{nR}<z_{CF})]$$

$$F_{nQ}=F_{nV}\hat{}(n\neq 8)\hat{}(x_{nL}<x_{8R})\hat{}(x_{nR}<x_{7R})\hat{}[(z_{nL}<z_{8R})v(z_{nR}<z_{8R})] \quad (EQ\ 57)$$

This query creates the set of all Potentially Occluding Spans for the Current Portion, $S_C$ (i.e., $S_8$ to the right of $x_{7R}$). The query finds $S_0$ and $S_9$.

24L) 2216 and 2218 Because $F_Q$ is not empty, there must spans that possibly occlude the Current Portion, $S_C$ (i.e., $S_8$ to the right of $x_{7R}$). Therefore, the first span in $F_Q$ is read and made the New Span, $S_N$. This read operation sets the following values:

$$S_N=read(n)=0;$$

$$x_{NL}=read(x_L)=x_{0L};$$

$$x_{NR}=read(x_R)=x_{0R};$$

$$z_{NL}=read(z_L)=z_{0L};$$

$$z_{NR}=read(z_R)=z_{0R};$$

$$d_N=read(d)=d_0;$$

$$i_N=read(i)=i_0; \quad (EQ\ 58)$$

Reading the first span in $F_Q$ yields $S_0$, the first span in the set. The read process also deletes $S_0$ from $F_Q$ by setting ($F_{0Q}=0$).

25) 2109, 2106, 2110, and 2112 The right edge of the display screen has not been reached (i.e., $x_{CL}<x_{max}$) and both the Present Span, $S_P$ (i.e., $S_8$), and the New Span, $S_N$ (i.e., $S_0$), are valid. Therefore, the Span Interaction Parameters for these two spans are computed, and are found to be: (Non, Non, Far, Near).

26) 2114 The Span Interaction Type is determined from the Span Interaction Parameters, and turns out to be Type 31.

27) 2116, 2118, and 2500 Because the Span Interaction Type is Type 31, Rule 4 invoked to process $S_8$:

27A) 2502 The Current Portion, $S_C$ (i.e., $S_8$ to the right of $x_{7R}$), and the New Span, $S_N$ (i.e., $S_0$), interact to cause $S_C$ to transition from being visible to being hidden somewhere along its length: at point of intersection between $S_C$ (i.e., $S_8$ to the right of $x_{7R}$) and $S_N$ (i.e., $S_0$). The intersection is computed, and found to be at ($x_I$, $z_I$) 2708, as shown in FIG. 27.

27B) 2504 The Current Portion, $S_C$ (i.e., $S_8$ to the right of $x_{7R}$), is shortened by changing its right end point to the intersection point. The right endpoint of $S_C$ is modified by setting $$x_{CR}=x_I;$$

$$z_{CR}=z_I;$$

$$c_F=\max(z_{CL}, z_I)=z_I; \quad \text{(EQ 59)}$$

The Current Portion, $S_C$ is now the portion of $S_8$ between $x_{7R}$ and $x_I$. The Present Span, $S_P$, is still equal to all of $S_8$.

27C) 2506 The New Span, $S_N$ (i.e., $S_0$), is saved as the Saved Span, $S_S$. This is done because $S_S$ will be needed later is $S_P$ (i.e., $S_8$) is rendered to $x_I$.

$$S_S=S_N=0;$$

$$x_{SL}=x_{NL}=x_{OL};$$

$$x_{SR}=x_{NR}=x_{OR};$$

$$z_{SL}=z_{NL}=z_{OL};$$

$$z_{SR}=z_{NR}=z_{OR};$$

$$d_S=d_N=d_O;$$

$$i_S=i_N=i_O; \quad \text{(EQ 60)}$$

The portion of the Saved Span, $S_S$, to the right $x_I$ abuts $S_C$ at the x coordinate $x_I$. If, later in the method, $S_C$ is rendered to $x_I$, then $S_S$ will become the Present Span, $S_P$.

27D) 2508 The Current Portion, $S_C$ (i.e., $S_8$ from $x_{7R}$ to $x_I$) has been changed, so a search is done for spans that could possibly occlude it. The Span Occluding Test query performs, in each SMCCAM Word 900:

$$F_{nQ}=F_{nV}{\char`\^}F_{nQ}{\char`\^}(n{\ne}S_P){\char`\^}(x_{nL}<x_{CR}){\char`\^}(x_{nR}>x_{CL}){\char`\^}[(z_{nL}<z_{CF})v(z_{nR}<z_{CF})]$$

$$F_{nQ}=F_{nV}{\char`\^}F_{nQ}{\char`\^}(n{\ne}8){\char`\^}(x_{nL}<x_I){\char`\^}(x_{nR}>x_{7R}){\char`\^}[(z_{nL}<z_I)v(z_{nR}<z_I)] \quad \text{(EQ 61)}$$

This query creates the set of all Potentially Occluding Spans for the Current Portion, $S_C$ (i.e., $S_8$ from $x_{7R}$ to $x_I$). The query does not find any spans; therefore, $F_Q$ is empty.

27E) 2510 and 2514 Because $F_Q$ is empty, there must not be any spans that possibly occlude the Current Portion, $S_C$ (i.e., $S_8$ from $x_{7R}$ to $x_I$). Therefore, the New Span, $S_N$, is declared invalid.

$$S_N=\text{invalid}; \quad \text{(EQ 62)}$$

28) 2109, 2106, 2110, and 2300 Because the right edge of the display screen has not been reached (i.e., $x_{CL}<x_{max}$) and also because $S_P$ is valid and $S_N$ is not valid, Rule 2 is invoked to process $S_8$.

28A) 2302 The Current Portion, $S_C$ (i.e., $S_8$ from $x_{7R}$ to $x_I$), must be completely visible. Therefore, render the Present Span, $S_P$ (i.e., $S_8$), from $x_{CL}$ to $x_{CR}$ (i.e., from $x_{7R}$ to $x_I$).

28B) 2304 and 2326 Because the Saved Span, $S_S$, is valid, there was an intersecting span that reduced the size of $S_C$. Therefore, the Saved Span, $S_S$ (i.e., $S_0$), is made into the Present Span, $S_P$, by setting:

$$S_P=S_S=0;$$

$$x_{PL}=x_{SL}=x_{OL};$$

$$x_{PR}=x_{SR}=x_{OR};$$

$$z_{PL}=z_{SL}=z_{OL};$$

$$z_{PR}=z_{SR}=z_{OR};$$

$$d_P=d_S=d_O;$$

$$i_P=i_S=i_O; \quad \text{(EQ 63)}$$

28C) 2328 The Current Portion, $S_C$, is set to the portion of $S_P$ (i.e., $S_0$) that is to the right of $x_I$. That way, the Saved Span, $S_S$ (i.e., $S_0$), acts the same as an Abutting Span for the portion of $S_8$ to the left of $x_I$, where the abutting takes place at $x_I$. This is done by setting:

$$x_{CL}=x_{CR}=x_I;$$

$$x_{CR}=x_{SR}=x_{OR};$$

$$z_{CL}=z_{CR}=z_I;$$

$$z_{CR}=z_{SR}=z_{OR};$$

$$z_{CF}=\max(z_{CR},z_{SR})=\max(z_I, z_{OR})=z_I; \quad \text{(EQ 64)}$$

This step can be done concurrently with Step 28B.

28D) 2330 Because the values for the Saved Span, $S_S$, have been transferred to the Present Span, $S_P$, $S_S$ is invalidated.

$$S_S=\text{invalid}; \quad \text{(EQ 65)}$$

28E) 2314 There is a new Current Portion, $S_C$ (i.e., $S_0$ to the right of $x_I$), so a search is done for spans that could possibly occlude it. The Span Occluding Test query performs, in each SMCCAM Word 900:

$$F_{nQ}=F_{nV}{\char`\^}(n{\ne}S_P){\char`\^}(x_{nL}<x_{CR}){\char`\^}(x_{nR}>x_{CL}){\char`\^}[(z_{nL}<z_{CF})v(z_{nR}<z_{CF})]$$

$$F_{nQ}=F_{nV}{\char`\^}(n{\ne}0){\char`\^}(x_{nL}<x_{OR}){\char`\^}(x_{nR}>x_I){\char`\^}[(z_{nL}<z_I)v(z_{nR}<z_I)] \quad \text{(EQ 66)}$$

This query creates the set of all Potentially Occluding Spans for the Current Portion, $S_C$ (i.e., $S_0$ to the right of $x_I$). The query finds $S_8$ through $S_{13}$.

28F) 2316 and 2332 Because $F_Q$ is not empty, there must spans that possibly occlude the Current Portion, $S_C$ (i.e., $S_0$ to the right of $x_I$). Therefore, the first span in $F_Q$ is read and made the New Span, $S_N$. This read operation sets the following values:

$$S_N=\text{read}(n)=8;$$

$$x_{NL}=\text{read}(x_L)=x_{8L};$$

$$x_{NR}=\text{read}(x_R)=x_{8R};$$

$$z_{NL}=\text{read}(z_L)=z_{8L};$$

$$z_{NR}=\text{read}(z_R)=z_{8R};$$

$$d_N=\text{read}(d)=d_8;$$

$$i_N=\text{read}(i)=i_8; \quad \text{(EQ 67)}$$

Reading the first span in $F_Q$ yields $S_8$, the first span in the set. The read process also deletes $S_8$ from $F_Q$ by setting $F_{8Q}=0$).

An alternate method could include a way to prevent the left side partner of an intersecting span pair from being considered as a Potentially Occluding Span of the right side partner. This could be done with an additional query of an SMCCAM 800 that can do two simultaneous inequality tests on n in each SMCCAM Word 900.

29) 2109, 2106, 2110, and 2112 The right edge of the display screen has not been reached (i.e., $x_{CL} < x_{max}$) and both the Present Span, $S_P$ (i.e., $S_0$), and the New Span, $S_N$ (i.e., $S_8$), are valid. Therefore, the Span Interaction Parameters for these two spans are computed, and are found to be: (Non, Near, Equal, Non).

30) 2114 The Span Interaction Type is determined from the Span Interaction Parameters, and turns out to be Type 21.

31) 2116, 2118, and 2600 Because the Span Interaction Type is Type 21, Rule 5 is invoked to process $S_0$.

31A) 2602 and 2604 The New Span, $S_N$ (i.e., $S_8$), is hidden within the x axis projection of $S_C$ (i.e., $S_0$ to the right of $x_I$). Therefore, $S_N$ (i.e., $S_8$) is discarded. Because $F_Q$ is not empty, there must be other spans that possibly occlude the Current Portion, $S_C$ (i.e., $S_0$ to the right of $x_I$). Therefore, the first span in $F_Q$ is read and made the New Span, $S_N$. This read operation sets the following values:

$S_N = \text{read}(n) = 9;$ $x_{NL} = \text{read}(x_L) = x_{9L};$ $x_{NR} = \text{read}(x_R) = x_{9R};$ $z_{NL} = \text{read}(z_L) = z_{9L};$ $z_{NR} = \text{read}(z_R) = z_{9R};$ $d_N = \text{read}(d) = d_9;$ $i_N = \text{read}(i) = i_9;$ \hfill (EQ 68)

Reading the first span in $F_Q$ yields $S_9$, the first span in the set. The read process also deletes $S_9$ from $F_Q$ by setting ($F_{9Q} = 0$). $S_0$ is still the Present Span, $S_P$. The status of the Saved Span, $S_S$, is left unchanged, thereby remaining invalid.

32) 2109, 2106, 2110, and 2112 The right edge of the display screen has not been reached (i.e., $x_{CL} < x_{max}$) and both the Present Span, $S_P$ (i.e., $S_0$), and the New Span, $S_N$ (i.e., $S_9$), are valid. Therefore, the Span Interaction Parameters for these two spans are computed, and are found to be: (Far, Far, Non, Non).

33) 2114 The Span Interaction Type is determined from the Span Interaction Parameters, and turns out to be Type 5.

34) 2116 and 2400 Because the Span Interaction Type is Type 5, Rule 3 is invoked to continue processing $S_0$.

34A) 2402 The Current Portion, $S_C$ (i.e., $S_0$ to the right of $x_I$), is hidden starting at $x_{NL}$ (i.e., $x_{9L}$), but is visible to the left of $x_{NL}$ (i.e., $x_{9L}$). Therefore, render the Present Span, $S_P$ (i.e., $S_0$), from $x_{CL}$ to $x_{NL}$ (i.e., from $z_1$w $z_{9L}$).

34B) 2404 The processing of Present Span is completed (for now), so make the New Span, $S_N$ (i.e., $S_3$), into the Present Span, $S_P$, by setting:

$S_{P=SN=}9;$ $x_{PL} = x_{NL} = x_{9L};$ $x_{PR} = x_{NR} = x_{9R};$ $z_{PL} = z_{NL} = z_{9L};$ $z_{PR} = z_{NR} = z_{9R};$ $d_P = d_N = d_9;$ $i_P = i_N = i_9;$ \hfill (EQ 69)

34C) 2046 The Current Portion, $S_C$, is set equal to $S_N$ (i.e., $S_9$) by setting:

$x_{CL} = x_{NL} = x_{9L};$ $x_{CR} = x_{NR} = x_{9R};$ $z_{CL} = z_{NL} = z_{9L};$ $z_{CR} = z_{NR} = z_{9R};$ $c_F = \max(z_{NL}, z_{NR}) = \max(z_{3L}, z_{3R}) = z_{9L};$ \hfill (EQ 70)

34D) 2408 The Saved Span, $S_S$, is invalidated, but it was already labelled invalid.

$S_S = \text{invalid};$ \hfill (EQ 71)

34E) 2410 There is a new Current Portion, $S_C$ (i.e., $S_9$), so a search is done for spans that could possibly occlude it. The Span Occluding Test query performs, in each SMCCAM Word 900;

$F_{nQ} = F_{nV}\hat{}(n \neq S_P)\hat{}(x_{nL} < x_{CR})\hat{}(x_{nR} > x_{CL})\hat{}[(z_{nL} < z_{CF}) \vee (z_{nR} < z_{CF})]$ $F_{nQ} = F_{nV}\hat{}(n \neq 9)\hat{}(x_{nL} < x_{9R})\hat{}(x_{nR} > x_{9L})\hat{}[(z_{nL} < z_{9L}) \vee (z_{nR} < z_{9L})]$ \hfill (EQ 72)

This query creates the set of all Potentially Occluding Spans for the Current Portion, $S_C$ (i.e., $S_{11}$). The query does not find any spans, so $F_Q$ is empty.

34F) 2412 and 2416 Because $F_Q$ is empty, there must be no other spans that possibly occlude the Current Portion, $S_C$ (i.e., $S_9$). Therefore, the New Span, $S_N$, is labelled as invalid.

$S_N = \text{invalid};$ \hfill (EQ 73)

A read operation is not done. $S_9$ is still the Present Span, $S_P$. The status of the Saved Span, $S_S$, is left unchanged, thereby remaining invalid.

35) 2109, 2106, 2110, and 2300 Because the right edge of the display screen has not been reached (i.e., $x_{CL} < x_{max}$) and also because $S_P$ is valid and $S_N$ is not valid, Rule 2 is invoked to process $S_9$.

35A) 2302 The Current Portion, $S_C$ (i.e., $S_9$), must be completely visible. Therefore, render the Present Span, $S_P$ (i.e., $S_9$), from $x_{CL}$ to $x_{CR}$ (i.e., from $x_{9L}$ to $x_{9R}$).

35B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$F_{nQ} = F_{nV}\hat{}(x_{nL} = x_{CR})\hat{}(z_{nL} = z_{CR})$ $F_{nQ} = F_{nV}\hat{}(x_{nL} = x_{9R})\hat{}(z_{nL} = z_{9R})$ \hfill (EQ 74)

This query creates the set of all Abutting Spans for the Current Portion, $S_C$ (i.e., $S_9$) and stores them in $F_Q$. The query finds only $S_{11}$.

35C) 2038 and 2310 Because $F_Q$ is not empty, there must be an Abutting Span. Therefore, the first span in $F_Q$ is read and made the present Span, $S_P$. This read operation sets the following values:

$S_P = \text{read}(n) = 11;$ $x_{PL} = \text{read}(x_L) = x_{11L};$ $x_{PR}$=read($x_R$)=$x_{11R}$;

$z_{PL}$=read($z_L$)=$z_{11L}$;

$z_{PR}$=read($z_R$)=$z_{11R}$;

$d_P$=read(d)=$d_{11}$;

$i_P$=read(i)=$i_{11}$; (EQ 75)

Reading the first span in $F_Q$ yields $S_{11}$, the first (and only) span in the set. The read process also deletes $S_{11}$ from $F_Q$ by setting ($F_{11Q}$=0). The read process leaves set $F_Q$ empty.

35D) 2312 The Current Portion, $S_C$, is set equal to $S_P$ (i.e., $S_{11}$) by setting:

$x_{CL}$=$x_{PL}$=$x_{11L}$;

$x_{CR}$=$x_{PR}$=$x_{11R}$;

$z_{CL}$=$z_{PL}$=$z_{11L}$;

$z_{CR}$=$z_{PR}$=$z_{11R}$;

$c_F$=max($z_{PL}$,$z_{11R}$)=max($z_{11L}$,$z_{11R}$)=$z_{11R}$; (EQ 76)

35E) 2314 There is a new Current Portion, $S_C$(i.e., $S_{11}$), so a search is done for spans that could possibly occlude it. The Span Occluding Test query performs, in each SMCCAM Word 900:

$F_{nQ}$=$F_{nV}$^(n≠$S_P$)^($x_{nL}$<$x_{CR}$)^($x_{nR}$>$x_{CL}$)^[($z_{nL}$<$z_{CF}$)v($z_{nR}$<$z_{CF}$)]

$F_{nQ}$=$F_{nV}$^(n≠11)^($x_{nL}$<$x_{11R}$)^($x_{nR}$>$x_{11L}$)^[($z_{nL}$<$z_{11R}$)v ($z_{nR}$<$z_{11R}$)] (EQ 77)

This query creates the set of all Potentially Occluding Spans for the Current Portion, $S_C$ (i.e., $S_7$). The query finds only $S_0$.

35F) 2316 and 2432 Because $F_Q$ is empty, there must be spans that possibly occlude the Current Portion, $S_C$ (i.e., $S_{11}$). Therefore, the first span in $F_Q$ is read and made the New Span, $S_N$. This read operation sets the following values:

$S_N$=read(n)=0;

$x_{NL}$=read($x_L$)=$x_{0L}$;

$x_{NR}$=read($x_R$)=$x_{0R}$;

$x_{NL}$=read($z_L$)=$z_{0L}$;

$z_{NR}$=read($z_R$)=$z_{0R}$;

$d_N$=read(d)=$d_0$;

$i_N$=read(i)=$i_0$; (EQ 78)

Reading the first span in $F_Q$ yields $S_0$, the first (and only) span in the set. The read process also deletes $S_0$ from $F_Q$ by setting ($F_{0Q}$=0). The read process leaves set $F_Q$ empty.

36) 2109, 2106, 2110, and 2112 The right edge of the display screen has not been reached (i.e., $x_{CL}$<$x_{max}$) and both the Present Span, $S_P$ (i.e., $S_{11}$), and the New Span, $S_N$ (i.e., $S_0$), are valid. Therefore, the Span Interaction Parameters for these two spans are computed, and are found to be: (Non, Non, Far, Far).

37) 2114 The Span Interaction Type is determined from the Span Interaction Parameters, and turns out to be Type 32.

38) 2116, 2118, and 2600 Because the Span Interaction Type is 32, Rule 5 is invoked to process $S_{11}$.

38A) 2602 and 2606 The New Span, $S_N$ (i.e., $S_0$), is hidden within the x axis projection of $S_C$ (i.e., $S_{11}$). Therefore, $S_N$ (i.e., $S_0$) is discarded. Because $F_Q$ is empty, there must be no other spans that possibly occlude the Current Portion, $S_C$ (i.e., $S_{11}$). Therefore, the New Span, $S_N$, is labelled as invalid.

$S_N$=invalid; (EQ 79)

A read operation is not done. $S_3$ is still the Present Span, $S_P$. The status of the Saved Span, $S_S$, is left unchanged, thereby remaining invalid.

39) 2109, 2106, 2110, and 2300 Because the right edge of the display screen has not been reached (i.e., $x_{CL}$<$x_{max}$) and also because $S_P$ is valid and $S_N$ is not valid, Rule 2 is invoked to continue processing $S_{11}$.

39A) 2302 The Current Portion, $S_C$ (i.e., $S_{11}$), must be completely visible. Therefore, render the Present Span. $S_P$ (i.e., $S_{11}$), from $x_{CL}$ to $x_{CR}$ (i.e., $x_{11L}$ to $x_{11R}$).

39B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$F_{nQ}$=$F_{nV}$^($x_{nL}$=$x_{CR}$)^($z_{nL}$=$z_{CR}$)

$F_{nQ}$=$F_{nV}$^($x_{nL}$=$x_{11R}$)^($z_{nL}$=$z_{11R}$) (EQ 80)

This query creates the set of all Abutting Spans for the Current Portion, $S_C$ (i.e., $S_{11}$) and stores them in $F_Q$. The query does not find any spans, so $F_Q$ is empty.

39C) 2308 and 2320 Because $F_Q$ is empty, there is not an Abutting Span. All spans completely to the left of $x_{CR}$ (i.e., $x_{11R}$) must be hidden, so they are declared invalid. This is done by a query that performs, in each SMCCAM Word 900:

$F_{nV}$=$F_{nV}$^($x_{nR}$>$x_{CR}$)

$F_{nV}$=$F_{nV}$^($x_{nR}$>$x_{11R}$) (EQ 81)

This query reduces the number of valid spans by reducing the spans in set $F_v$ from 10 to 5. At this point, $F_v$ consists of $S_0$, $S_1$, and $S_{12}$ through $S_{14}$.

39D) 2322 There is neither a valid Present Span, $S_P$, nor a valid New Span, $S_N$. Hence, both are labelled as invalid.

$S_P$=invalid;

$S_N$=invalid; (EQ 82)

39E) 2324 The Current Portion, $S_C$, is set equal to:

$x_{CL}$=$x_{CR}$=$x_{11R}$;

$x_{CR}$=invalid;

$z_{CL}$=infinity;

$z_{CR}$=invalid;

$z_{CF}$=infinity; (EQ 83)

40) 2109, 2106, 2108 and 2200 Because the right edge of the display screen has not been reached (i.e., $x_{CL}$<$x_{max}$) and also because the Present Span, $S_P$, is not valid and $F_v$ is not empty (indicating that at least some spans are valid). Rule 1 is invoked. Here, Rule 1 is used to search for the frontmost span at $x_{11R}$. When found, this frontmost span is processed as the Present Span, $S_P$.

40A) 2202 Do a query to find all valid spans that could affect the current raster line at $x_{CL}$ (i.e., $x_{11R}$). The query performs, in each SMCCAM Word 900:

$$F_{nQ}=F_{nV}\hat{}(x_{nL} \leq x_{CL})$$

$$F_{nQ}=F_{nV}\hat{}(x_{nL} \leq x_{11R}) \quad \text{(EQ 84)}$$

This query finds $S_0$, $S_1$, and $S_{12}$. The query operation could include z coordinate comparisons that check for values less than $z_{CP}$, which has been set to infinity.

40B) 2204 and 2222 Because $F_Q$ is not empty, there must be at least one span that could affect the current raster line at $x_{CL}$ (i.e., $x_{11R}$). Therefore, the first span in $F_Q$ is read and made the New Span, $S_N$. This read operation sets the following values;

$$S_N=\text{read}(n)=0;$$

$$x_{NL}=\text{read}(x_L)=x_{0L};$$

$$x_{NR}=\text{read}(x_R)=x_{0R};$$

$$z_{NL}=\text{read}(z_L)=z_{0L};$$

$$z_{NR}=\text{read}(z_R)=z_{0R};$$

$$d_N=\text{read}(d)=d_0;$$

$$i_N=\text{read}(i)=i_0; \quad \text{(EQ 85)}$$

Reading the first span yields the leftmost span in $F_Q$, which is $S_0$. The read process also deletes $S_0$ from $F_Q$ by setting ($F_{0Q}=0$).

40C) 2224 The x value for the New Span, $S_N$ (i.e., $S_0$), at the x coordinates $x_{CL}$ (i.e., $x_{11R}$) is computed as $z_{temp}$.

$$z_{temp}=z_{NL}+(x_{CL}-x_{NL})d_N=z_{0L}+(x_{11R}-x_{0L})d_0 \quad \text{(EQ 86)}$$

The position ($x_{11R}$, $z_{temp}$) 2710 is shown in FIG. 27.

40D) 2226, 2228, and 2232 The computed value, $z_{temp}$, is less than $z_{CL}$ (i.e., infinity), so make the New Span, $S_N$ (i.e., $S_0$), into the Present Span $S_P$, by setting:

$$S_P=S_N=0;$$

$$x_{PL}=x_{NL}=x_{0L};$$

$$x_{PR}=x_{NR}=x_{0R};$$

$$z_{PL}=z_{NL}=z_{0L};$$

$$z_{PR}=z_{NR}=z_{0R};$$

$$d_P=d_N=d_0;$$

$$i_P=i_N=i_0; \quad \text{(EQ 87)}$$

40E) 2236 The Current Portion, $S_C$, is set to the portion of the Present Span, $S_P$ (i.e., $S_0$) to the right of $x_{CL}$ (i.e., $x_{11R}$) by setting:

$$x_{CR}=x_{NR}=x_{0R};$$

$$z_{CL}=z_{temp};$$

$$z_{CR}=z_{NR}=z_{0R};$$

$$c_F=\max(z_{temp}, z_{NR})=\max(z_{temp}, z_{0R})=z_{temp}; \quad \text{(EQ 88)}$$

40F) 2237 and 2238 As stated above, the objective of this part of the method is to find the frontmost span at $x_{CL}$ (i.e., $x_{11R}$). At $x_{CL}$ (i.e., $x_{11R}$), the z coordinate of the Present Span, $S_P$ (i.e., $S_0$), is equal to $z_{temp}$. Therefore, any span in front of $S_P$ (i.e., $S_0$) at $x_{CL}$ (i.e., $x_{11R}$) must be at least partially located closer to the observer than $z_{temp}$. The set $F_Q$ is not empty and includes all the candidates for frontmost span at $x_{CL}$ (i.e., $x_{11R}$), and some of these candidates maybe eliminated with the query:

$$F_{nQ}=F_{nV}\hat{}F_{nQ}\hat{}[(z_{nL}<z_{CL})\vee(z_{nR}<z_{CL})]$$

$$F_{nQ}=F_{nV}\hat{}F_{nQ}\hat{}[(z_{nL}<z_{temp})\vee(z_{nR}<z_{temp})] \quad \text{(EQ 89)}$$

This query operation keeps candidate spans that has either endpoint z coordinate less than $z_{temp}$. After the query, $F_Q$ is empty.

40G) 2204, 2206, and 2214 Because $F_Q$ is empty, there can not be any other candidate span that could frontmost at $x_{CL}$ (i.e., $x_{11R}$). Also, because $S_P$ (i.e., $S_0$) is valid, perform, in each SMCCAM Word 900, the Span Occluding Test query:

$$F_{nQ}=F_{nV}\hat{}(n \neq S_P)\hat{}(x_{nL}<x_{CR})\hat{}(x_{nR}>x_{CL})\hat{}[(z_{nL}<z_{CP})\vee(z_{nR}<z_{CF})]$$

$$F_{nQ}=F_{nV}\hat{}(n \neq 0)\hat{}(x_{nL<x0R})\hat{}(x_{nR}>x_{11R})\hat{}[(z_{nL}<z_{temp})\vee(z_{nR}<z_{temp})] \quad \text{(EQ 90)}$$

This query creates the set of all Potentially Occluding Spans for the Current Portion, $S_C$ (i.e., $S_0$ to the right of $x_{11R}$). The query does not find any spans, and $F_Q$ is empty.

40H) 2216 and 2220 because $F_Q$ is empty, there must be no other spans that possibly occlude the Current Portion, $S_C$ (i.e., $S_0$ to the right of $x_{11R}$). Therefore, the New Span, $S_N$, is labelled as invalid.

$$S_N=\text{invalid}; \quad \text{(EQ 91)}$$

A read operation is not done, $S_0$ is still the Present Span, $S_P$. The status of the Saved Span, $S_S$, is left unchanged, thereby remaining invalid.

41) 2109, 2106, 2110, and 2300 Because the right edge of the display screen has not been reached (i.e., $x_{CL}<x_{max}$) and also because $S_P$ is valid and $S_N$ is not valid. Rule 2 is invoked to process $S_0$.

41A) 2302 The Current Portion $S_C$ (i.e., $S_0$ to the right of $x_{11R}$), must be completely visible. Therefore, render the Present Span, $S_P$ (i.e., $S_0$), from $x_{CL}$ to $x_{CR}$ (i.e., from $x_{11R}$ to $x_{0R}$).

41B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$$F_{nQ}=F_{nV}\hat{}(x_{nL}=x_{CR})\hat{}(z_{nL}=z_{CR})$$

$$F_{nQ}=F_{nV}\hat{}(x_{nL}=x_{0R})\hat{}(z_{nL}=z_{0R}) \quad \text{(EQ 92)}$$

This query creates the set of all Abutting Spans for the Current Portion, $S_C$ (i.e., $S_0$) and stores them in $F_Q$. The query does not find any spans, so $F_Q$ is empty.

41C) 2308 and 2320 Because $F_Q$ is empty, there is not an Abutting Span, All spans completely to the left of $x_{CR}$ (i.e., $x_{0R}$) must be hidden, so they are declared invalid. This is done by a query that performs, in each SMCCAM Word 900;

$$F_{nV}=F_{nV}\hat{}(x_{nR}>x_{CR})$$

$$F_{nV}=F_{nV}\hat{}(x_{nR}>x_{0R}) \quad \text{(EQ 93)}$$

This query reduces the number of valid spans by reducing the spans in set $F_V$ from 10 to 2. At this point, $F_V$ consists of $S_1$ and $S_{14}$.

41D) 2322 There is neither a valid Present Span, $S_P$, nor a valid New Span, $S_N$. Hence, both are labelled as invalid.

$S_P$=invalid;

$S_N$=invalid; (EQ 94)

41E) 2324 The Current Portion, $S_C$, is not equal to:

$x_{CL}=x_{CR}=x_{0R}$;

$x_{CR}$=invalid;

$z_{CL}$=infinity;

$z_{CR}$=invalid;

$z_{CF}$=infinity; (EQ 95)

42) 2109, 2106, 2108, and 2200 Because the right edge of the display screen has not been reached (i.e., $x_{CL} < x_{max}$) and also because the Present Span, $S_P$, is not valid and $F_V$ is not empty (indicating that at least some spans are valid), Rule 1 is invoked. Here, Rule 1 is used to search for the frontmost span at $x_{0R}$. When found, this frontmost span is processed as the Present Span, $S_P$.

42A) 2202 Do a query to find all valid spans that could affect the current raster line at $x_{CL}$ (i.e., $x_{0R}$). The query performs, in each SMCCAM Word 900:

$F_{nQ}=F_{nV}\hat{}(x_{nL} \leq x_{CL})$ $F_{nQ}=F_{nV}\hat{}(x_{nL} \leq x_{0R})$ (EQ 96)

This query finds $S_1$ and $S_{14}$. The query operation should include z coordinate comparisons that check for values less than $z_{CP}$, which has been set to infinity.

42B) 2204 and 2222 Because $F_Q$ is not empty, there must be at least one span that could affect the current raster line at $x_{CL}$ (i.e. $x_{0R}$). Therefore, the first span in $F_Q$ is read and made the New Span, $S_N$. This read operation sets the following values:

$S_N$=read(n)=1;

$x_{NL}$=read($x_L$)=$x_{1L}$;

$x_{NR}$=read($x_R$)=$x_{1R}$;

$z_{NL}$=read($z_L$)=$z_{1L}$;

$z_{NR}$=read($z_R$)=$z_{1R}$;

$d_N$=read(d)=$d_1$;

$i_N$=read(i)=$i_1$; (EQ 97)

Reading the first span yields the leftmost span in $F_Q$, which is $S_1$. The read process also deletes $S_1$ from $F_Q$ by setting ($F_{1Q}$=0).

42C) 2224 The z value for the New Span, $S_N$ (i.e., $S_1$), at the x coordinate $x_{CL}$ (i.e., $x_{0R}$) is computed as $z_{temp}$.

$z_{temp}=z_{NL}+(x_{CL}-x_{NL})d_N=z_{1L}+(x_{0R}-x_{1L})d_1$ (EQ 98)

The position ($x_{0R},z_{temp}$) 2712 is shown in FIG. 27.

42D) 2226, 2228 and 2232 The computed value, $z_{temp}$, is less than $z_{CL}$ (i.e., infinity), so make the New Span, $S_N$ (i.e., $S_1$), into the Present Span, $S_P$, by setting:

$S_P=S_N$=1;

$x_{PL}=x_{NL}=x_{1L}$;

$x_{PR}=x_{NR}=x_{1R}$;

$z_{PL}=z_{NL}=z_{1L}$;

$z_{PR}=z_{NR}=z_{1R}$;

$d_P=d_N=d_1$;

$i_P=i_N=i_1$; (EQ 99)

42E) 2236 The Current Portion, $S_C$, is set to the portion of the Present Span, $S_P$ (i.e., $S_1$) to the right of $x_{CL}$ (i.e., $x_{0R}$) by setting:

$x_{CR}=x_{NR}=x_{1R}$;

$z_{CL}=z_{temp}$;

$z_{CR}=z_{NR}=z_{1R}$;

$c_F=\max(z_{temp}, z_{NR})=\max(z_{temp}, z_{1R})=z_{temp}$; (EQ 100)

42F) 2237 and 2238 As stated above, the objective of this part of the method is to find the frontmost span at $x_{CL}$ (i.e., $x_{0R}$). At $x_{CL}$ (i.e., $x_{0R}$), the z coordinate of the Present Span, $S_P$(i.e., $S_1$), is equal to $z_{temp}$. Therefore, any span in front of $S_P$ (i.e., $S_1$) at $x_{CL}$ (i.e., $x_{0R}$) must be at least partially located closer to the observer than $z_{temp}$. The set $F_Q$ is not empty and includes all the candidates for frontmost span at $x_{CL}$ (i.e., $x_{0R}$), and some of these candidates maybe eliminated with the query:

$F_{nQ}=F_{nV}\hat{}F_{nQ}\hat{}[(z_{nL}<z_{CL})\lor(z_{nR}<z_{CL})]$ $F_{nQ}=F_{nV}\hat{}F_{nQ}\hat{}[(z_{nL}<z_{temp})\lor(z_{nR}<z_{temp})]$ (EQ 101)

This query operation keeps candidate spans that has either endpoint z coordinate less than $z_{temp}$. After the query, $F_Q$ contains only $S_{14}$, and did not get changed by the query.

42G) 2204 and 2222 Because $F_Q$ is not empty, there must be at least one more candidate span that could be frontmost at $x_{CL}$ (i.e., $x_{0R}$). Therefore, the first span in $F_Q$ is read and made the New Span, $S_N$. This read operation sets the following values:

$S_N$=read(n)=14;

$x_{NL}$=read($x_L$)=$x_{14L}$;

$x_{NR}$=read($x_R$)=$x_{14R}$;

$z_{NL}$=read($z_L$)=$z_{14L}$;

$z_{NR}$=read($z_R$)=$z_{14R}$;

$d_N$=read(d)=$d_{14}$;

$i_N$=read(i)=$i_{14}$; (EQ 102)

Reading the first span yields the only span in $F_Q$, that is $S_{14}$. The read process also deletes $S_{14}$ from $F_Q$ by setting ($F_{14Q}$=0). The read process leaves set $F_Q$ empty.

42H) 2224 The x value for the New Span, $S_N$ (i.e., $S_{14}$), at the x coordinate $x_{CL}$ (i.e., $x_{0R}$) is computed as $z_{temp}$.

$z_{temp}=z_{NL}+(x_{CL}-x_{NL})d_N=z_{14}L+(x_{0R}-x_{14L})d_{14}$ (EQ 103)

The position $(x_{OR}, z_{temp})$ 2714 is shown in FIG. 27.

42I) 2226, 2228, and 2232 The computed value, $z_{temp}$, is less than $z_{CL}$ (i.e., z coordinate of $S_0$ at $x_{7R}$, computed as $z_{temp}$ in Step 42C), so make the New Span, $S_N$ (i.e., $S_{14}$), into the Present Span, $S_P$, by setting:

$$S_P = S_N = 14;$$
$$x_{PL} = x_{NL} = x_{14L};$$
$$x_{PR} = x_{NR} = x_{14R};$$
$$z_{PL} = z_{NL} = z_{14L};$$
$$z_{PR} = z_{NR} = z_{14R};$$
$$d_P = d_N = d_{14};$$
$$i_P = i_N = i_{14}; \quad \text{(EQ 104)}$$

42J) 2236 The Current Portion, $S_C$, is set to the portion of the Present Span, $S_P$ (i.e., $S_{14}$) to the right of $x_{CL}$ (i.e., $x_{OR}$) by setting:

$$x_{CR} = x_{NR} = x_{14R};$$
$$z_{CL} = z_{temp};$$
$$z_{CR} = z_{NR} = z_{14R};$$
$$z_{CF} = \max(z_{temp}, z_{NR}) = \max(z_{temp}, z_{14R}) = z_{14R}; \quad \text{(EQ 105)}$$

Because, as shown FIG. 27, $z_{temp}$ is equal to $z_{CL}$, the max () function could choose either $z_{temp}$ or $z_{CL}$.

42K) 2237, 2204, 2206, and 2214 Because $F_Q$ is empty and $S_P$ (i.e., $S_{14}$) is valid, a search is done for spans that could possibly occlude the Current Portion, $S_C$, (i.e., $S_{14}$ to the right of $x_{OR}$). The Span Occluding Test query performs, in each SMCCAM Word 900:

$$F_{nQ} = F_{nV} \hat{} (n \neq S_P) \hat{} (x_{nL} < x_{CR}) \hat{} (x_{nR} > x_{CL}) \hat{} [(z_{nL} < z_{CF}) \vee (z_{nR} < z_{CF})]$$

$$F_{nQ} = F_{nV} \hat{} (n \neq 8) \hat{} (x_{nL} < x_{14R}) \hat{} (x_{nR} > z_{temp}) \hat{} [(z_{nL} < z_{14R}) \vee (z_{nR} < z_{14R})] \quad \text{(EQ 106)}$$

This query creates the set of all Potentially Occluding Spans for the Current Portion $S_C$ (i.e., $S_{14}$ to the right of $x_{OR}$). The query does not find any spans, so $F_Q$ is empty.

42L) 2216 and 2220 Because $F_Q$ is empty, there must be no other spans that possibly occlude the Current Portion, $S_C$ (i.e., $S_{14}$ to the right of $x_{OR}$). Therefore, the New Span, $S_N$, is labelled as invalid.

$$S_N = \text{invalid}; \quad \text{(EQ 107)}$$

A read operation is not done. $S_{14}$ is still the Present Span, $S_P$. The status of the Saved Span, $S_S$, is left unchanged, thereby remaining invalid.

43) 2109, 2106, 2110, and 2300 Because the right edge of the display screen has not been reached (i.e., $x_{CL} < x_{max}$) and also because $S_P$ is valid and $S_N$ is not valid, Rule 2 is invoked to process $S_{14}$.

43A) 2302 The Current Portion, $S_C$ (i.e., $S_{14}$ to the right of $x_{OR}$), must be completely visible. Therefore, render the Present Span, $S_P$ (i.e., $S_{14}$), from $x_{CL}$ to $x_{CR}$ (i.e., from $x_{OR}$ to $x_{14R}$).

43B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$$F_{nQ} = F_{nV} \hat{} (x_{nL} = x_{CR}) \hat{} (z_{nL} = z_{CR}) \quad F_{nQ} = F_{nV} \hat{} (x_{nL} = x_{14R}) \hat{} (z_{nL} = z_{14R}) \quad \text{(EQ 108)}$$

This query creates the set of all Abutting Spans for the Current Portion, $S_C$ (i.e., $S_{14}$ to the right of $x_{OR}$) and stores them in $F_Q$. The query does not find any spans, so $F_Q$ is empty.

43C) 2308 and 2320 Because $F_Q$ is empty, there is not an Abutting Span. All spans completely to the left of $x_{CR}$ (i.e., $x_{14R}$) must be hidden, so they are declared invalid. This is done by a query that performs, in each SMCCAM Word 900:

$$F_{nV} = F_{nV} \hat{} (x_{nR} > x_{CR})$$

$$F_{nV} = F_{nV} \hat{} (x_{nR} > x_{14R}) \quad \text{(EQ 109)}$$

This query reduces the number of valid spans by reducing the spans in set $F_V$ from 2 to 1. At this point, $F_V$ consists only of $S_1$.

43D) 2322 There is neither a valid Present Span, $S_P$, nor a valid New Span, $S_N$. Hence, both are labelled as invalid.

$$S_P = \text{invalid};$$
$$S_N = \text{invalid}; \quad \text{(EQ 110)}$$

43E) 2324 The Current Portion, $S_C$, is set equal to:

$$x_{CL} = x_{CR} = x_{14R};$$
$$x_{CR} = \text{invalid};$$
$$z_{CL} = \text{infinity};$$
$$z_{CR} = \text{invalid};$$
$$z_{CF} = \text{infinity}; \quad \text{(EQ 111)}$$

44) 2109, 2106, 2108, and 2200 Because the right edge of the display screen has not been reached (i.e., $x_{CL} < x_{max}$) and also because the Present Span, $S_P$, is not valid and $F_V$ is not empty (indicating that at least some spans are valid). Rule 1 is invoked. Here, Rule 1 is used to search for the frontmost span at $x_{14R}$. When found, this frontmost span is processed as the Present Span, $S_P$.

44A) 2202 Do a query to find all valid spans that could affect the current raster line at $x_{CL}$ (i.e., $x_{14R}$). The query performs, in each SMCCAM Word 900:

$$F_{nQ} = F_{nV} \hat{} (x_{nL} \leq x_{CL})$$

$$F_{nQ} = F_{nV} \hat{} (x_{nL} \leq x_{14R}) \quad \text{(EQ 112)}$$

This query finds only $S_1$. The query operation could include z coordinate comparisons that check for values less than $z_{CP}$, which has been set to infinity.

44B) 2204 and 2222 Because $F_Q$ is not empty, there must be at least one span that could affect the current raster line at $x_{CL}$ (i.e., $x_{14R}$). Therefore, the first span in $F_Q$ is read and made the New Span, $S_N$. This read operation sets the following values:

$$S_N = \text{read}(n) = 1;$$
$$x_{NL} = \text{read}(x_L) = x_{1L};$$
$$x_{NR} = \text{read}(x_R) = x_{1R};$$
$$z_{NL} = \text{read}(z_L) = z_{1L};$$
$$z_{NR} = \text{read}(z_R) = z_{1R};$$

$d_N$=read($d$)=$d_1$;

$i_N$=read($i$)=$i_1$; (EQ 113)

Reading the first span yields the leftmost span in $F_Q$, which is $S_1$. The read process also deletes $S_1$ from $F_Q$ by setting ($F_{1Q}$=0).

44C) 2224 The z value for the New Span, $S_N$ (i.e., $S_1$), at the x coordinate $x_{CL}$ (i.e., $x_{14R}$) is computed as $z_{temp}$.

$z_{temp}=z_{NL}+(x_{CL}-x_{NL})d_N=z_{1L}+(x_{14R}-x_{1L})d_1$ (EQ 114)

The position ($x_{14R}$, $z_{temp}$) 2716 is shown in FIG. 27.

44D) 2226, 2228, and 2232 The computed value, $z_{temp}$, is less than $z_{CL}$ (i.e., infinity), so make the New Span, $S_N$ (i.e., $S_1$), into the Present Span, $S_P$, by setting:

$S_P=S_N=1$;

$x_{PL}=x_{NL}=x_{1L}$;

$x_{PR}=x_{NR}=x_{1R}$;

$z_{PL}=z_{NL}=z_{1L}$;

$z_{PR}=z_{NR}=z_{1R}$;

$d_P=d_N=d_1$;

$i_P=i_N=i_1$; (EQ 115)

44E) 2236 The Current Portion, $S_C$, is set to the portion of the Present Span, $S_P$ (i.e., $S_1$) to the right of $x_{CL}$ (i.e., $x_{14R}$) by setting:

$x_{CR}=x_{NR}=x_{1R}$;

$z_{CL}=z_{temp}$;

$z_{CR}=z_{NR}z_{1R}$;

$_{CR}=\max(z_{temp},z_{NR})=\max(z_{temp},z_{1R})=z_{temp}$; (EQ 116)

44F) 2237, 2204, 2206, and 2214 Because $F_Q$ is empty and $S_P$ (i.e., $S_1$) is valid, a search is done for spans that could possibly occlude the Current Portion, $S_C$, (i.e., $S_1$ to the right of $x_{14R}$). The Span Occluding Test query performs, in each SMCCAM Word 900:

$F_{nQ}=F_{nV}\hat{}(n{\neq}S_P)\hat{}(x_{nL}<x_{CR})\hat{}(x_{nR}>x_{CL})\hat{}[(z_{nL}<z_{CF})v(z_{nR}<z_{CF})]$ $F_{nQ}=F_{nV}\hat{}(n{\neq}8)\hat{}(x_{nL}<x_{1R})\hat{}(x_{nR}>x_{14R})\hat{}[(z_{nL}<z_{temp})v(z_{nR}<z_{temp})]$ (EQ 117)

This query creates the set of all Potentially Occluding Spans for the Current Portion, $S_C$ (i.e., $S_1$ to the right of $x_{14R}$). The query does not find any spans, so $F_Q$ is empty.

44G) 2216 and 2220 Because $F_Q$ is empty, there must not be any spans that possibly occlude the Current Portion, $S_C$ (i.e., $S_1$ to the right of $x_{14R}$). Therefore, the New Span, $S_N$, is labelled as invalid.

$S_N$=invalid; (EQ 118)

A read operation is not done. $S_1$ is still the Present Span, $S_P$. The status of the Saved Span, $S_S$, is left unchanged, thereby remaining valid.

45) 2109, 2106, 2110, and 2300 Because the right edge of the display screen has not been reached (i.e., $x_{CL}<x_{max}$) and also because $S_P$ is valid and $S_N$ is not valid, Rule 2 is invoked to process $S_1$.

45A) 2302 The Current Portion, $S_C$ (i.e., $S_1$ to the right of $x_{14R}$), must be completely visible. Therefore, render the Present Span, $S_P$(i.e., $S_1$), from $x_{CL}$ to $x_{CR}$ (i.e., $x_{14R}$ to $x_{1R}$).

45B) 2304 and 2306 Because the Saved Span, $S_S$, is not valid, there was not an intersecting span that reduced the size of $S_C$. Therefore, a query is done to look for an Abutting Span. The query performs, in each SMCCAM Word 900:

$F_{nQ}=F_{nV}\hat{}(x_{nL}=x_{CR})\hat{}(z_{nL}=z_{CR})$ $F_{nQ}=F_{nV}\hat{}(x_{nL}=x_{1R})\hat{}(z_{nL}=z_{1R})$ (EQ 119)

This query creates the set of all Abutting Spans for the Current Portion, $S_C$ (i.e., $S_1$ to the right of $x_{14R}$) and stores them in $F_Q$. The query does not find any spans, so $F_Q$ is empty.

45C) 2308 and 2320 Because $F_Q$ is empty, there is not an Abutting Span. All spans completely to the left of $x_{CR}$(i.e., $x_{14R}$) must be hidden, so they are declared invalid. This is done by a query that performs, in each SMCCAM Word 900:

$F_{nV}=F_{nV}\hat{}(x_{nR}>x_{CR})$ $F_{nV}=F_{nV}\hat{}(x_{nR}>x_{1R})$ (EQ 120)

This query reduces the number of valid spans by reducing the spans in set $F_V$ from one to zero. At this point, $F_V$ is empty.

42D) 2322 There is neither a valid Present Span, $S_P$, nor a valid New Span, $S_N$. Hence, both are labelled as invalid.

$S_P$=invalid;

$S_N$=invalid; (EQ 121)

45E) 2324 The Current Portion, $S_C$, is set equal to:

$x_{CL}=x_{CR}=x_{1R}$;

$x_{CR}$=invalid;

$z_{CL}$=infinity;

$z_{CR}$=invalid;

$z_{CF}$=infinity; (EQ 122)

46) 2106, 2108, and 2120 Because the Present Span, $S_P$, is not valid and $F_V$ is empty, all the spans have been processed. Since $x_{CL}$ (i.e., $x_{1R}$) must be less than $x_{max}$, there is still a fraction of the current raster line to the right of $x_{CL}$ (i.e., $x_{1R}$) that has not been covered by spans. Therefore, the background is rendered form $x_{CL}$ (i.e., $x_{1R}$) to $x_{max}$. The Segment Span Rasterization Method 2100 is complete for the current raster line,.

Timing of Processing within the Span Sorting Pipeline 400

The Generic 3D Graphics Pipeline 200 generally utilizes a double buffered frame buffer 224 with two pages of memory. This allows an image in one page to be displayed on the display device, while the rendering process writes and image into the other page. Image data is written to random locations within the display screen 104 because the geometry is fed into the pipeline without any spatial sorting. When scene rendering is complete, the pages are swapped and the next scene is rendered.

Using only a few raster lines of display memory

The Span Sorting Rendering Pipeline 400 generates the complete pixel coloring for a raster line before proceeding to the next raster line. If raster line rendering is done at a rate to keep up with the display, then only a few raster lines of Raster Line Memory 416 are needed.

FIG. 28 shows how the timing of processing within the Span Sorting Rendering Pipeline 400 can be accomplished with only two raster lines of Raster Line Memory 416. In this figure, the horizontal axis is time, where each tick mark represents the time to display only raster line on the physical display device (CRT, etc.). Polygon processing 1400 for scene 1 2802 writes all the polygons in the scene into the Bocket Sort Memory 404. Once this 2802 is completed, raster line 0 is rendered 2804 for scene 1. When rendering this first raster line 2804 is completed, the displaying of some 1 2806 on the display device can begin, provided that subsequent raster lines are rendered before they are needed by the display device. In this way, the rendering of raster lines 2808 is in lock step with displaying of raster lines 2806, and only two raster lines of Raster Line memory 416 are needed, one for writing while a raster line is processed, and one for reading to send data to the display device. Once polygon processing 1400 for scene 1 2802 is complete, polygon processing 1400 for scene 2 2810 can begin, and this 2810 is done in parallel (in a pipelined fashion) with processing raster lines for scene 1 2808 and displaying raster lines for scene 1 2806.

The diagram of FIG. 28 is an ideal case because processing a raster line 2808 is assumed to be very closely matched to the time it takes to display a raster line. In practical systems, there is some variation in the time it takes to process a raster line. Therefore, several raster lines should be processed before the corresponding scene is displayed, thereby providing some "slack" in the timing requirements. The diagram of FIG. 28 also neglects display timing issues such as horizontal and vertical retrace times, but these can be used to introduce some of the "slop" in the timing.

Having less memory than a full frame buffer is possible because pixel coloration processing is proportional to the number of pixels in the display screen rather than to the number of pixels in all the polygon spans in the raster line. When rendering timing is done this way, the latency through the Span Sorting Rendering Pipeline 400 is mostly in the process polygon 1400 portion. If the polygon processing 1400 can keep up with the display screen rate, then a new scene can be displayed every time the screen of the display device is refreshed.

The diagram of FIG. 28 assumes, when a new scene is displayed, raster line 0 of the scene must be displayed first. This assumption requires polygon processing 2802 and raster line processing 2808 to "sync up" with the display device 2806. An alternate approach is to let the polygon processing complete at any point with in the cycle 2806 of the display device, and to begin raster line rendering at the raster line that is about to be displayed (taking into account the latency of processing a raster line). This alternate approach requires the Bucket Sort Memory 404 to be able to start its read operation at any raster line.

Some display screens, such as standard televisions, use an interlaced display of the raster lines. This is the even numbered raster lines are displayed first (in the even "field") and the odd numbered raster lines are displayed next (in the odd "field"). For this type of display, the Span Sorting Rendering Pipeline 400 generates raster lines in the order needed by the display. The two fields of the display can be treated as separate screens, or as a single interlaced scene.

Using a single buffered display memory

FIG. 28 assumes only a few raster lines are stored in the Raster Lines Memory 416. An alternate approach is to have memory for all the raster lines in the Raster Line Memory 416. This increases the required memory by quite a lot (maybe by a factor 100), but most computer video display systems have memory for every pixel in the screen, and 3D rendering maybe considered an add-on to this type of computer display. Hence, the required memory may already present in the video memory of the host computer system.

This section of the document assumes the Raster Line Memory 416 stores all pixel color information for every raster line. FIG. 29 shows the timing for a display device with ten raster lines (practical displays generally have on the order of 1000 raster lines) being continuously refreshed, where three screens worth of raster lines are displayed 2902. As in the previous figure, the horizontal axis is time, where each tick mark represents the time to display one raster line on the physical display device. At some point within the display of a scene 2904, polygon processing 1400 will be completed 2906 for the next scene, and this point 2906 is not assumed to be synchronized with the screen display in any particular way. Completion 2906 of polygon processing 1400 means that raster line processing 2907 can begin. Processing raster line 0 2908 is done first, and this raster line is displayed the next time 2910 raster line 0 is sent to the display device. Similarly, the last raster line is processed 2912 and subsequently displayed 2914, thereby displaying 2916 the entire scene. FIG. 29 shows how, upon completion 2906 of a scene's polygon processing 1400, the scene can be displayed beginning at the very next refresh cycle 2916 of the display, even though the raster line processing of the last raster line 2912 occurs after display of the first raster line 2910. If both the polygon processing and the raster line processing for entire scenes can keep up with the display device's screen refresh rate, then a new scene can be displayed at every screen refresh. If, once in a while, either the polygon processing or the raster line processing does not keep up, then the display device may show the same screen on two consecutive display refresh cycles.

The concept behind FIG. 29 can be extended to raster line processing that does not, on the average, keep up with the display refresh cycles. That is, as long as the raster line processing of the last raster line 2912 is completed before it is displayed 2914, then the entire scene will be displayed correctly. Furthermore, raster line processing can start on the raster line that has most recently been displayed. FIG. 30 shows a polygon processing 1400 completing 3002 just before raster line 7 is completely displayed. Raster line processing 3004 can begin with raster line 7 3006, and this raster line is displayed 3008 the next time the display device shows it. Display of the scene is not intermixed with display of the previous scene (that is, there is a clean transition) provided the last raster line processed 3010 is completed before it is displayed 3012. In this way, the maximum time to process all rasters 3014 is almost as long as two screen refresh cycles. Hence, the processing of each raster line can be about twice as long as the time to display it without requiring the need for double buffering, only a single buffer is needed.

The concept illustrated in FIG. 30 of having raster line processing 3004 over more that one screen refresh cycles, can be modified to have raster line processing 3004 wait until raster line 0 is displayed, thereby synchronizing with the refresh cycles. Polygon processing 1400 for the next screen does not need to wait because the Bucket Sort Memory 404 is double buffered.

Using a double buffered display memory

The Span Sorting Rendering Pipeline 400 can function with a fully double buffered Raster Line Memory 416, where every pixel in the display screen 104 corresponds to two words of memory (one in each buffer page). In this configuration, polygon processing 1400 for a scene is done until complete, then raster line processing is done until all raster lines in the display screen 104 have been processed, then the scene is show on the display device. This approach has the advantage of being able to take as long as necessary without being constrained to display device timing. This approach has the disadvantage of introducing an additional stage of latency.

Query Processor Architecture

Within the Span Sorting Rendering Architecture 500 of FIG. 5, for each raster line, the Query Processor 510 receives spans from the Span Generation Processor 508, determines the visible span portions (as described above), and sends the visible span portions to the Rasterize Processor 510. A block diagram of the Query Processor 510 is shown in FIG. 31, along with the two pages within the Span Memory 408.

While one Span Memory Page 800 is receiving Span Parameters from the Span Generation Processor 508, the other page 800 is being queried to determine the visible span portions. The two pages 800 are swapped via the Query Processor Crossbar 3102, which is a set of multiplexors. The Query Processor 510 includes a register file 3104 that is subdivided into five sets of registers for storing Span Parameters: 1) registers 3106 for the Current Portion, $S_c$: 2) registers 3108 for the Present Span, $S_p$: 3) registers 3110 for the New Span, $S_N$: 4) registers 3112 for the Saved Span, $S_S$: and 5) temporary registers 3114 used for things such as span intersection locations.

The Query Processor Control 3116 determines the sequence of operations in the Query Processor 510, including the sequence of query operations. As raster line processing proceeds, branches within the method 1800 or 2100 depend on query outcomes, span status, and Span Interaction Types (SITs). for each pair of $S_C$ and $S_N$, the SIT and SIP Logic 3118 generates the Span Interaction Type. Computing a SIT requires the operations of Equation 10 to be performed, as well as various comparison operations. These operations are performed in the Compare and Offset Computation 3200 block on data received from the register filed 3104. Whenever Rule 4 2500 is invoked, the intersection point between $S_C$ and $S_N$ is computed in the Intersection Computation block.

For maximum throughput, Compare and Offset Computation 3200 can be implemented in parallel hardware. FIG. 32 shows four identical blocks 3202, where each block 3202 includes two arithmetic comparators 3204 and 3206, a subtracter 3208, and a multiplier 3210. The subtracter 3208 and multiplier 3210 computer the offsets as shown in Equation 10. The comparators generate signals that can be used to generate the Span Interaction Parameters (SIPs). Inputs to the blocks 3202 come from the register file 3104, and outputs go to the SIT and SIP Logic 3118.

Sorting Magnitude Comparison CAM circuits

FIG. 33 shows a prior art MCCAM bit cell 3300, taken from the Duluk Patent, constructed out of CMOS transistors and gates. A field within an MCCAM Word can be built with a multiplicity of these cells 3300. In this cell 3300, one bit is stored in a Six Transistor RAM Subcircuit 3302, where reading and writing is controlled by the signal CamWord 3304 and data is written and read via the differential bit lines, BitH 3306 and BitL 3308 (the "H" and "L" at the end of signal names indicates active high and active low, respectively). During a query operation, the XOR Subcircuit 3310 performs an exclusive or function to produce the signal Not Equal 3312, which indicates the bit value stored in the RAM 3302 is not equal to the bit value on the bit lines 3306 and 3308. During a query operation, the signal EnableIn 3314 being asserted indicates higher order bits in the field are all equal, and this bit position is enabled for comparison. If NotEqaul 3312 is at logic "0" when EnableIn 3314 is asserted, the Precharged Enable Propagation Subcircuit 3316 enables the next lower bit position by asserting EnableOut 3318. If NotEqual 3312 is at logic "1" when EnableIn 3314 is asserted, the Two Transistor Query Resolution Subcircuit 3320 conditionally pulls down the QueryTrue 3322 signal, depending on the value of ComparisonOp 3324 (as described in the Duluk Patent), and EnableOut 3318 remains unasserted.

In contrast to an MCCAM, an SMCCAM 800 (recall, the "S" stands for "sorting") can shift data from one word 900 to the next during a sorting operation. FIG. 34 is a "TTL type" circuit for one bit in an SMCCAM Word 900. This cell 3400 includes a master-slave flip-flop 3402 for storing the bit value because it must function as a bit in a shift register. The cell is shown with separate I/O lines, InputBit 3404 and OutputBit 3406, but a single bidirectional I/O line or a bidirectional differential pair could be used. A read operation is done by asserting the Read 3408 control line, which enables the tri-state buffer 3410. A write operation is done on the rising edge of Clock 3412 when WriteEn 3414 is asserted and ShiftEn 3416 is not asserted. The shift within a sort operation is done on the rising edge of Clock 3412 when WriteEn 3414 is asserted and ShiftEn 3416 is also asserted. The signal ShiftEn 3416 controls a multiplexor 3418 that chooses whether data on InputBit 3404 or data on ShiftIn 3420 is stored into the flip-flop 3402. Data on ShiftIn 3420 come from ShiftOut 3422 in the corresponding cell 3400 in the previous SMCCAM Word 900. Query operations function similarly to the MCCAM of the Duluk Patent. That is, an exclusive-or 3424 generates the signal NotEqual 3312, which is used to generate EnableOut 3318 and the word's query result, StoredGreaterL 3426. The key differences in the query operation function are: 1) the absence of ComparisonOp 3324 in the cell; and 2) an open collector circuit 3428 to generate the query result.

FIG. 35 is a 27-transistor CMOS circuit for one bit in an SMCCAM Word 900. This cell 3500 includes a Six Transistor RAM Subcircuit 3302 as the master part of the flip-flop, and a Slave Memory Subcircuit 3502 as the slave part of the flip-flop. The Six Transistor RAM Subcircuit 3302 is used in the conventional way for read and write operations, and the Slave Memory Subcircuit 3502 is only used during shifting. To allow a bit to be shifted into the Six Transistor RAM Subcircuit 3302, a Shift Write Subcircuit is included in the cell 3504. The following sequence occurs (in this example cell 3500) when shifting is done: 1) the differential clock signal ShitToSlaveH 3506 and ShiftToSlaveL 3508 is asserted then de-asserted in order to latch the data bit into the Slave Memory Subcircuit 3502; 2) The data bit is output from the cell to the corresponding cell 3500 in the next word 900 via the differential signal ShiftDataOutH 3510 and ShiftDataOutL 3512; and 3) the data bit is received on the differential signal ShiftDataInH 3514 and ShiftDataInL 3516 in the next word 900 and is written into that cell 3500 by asserting ShiftEnable 3518.

Certainly, there are many bit cell circuits that could be designed to do an equivalent function. To illustrate some of the other choices, the cell in FIG. 35 uses a Non-Precharged Enable Propagation Subcircuit 3520 and a Three Transistor Query Resolution Subcircuit 3522. Note that the Slave Memory Subcircuit 3502 is a dynamic circuit, and it could be replaced with many other types of latches, including a static latch.

FIG. 36 is a 23-transistor CMOS circuit for one bit in an SMCCAM Word 900. This cell 3600 utilizes a 12-transistor Master-Slave Memory Subcircuit 3602 that uses dynamic storage in both the master and slave halves of the flip-flop. The main advantage of this cell is reduced chip area due to both a smaller number of transistors and the significant number of series transistors (series transistors take up less space because they use fewer diffusion contacts). A data bit from the input bus, BitInH 3604, is written into the master half of the flip-flop 3602 by asserting the differential signal pair composed of WriteToMasterH 3606 and WriteToMasterL 3608. During the other half of a clock cycle, the data bit is stored into the slave half of the flip-flop 3602 by asserting the differential signal pair composed of ShiftToSlaveH 3610 and ShiftToSlaveL 3612. A data bit from the corresponding bit in the previous word is shifted in via ShiftDataInH 3514 into the master half of the flip-flop 3602 by asserting the differential signal pair composed of ShiftToMasterH 3616 and ShiftToMasterL 3618. The stored data bit is read from the cell 3600 by asserting ReadWord 3620, which puts the inverted bit value onto the BitOutL 3622 bus. The balance of the cell 3600 performs the comparison and enable chain in a manner similar to the cell 3500 described above. The XOR Subcircuit compares the stored bit value (utilizing both the master and slave values flip-flop 3602 because they are compliments of each other) and the complementary values of BitInH 3604 and BitInL 3624.

FIG. 37 shows an array of CMOS SMCCAN bit cells forming a set of fields. The signals. ShiftDataInH 3514 and ShiftDataInL 3516, are grounded in the first word 900 because the first word 900 cannot have data shifted into it 900.

When signed numbers need to be stored into the SMCCAM, it is simplest to invert the sign bit (i.e., "1" implies positive) during both the reading and writing processes. That way, in the hardware, positive numbers are "bigger" than negative numbers. An alternate approach it to change the logic in the sign bit positions in every field where a signed number needs to be stored and queried. Floating point numbers are easily stored by putting the exponent in a more significant set of bit positions and by storing the exponent as a positive number. Hence, IEEE floating point standard numbers will be processed correctly.

Multiple Spans Vertically within a Raster Line

In the Segment Span Rasterization Method 2100 as described above, each polygon can have only one span in a given raster line, and that span is represented by a line segment (hence, the name 2100) parallel to the x-y plane in screen coordinates. The location of the endpoints of spans are in object-precision, and therefore can be located anywhere horizontally within a pixel's boundaries. For example, if the end a span covers 20% of the width of a pixel, then that span accounts for 20% of the color value for that pixel, and is blended with color value for the other 80% of the pixel width. This provides for horizontal anti-aliasing, but not vertical antialiasing. That is, blending occurs horizontally, but not vertically. If the edge of a polygon is closer to horizontal than vertical, then the edge has a good chance of crossing through multiple pixel areas, meaning that the polygon color should be blended into multiple pixels. However, when a single line segment is used to represent the span, the polygon's color is blended into one pixel (the one that includes the segment span endpoint), and pixels on either side are assumed to be covered 100%, and are not blended (assuming visible span portions are wider than one pixel). Lack of vertical antialiasing is acceptable for some applications, but high quality images should be both antialiased in both directions.

Figure 38A:
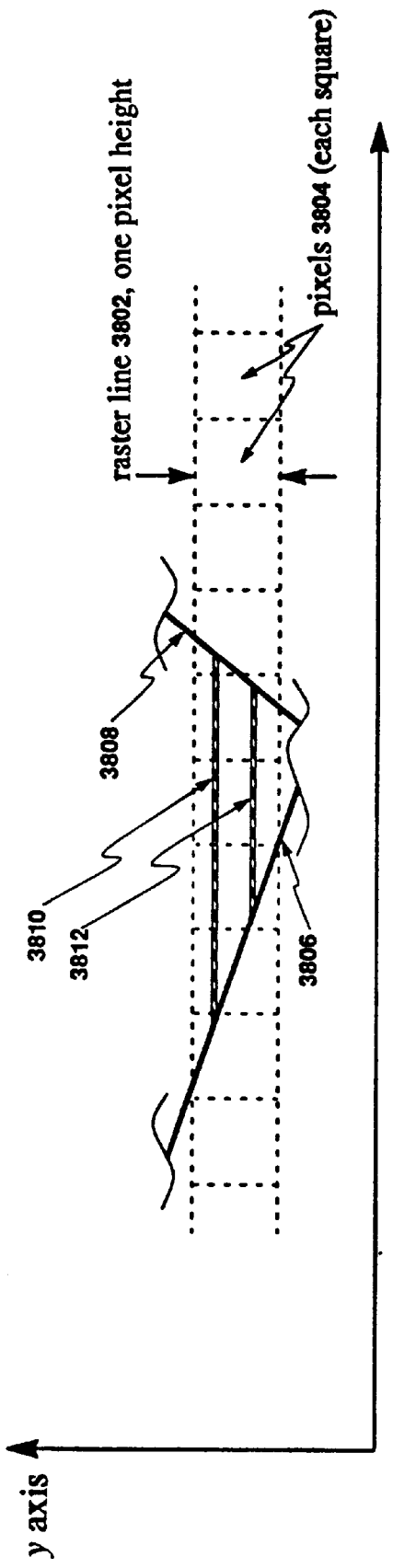
Figure 38B:
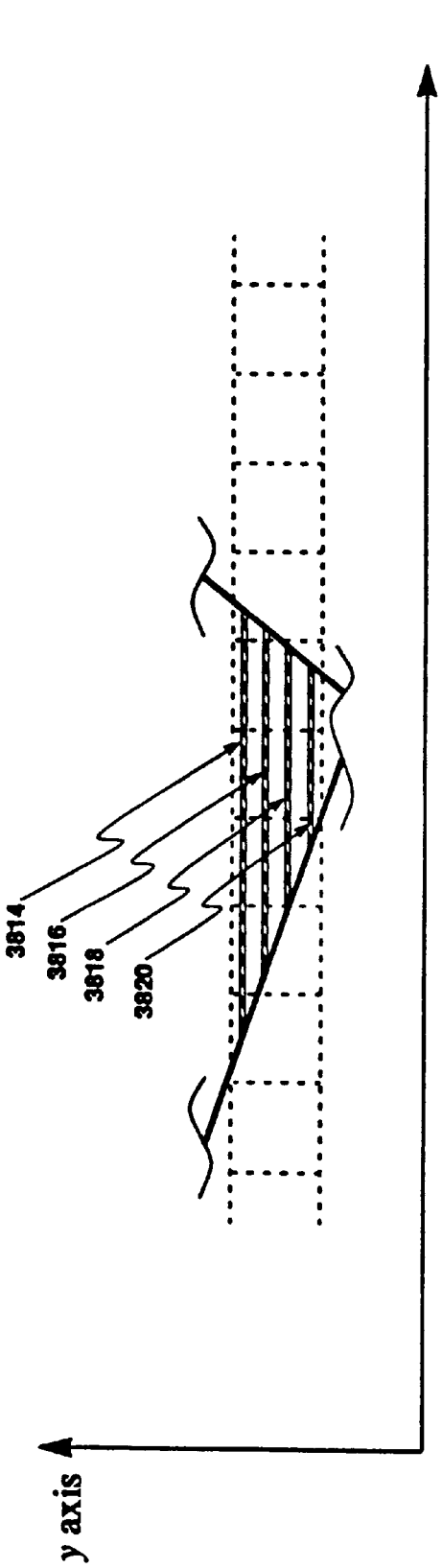

One method of adding vertical antialiasing is to divide each raster line vertically into several "sub-raster" lines. Then, the Segment Span Rasterization Method 2100 can be used for each sub-raster, and pixel color values can be generated by blending vertically as well as horizontally. FIG. 38A shows a raster line 3802 and its pixels 3804, two edges of a polygon 3806 and 3808, and two sub-raster spans 3810 and 3812 for that polygon. Similarly, FIG. 38B shows four sub-raster spans 3814, 3816, 3828, and 3820 for the polygon. As a possible variation, if a pixel is covered by only two such sub-raster spans from the sample polygon, it would be possible to compute one color value at the center of the pixel.

Using sub-raster lines reduces vertical aliasing, but does not eliminate it. For many applications, this is an acceptable approximation.

Trapezoidal Span Rasterization Method

Spans can be represented by two-dimensional trapezoids rather than one-dimensional line segments. Both line segments and planar trapezoids are in three-dimensional object-precision eye coordinates. The advantage of a trapezoidal representation is the preservation of edge information within a raster line, thereby providing correct antialiasing in both the horizontal and vertical dimensions.

FIG. 39 shows a triangle mesh with two triangles 3902, and 3904, and one raster line 3906 within the display screen 104. The area within the raster line 3906 for each triangle 3902, and 3904 is a trapezoidally shaped span, labelled $S_{11}$ 3908 and $S_{12}$ 3910. For trapezoidal spans, the span endpoint is an edge of the trapezoid, and is described by two points in three-dimensional screen coordinates: one at the top edge of the raster line, and one of the bottom edge of the raster line. Hence, a trapezoidal span is described by four point in screen coordinates. For example, the trapezoidal span on the left 3908 in the figure has endpoints described in x-z space by: 1) the top of the left endpoint located at $(x_{11LT}, z_{11LT})$; 2) the bottom of the left endpoint located at $(x_{11LB}, z_{11LB})$; 3) the top of the right endpoint located at $(x_{11RT}, z_{11RT})$; and 4) the bottom of the right endpoint located at $(x_{11RB}, z_{11RB})$. These four points are actually in x-y-z space, but the y-coordinate is dictated by the location of either the top or the bottom of the raster line 3906. Note that the subscripts in the coordinate variables indicate three things: 1) the span number (e.g., "11"); 2) the left or right endpoint (i.e., "L" or "R"); and 3) the top or bottom of the raster line (i.e., "T" or "B").

An opaque trapezoidal span occludes more distant geometry over most of its length, but at endpoints 3912, and 3914 that are not abutted to another trapezoidal span, more distant geometry is partially visible. However, for abutting trapezoidal spans, as shown in FIG. 39, the common endpoint 3916 does occlude more distant geometry. This presents a problem when utilizing trapezoidal spans. That is, non-abutting trapezoidal span endpoints do not occlude more distant geometry, but abutting endpoints work together to occlude 3918 more distant geometry. The invention of this document successfully solves this problem by searching for abutting spans.

FIG. 40 shows a group of trapezoidal spans in the same raster line, and these spans are trapezoidal versions of the segment spans shown in FIG. 11. In FIG. 40, the visible portions of the spans are shaded. Notice that for spans is a polygon mesh (i.e. abutting spans), span tops lay end-to-end with each other, and span bottoms to likewise. Span endpoints cast an edge "shadeow" onto spans that are farther from the viewing point. For example, the left endpoint 4002 of $S_2$ casts such a shadow 4004 onto $S_1$.

An additional concern when using trapezoidal spans occurs when a polygon crosses either the top or the bottom of the raster line, but not both. This would generally happen at: 1) the corner of a polygon 2) at a horizontal edge of a polygon; or 3) when occluding spans leave only a sliver of a span visible. One example of this is shown in FIG. 40, where the far right end 4006 of $S_0$ is visible. In this type of situation, the trapezoidal span is actually shaped like a triangle, and therefore could be considered a "degenerate trapezpoid" where the top or bottom is of length zero.

This document has explained in great detail the Segment Span Rasterization Method 2100, and the Trapezoidal Span Rasterization Method is similar in that it follows the front most spans from left to right and sending the visible portions of spans to the Rasterization Processor 512. The key difference is that non-abutting endpoints of trapezoidal spans do not fully occlude more distant geometry. The Trapezoidal Span Rasterization Method must correctly handle these types of spans.

There is a variety of ways to handle trapeizoidally shaped spans. Rather than having a method flow diagram for each of the four choices for the Trapezoidal Span Rasterization Method presented here, the features of each choice will be explained, along with the corresponding choices for SOT Queries. These four particular choices were selected to illustrate how the rasterization method presented here can be expanded to process trapezoidally shaped spans.

Version 1: Occlusion processing done separately for span tops and span bottoms

A trapezoidal span can be described as the collection of: 1) a span top, the line segment on the boundary of the trapezoidal span along the top of the raster line; 2) a span bottom, the line segment along the bottom of the raster line; and 3) the area between the span top and the span bottom. The version of the Trapezoidal Span Rasterization Method described in the section of the document does occluding processing on span tops separately from span bottoms. This can be done because, for the same raster line, span tops and span bottoms never occlude each other. Occlusion processing for span tops can be done in the same way occlusion processing is done for segment spans in the Segment Span Rasterization Method 2100. Occlusion processing for span bottoms can be done separately in the same way, and should be done in parallel with occlusion processing of span tops in order for pairs of tops and bottoms to be correctly paired for pixel color generation.

This version of the Trapezoidal Span Rasterization Method keeps track of the following "span-like" things (including appropriate endpoints): 1) the Present Span, $S_P$, the trapezoidal span that is currently being tested to see what part of it should be rendered; 2) the Current Span Top, $S_{CT}$ the top edge of the $S_P$ that is being tested for visibility; 3) the Current Span Bottom, $S_{CB}$, the bottom edge of the $S_P$ that is being tested for visibility; 4) the New Span, $S_N$, the trapezoidal span recently read from the Span Memory 408; 5) New Span Top, $S_{NT}$, the top edge of $S_N$; 6) the New Span Bottom, $S_{NB}$, the bottom edge of $S_N$; 7) the Top Saved Span, $S_{ST}$, a trapezoidal span that is temporarily saved because $S_{CT}$ intersects $S_{NT}$, in a situation analogous to Rule 4 described above; and 8) the Bottom Saved Span, $S_{SB}$, a trapezoidal span that is temporarily saved because $S_{CB}$ intersects $S_{NB}$. Two different saved spans are needed because span tops are processed separately from span bottoms, and they could have intersections with different spans. Keeping track of more information during rasterization requires more registers to be added to the Span Parameter Registers 3104 within the Query Processor 510.

FIG. 41 shows an enlarged version of the example spans $S_1$ 4101 and $S_2$ 4102 from FIG. 40, and $S_1$ 4101 is assumed to be the Present Span, $S_P$. The span top of $S_1$ 4101, called $S_{1T}$ 4103, has its corresponding SOT Region 4104 that finds $S_{2T}$ 4106 occluding it 4103. This SOT Region 4104 does not find $S_{2B}$ 4108 because is 4104 is only searching for span tops. Similarly, the span bottom of $S_1$, $S_{1B}$ 4110, has its SOT Region 4112 that finds $S_2$ 4108 occluding it 4110.

FIG. 42 shows two views of a partial set of spans within a raster line 4200, labelled $S_{31}$ 4201 through $S_{39}$ 4209. The upper diagram is the x-z view (the look direction is parallel to the y-axis) of the spans, and the lower diagram is x-y view (the look direction is parallel to the z-axis) of the same spans. In the lower view, hidden portions of the spans are not shown, and therefore represent how an infinite precision rendering of the spans would be drawn for that raster line 4200. But, since the display device does not have infinite precision, span colors must be blended together in correct proportions for each pixel. In the figure, visible portions of span tops and bottoms are shown as thicker lines. Visible portions of span tops and bottoms are passed to the Rasterization Processor 512 were they are used along with polygon edge derivatives to determine pixel colors. The spans in FIG. 42 were chosen to illustrate handling of various cases, including spans where only the span top or span bottom is visible and also spans that do not cover the entire height of the raster line 4200.

Just as in the Segment San Rasterization Method 2100, the spans are processed in a left-to-right manner. The example of FIG. 42 starts in the middle (i.e., horizontally) of the raster line where $S_{31}$ 4201 is $S_P$, $S_{31T}$ 4211 is $S_{CT}$ and $S_{31B}$ 4221 is $S_{CB}$. The SOT Queries for $S_{CT}$ and $S_{CB}$ find nothing, $S_N$ is set to invalid, and by a rendering rule similar to Rule 2 2300 of the Segment Span Rasterization Method 2100, $S_{31}$ 4201 is rendered to its right endpoint. The rendering of $S_{31}$ 4201 covers 100% of the pixels up to the one that includes $x_{31RT}$ 4251. From that point, the edge derivative for the corresponding polygon edge (see Equation 1) is used to determine the percent coverage of each pixel, and this percentage weights the pixel color. The span 4201 can be rendered to its right endpoint because the entire length of the endpoint (the endpoint of a trapezoidal span is a line segment) is guaranteed to be visible. Also by the Rule 2 2300 analog, queries for abutting span tops and span bottoms find $S_{32T}$ 4212 and $S_{32B}$ 4222. At this point in the method $S_{32}$ 4202 is $S_P$, $S_{32T}$ 4212 is $S_{CT}$, and $S_{32B}$ 4222 is $S_{CB}$. The SOT Queries for $S_{CT}$ and $S_{CB}$ find nothing, and abutting spans are also not found. Hence, $S_N$ is set to invalid.

By a rule similar to Rule 2 2300, $S_{32}$ 4202 is rendered in its entirety (its right endpoint is guaranteed visible),and edge derivatives are again used to compute pixel coverage. To sight an example, for the pixels at least partly contained between $x_{31RT}$ 4251 and $x_{31RB}$ 4252, the sum of percent coverage due to $S_{31}$ 4201 and $S_{32}$ 4202 totals 100%. Queries to find abutting span tops or bottoms fail, so all spans completely to the left of $x_{32RB}$ 4252 are invalidated, and both $S_P$ and $S_N$ are set to invalid.

By a rule similar to Rule 1 2200, a search is done to find the front most span tops and bottoms at $x_{32RT}$ 4253 and $x_{32RB}$ 4254, which finds $S_{33}$ 4203 and assigns is to $S_P$, sets $S_{CT}$ to the part of $S_{33T}$ 4213 to the left of $x_{32RT}$ 4254, and sets $S_{CB}$ to the part of $S_{33B}$ 4223 to the left of $x_{32RB}$ 4253.

The SOT Queries for $S_{CT}$ and $S_{CB}$ find $S_{34T}$ 4214 and $S_{35B}$ 4225 (note these are from different spans) which are assigned to $S_{NT}$ and $S_{NB}$, respectively, $S_N$ is set to $S_{34}$ 4204, rather than $S_{35}$ 4205 because the visible portion of $S_{34}$ 4204 a further to the left, and the method proceeds from left to right.

By a rule similar to Rule 3 2400, $S_{33}$ 4202 is rendered, but only partially. At this point, the Rasterization Processor 512 can only render it 4203 to $x_{34LT}$ 4255 because its 4203 area to the right of $x_{34LT}$ 4255 still needs to have its visibility determined (generally the case when $S_{NT}$ $S_{NB}$ are not from the same span). Because $x_{34RT}$ 4255 almost certainly does not align with a pixel edge, the pixel that includes $x_{34RT}$ 4255 is partially colored by the portion of $S_{33}$ 4203 that is known to cover it (and the rest added later). Alternatively, the entire color contribution to that pixel by $S_{33}$ 4203 can be postponed until the entire amount of pixel coverage is known. At this point in the method, $S_{34}$ 4204 is $S_P$, $S_{34T}$ 4214 is $S_{CT}$, and $S_{35B}$ 4225 is $S_{CB}$. The SOT Query for $S_{CT}$ (i.e., $S_{34T}$ 4214) finds $S_{35T}$ 4215 and makes it $S_{NT}$. Because this $S_{NT}$ matches $S_{NB}$ of the previous step (i.e., they are from the same span, $S_{35}$ 4205), the SOT Query for $S_{CB}$ (i.e., $S_{35B}$ 4225) is postponed to the next step in the method, $S_N$ is set to $S_{35}$ 4205.

During the method, when $S_{NT}$ and $S_{NB}$ are not from the same span, previous spans can only be rendered to the leftmost of either the current x-value position along the top of the raster line and the current x-value position along the bottom of the raster line. At the leftmost of the two x-values, all span to the left has been considered, and so rendering can be done.

By a rule similar to Rule 3 2400, $S_{34}$ 4204 is rendered by the Rasterization Processor 512. This time, $S_{NT}$ and $S_{NB}$ are from the same span, so $S_{34}$ 4204 is rendered up to the left endpoint of $S_{35}$ 4205. Also, rendering of $S_{33}$ 4203 can be completed because its visibility has now been determined. At this point in the method, $S_{35}$ 4202 is made $S_P$, $S_{35T}$ 4215 is made $S_{CT}$, and $S_{35B}$ 4225 is made $S_{CB}$. The SOT Query for $S_{CT}$ (i.e., $S_{35T}$ 4215) finds $S_{37T}$ 4217 making it $S_{NT}$, while the SOT Query for $S_{CB}$ (i.e., $S_{35B}$ 4225) finds nothing, and makes $S_{NB}$ invalid, $S_N$ is set to $S_{37}$ 4207.

By a rule similar to Rule 3 2400, $S_{35}$ 4205 is rendered from its left endpoint to $x_{35RB}$ 4256 because $x_{35RB}$ 4256 is the leftmost choice between $x_{35RB}$ 4256 and $x_{37LT}$ 4257. A search for an abutting span bottom to $S_{CR}$ (i.e., $S_{35B}$ 4225) finds $S_{36B}$ 4226. At this point in the method, $S_{36}$ 4206 is $S_P$, $S_{37T}$ 4217 is $S_{CT}$, $S_{36B}$ 4226 is $S_{CB}$, $S_{37T}$ 4217 is $S_{NT}$, and an SOT Query for $S_{CB}$ (i.e., $S_{36B}$ 4226) finds $S_{39B}$ 4220 and makes it $S_{NB}$.

By a rule similar to Rule 3 2400, $S_{36}$ 4206 is rendered up to $x_{37LT}$ 4257 because $x_{37LT}$ 4257 is the leftmost choice between $x_{37LT}$ 4257 and $x_{38LB}$ 4258. Also, rendering of $S_{35}$ 4205 can be continued up to $x_{37LT}$ 4257. Because $S_{37}$ 4207 is not hidden and is known to have only a span top (no span bottom), it 4207 is made $S_P$. Also at this point, $S_{37T}$ 4217 is still $S_{CP}$ $S_{39B}$ 4229 is $S_{CB}$, and query to find an abutting span to $S_{37}$ 4207 finds noting, so $S_{NT}$ is invalid, and $S_{39B}$ 4229 is still $S_{NB}$.

By a rule similar to Rule 2 2300, $S_{37}$ 4207 is rendered in its entirety. Both $S_{35}$ 4205 and $S_{36}$ 4206 can now to rendered up to $x_{37RT}$ 4259 (completing $S_{35}$ 4205) because it is the leftmost choice between $x_{37RT}$ 4259 and $x_{39LB}$ 4258. At this point, $S_{38}$ 4208 is $S_P$, $S_{CT}$ is invalid, $S_{39B}$ 4229 is $S_{CB}$, $S_{NT}$ is invalid, and an SOT Query for $S_{CB}$ (i.e., $S_{39B}$ 4229) finds nothing, so $S_{NB}$ is invalid.

By a rule similar to Rule 1 2200, a search is done to find the front most span top at $x_{37RT}$ 4259. This search finds $S_{38T}$ 4218, and $S_{CT}$ is set to the portion of $S_{38T}$ 4218 so that right of $x_{37RT}$ 4259. An SOT Query for $S_{CT}$ fins $S_{39T}$ 4219 which is assigned to $S_{NT}$. At this point, $S_{38}$ 4208 is still $S_P$, $S_{39B}$ 4229 is still $S_{CB}$, and $S_{NB}$ is still invalid.

By a rule similar to Rule 1 2400, $S_{38}$ 4208 is rendered up to the left endpoint of $S_{39B}$ 4229. Because $S_{39}$ 4209 is going to be made into the next $S_P$, the other remaining uncompleted span, $S_{36}$ 4206, is completed by rendering it up to the left endpoint of $S_{39B}$ 4229. Care must be taken to correctly account for all the polygons edge derivatives correctly.

The raster line 4200 processing continues with $S_{39}$ 4209 as $S_P$, but the right edge of our example has been reached. If there had been some completely hidden spans within the left and right boundaries of this example, they would have been completely avoided by either never being found by as SOT Query or by being discarded by a rendering rule similar to Rule 5 2600. Similarly, if there had been an intersection between two span tops or two span bottoms, a rule similar to Rule 4 2500 would have been applied, and Saved Spans would have been used.

A special case may be added for handling spans that either do not have either a span top or a span bottom (they are less than one pixel in height) or have both their span bottom hidden, but are visible within the raster line (just peeking out from between two nearly horizontal polygon edges). In most practical application, such marginally visible items can be ignored.

It is possible that color information from several different spans are blended together for a particular pixel. Under such circumstances (and even for blending only two span's colors), only a reasonable approximation of the percent coverage is needed to make a high quality image.

When implemented in hardware, this version of the Trapezoidal Span Rasterization Method uses one SMCCAM Word 900 for each span top and another one for each span bottom. Both the span tops and span bottoms could be stored into the same page within the Span Memory 408. This would mean timesharing the Span Memory 408 between two essentially independent occlusion processes, thereby reducing performance when compared to storing span tops and span bottoms into different pages. Using one page for occlusion implies the Span Memory 408 needs a total of two pages, as shown in FIG. 39, to double buffer the spans.

It two pages within the Span Memory 408 are used, the two occlusion processes can be done in parallel. However, some fields, such as the Span Derivative Field 812 and the Information Pointer Field 812, need to be duplicated because they are needed by both occluding processes. Also, using two pages for occlusion processing tends to imply a total of four pages are needed in the Span Memory 408. But, if a non-interlaced display device is used, then the set of span Bottoms for the current raster line is the same as the set of span tops for the next raster line. Hence, three total pages are needed in the Span Memory 408 because one page is used for writing, and two pages are used for reading, and one of those two pages is reused for the next raster line. If an interlaced display device is used, then the same technique can be used, but raster line rendering order will not match the display device.

Another alternative is saving the list of the visible bottom span portions (i.e., after occlusion processing) in another memory and then using them as the span tops in the next raster line. Such a memory could be included in the Rasterization Processor 512. While this is certainly possible, it is probably more economical to recompute the visible top spans.

Version 2: Perform an SOT Query at every transition in the raster line

In this version of the Trapezoidal Span Rasterization Method, spans are processed from left to right, but occlusion processing treats each span as a unit, not as a separate span top and a span bottom. To do this, SOT Regions are bounded on the right and left by a visibility transition on either span tops or span bottoms.

FIG. 43 shows an enlarged version of the example spans $S_1$ 4301 and $S_2$ 4302 from FIG. 40. At the start of this example, $S_1$ 4301 is the Present Span, $S_P$, and $x_{1LB}$ 4304 is the current x-coordinate, $x_{CL}$. Hence, the raster line has been rendered up to $x_{1LB}$ 4304, including the part of $S_1$ 4301 between $x_{1LT}$ 4303 and $x_{1LB}$ 4304. The Current Span, $S_C$, is the part of $S_P$ (i.e., $S_1$ 4301) to the right of $x_{CL}$ (i.e., $x_{1LB}$ 4304) that has the same visibility characteristic, namely the part between $x_{1LB}$ 4304 and $x_{1RT}$ 4306 (making $x_{1RT}$ 4306 the value for $x_{CR}$). The visibility characteristic for $S_1$ 4301 changes at $x_{1RT}$ 4306 because to the right, the span 4301 does not occlude more distant geometry, while to the left of that prior 4306, it does. The SOT Region 4308 for this $S_c$ is shown in FIG. 43 and described by Equation 123.

$$F_{nQ} = F_{nV} \hat{F}_{nQ}(n \neq S_C)\hat{}$$
$$[(x_{nLT} < x_{CR})v(x_{nLB} < x_{CR})]\hat{}[(x_{nRT} < x_{CL})v(x_{nRB} < x_{CL})]$$
$$\hat{}[[(x_{nLT} < I_{CFT}) v (I_{nLB} < I_{CTR})]v$$
$$[(I_{nRT} < I_{CPT})v(I_{nRB} < I_{CTR}))]]$$
$$F_{nQ} = F_{nV} \hat{F}_{nQ}(n \neq 1)\hat{}[(x_{nLT} < x_{1RT})$$
$$v(_{nLB} < x_{1RT})]\hat{}[(x_{nRT} < x_{1LB})v(x_{nRB} < x_{1LB})]$$
$$\hat{}[[(x_{nLT} < z_{temp1})v(z_{nLB} < z_{1LB})]v(x_{nRT} < z_{tem1})v(z_{nRB} < z_{1LB})]] \text{ (Eq 123)}$$

There are two different x-value used in this query, $x_{CGT}$ and $x_{TPB}$, because the span portion being tested for occlusion has different depth values for its top and bottom. The value for $z_{CFT}$ is set to the maximum x-value of the span top within the x-coordinate interval of $S_C$, which happens to be x-coordinate with the value $x_{1LB}$ 4304, labelled $z_{temp1}$ 4309. The value $z_{temp1}$ 4309 is computed using the span derivative for $S_1$ 4301. Similarly, the value for $z_{CFB}$ is set to the maximum x-value of the span bottom within the x-coordinate interval of $S_C$, and the value is $z_{1LB}$ 4310. The SOT Query finds $S_2$ 4302, and is 4302 is made $S_N$.

By a rule similar to Rule 3 2400 of the Segment Span Rasterization Method 2100, $S_P$ (i.e., $S_1$ 4301) is rendered from $x_{CL}$ (i.e., $x_{1LB}$ 4304) to the leftmost point of $S_N$ (i.e., $S_2$ 4302), which is $x_{2LB}$ 4304. Over this interval, the visibility characteristic does not change for the raster line. That is, $S_1$ 4301 is the only geometry that is visible within the interval.

The value of $x_{CL}$ is changed to $x_{2LB}$ 4311, and $S_C$ is the top edge of $S_1$ 4301 from $x_{2LB}$ 4311 to $x_{2LT}$ 4312 combined with the bottom edge of $S_2$ 4302 over the same interval. The valid for $S_N$ is set to invalid. For this $S_C$, the visibility characteristic is consistent in that it includes $S_1$ 4301 gradually being covered by $S_2$ 4302 over its entire width. The corresponding Query Region 4313 is over the interval of $S_C$ in the x-coordinate dimension. But, in the z-coordinate dimension, span top coordinates are tested to see if they are in front of a $z_{temp2}$ 4314 and span bottom coordinates are tested to see if they are ignorant of $z_{2LT}$ 4316. The coordinates $z_{temp2}$ 4314 is the x-coordinate of the span top of $S_1$ 4301 at x-coordinate $x_{2LB}$ 4304. This Query Region 4313 needs to include a search for span tops that are between $z_{temp2}$ 4314 and $z_{2LT}$ 4316 because a span with its left top corner in this range would be visible. The query operation is shown as Equation 124.

$$F_{nQ} = F_{nV} \hat{F}_{nQ}(n \neq S_C)\hat{}$$
$$[(x_{nLT} < x_{CR})v(x_{nLB} < x_{CR})]\hat{}[(x_{nRT} < x_{CL})v(x_{nRB} < x_{CL})]$$
$$\hat{}[[(z_{nLT} < z_{CFT})v(z_{nLB} < z_{CFB})]v[(z_{nRT} < z_{CFT})v(z_{nRB} < z_{CFB})]]$$
$$F_{nQ} = F_{nV} \hat{F}_{nQ}(n \neq 1)\hat{}(n \neq 2)$$
$$\hat{}[(x_{nLT} < x_{2LT})v(x_{nLB} < x_{2LT})]\hat{}[(x_{nRT} < x_{2LB})v(x_{nRB} < x_{2LB})]\hat{}$$
$$[[(z_{nLT} < z_{temp2})v(z_{nLB} < z_{2LB})]v[(z_{aRT} < z_{temp2})v(z_{nRB} < z_{2LB})]] \text{(EQ 124)}$$

In this example, the Query Region 4313 finds nothing, so $S_N$ remains invalid.

By a rule similar to Rule 2 2300, $S_C$ is not hidden, so it is rendered, resulting in a blending of $S_1$ 4301 and $S_2$ 4302 over the entire width of $S_C$. The rule then "checks for" the equivalent of an abutting span, and this is known to exist because $S_2$ 4302 continues to the right from $x_{2LX}$ 4312. Therefore, $S_C$ is set to the part of $S_2$ 4302 between $x_{2LT}$ 4312 and $x_{2RT}$ 4318, and $x_{CL}$ is set to $x_{2LT}$ 4312. Once again (as always for this version of the method), $S_C$ has a consistent visibility characteristic over its entire width. The Sot region 4320 for this $S_C$ is shown in FIG. 43 and described by Equation 125. The value $x_{temp3}$ 4322 is the x-value of the span bottom of $S_2$ 4302 at the x-coordinate $x_{2LT}$ 4312.

$$F_{nQ}F_{nV}\hat{F}_{nQ}(n \neq S_C)\hat{}[(x_{nLT} < x_{CR})v(x_{nLB} < x_{CR})]\hat{}$$
$$[(x_{nRT} < x_{CL})v(x_{nRB} < x_{CL})]\hat{}[[(x_{nLT} < z_{CFT})v(z_{nLB} < z_{CFB})]v$$
$$[(z_{nRT} < z_{CFT})v(z_{nRB} < z_{CFB})]]$$

$$F_{nQ} = F_{nV}\hat{F}_{nQ}(n \neq 2)\hat{}[(x_{nLT} < x_{2RT})v(x_{nLB} < x_{2RT})]\hat{}$$
$$[(x_{nRT} < x_{2LT})v(x_{nRB} < x_{2LT})]\hat{}[[(x_{nLT} < z_{2LT})v(z_{nLB} < z_{temp3})]v$$
$$[(x_{nRT} < z_{2LT})v(z_{nRB} < z_{temp3})]]$$

The rasterization of the spans in this raster line would continue from this point. This version of the method also has rules analogous to Rule 1 2200, Rule 4 2500, and Rule 5 2600.

In general, this version of the method takes spans, and subdivides them horizontally in order to create sections that have a consistent visibility characteristic. This means that the endpoint regions of a span (the part that does not occlude distant geometry, such as the endpoints 3912 and 3914 in FIG. 39) are treated separately from the central portions of the span. This causes more query operations to be needed, but can be done in a single occlusion process.

This version of the Trapezoidal Span Rasterization Method Requires more fields per SMCCAM Word 900 because there are four fields per endpoint rather than just two. Additional comparison logic is also needed in the Word Number Field 802 because it 802 must be able to check inequality with a Current Span that is the combination of two trapezoidal spans. In the above example, the value of $S_C$ corresponding to the Query Region 4313 covering $x_{2LB}$ 4310 to $x_{2LT}$ 4312 is the combination of $S_1$ 4301 and $S_2$ 4302. Hence, the SOT Query must check for both ($n \neq 1$) and ($n \neq 2$), thereby requiring two inequality comparisons during that query operation. This version of the method has the advantage of needing only one word 900 to store a span.

Version 3: More comparisons per word to allow more complex SOT Regions

In this version of the Trapezoidal Span Rasterization Method, occlusion processing treats each spans as a unit, just as in Version 2. However, this version performs more comparison operations in each SMCCAM Word 900, thereby providing the ability to make more complicated SOT Regions. Rather than splitting spans of every visibility transition. The Current Span. SC, can contain one visibility transition. In essence, an SOT Region for this version is the union of two SOT Regions as defined in Version 2. FIG. 44 shows the same two spans 4401 and 4402 as shown in FIG. 43, and an SOT Region 4404 that is the union of two SOT Regions 4313 and 4320 from Version 2 of the method. To perform this SOT Query, the query operation is the disjunction (i.e., logical "or") of the right sides of Equation 124 and Equation 125.

To perform the more complicated query function to generate the SOT Region 4404, the fields in each SMCCAM Word 900 each need to perform two comparison operations in parallel (if the two operations are done sequentially, then it is the same as Version 2). This makes the hardware more complicated, but will reduce the time to perform occlusion processing by about a factor of two.

Version 4: Use a looser approximation of the Occluding Region

Another choice to reduce the occlusion processing time is to use a looser approximation of the Occluding Region. For example, the "L-shaped" SOT Region 4404 in FIG. 44 (which is a good approximation) can be made into a simple rectangular region by increasing in its area. FIG. 45 shows the same tow spans 4501 and 4502 as shown in FIG. 44, and an SOT Region 4504 that is larger and simpler than the SOT Region 4404 from Version 3 of the method. The SOT Query that generates this SOT Region 4504 is the combination of Equation 124 and Equation 125 such that the looser constraint is used for each field. The query operation is:

$F_{nQ} = F_{nV} \hat{\ } F_{nQ}\hat{\ }(n \neq S_C)\hat{\ }$ $[(x_{nLT} < x_{CR}) v (x_{nLB} < x_{CR})] \hat{\ } [(x_{nRT} < x_{CL}) v (x_{nRB} < x_{CL})]$ $\hat{\ }[[(x_{nLT} < z_{CFT}) v (z_{nLB} < z_{CFB})] v [(x_{nRT} < z_{CFT}) v (z_{nRB} < z_{CFB})]]$ $F_{nQ} = F_{nV} \hat{\ } F_{nQ}\hat{\ }(n \neq 1)\hat{\ }) n \neq 2)\hat{\ }$ $\hat{\ }[(x_{nLT} < x_{2RT}) v (x_{nLB} < x_{2RT})] \hat{\ } [(x_{nRT} < x_{2LB}) v (x_{nRB} < x_{2LB})]\hat{\ }$ $[[(x_{nLT} < z_{temp2}) v (z_{nLB} < z_{2LB})] v [(z_{nRT} < z_{temp2}) v (z_{nRB} < z_{2LB})]]$ (Eq. 126)

When this looser approximation is used for the SOT Region 4504, more Potentially Occluding Spans (on the average) that are actually hidden will be found, thereby reducing performance. However, this may yield a net gain because the number of query operations is reduced.

Transparency

The Span Sorting Rendering Architecture 500 can render transparent geometry that can be seen through) by generating its spans in the same way as those for opaque geometry. Translucency can be handled in a similar way, but this document focuses on transparency. To aid in the rasterization process, the transparency of each span is marked in the Span Memory 408 by one of three methods: 1) another flag bit, $F_{aT}$, is added to each word 900; 2) a bit in the Information Pointer Field 814; or 3) another field, a Translucency Field, is added to each word 900. The opacity coefficient (i.e., the amount of light transmitted by the transparent geometry) is stored in the Polygon Information Memory 514 along with the other color information.

There are various ways to handle transparent spans within the rasterization method presented in this document. As an aid in the following explanations. FIG. 46 (a modified version of FIG. 11) shows a set of segment spans 4600 to 4613 in a raster line where the visible opaque surfaces are shown as thick black lines and the visible portions of the transparent spans 4602, 4605, and 4607 are shown as thick shaded lines. This section of the document users an example with segment spans, but the transparency methods can be applied to trapezoidal spans and quadrilateral spans.

Version 1; Keeping visibility characteristic consistent ever the Current Span

This version of the method keeps the visibility characteristic of the Current Span. $S_C$, consistent by making $S_C$ smaller, if necessary, when a transparent span occludes it. The method follows the frontmost opaque spans, and adds in the effect of transparent spans if they are found to occlude $S_C$.

For example, in FIG. 46, when the SOT Query for $S_1$ 4601 finds the transparent span $S_2$ 4602, $S_C$ is changed to the part of $S_1$ 4601 between $x_{1L}$ 4624 and $x_{2L}$ 4626, and $S_1$ 4601 is also kept at the Saved Span, $S_S$, so that its part to the right of $x_{2L}$ 4624 will be the next $S_C$. When this part becomes $S_C$ (i.e., the part of $S_1$ 4601 between $x_{JL}$ 4626 and $x_{3L}$ 4628), its SOT Query also finds $S_2$ 4602, and the combination of $S_1$ 4601 and $S_2$ 4602 is rendered. The combination of $S_3$ 4603 and $S_2$ 4602 is processed in a similar way.

When $S_4$ 4604 is reached, it is first processed as its part located between $x_{4L}$ 4630 and $x_{5L}$ 4632 and includes the effect of $S_2$ 4602. Then, when $S_C$ is the portion of $S_4$ 4604 to the right of $x_{5L}$ 4632, the SOT Query finds both $S_5$ 4605 and $S_6$ 4606. At this point, the method and apparatus can be designed to either: 1) read the leftmost opaque occluding span; 2) read the leftmost transparent occluding span; or 3) read the leftmost span or either type. The first of these choices is assumed here. Hence, by a rendering rule similar to Rule 3 2400, $S_C$ is reduced to the portion of $S_4$ 4604 between $x_{5L}$ 4632 and $x_{6L}$ 4634. But, before $S_C$ is rendered, transparent spans in the SOT Region are read, thus obtaining $S_5$ 4605. Because $S_5$ 4605 covers all of $S_C$ (i.e., $S_4$ 4604 between $x_{5L}$ 4632 and $x_{6L}$ 4634), $S_C$ is not further divided, and is rendered as the combination of $S_4$ 4604 and $S_5$ 4605 over the interval from $x_{5L}$ 4632 to $x_{6L}$ 4634. Within the same rendering rule, $S_6$ 4606 is made $S_P$, and all of it 4606 is designated as $S_C$.

The span $S_6$ 4606 is processed similarly to $S_4$ 4604 in that its first portion, from $x_{6L}$ 4634 to $x_{7L}$ 4636, is combined with the transparent span $S_5$ 4605. Its second portion, from $x_{7L}$ 4635 to $x_{8L}$ 4636, is combined with the transparent span $S_7$ 4607. And, its third portion, to the right of $x_{8L}$ 4636, is hidden, and then $S_7$ 4607 becomes $S_P$. From $x_{8L}$ 4636 to the right, the spans are processed be desired its previous section because there are no more transparent spans.

Version 2: Dividing the raster line into places where depth visibility changes

This version of the method follows, in left-to-right order, the frontmost spans whether they are opaque or transparent. When opaque spans are rendered from left to right up to the x-coordinate where a visible transparent spans starts, rendering of the opaque spans is temporarily suspended (in essence, that rendering process is pushed onto a stack), and rendering shifts to the transparent span. Then frontmost transparent spans are rendered from left to right until either: 1) the transparent spans and at an x-coordinate where either only opaque spans or no spans exist; or 2) the frontmost transparent span is occluded by an opaque span. At that point, rendering returns to the rendering of opaque spans that were temporarily suspended (the rendering process stack is popped).

As transparent spans are rendered, they are deleted from the Span Memory 408 in order to keep them from being re-rendered later in the method. Because a transparent span can transition from visible to hidden and then become visible again as the method renders farther to the right, the visible part that is already rendered needs to be deleted to keep it from being re-rendered. This can be done by overwriting the transparent span in the Span Memory 408 and changing its left endpoint. Thus, when a transparent span is rendered, if it is rendered to its right endpoint, it is deleted completely. When a transparent span is partially rendered, only the rendered part is deleted.

In portions of the raster line that have one visible transparent span, the stack-oriented approach renders the transparent spans first, then the opaque spans. In ports of the raster line that have two visible transparent spans (one in front of the other), the stack-oriented approach renders the frontmost transparent spans first, then the second from the front transparent spans, and finally the opaque spans. As long as the rendering process stack does not overflow, this method can render any depth of visible transparent spans.

The raster line can be thought of as being divided into pieces at x-coordinate locations where the visibility depth changes (e.g., from one to two, from two to three, from two to one, etc.). Within these pieces, visible spans are rendered in a front-to-back order. Having the rendering done in front-to-back order allows pixel color values to be correctly blended. This is in contrast to prior art methods (such as the Z-buffer technique) that renders geometry in random order.

Using the spans shown in FIG. 46 as an example, this version of the method renders the visible portions of $S_0$ 4600 and $S_1$ 4601 up to $x_{2L}$ 4626. At that point in the method, $S_C$ is the portion of $S_1$ 4601 between $x_{2L}$ 4626 and $x_{3L}$ 4628, and it is pushed onto the rendering process stack. Next, the transparent spans $S_2$ 4602 $S_5$ 4605, and $S_7$ 4607 are rendered from $x_{2L}$ 4626 to $x_{8L}$ 4636. As these spans are rendered, $S_2$ 4602 is deleted, $S_5$ 4605 is deleted, $S_3$ 4605 is deleted, and part of $S_7$ 4607 is deleted by changing its left endpoint to ($x_{8L}$, $x_{temp1}$) 4640. Next, the rendering process stack is popped, and $S_C$ is restored to the portion of $S_1$ 4601 between $x_{2L}$ 4626 and $x_{3L}$ 4628. There, rendering of opaque spans resumes, and the visible portions of spans $S_1$ 4601, $S_3$ 4603, $S_4$ 4604, and $S_6$ 4606 are rendered from $x_{2L}$ 4626 to $x_{8L}$ 4636. The next $S_C$ is set to all of $S_8$ 4608, and the balance of the opaque spans are rendered. The remaining piece of $S_6$ 4606 is hidden, so the method avoids reading it 4606 from the Span Memory 408.

Version 3: Perform multiple passes

In this version of the method, a multiple pass strategy is used. In the first pass, all the opaque geometry is rendered with the previously described method of this document. At the end of rendering the opaque spans, all the Valid Flags 816 for the opaque spans have been turned off. Then, in the second pass that renders the transparent spans, the Valid Flags 816 for all the opaque spans are turned on, and each transparent span is then sequentially tested to determine if it is occluded by an opaque span, and then its visible portions are rendered.

As a possible option, as an opaque span is rendered, a query is done to find all transparent spans that are completely behind the opaque span and de-assert the Valid Flags 816 of such transparent spans. This reduces the number of transparent spans that are processed and are hidden, but increases the processing the processing required by each opaque span by adding another query. To reduce this overhead, the query that invalidates transparent spans can be done once after every set of abutting opaque spans. Hence, when the rendering of a set of abutting spans ends, the maximum z-value of any of the visible portions of spans in the set is used as the minimum z-value in the query to find hidden transparent spans. This option is assumed in the example described in the next paragraph. This option may consider a single span as a one-span set for use as occluding transparent spans.

Using the spans shown in FIG. 46 as an example, in the first pass of this version of the method renders the visible portions of $S_0$ 4600, $S_1$ 4601, $S_3$ 4603, and $S_4$ 4604. At tis point in the method, rendering of a set of abutting spans has ended, and transparent spans hidden by the set are invalidated by a query that finds transparent spans completely within the x-coordinate range of $x_{1L}$ 4624 to $x_{6L}$ 4634 and having the x-value of both its endpoints greater than $x_{temp2}$ 4642. Next, the visible part of $S_6$ 4606 is rendered. Then, the abutting span set of $S_8$ 4608 and $S_{10}$ 4610 is rendered, and a query is dose to invalidate the transparent spans behind the set. Likewise, when $S_{11}$ 4611 and $S_{12}$ 4612 are rendered, the same sort of query is done. The other opaque spans in the raster line are processed normally. At the beginning of the second pass, all the Valid Flags 816 of the opaque spans are asserted, and then the transparent spans are sequentially processed in a left-to-right order. In the example, $S_2$ 4602 is read from the Span Memory 408, an SOT Query is done for it 4602 which finds no occluding spans, and it is therefore rendered. The span $S_6$ 4606 is processed similarly. For $S_7$ 4607, its SOT Query finds $S_8$ 4608, so $S_7$ 4607 is only rendered up to $x_{8L}$ 4636. Since no other transparent spans are left, this raster line has been completed.

An optional change to this version of the method is to store the transparent spans in a memory separate from the Span Memory 408. Then, in the second pass, each transparent span is read from this separate memory, has an SOT Query done for it, and has its visible parts rendered.

Additional considerations for transparencies

Polygon coloration is frequently described by texture maps. Some texture maps are defined to have some pixels the 100% transparent (perfectly clear). A typical example use of such a texture map is an image of a tree mapped onto a rectangular "billboard-type" polygon (billboard polygons automatically rotate to face the viewing point), where the corners of the rectangle are clear, and holes within the tree's image can occur. Polygons with such texture maps need to have their spans processed as transparent spans. This is because they do not completely occlude all the geometry behind them. Hence, when a polygon uses a texture map with transparent pixels, spans is that polygon are assumed to be transparent, and the texture map dictates the opacity coefficient for each of its pixels.

When trapezoidal spans for quadrilateral spans) are sued, spans that include corners and edges of polygons that have either a span top or span bottom but not both, can be processed as transparent spans. This can be done because spans of this type do not completely occlude more distant spans, just as transparent spans do. Hence, this section of the document on transparency can be used to process spans that only partially cover the vertical height of the raster line.

Spans Represented by Quadrilaterals

Representing spans with trapezoids has the disadvantage of requiring the location of four points in x—x plane (not precisely a plane, it has the thickness of one raster line), which, in turn, requires lots of bits of memory. This is especially true if the x-values are 32-bits each.

In order to reduce the memory requirements, the endpoint location of a span can be approximated by two x-values and one x-value. In essence, the two points that describe the endpoint have the same z-coordinate, but have different x-coordinates. Therefore, the number of fields for storing coordinates is reduced from eight to six. This introduces a small amount of error in the antialiasing methods described above, but the error is only significant for polygons that are nearly parallel to the x-z plane. For these polygons, the look direction is very close to being a tangent to the plane of the polygon. However, for most applications, this errors is acceptable because the projection of these polygons onto the viewing plane 102 has not changed.

FIG. 47 shows the trapezoidal spans $S_1$ 4701, $S_3$ 4703, and $S_4$ 4704 as dashed lines, and shows the quadrilateral approximations of these spans, $S'_1$ 4711, $S'_3$ 4713, and $S'_4$ 4714 as solid lines. In this figure, endpoints for the quadrilateral spans are always a horizontal line segment. FIG. 48 is similar to FIG. 40, except that all the trapezoidal spans have been replaced by their trapezoidal approximation. Note that some of the trapezoidal spans appear to fold over themselves. Trapezoidal spans can be processed by similar methods to those described in this document for trapezoidal spans.

Eliminate Current Polygon Memory 406 and read from Sort Memory 404

By adding more "smarts" to the Bucket Sort Processor 504, the Current Polygon Memory 406 and the Current Polygon Processor 506 can be eliminated. FIG. 49 shows the Span Sorting Rendering Pipeline with Direct Span Generation 4900, where the process 1600 data from Bucket Sort Memory and Current Polygon Memory 406 have been eliminated (when compared to the Span Sorting Rendering Pipeline 400) and the Bucket Sort Memory 404 has been changed to the Sort Memory 4904. As polygons are generated by the process polygon 1400 portion of the pipeline 4900, their parameters are written into the Sort Memory 4904. Keeping track of the polygons which affect the current raster line is done by maintaining a list of pointers into the Sort Memory 4904, rather than copying the polygon parameters to a separate memory (the Current Polygon Memory 406). This is accomplished by feeding polygons, at high speed, directly from the Bucket Sort Processor 504 to the Span Generation Processor 508, as shown in the Span Sorting Renderer Architecture with Direct Span Generation 5000. This has the disadvantage of accessing the Sort Memory 4904 at a much higher rate, thus probably requiring the Sort Memory 4904 to be fast memory, rather than slow memory.

A decision to use this alternative must be based on an engineering decision between a large fast memory (the Sort Memory 4904) versus having both a large slow memory (the Bucket Sort Memory 404) coupled with a small fast memory (the Current Polygon Memory 406). However, in the extreme case where every polygon can affect on particular raster line, the Current Polygon memory 406 would need to be as large as the Bucket Sort Memory 404, and therefore it may be necessary to have a large fast memory even when a separate Current Polygon Memory 406 is used.

Alternate Representation of Polygons using Derivatives

As a possible improvement, an alternate set of parameters can be used for polygons and spans that make additional use of derivatives. For example, as shown in FIG. 51, a triangle can be represented by the parameters: 1) (x, y, z) at one vextex 5102, 2) (x,y) at a second vertex 5104; 3) y at the third vertex 5106; 4) δx/δy for each of the three edges 5108, 5110, 5112 of the triangle, rather than the more usual representation of (x, y, z) of each of the three vertices 5202, 5204, 5206, as shown in FIG. 52. In both cases, the number of parameters of the triangle is nine. The improvement is significant because the edge derivatives 5108, 5110, 5112 are needed for edge walking in both representations (i.e., in FIG. 51 and FIG. 52), and must be computed and stored. Hence, utilizing fewer vertex coordinates (as in FIG. 51) saves memory.

On-the-fly Generation of Subspans

As shown in FIG. 38, multiple segment spans can used within a raster line to enhance anitializing. The key disadvantage with having multiple multiple segment spans per raster line is requiring either 1) a corresponding multiplication of the processing performed for each raster line; 2) a corresponding multiplication of the hardware, including the Span Memory 408, or 3) some combination of multiplication of the processing and multiplication of the hardware.

As a possible improvement for trapezoidal spans and quadrilateral spans, the spatial data structure can store the parameters of the entire span, and when the span is read form the data structure, a set of subspans is generated on the fly, where these subspans are vertically distributed over the height of the full span, and each subspan is a segment span. An example of this is shown in FIG. 53, where eight subspans are shown for the span 5300. The left endpoints, $x_L[0]$ 5302, $x_L[1]$ 5304, $x_L[2]$5306, $x_L[3]$5308, $_L[4]$5310, $x_L[5]$ 5312, $x_L[6]$ 5314, and $x_L[7]$5316, of each subspan are generated utilizing a vertex's coordinates, edge derivatives, and the y offset from the vertex. The right endpoints, $x_R[0]$ 5322, $x_R[1]$ 5324, $x_R[2]$ 5326, $x_R[3]$ 5328, $x_R[4]$ 5330, $x_R[5]$ 5332, $x_R[6]$ 5334, and $x_R[7]$ 5336, are generated in a similar manner. When subspans are used, the locations of the endpoints are stored in the Span Parameters Registers 3104, which need to be expanded to store the additional information.

When subspans are used, the rule for comparing the Current Span Portion to the New Span are applied on a subspan-by-subspan basis, thereby providing additional polygon edge information within a raster line, which, in turn, provides antialiasing. Once again, for real-time performance, the spatial data structure can be stored in a SMCCAM. When a portion of a span is determined to be visible due to a portion of the span's subspans being visible, those subspan portions must be sent to the Rasterize Processor 512. However, only the right endpoints of the visible subspan portions need to be sent. An example of a visible span portion 5400 is shown in FIG. 54, and its right endpoints are shown as: $x_R[0]$ 5402, $x_R[1]$ 5404, $x_R[2]$ 5406, $x_R[3]$ 5408, $x_R[4]$ 5410, $x_R[5]$ 5412, $x_R[6]$ 5414, and $x_R[7]$ 5416. The left endpoints do not need to be sent to the Rasterize Processor 512 because the left endpoints are equal to the right endpoints of the previously sent visible span portion. Hence, the sequence of sets of right endpoints can be thought of as a "wave" traveling along the length of the raster line, where the "wave-front" can be an arbitrary shape. Special care must be taken to prevent "holes" from developing, and therefore disturb the "wave-like flow". This is done by finding the visible subspan at the leftmost point among the most recently sent set of right endpoints. In the example of FIG. 54, the next visible span portion must be located at the points $x_R[3]$ 5408.

Alternate Representation of Trapezoidal Spans

The minimum number of queryable parameters for a span stored in the Span Memory 408 are 1) the leftmost x-value of the span, $x_L[r_{MinX}]$ 5502; 2) the rightmost x-value of the span, $x_R[r_{MaxX}]$ 5504; and 3) the frontmost z-value of the span, $z_{Min}$ 5506, which could be located at any corner of the span. These three parameters should be stored in fields within the SMC-CAM that can perform arithmetic comparisons. However, it is also important for it to be easy to generate, form the span parameters, the subspan endpoints for the span, as well as z-values along any point along any subspan within the span. The calculations need to generates two types of results: 1) x-values at any points within the span or along its edges; and 2) the x-values that define the projected edges of the span. A reference point, $(x_{Ref}, z_{Ref})$ 5508, as shown in FIG. 55, can be located at the uppermost subspan y-value within the raster line (even if the span does not touch that part of the raster line). Once this reference point 5508 is known, the z-value of the span at any location can be computed from the x and y offsets from this reference point 5508 and the derivatives, $\delta x/\delta y$ 5510 and $\delta x/\delta x$ 5512, of the original polygon. The projected edges of the span must be able to be computed in a similar manner, and many choices for parameters are possible, and one possible choice includes: 1) the edge derivatives $\delta x_R/\delta y$ 5514 and $\delta x_L/\delta y$ 5516; 2) the uppermost subspan location, $r_{Top}$ 5518; 3) the lowermost subspan location, $r_{Box}$ 5520; 4) $r_{MinX}$ 5522, the subspan location that includes the rightmost x-value of the span, $x_L$ [$r_{MinX}$] 5502; and 5) $r_{MaxX}$ 5524, the subspan location that includes the rightmost x-value of the span, $x_R$[$F_{MaxX}$] 5504.

If a raster line includes the corner of a polygon, then the span will not have the shape of a trapezoid. An example of this is shown in FIG. 56, where the middle (in an up-down sort) corner is included. Since the resulting span in this example would have five sides, and therefore can not be modeled as a trapezoid, the span is split into two spans: 1) the upper trapezoid 5602; and 2) the lower trapezoid 5604. When an uppermost corner or a lowermost corner of a polygon is included, then the span is modeled as a degenerate trapezoid, where two of the four corners are identical.

Similar alternate representations can be used for quadrilateral spans.

Preservation of Rendering Order

For some applications, the order of rendering must be preserved. A typical example is the "painter's algorithm" (see Foley Reference, page 674) as used in computer windowing systems. To render an inner rectangle with a boarder, first the boarder is rendered as a filled rectangle, then the inner rectangle is rendered, over-writing most of the pixels in the boarder rectangle. If the rendering order of these two rectangles is reversed, then the entire area will have the color of the boarder rectangle because the inner rectangle will be completely over-written. If these two rectangles have a distinct placement due to different z-coordinates, then they will be rendered correctly. However, if no z-coordinate is specified (the default would be the depth of the viewing plane 102), then the order must be preserved. This can be done by having the Bucket Sort Processor 504 and the Current Polygon Processor 506 maintain the order in which they are received from the Polygon Processor 502. The Query Processor would maintain the rendering order by placing spans for later input polygons into later positions in the span list. Then, at rendering proceeds, rendering order is preserved because, in the case of ties in z-coordinate, spans earlier in the list will be rendered first and later geometry with the same z-coordinate will be assumed to be hidden.

Method and Apparatus Options and Possible Enhancements

Add to single buffered VGA graphics card

The video output for computers (for example, VGA and SVGA interfaces on IBM compatibles) generally includes a frame buffer memory that stores the pixel information sent to the display device (i.e., the CRT). The 3D graphics rendering methods and/or apparatus described here can be added to such a display system. The CPU (or DMA controller) writes geometry into the renderer, and it gets processed and stored into the Bucket Sort Memory (which may need to be double buffered). When the geometry is done being written, the rest of the pipeline synchronizes to the computer display, and generates spans before they are needed, overwriting the previous frame's data in the computer's frame buffer. Hence, a low cost, but high performance, 3D graphics accelerator can be added to a computer without adding more memory to the frame buffer.

Turn off antialiasing on specific polygon edges

The antialiasing method described above assumes that every polygon has independent color values; and when abutting spans are found, the pixels the include both of the spans need to have their colors be a blend from the two polygons. However, polygons that share an edge often have exactly the same color information along the edge. For example, this occurs for Gouraud shaded polygons that have the same color and surface normal information at both ends of the same polygon edge. For these types of edges, the pixel blending can be ignored because two identical colors will be blended together. Such polygon edges can be tagged as "skip antialiasing" when they are supplied to the renderer. Then, if such edges are found so be part of an abutting span pair, the pixel color value for one of them (say, the one on the right) is skipped, thereby saving computation. Edges that are tagged but are not part of an abutting span pair are processed by the antialiasing methods described above. Prior art renderers can not taken advantage of this saving because they do not search for abutting spans or polygons. That is, prior art renderers generally assume every polygon is independent from all other polygons. If tagging is not done (due possibly to constrains imposed by the interfacing software), the Span Sorting Rendering Pipeline 400 can automatically generate such tags for edges within polygon meshes and strips where an edge shared between two polygons has the same color information for both polygons.

Store edge pairs rather than polygons in Bucket Sort Memory 404

Rather than store polygons in the Bucket Sort Memory 404, polygon edge pairs can be stored. This means polygons are horizontally sliced so that each horizontal strip of a polygon does not contain any polygon corners. Hence, polygons are horizontally sliced at the y-coordinate (or nearly raster line boundary) of corners that are at neither $y_{START}$ or $y_{END}$. This polygon slicing makes downstream processing easier by eliminating the need to test for when to change to a new edge at the corner of a polygon.

Front and rear clipping planes

By adding clipping planes, the view volume (shaped as an infinite pyramid) is changed into a frustum. Right before spans are written into the Span Memory 408, the z-value of their endpoints are compared to the z-location of the front and rear clipping planes. If both endpoints are nearer then the front clipping plane or farther than the rear clipping plane, then the span is discarded. If one endpoint is farther than the rear clipping plane, then that end of the span is shortened so that its endpoint is on the rear clipping plane. If one endpoint is nearer than the front clipping plane, then that end of the span is shortened so that its endpoint is on the front clipping plane. This requires a set of comparators to be added to the either the Span Generation Processor 508 or the Query Processor 510.

Multiple arbitrary clipping planes

An arbitrary clipping plane could be done the same way as simple front and rear clipping planes, except, right before a span in written into Span Memory 408, Span Interaction Parameters between the span and the span of clipping plane are generated, and these are used, as described above, to determine the Span Interaction Type (SIT). The span is then kept, clipped or discarded depending on the SIT.

This could also be done by adding dummy spans into the Span Memory 408 that represent the location of an arbitrary clipping plane. Then the rasterization methods described above could be altered to make sure all rendered spans are behind these dummy spans.

Geometry Cache

A memory at the input to the pipeline could be added to store geometry as it is input for rendering. Then, when subsequent scenes are rendered, this stored (or "cached") geometry can be re-rendered (with possibly changed translation matrices), thereby saving cycles on the system bus. This could solve a bottleneck caused by having a rendered that can process more geometry per second than the host computer bus can support. It can only be applied to geometry that has not changed shape since its previous rendering. "Squishy" objects would generally need to be supplied to the rendered for every scene.

Use only one page of Span Memory 408

It is possible to sue only one page of Span Memory 408. This is done by shifting valid spans toward upper words, leaving lower words invalid. Then, as new spans are generated, store them into the lower words. This strategy can be thought of as a single bank of memory that is separated into two pages by a moving boundary. This can be done because, as a raster line is processed, spans are deleted, while the simultaneous process of preparing for the next raster line generates spans.

As an alternate approach, the fixed Word Number Field 802 can be changed to a variable Tag Field. Unique (and random will do) tags for each span are written into the Tag Field, and designate if: 1) a span is in the current raster line or the next raster line; and 2) be a unique identifier for the span. Furthermore, the Tags can be included in the query process such that spans from the current raster line can be intermixed with those in the next raster line. As long as spans in the same raster line are kept in order with respect to each other, then spans from an unrelated raster line can be intermixed as long as they are ignored. This could be done by maintaining two sets of Valid Flags 816, one for each raster line. Spans from more raster lines could be simultaneously maintained by adding more sets of Valid Flags 816.

Separate Read and Write Busses in the Span Memory Page

The circuit for the SMCCAM Cell 3400 or 3500 can be modified to have both an input bus and an output but. This allows simultaneous read and write operations. The is specially useful if there is only one page of Span Memory 408 as described in the previous section.

Computing SIP and SIT only when bounding boxes everlap

Rather than computing the SIT for every New Span, $S_N$, compute is sequentially with less hardware only when bounding boxes overlap. This sacrifices time in order to save circuitry.

Split raster line into smaller places to save on SMCCAM memory

The total number of words in the Span Memory Page 800 imposes a link on the number of spans that can be processed for a given raster line. This limitation can be overcome by conditionally splitting the raster line in half (or more pieces if necessary), and passing through the span data twice. This decision can be done on the fly as a scene is rendered or by an a priori decision before rendering starts.

Have an overflow RAM to save spans that are shifted out during sort operations

Rather than splitting the raster line in to pieces, the Span Memory Page 800 can be augmented with an "overflow RAM" that stores spans as they are shifted out of the last SMCCAM Word 900. Shifted out spans would start at far right of raster line, so the left side of the raster line could be processed normally until $x_{CL}$ gets to left of leftmost shifted out span. Then, shifted out spans could be re-written into the Span Memory Page 800 because may spans have been deleted (i.e., invalidated) by the rasterizing process.

Inclusion rendering primitives other than polygons

Geometry primitives other than polygons (such as CSG primitives) can be processed by the Span Sorting Rendering Pipeline 400. This can be done as long as the $y_{START}$ and $y_{END}$ parameters can be computed (so the primitive can be stored into the Bucket Sort Memory) and spans with bounding boxes can be generated. The corners of the bounding box are used as the Span Parameters, and SOT Queries can be used to find the visible portions of the bounding boxes. Another set of Span Interaction Types would be needed for the specific set of geometry primitives.

Low cost version can use CPU for front end

The host CPU, or a dedicated generally-purpose processor, could perform the tasks of the Polygon Processor 502, thus feeding geometry in screen coordinates (in object-precision) to the rest of the pipeline. Similarly, such a CPU could perform more of the front end of the pipeline 400. For example, a CPU and its general purpose memory could perform the tasks of the Polygon Processor 502, the Bucket Sort Processor 504, and the Bucket Sort Memory 404, and feeding polygons that start on the present raster line to the rest of the pipeline.

Alternate sorting mechanism could use up-counting tag

The Word Number Field 802 could be replaced with a conditional up-counter, in order for shifting to be eliminated from the SMCCAM. When a new span is being written to the SMCCAM, a query determines which spans should be later in the sorted list than the new span. Such "later" spans have their up-counter incremented, and no shifting is performed. The up-counter for the new span would be assigned the lowest counter number in the list of "later" spans before the up-count takes place.

This approach means the "get the first span in the sorted list" becomes "find the smallest counter value" in the Span Memory 408. Hence, the sorting (i.e., shifting) is replaced with a new search type. For this to be fast, the hardware would need to have a "find the smallest" function associated with the set of up-counters. Also, this "find the smallest" could be performed in bit-serial method.

Using a generic CAM

Generic, prior art CAMs could be used, but magnitude comparisons would be bit sequential. This would greatly slow the processing, but may afford some cost savings in the hardware. This alternative would probably use the up-counting tag, as described in the previous section.

Using multiple registers per arithmetic comparator

The above description of the SMCCAM assumes a one-to-one match between memory register and arithmetic comparators. An alternate approach is to have all the memory registers in the same word share a single arithmetic comparator. This saves on circuitry, but slows the processing. However, since not all fields participate in every query operation, the performance loss is not proportional to the total number of fields.

Other alternate approaches could share comparators between words, or between words and fields. These approaches further reduce the amount of hardware, but further reduce the performance. If any of these shared comparator approaches are used, then a standard six-transfer RAM cell should be used because it provides the greatest density. Hence, the searching and sorting hardware could be made from a set of multiple-word memories, where each such memory has one or more comparators associated with it.

Using a RAM-based sorting processor

An alternative to using a CAM of any type can be done by having a fast linked list sorting processor. By utilizing fast memory, spans could be sorted into a linear list in the same order as described above (using an SMCCAM). But, since spans are added and deleted frequently, this approach might be every slow. The advantage is the ability to use fast off-the-shift RAMs that are readily available.

To aid in SOT Query operations, a two-dimensional data structure could be used that sorts the spans in both the x and z dimensions at the same time. Such a searching and sorting structures is described on pages 24 to 55 of "Data Structures and Algorithms 3: Multi-dimensional Searching and Computational Geometry", by Kurt Mahlhorn, a volume in the EATCS series on Monographs on Theoretical Computer Science, edited by Brauer, W., et al., ISBM 0-387-13642.8, published by Springer-Verlag, N.Y., 1985.

Shadow processing

Because shadow computations as essentially the same as hidden surface removal, the Span Sorting Renderer 500 can be used for shadow computation. This can be done by utilizing multiple Span Sorting Renderers 500 in parallel, or it can be done by time-sharing one Span Sorting Renderer 500.

What is claimed is:

1. A sorting magnitude comparison content addressable memory (SMCCAM) apparatus comprising:

a plurality of addressable memory storage bits, each said storage bit for storing a data bit, said memory storage bits arranged into a plurality of words;

an input circuit providing an input comprising a plurality of input bits matching some of said data bits so as to have a one-to-one bit correspondence to said data bits;

a comparator circuit simultaneously comparing said plurality of input bits to data bits in all said words, said comparator circuit making simultaneous comparisons such that each said data bit is compared to its corresponding input bit, and said comparator circuit generating a query result for each said word which query results has a first state when all said data bits within said word which are compared to one of said input bits compare favorably to each corresponding input bit, and a second state when said bits do not compare favorably;

a flag memory storage storing a flag bit generated from said query result for each of said words;

an up-counter circuit for each said word, said up-counter circuit being conditionally incremented according to said flag bit, the up-counter used to indicate a position in an ordered list; and a circuit locating the smallest value in said up-counter circuits.

2. In a graphical processing system for processing 3-dimensional object geometry data and rendering at least some of said object geometry data on a 2-dimensional display screen, said object geometry comprising polygons, a method for rendering a display raster line comprising the steps:

(i) maintaining a list of current polygons that intersect a current display raster line;

(ii) generating a polygon span for each polygon that intersects said current display raster line based on geometric properties of said polygon including said polygon parameters, each said polygon span including subraster information describing the geometric shape of said span within a vertical extent of said display raster line;

(iii) generating at least one dummy span, said dummy span representing a location and a clipping function of a clipping plane, each said dummy span including subraster information describing the geometric shape of said span within a vertical extent of said display raster line;

(iii) storing said geometric properties of each said generated span into a span memory, said generated spans, said current span portion comprised of a set of current subspans, each said (iv) maintaining a current span portion that is part of a potentially visible one of said generated spans, said current span portion comprised of a set of current subspans, each said current subspan representing a rectangular area within said current span portion, and said set of current subspans approximating an area of said current span portion;

(v) performing at least one span occluding test to find any new span that potentially occludes said current span portion, where said span occluding test comprises:
      (1) determining the leftmost, rightmost, and farthest spatial coordinates in said set of current subspans; and
      (2) performing a query operation on the said stored geometric properties in said span memory to find all said spans whose stored geometric properties include a spatial coordinate located between said leftmost and said rightmost spatial coordinates of the said set of current subspans, and a spatial coordinate closer than said farthest spatial coordinate of the said set of current subspans;

(vi) generating a set of new subspans, each said new subspan representing a rectangular area within said new span, and said set of new subspans approximating an area of said new span;

(vii) for each said subspan in said set of current subspans, performing a subspan comparison comprising:
      (1) performing a spatial comparison between said subspan in said set of current subspans and a corresponding subspan in the said set of new subspans; and
      (2) determining the visibility, partial visibility, or non-visibility of each subspan in said set of current subspans, taking into account the clipping function of one of the dummy spans if the new span is a dummy span; and (viii) updating said current span portion based on result of said subspan comparisons.

* * * * *